(12) United States Patent
Nishimura et al.

(10) Patent No.: US 12,393,669 B2
(45) Date of Patent: Aug. 19, 2025

(54) INFORMATION PROCESSING APPARATUS, INFORMATION PROCESSING METHOD, AND PROGRAM

(71) Applicant: SONY GROUP CORPORATION, Tokyo (JP)

(72) Inventors: Kiminobu Nishimura, Kanagawa (JP); Masanori Katsu, Tokyo (JP); Taizo Shirai, Kanagawa (JP)

(73) Assignee: SONY GROUP CORPORATION, Tokyo (JP)

( * ) Notice: Subject to any disclaimer, the term of this patent is extended or adjusted under 35 U.S.C. 154(b) by 405 days.

(21) Appl. No.: 17/431,993

(22) PCT Filed: Feb. 10, 2020

(86) PCT No.: PCT/JP2020/005027
§ 371 (c)(1),
(2) Date: Aug. 18, 2021

(87) PCT Pub. No.: WO2020/175116
PCT Pub. Date: Sep. 3, 2020

(65) Prior Publication Data
US 2022/0147611 A1    May 12, 2022

(30) Foreign Application Priority Data

Feb. 25, 2019    (JP) ................ 2019-031834

(51) Int. Cl.
*G06F 21/45*    (2013.01)
(52) U.S. Cl.
CPC ...... *G06F 21/45* (2013.01); *G06F 2221/2113* (2013.01)
(58) Field of Classification Search
None
See application file for complete search history.

(56) References Cited

U.S. PATENT DOCUMENTS

| 5,944,824 A | * | 8/1999 | He | H04L 63/102 |
| | | | | 726/6 |
| 8,484,711 B1 | * | 7/2013 | Coletta | H04L 67/563 |
| | | | | 726/17 |

(Continued)

FOREIGN PATENT DOCUMENTS

| CN | 107797778 A | 3/2018 |
| EP | 3087773 | 11/2016 |

(Continued)

OTHER PUBLICATIONS

Fumiaki Kudo et al., Continuous Authentication System Using Wearable Device, The Institute of Electronics, Information and Communication Engineers, IEICE Technical Report, Mar. 2-3, 2017, pp. 79-83, Vo. 116, No. 488, IEICE.

*Primary Examiner* — Kambiz Zand
*Assistant Examiner* — Mahabub S Ahmed
(74) *Attorney, Agent, or Firm* — Paratus Law Group, PLLC

(57) ABSTRACT

There is provided an information processing apparatus, an information processing method, and a program for enabling simple and safe sharing of authentication information among a plurality of information processing apparatuses. The information processing apparatus includes an authentication sharing control unit that controls sharing of authentication information of a user among a plurality of information processing apparatuses attached to the same user and having different authentication levels. The present technology can be applied to, for example, smartphones, personal computers, wearable devices, and the like.

19 Claims, 66 Drawing Sheets

(56) References Cited

U.S. PATENT DOCUMENTS

| | | | | |
|---|---|---|---|---|
| 8,805,089 B2* | 8/2014 | Chang | G06F 3/005 | 709/212 |
| 8,914,869 B2* | 12/2014 | Shu | H04L 12/2821 | 726/6 |
| 9,038,138 B2* | 5/2015 | Trammel | H04L 63/0876 | 713/188 |
| 9,349,035 B1* | 5/2016 | Gerber | H04L 63/0861 | |
| 9,749,331 B1* | 8/2017 | Koeten | H04L 63/0815 | |
| 9,762,581 B1* | 9/2017 | Wang | H04L 63/102 | |
| 10,387,634 B1* | 8/2019 | Lindell | G06F 21/35 | |
| 10,547,745 B2* | 1/2020 | Dhawan | H04M 3/5158 | |
| 10,580,243 B2* | 3/2020 | Harding | G07C 9/37 | |
| 10,803,159 B2* | 10/2020 | Kim | G06F 21/32 | |
| 10,977,348 B2* | 4/2021 | Boesen | H04L 63/0861 | |
| 11,036,870 B2* | 6/2021 | Kamal | G06F 21/602 | |
| 11,101,993 B1* | 8/2021 | Shahidzadeh | H04L 9/0863 | |
| 11,115,403 B2* | 9/2021 | Krishan | G06F 21/32 | |
| 11,151,816 B2* | 10/2021 | Schoenfelder | G07C 9/257 | |
| 11,227,036 B1* | 1/2022 | Hitchcock | G06F 21/40 | |
| 11,464,451 B1* | 10/2022 | Zavanelli | A61B 5/6833 | |
| 2002/0126881 A1* | 9/2002 | Langley | G06V 40/12 | 382/218 |
| 2002/0184538 A1* | 12/2002 | Sugimura | G06F 21/32 | 726/5 |
| 2003/0163733 A1* | 8/2003 | Barriga-Caceres | H04L 67/51 | 726/5 |
| 2004/0014423 A1* | 1/2004 | Croome | H04L 63/08 | 455/403 |
| 2004/0153656 A1* | 8/2004 | Cluts | H04L 9/40 | 713/186 |
| 2004/0257196 A1* | 12/2004 | Kotzin | G06F 21/31 | 340/5.74 |
| 2005/0108057 A1* | 5/2005 | Cohen | G16H 40/20 | 705/3 |
| 2005/0229007 A1* | 10/2005 | Bolle | G06V 40/10 | 713/186 |
| 2006/0282671 A1* | 12/2006 | Burton | G16H 10/60 | 713/176 |
| 2007/0288320 A1* | 12/2007 | Cooper | G06Q 20/12 | 705/348 |
| 2009/0064296 A1* | 3/2009 | Aikawa | H04W 12/06 | 726/6 |
| 2009/0232361 A1* | 9/2009 | Miller | G06F 18/256 | 382/115 |
| 2010/0071031 A1* | 3/2010 | Carter | G06F 21/32 | 726/2 |
| 2010/0192209 A1* | 7/2010 | Steeves | H04L 63/08 | 726/7 |
| 2011/0056108 A1* | 3/2011 | McCord | F41A 17/066 | 40/633 |
| 2011/0067092 A1* | 3/2011 | Baker | H04L 63/083 | 726/6 |
| 2011/0145897 A1* | 6/2011 | Tyree | G06F 21/42 | 726/6 |
| 2012/0032781 A1* | 2/2012 | Moon | G06F 21/72 | 340/5.82 |
| 2012/0089682 A1* | 4/2012 | Wu | H04W 28/24 | 709/206 |
| 2012/0096526 A1* | 4/2012 | Brahmanapalli | H04L 9/3234 | 726/6 |
| 2012/0144468 A1* | 6/2012 | Pratt | H04L 9/3271 | 726/7 |
| 2013/0047266 A1* | 2/2013 | Radhakrishnan | H04L 63/105 | 726/28 |
| 2013/0104187 A1* | 4/2013 | Weidner | G06F 21/74 | 726/1 |
| 2013/0133035 A1* | 5/2013 | Baba | H04L 63/0869 | 726/3 |
| 2013/0133055 A1* | 5/2013 | Ali | H04L 63/0861 | 726/7 |
| 2013/0267204 A1* | 10/2013 | Schultz | G06F 21/32 | 455/411 |
| 2014/0089673 A1* | 3/2014 | Luna | H04L 63/0861 | 713/186 |
| 2014/0164611 A1* | 6/2014 | Molettiere | A61B 5/1118 | 709/224 |
| 2014/0223547 A1* | 8/2014 | Tse | G06F 21/31 | 726/19 |
| 2014/0232525 A1* | 8/2014 | Mohmedi | G06V 40/1365 | 340/5.83 |
| 2014/0245414 A1* | 8/2014 | Eun | G06F 21/608 | 726/7 |
| 2014/0270408 A1* | 9/2014 | Hutchison, IV | G06F 16/5838 | 382/118 |
| 2014/0282895 A1* | 9/2014 | Stuntebeck | G06F 21/34 | 726/4 |
| 2014/0289509 A1* | 9/2014 | Baghdasaryan | H04L 63/0861 | 713/155 |
| 2014/0289833 A1* | 9/2014 | Briceno | G06F 21/31 | 726/5 |
| 2014/0366128 A1* | 12/2014 | Venkateswaran | H04W 12/30 | 726/19 |
| 2015/0035643 A1* | 2/2015 | Kursun | G07C 9/32 | 340/5.82 |
| 2015/0046990 A1* | 2/2015 | Oberheide | G06F 21/45 | 726/5 |
| 2015/0052587 A1* | 2/2015 | O'Neill | H04W 12/06 | 726/4 |
| 2015/0070134 A1* | 3/2015 | Nagisetty | G07C 9/28 | 340/5.61 |
| 2015/0082032 A1* | 3/2015 | Bruce | H04L 63/08 | 713/168 |
| 2015/0186636 A1* | 7/2015 | Tharappel | G06F 21/32 | 726/8 |
| 2015/0213244 A1* | 7/2015 | Lymberopoulos | G06V 40/70 | 726/19 |
| 2015/0227726 A1* | 8/2015 | Grigg | H04L 9/3226 | 726/7 |
| 2015/0281200 A1* | 10/2015 | Steeves | G06F 21/32 | 726/6 |
| 2015/0310444 A1* | 10/2015 | Chen | G06Q 20/308 | 705/44 |
| 2015/0350178 A1* | 12/2015 | Yang | G06F 21/31 | 713/168 |
| 2016/0063657 A1* | 3/2016 | Chen | H04L 63/08 | 705/325 |
| 2016/0065568 A1* | 3/2016 | Dave | H04L 63/0838 | 726/4 |
| 2016/0127900 A1* | 5/2016 | John Archibald | G06F 21/32 | 726/7 |
| 2016/0135046 A1* | 5/2016 | John Archibald | H04L 63/0861 | 455/411 |
| 2016/0149904 A1* | 5/2016 | Kim | G06F 21/32 | 713/186 |
| 2016/0269377 A1* | 9/2016 | Ylönen | H04L 9/0891 | |
| 2016/0302677 A1* | 10/2016 | He | A61B 5/1102 | |
| 2016/0344569 A1* | 11/2016 | Chun | G06F 3/04817 | |
| 2017/0006009 A1* | 1/2017 | Hessler | G06F 21/316 | |
| 2017/0124562 A1* | 5/2017 | Hessler | G06Q 20/386 | |
| 2017/0237716 A1* | 8/2017 | Kim | H04L 63/0823 | 726/6 |
| 2017/0262664 A1* | 9/2017 | Leiponis | G06K 7/10316 | |
| 2017/0337412 A1* | 11/2017 | Bhat | G06V 40/1318 | |
| 2017/0372059 A1* | 12/2017 | Sindia | H04L 63/08 | |
| 2018/0026973 A1* | 1/2018 | Le Saint | G06Q 20/40 | |
| 2018/0039990 A1* | 2/2018 | Lindemann | G06V 40/19 | |
| 2018/0183779 A1* | 6/2018 | Krishan | H04W 12/06 | |
| 2018/0191501 A1* | 7/2018 | Lindemann | H04L 9/0833 | |
| 2018/0225456 A1* | 8/2018 | Barsness | G06F 21/35 | |
| 2018/0302408 A1* | 10/2018 | Touati | H04L 9/3234 | |
| 2018/0336332 A1* | 11/2018 | Singh | H04L 9/3271 | |
| 2019/0058994 A1 | 2/2019 | Embrechts et al. | | |
| 2019/0090135 A1* | 3/2019 | Milevski | H04W 12/06 | |
| 2019/0090812 A1* | 3/2019 | Martin | G06F 1/3231 | |
| 2019/0130124 A1* | 5/2019 | Dasgupta | G06F 21/6218 | |
| 2019/0156020 A1* | 5/2019 | Sato | H04L 9/0894 | |
| 2019/0156345 A1* | 5/2019 | Chen | G06Q 20/3226 | |
| 2019/0173887 A1* | 6/2019 | Gauthier | G06F 21/45 | |
| 2019/0222570 A1* | 7/2019 | Krishan | G06F 21/45 | |

(56) References Cited

U.S. PATENT DOCUMENTS

| | | | | |
|---|---|---|---|---|
| 2019/0268332 A1* | 8/2019 | Wang | ............... | G06F 21/32 |
| 2019/0298173 A1* | 10/2019 | Lawrence | ............ | A61B 5/0024 |
| 2019/0392125 A1* | 12/2019 | Lee | ............... | H04L 63/105 |
| 2020/0014702 A1* | 1/2020 | Dasgupta | ............... | G06F 21/45 |
| 2020/0053088 A1* | 2/2020 | Drake, II | ............... | H04L 63/08 |
| 2020/0120090 A1* | 4/2020 | Li | ............... | G06F 21/32 |
| 2020/0151988 A1* | 5/2020 | Harding | ............... | G07C 9/37 |
| 2020/0265132 A1* | 8/2020 | Chang | ............ | G06Q 20/40145 |
| 2021/0144008 A1* | 5/2021 | Prager | ............... | G06V 40/1382 |
| 2021/0365531 A1* | 11/2021 | Tuneld | ............... | H04L 9/3231 |
| 2021/0409405 A1* | 12/2021 | Salajegheh | ......... | H04L 63/0807 |

FOREIGN PATENT DOCUMENTS

| | | |
|---|---|---|
| JP | 2011-130398 A | 6/2011 |
| JP | 2012-247825 A | 12/2012 |
| JP | 2018-042745 A | 3/2018 |
| JP | 2018-198038 A | 12/2018 |
| KR | 101857899 B1 | 5/2018 |
| WO | WO 2017/111672 A1 | 6/2017 |

* cited by examiner

| TIMESTAMP | DEVICE ID | CHARACTERISTIC TYPE | CHARACTERISTIC AMOUNT |
|---|---|---|---|
| 2018/11/27 10:26:13.622 | 427683 | WALKING INTERVAL | 41A0C0E5 |
| 2018/11/27 10:26:21.145 | 427683 | WALKING INTERVAL | E4B91AE0F |
| ... | ... | ... | ... |

B

| TIMESTAMP | DEVICE ID | CHARACTERISTIC TYPE | CHARACTERISTIC AMOUNT |
|---|---|---|---|
| 2018/11/27 10:26:13.532 | 365137 | WALKING INTERVAL | 41A0C0DB |
| 2018/11/27 10:26:21.532 | 365137 | WALKING INTERVAL | E4B91AE05 |
| ... | ... | ... | ... |

FIG. 37

| | | 1 | 2 | 3 |
|---|---|---|---|---|
| DEVICE ID | | | | |
| AUTHENTICATION LEVEL | | 5 | 1 | 1 |
| MOUNT STATE | | Yes | Yes | Yes |
| SENSOR TYPE | ACCELERATION SENSOR | Yes | Yes | Yes |
| | PULSE SENSOR | | Yes | Yes |
| | BLOOD GLUCOSE SENSOR | | Yes | |
| | RESPIRATION SENSOR | | | Yes |
| DETECTION DATA TYPE | WALKING INTERVAL | Yes | Yes | Yes |
| | PULSE PATTERN | | Yes | Yes |
| | BLOOD GLUCOSE LEVEL | | Yes | |
| | RESPIRATORY RHYTHM | | | Yes |

| from \ to | WATCH | BLOOD GLUCOSE SENSOR | RESPIRATION SENSOR |
|---|---|---|---|
| WATCH | 5 | 🔑 | 🔑 |
| BLOOD GLUCOSE SENSOR | | 1 | |
| RESPIRATION SENSOR | | | 1 |

FIG. 57

| FUNCTION | FATHER | MOTHER | DAUGHTER | SON |
|---|---|---|---|---|
| SWIMMING SCHOOL KEY | | | | ● ● |
| LOCATION INFORMATION TRANSMISSION | | | ● ● | |
| PAYMENT UP TO 1000 YEN PER MONTH | | ● ● | | |
| CAR KEY | | ● | | |
| ATM WITHDRAWAL | | | | |

FIG. 70

| AUTHENTICATION LEVEL (EER) | AVAILABLE FUNCTION | AUTHENTICATION LEVEL 2 | AUTHENTICATION LEVEL 5 |
|---|---|---|---|
| 1 (NOT REQUIRED) | PREPAID PAYMENT | | ● |
| 2 (<5%) | SPORTS GYM MEMBER CARD | ● | ● |
| 3 (<0.1%) | POSTPAID PAYMENT | ● | ● |
| 4 (<0.05%) | CAR KEY | | ● |
| 5 (<0.01%) | HOUSE KEY | | ● |

INFORMATION PROCESSING APPARATUS, INFORMATION PROCESSING METHOD, AND PROGRAM

CROSS REFERENCE TO PRIOR APPLICATION

This application is a National Stage Patent Application of PCT International Patent Application No. PCT/JP2020/005027 (filed on Feb. 10, 2020) under 35 U.S.C. § 371, which claims priority to Japanese Patent Application No. 2019-031834 (filed on Feb. 25, 2019), which are all hereby incorporated by reference in their entirety.

TECHNICAL FIELD

The present technology relates to an information processing apparatus, an information processing method, and a program, and more particularly to an information processing apparatus, an information processing method, and a program favorably used in a case of sharing authentication information among a plurality of information processing apparatuses.

BACKGROUND ART

Life insurance companies can curb insurance payments as each policyholder maintains healthy. Therefore, the life insurance companies consider introduction of services for collecting biometric data (for example, an exercise amount or the like) detected by the wearable device worn by the policyholder and, for example, granting benefits and discounting premiums on the basis of the collected biometric data in order to promote the health of the policyholder.

Furthermore, conventionally, it has been proposed that an information processing apparatus converts or separates sensor information collected from a sensor mounted on a user into granularity and accuracy minimum required by a server that uses the sensor information and transmits the sensor information to the server (see, for example, Patent Document 1).

CITATION LIST

Patent Document

Patent Document 1: Japanese Patent Application Laid-Open No. 2018-198038

SUMMARY OF THE INVENTION

Problems to be Solved by the Invention

However, in the above-described service of the life insurance companies, it is necessary to take measures against spoofing such that, for example, another person wears the wearable device and exercises instead of the policyholder. Patent Document 1 does not particularly examine the measures against user spoofing.

Meanwhile, as a countermeasure against user spoofing, for example, a method of obliging the user to perform user authentication such as fingerprint authentication on the wearable device before exercising is conceivable. However, this method is expected to decline convenience such as the user feeling annoyed or forgetting the user authentication, or a wearable device that cannot be equipped with a module for user authentication due to cost, mount position, or the like becoming unavailable.

The present technology has been made in view of the foregoing, and enables simple and safe sharing of authentication information among a plurality of information processing apparatuses such as wearable devices.

Solutions to Problems

An information processing apparatus according to one aspect of the present technology includes an authentication sharing control unit configured to control sharing of authentication information of a user among a plurality of information processing apparatuses attached to the same user and having different authentication levels.

An information processing method according to one aspect of the present technology controls sharing of authentication information of a user among a plurality of information processing apparatuses attached to the same user and having different authentication levels.

A program according to one aspect of the present technology causes a computer to execute processing of controlling sharing of authentication information of a user among a plurality of information processing apparatuses attached to the same user and having different authentication levels.

In one aspect of the present technology, authentication information of a user is shared among a plurality of information processing apparatuses attached to the same user and having different authentication levels.

BRIEF DESCRIPTION OF DRAWINGS

FIG. 10 is a diagram illustrating an example of characteristic information.

FIG. 37 is a diagram illustrating an example of an authentication state table.

FIG. 57 is a table illustrating an example of functions that are enabled by sharing authentication information.

FIG. 70 is a diagram illustrating an example of a function enabled according to an authentication level.

MODE FOR CARRYING OUT THE INVENTION

Hereinafter, modes for carrying out the present technology will be described. Description will be given in the following order.

1. First Embodiment
  2. Second Embodiment
  3. Third Embodiment
  4. Fourth Embodiment
  5. Fifth Embodiment
  6. Sixth Embodiment
  7. Modification
  8. Others 1. First Embodiment <Configuration Example of Information Processing System 1>

Figure 1:
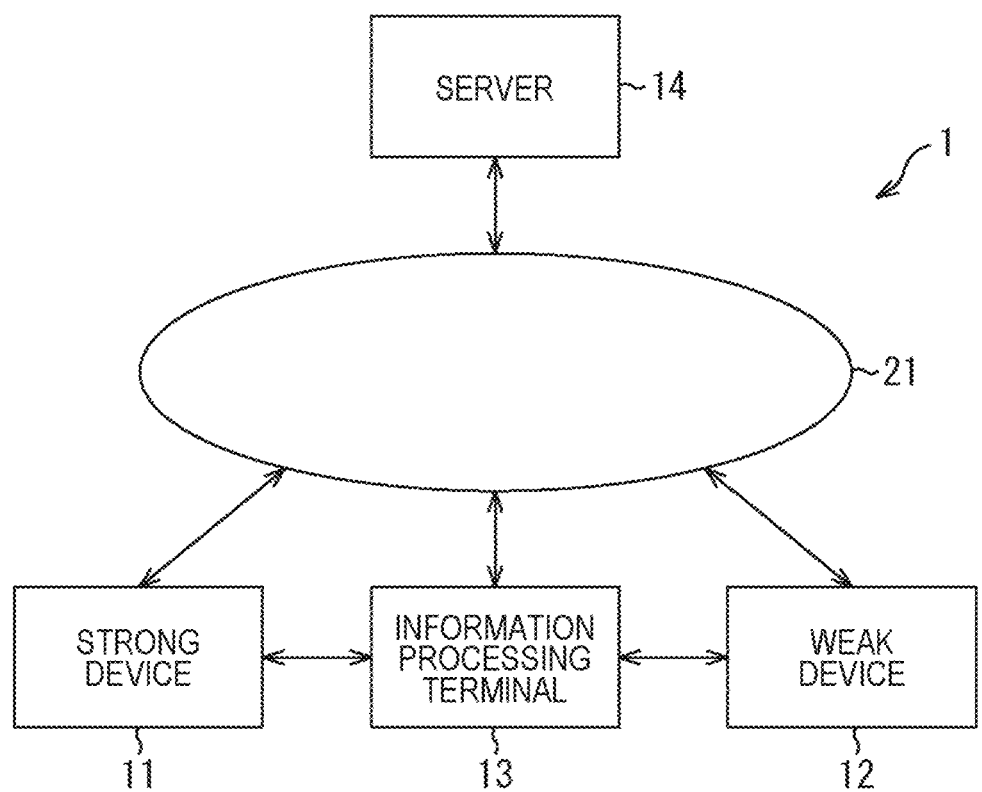
FIG. 1 is a block diagram illustrating a first embodiment of an information processing system to which the present technology is applied.

FIG. 1 is a block diagram illustrating a configuration example of an information processing system 1 to which the present technology is applied.

The information processing system 1 is a system that collects biometric data of a user and performs various types of processing using the biometric data. For example, the information processing system 1 is used to provide a service that grasps the life and health of each life insurance policyholder on the basis of biometric data, and grants life insurance benefits, discounts premiums, and the like.

Here, the biometric data is, for example, data regarding the mind and body or behavior of the user. Examples of data regarding the mind and body of the user include body temperature, blood flow, blood pressure, blood oxygen saturation, blood glucose level, pulse pattern (for example, pulse rate or the like), heartbeat pattern (for example, heart rate or the like), sweating amount, brain wave, electrocardiogram, maximal oxygen uptake (VO2Max), respiratory rhythm, and the like. Examples of data regarding the behavior of the user include exercise amount, sleep pattern, sleep depth, sleep time, meal amount, meal content, behavior pattern, habit, and the like. Furthermore, the biometric data may be either sensor data obtained by various sensors or data obtained by processing or analyzing the sensor data.

The information processing system 1 includes a strong device 11, a weak device 12, an information processing terminal 13, a server 14, and a network 21. The strong device 11, the weak device 12, the information processing terminal 13, and the server 14 are connected to one another via the network 21 and communicate with one another. Furthermore, the strong device 11, the weak device 12, and the information processing terminal 13 can directly communicate with one another.

The strong device 11 and the weak device 12 are configured by information processing apparatuses capable of being attached to the user, of any type such as eyeglass type, wristband type, bracelet type, necklace type, neckband type, earphone type, headset type, head mount type, and clothing type, for example.

Here, a state of being attached to the user is, for example, a state of being mounted, touched, or carried by the user. Note that, hereinafter, a case where the strong device 11 and the weak device 12 are mainly mounted on the user will be described as an example.

The strong device 11 can perform user authentication in a state of being attached to the user. Furthermore, an authentication level indicating strength of the user authentication (hereinafter referred to as authentication strength) of the strong device 11 is higher than that of the weak device 12. That is, the strong device 11 can execute the user authentication with higher reliability than the weak device 12.

Here, the authentication strength is defined on the basis of, for example, authentication accuracy and security (for example, tamper resistance or the like). For example, an equal error rate (EER) is used for the authentication strength, and the user authentication with an EER that is less than a predetermined threshold value is regarded as strong user authentication.

Meanwhile, the weak device 12 has a lower authentication level than the strong device 11. That is, the weak device 12 has a user authentication function having a lower authentication level than the strong device 11 or does not have a user authentication function.

The strong device 11 and the weak device 12 generate authentication information indicating a state of the user authentication (hereinafter referred to as an authentication state) and transmit the authentication information to the information processing terminal 13.

The authentication information includes, for example, user information (for example, a user ID, a name, and the like) indicating the user (hereinafter referred to as authenticated user) authenticated or identified by the user authentication, and the authentication level. Note that, in a case where the user authentication is invalid, that is, in a case where the user authentication has not been performed or the user authentication has failed, for example, the authenticated user of the authentication information is unset, and the authentication level is set to 1, which is the lowest.

Moreover, the strong device 11 and the weak device 12 each detect a characteristic of a similar type of the user, generate characteristic information including characteristic data indicating the detected characteristic, and transmit the characteristic information to the information processing terminal 13. The characteristics of the user detected by the strong device 11 and the weak device 12 are not particularly limited as long as both the devices being attached to the same user can be detected from the characteristics.

Further, the weak device 12 detects the biometric data of the user, generates biometric information including the biometric data and the authentication information, and transmits the biometric information to the server 14 via the network 21. Moreover, the weak device 12 transmits the characteristic information together with the authentication information to the server 14 via the network 21.

The information processing terminal 13 is configured by, for example, an information processing apparatus such as a smartphone, a personal computer, a tablet, or a mobile phone. The information processing terminal 13 controls processing of sharing the authentication information between the strong device 11 and the weak device 12 on the basis of the characteristic data received from the strong device 11 and the characteristic data received from the weak device 12.

The server 14 performs various types of processing on the basis of the biometric data of the user acquired from the weak device 12. For example, the server 14 performs arithmetic processing such as granting a life insurance benefit of the user and discounting a premium on the basis of the biometric data.

Furthermore, the server 14 performs learning processing of a classifier for user authentication on the basis of the characteristic data acquired from the weak device 12.

Note that FIG. 1 illustrates the strong device 11, the weak device 12, the information processing terminal 13, and the server 14 one each for simplicity of description. However, each device can be provided in plural.

<Configuration Example of Strong Device 11a>

Figure 2:
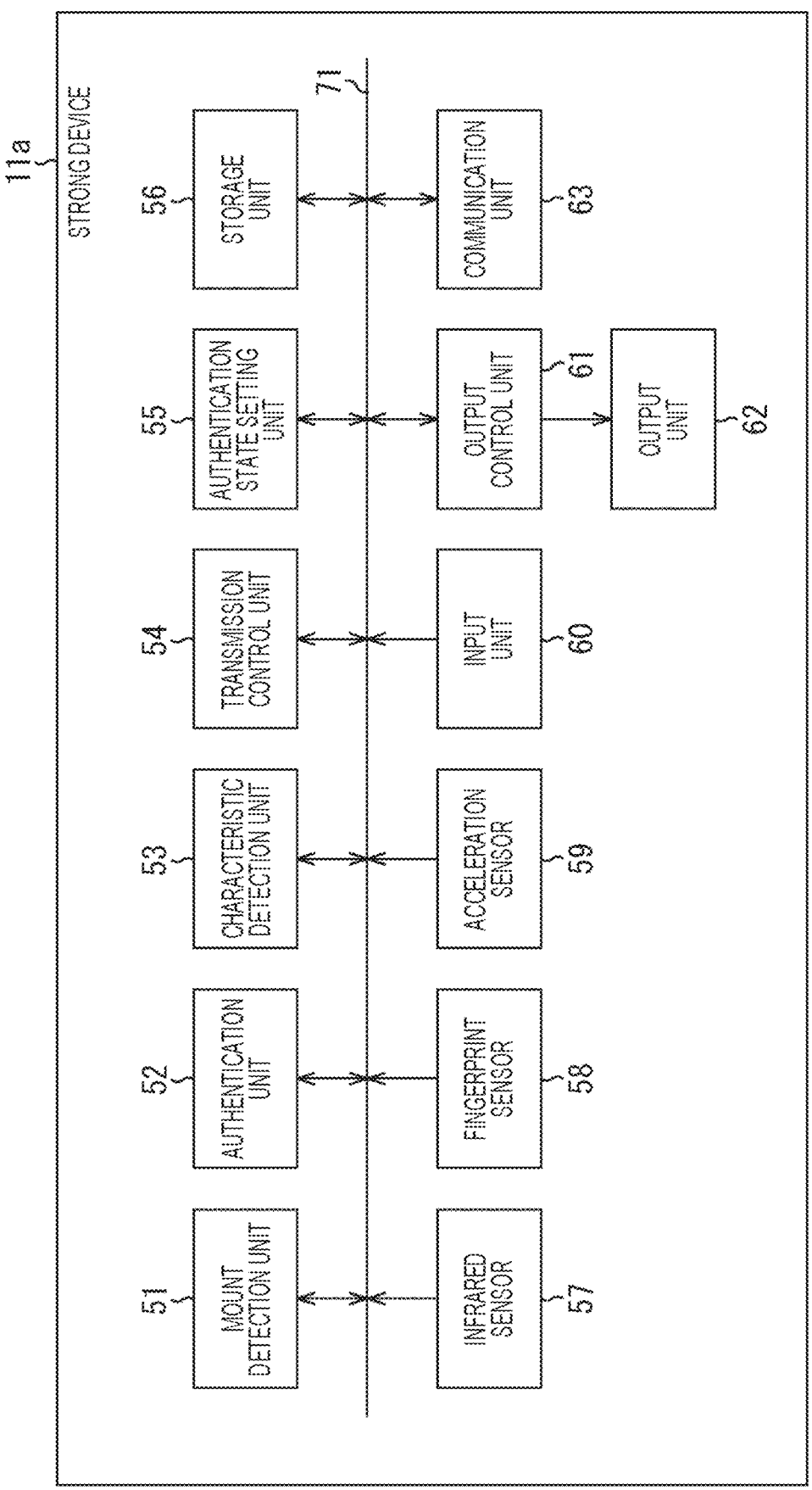
FIG. 2 is a block diagram illustrating the first embodiment of a strong device of FIG. 1.

FIG. 2 illustrates a configuration example of functions of a strong device 11a that is the first embodiment of the strong device 11 of FIG. 1. The strong device 11a includes a mount detection unit 51, an authentication unit 52, a characteristic detection unit 53, a transmission control unit 54, an authentication state setting unit 55, a storage unit 56, an infrared sensor 57, a fingerprint sensor 58, an acceleration sensor 59, an input unit 60, an output control unit 61, an output unit 62, a communication unit 63, and a bus 71. The mount detection unit 51, the authentication unit 52, the characteristic detection unit 53, the transmission control unit 54, the authentication state setting unit 55, the storage unit 56, the infrared sensor 57, the fingerprint sensor 58, the acceleration sensor 59, the input unit 60, the output control unit 61, and the communication unit 63 are connected to one another via the bus 71 and communicate with one another.

Note that, hereinafter, description of the bus 71 will be omitted. For example, in a case where the mount detection unit 51 and the authentication unit 52 transfer data via the bus 71, description of the bus 71 is omitted and it is simply described that the mount detection unit 51 and the authentication unit 52 transfer data.

The mount detection unit 51 detects a mount state of the strong device 11a on the user. For example, the mount detection unit 51 detects the presence or absence of mount of the strong device 11a on the user on the basis of the sensor data from the infrared sensor 57.

The authentication unit 52 performs user authentication. For example, the authentication unit 52 performs fingerprint authentication on the basis of the sensor data from the fingerprint sensor 58 and collation data stored in the storage unit 56.

The characteristic detection unit 53 detects a characteristic of the user and generates characteristic data indicating the detected characteristic. For example, the characteristic detection unit 53 detects a walking characteristic of the user on the basis of the sensor data from the acceleration sensor 59, and generates characteristic data indicating the detected walking characteristic.

The transmission control unit 54 generates characteristic information including the characteristic data. Furthermore, the transmission control unit 54 controls transmission of the authentication information and the characteristic information to the information processing terminal 13.

The authentication state setting unit 55 sets an authentication state of the strong device 11a on the basis of the mount state of the strong device 11a detected by the mount detection unit 51 and a result of the user authentication by the authentication unit 52. The authentication state setting unit 55 generates or updates the authentication information indicating the authentication state of the strong device 11a, and causes the storage unit 56 to store the authentication information.

The storage unit 56 stores various data required for processing of the strong device 11a. For example, the storage unit 56 stores the collation data for collation of the user authentication, the authentication information, and the like.

The infrared sensor 57 detects approach of an object and supplies sensor data indicating a detection result to the mount detection unit 51.

The fingerprint sensor 58 detects a shape of a fingerprint of the user and supplies sensor data indicating the detected shape of the user's fingerprint to the authentication unit 52.

The acceleration sensor 59 detects acceleration of the strong device 11a and supplies sensor data indicating the detected acceleration to the characteristic detection unit.

The input unit 60 includes an input device and is used for inputting various data, instructions, and the like to the strong device 11a. The type of the input device included in the input unit 60 is not particularly limited, and a touch panel, a button, a switch, or the like is used as needed. The input unit 60 generates an input signal on the basis of data, an instruction, or the like input by the user, and supplies the input signal to each unit of the strong device 11a.

The output control unit 61 controls outputs of various types of information by the output unit 62. For example, the output control unit 61 generates an output signal including at least one of visual information (for example, image data), auditory information (for example, audio data), and tactile information (for example, vibration data). The output control unit 61 supplies the generated output signal to the output unit 62, and controls an output of one or more of the visual information, the auditory information, and the tactile information from the output unit 62.

The output unit 62 includes an output device, and can output one or more of the visual information, the auditory information, and the tactile information. For example, the output unit 62 includes a display device, a speaker, a light emitting device, a vibration element, and the like.

The communication unit 63 communicates with the information processing terminal 13 and communicates with the server 14 via the network 21 by a predetermined communication method. Any type of wireless communication, for example, Bluetooth (registered trademark) can be adopted for the communication unit 63. Note that any type of wired communication can be adopted for the communication unit 63. Furthermore, the communication unit 63 may support a plurality of communication methods.

<Configuration Example of Weak Device 12a>

Figure 3:
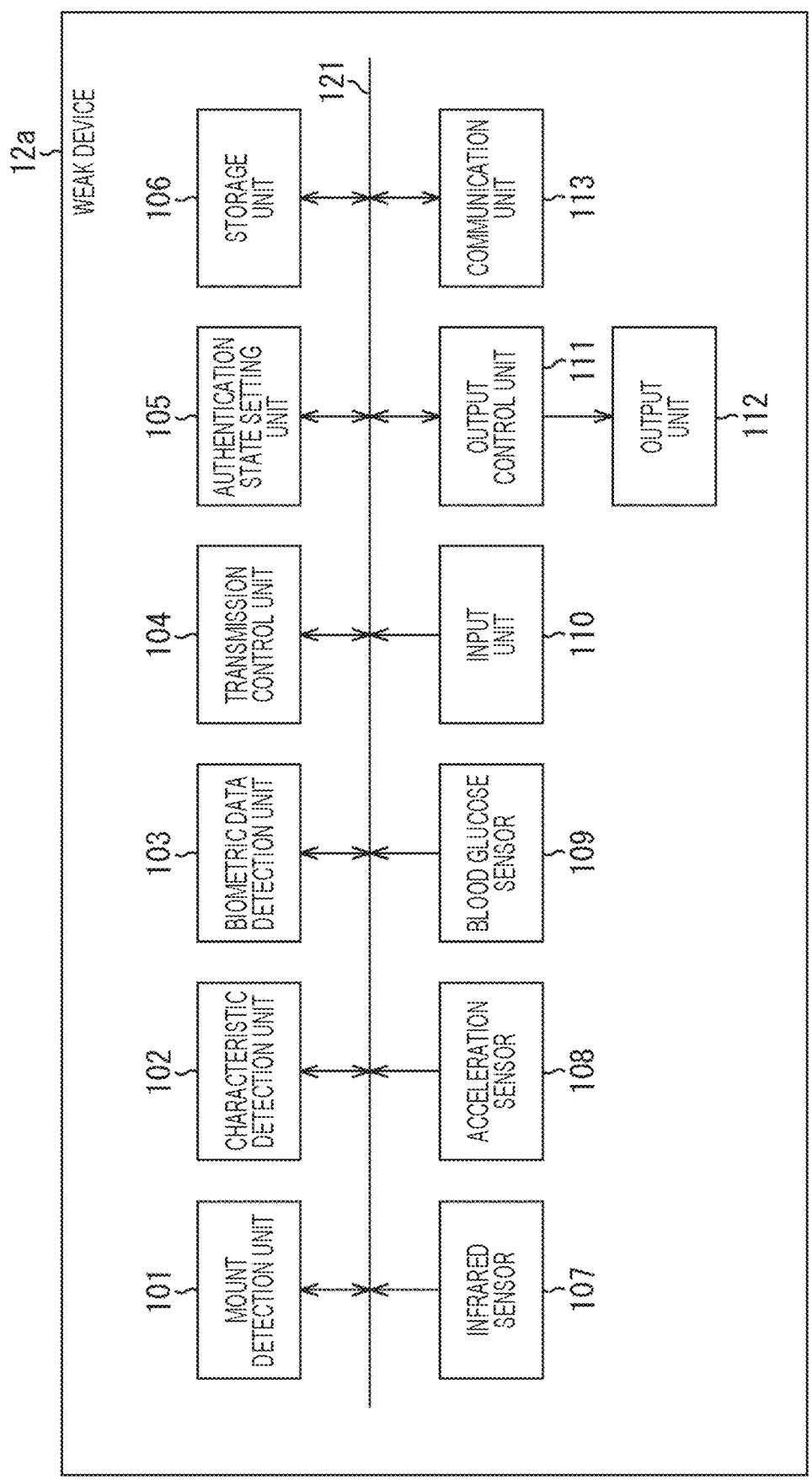
FIG. 3 is a block diagram illustrating the first embodiment of a weak device of FIG. 1.

FIG. 3 illustrates a configuration example of functions of a weak device 12a that is the first embodiment of the weak device 12 of FIG. 1.

Note that FIG. 3 illustrates an example in which the weak device 12a does not have the user authentication function and detects a user's blood glucose level as biometric data.

Specifically, the weak device 12a includes a mount detection unit 101, a characteristic detection unit 102, a biometric data detection unit 103, a transmission control unit 104, an authentication state setting unit 105, a storage unit 106, an infrared sensor 107, an acceleration sensor 108, a blood glucose sensor 109, an input unit 110, an output control unit 111, an output unit 112, a communication unit 113, and a bus 121. The mount detection unit 101, the characteristic detection unit 102, the biometric data detection unit 103, the transmission control unit 104, the authentication state setting unit 105, the storage unit 106, the infrared sensor 107, the acceleration sensor 108, the blood glucose sensor 109, the input unit 110, the output control unit 111, and the communication unit 113 are connected to one another via the bus 121 and communicate with one another.

Note that, hereinafter, description of the bus 121 will be omitted. For example, in a case where the mount detection unit 101 and the characteristic detection unit 102 transfer data via the bus 121, description of the bus 121 is omitted and it is simply described that the mount detection unit 101 and the characteristic detection unit 102 transfer data.

The mount detection unit 101 detects a mount state of the weak device 12a on the user. For example, the mount detection unit 101 detects the presence or absence of mount of the weak device 12a on the user on the basis of the sensor data from the infrared sensor 107.

The characteristic detection unit 102 detects a characteristic of the user and generates characteristic data indicating the detected characteristic. For example, the characteristic detection unit 102 detects a walking characteristic of the user on the basis of the sensor data from the acceleration sensor 108, and generates characteristic data indicating the detected walking characteristic.

The biometric data detection unit 103 detects data regarding the mind and body or behavior of the user, and generates biometric data indicating a detection result. For example, the biometric data detection unit 103 detects a blood glucose level of the user on the basis of the sensor data from the blood glucose sensor 109, and generates biometric data indicating a detection result.

The transmission control unit 104 generates mount state information indicating the mount state of the weak device 12a, characteristic information including the characteristic data, and biometric information including the biometric data. The transmission control unit 104 controls the transmission of the authentication information, the mount state information, and the characteristic information to the information processing terminal 13, and transmission of the biometric information to the server 14.

The authentication state setting unit 105 sets an authentication state of the weak device 12a on the basis of the mount state of the weak device 12a detected by the mount detection unit 101 and the authentication information of the strong device 11a transmitted from the information processing terminal 13. The authentication state setting unit 105 generates or updates the authentication information indicating the authentication state of the weak device 12a, and causes the storage unit 106 to store the authentication information.

The storage unit 106 stores various data required for processing of the weak device 12a. For example, the storage unit 106 stores the authentication information and the like.

The infrared sensor 107 detects approach of an object and supplies sensor data indicating a detection result to the mount detection unit 101.

The acceleration sensor 108 detects acceleration of the weak device 12a and supplies sensor data indicating the detected acceleration to the characteristic detection unit 102.

The blood glucose sensor 109 detects the blood glucose level of the user and supplies the sensor data indicating the detected blood glucose level to the biometric data detection unit 103.

The input unit 110 includes an input device and is used for inputting various data, instructions, and the like to the weak device 12a. The type of the input device included in the input unit 110 is not particularly limited, and a touch panel, a button, a switch, or the like is used as needed. The input unit 110 generates an input signal on the basis of data, an instruction, or the like input by the user, and supplies the input signal to each unit of the weak device 12a.

The output control unit 111 controls outputs of various types of information by the output unit 112. For example, the output control unit 111 generates an output signal including at least one of visual information, auditory information, and tactile information. The output control unit 111 supplies the generated output signal to the output unit 112, and controls an output of one or more of the visual information, the auditory information, and the tactile information from the output unit 112.

The output unit 112 includes an output device and can output one or more of the visual information, the auditory information, and the tactile information. For example, the output unit 112 includes a display device, a speaker, a light emitting device, a vibration element, and the like.

The communication unit 113 communicates with the information processing terminal 13 and communicates with the server 14 via the network 21 by a predetermined communication method. Any type of wireless communication, for example, Bluetooth (registered trademark) can be adopted for the communication unit 113. Note that any type of wired communication can be adopted for the communication unit 113. Furthermore, the communication unit 113 may support a plurality of communication methods.

<Configuration Example of Information Processing Terminal 13a>

Figure 4:
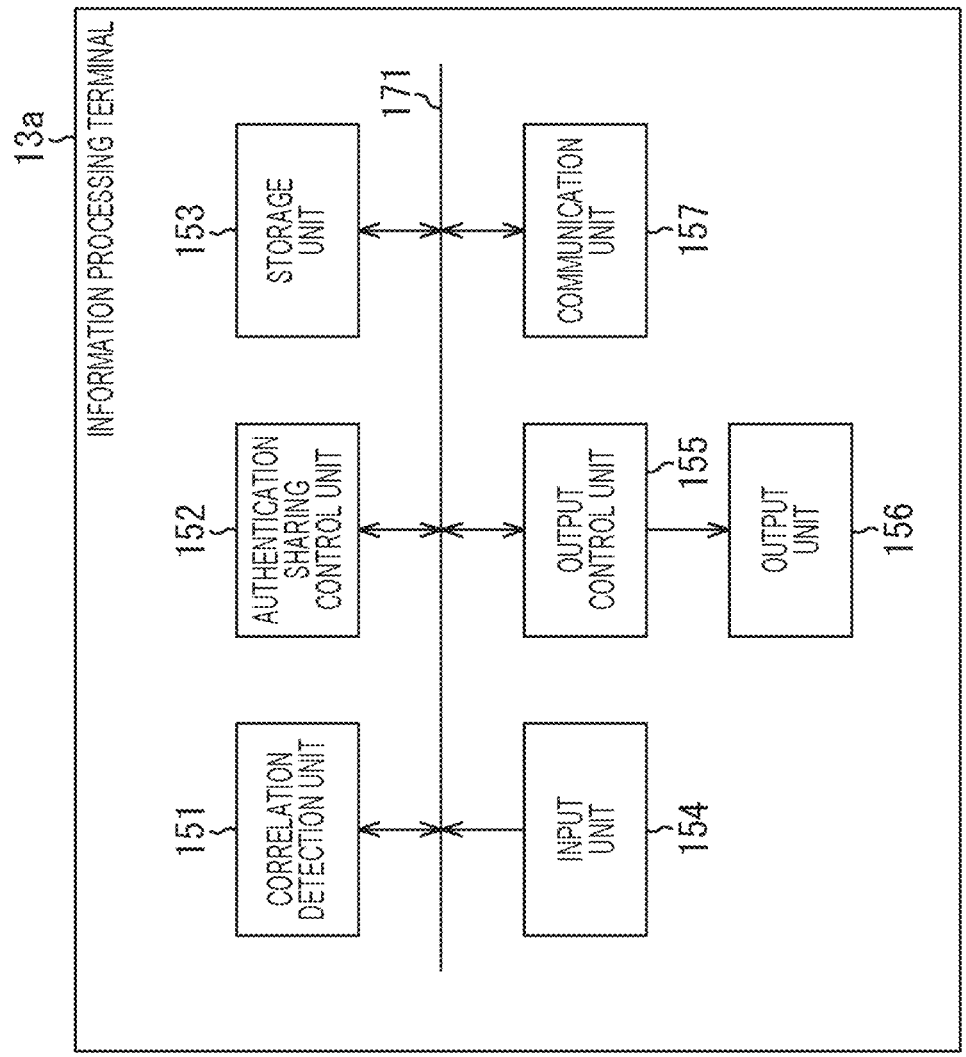
FIG. 4 is a block diagram illustrating the first embodiment of an information processing terminal of FIG. 1.

FIG. 4 illustrates a configuration example of functions of an information processing terminal 13a that is the first embodiment of the information processing terminal 13 of FIG. 1. The information processing terminal 13a includes a correlation detection unit 151, an authentication sharing control unit 152, a storage unit 153, an input unit 154, an output control unit 155, an output unit 156, a communication unit 157, and a bus 171. The correlation detection unit 151, the authentication sharing control unit 152, the storage unit 153, the input unit 154, the output control unit 155, and the communication unit 157 are connected to one another via the bus 171 and communicate with one another.

Note that, hereinafter, description of the bus 171 will be omitted. For example, in a case where the correlation detection unit 151 and the authentication sharing control unit 152 transfer data via the bus 171, description of the bus 171 is omitted and it is simply described that the correlation detection unit 151 and the authentication sharing control unit 152 transfer data.

The correlation detection unit 151 detects a correlation between the characteristic data detected by the strong device 11a and the characteristic data detected by the weak device 12a.

The authentication sharing control unit 152 controls sharing of the authentication information between the strong device 11a and the weak device 12a. For example, the authentication sharing control unit 152 generates and updates an authentication state table for managing the authentication states and the like of the strong device 11a and the weak device 12a on the basis of the authentication information from the strong device 11a and the authentication information and the mount state information from the weak device 12a. Furthermore, the authentication sharing control unit 152 requests the strong device 11a and the weak device 12a to transmit the characteristic information, as needed. Moreover, the authentication sharing control unit 152 controls transmission of the authentication information of the strong device 11a to the weak device 12a on the basis of a detection result of the correlation detection unit 151.

The storage unit 153 stores various data required for processing of the information processing terminal 13a. For example, the storage unit 153 stores the authentication state table.

The input unit 154 includes an input device and is used for inputting various data, instructions, and the like to the information processing terminal 13a. The type of the input device included in the input unit 154 is not particularly limited, and a touch panel, a button, a switch, or the like is used as needed. The input unit 154 generates an input signal on the basis of data, an instruction, or the like input by the user, and supplies the input signal to each unit of the information processing terminal 13a.

The output control unit 155 controls outputs of various types of information by the output unit 156. For example, the output control unit 155 generates an output signal including at least one of visual information, auditory information, and tactile information. The output control unit 155 supplies the generated output signal to the output unit 156, and controls an output of one or more of the visual information, the auditory information, and the tactile information from the output unit 156.

The output unit 156 includes an output device and can output one or more of visual information, auditory information, and tactile information. For example, the output unit 156 includes a display device, a speaker, a light emitting device, a vibration element, and the like.

The communication unit 157 communicates with the strong device 11a by a communication method corresponding to the communication unit 63 of the strong device 11a. Furthermore, the communication unit 157 communicates with the weak device 12a by a communication method corresponding to the communication unit 113 of the weak device 12a. Furthermore, the communication unit 157 communicates with the server 14 via the network 21 by any type of wired communication or wireless communication.

<Configuration Example of Server 14>

Figure 5:
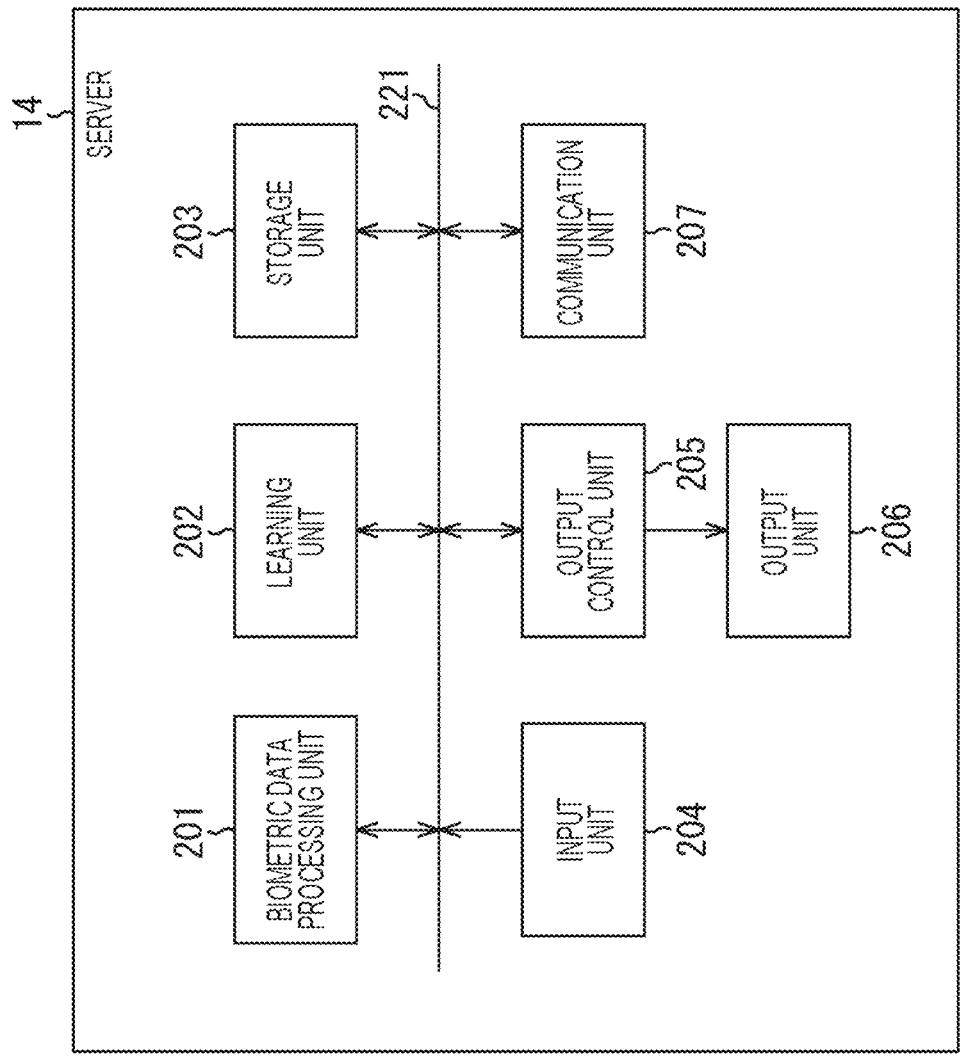
FIG. 5 is a block diagram illustrating a configuration example of a server of FIG. 1.

FIG. 5 illustrates a configuration example of functions of the server 14 of FIG. 1. The server 14 includes a biometric data processing unit 201, a learning unit 202, a storage unit 203, an input unit 204, an output control unit 205, an output unit 206, a communication unit 207, and a bus 221. The biometric data processing unit 201, the learning unit 202, the storage unit 203, the input unit 204, the output control unit 205, and the communication unit 207 are connected to one another via the bus 221 and communicate with one another.

Note that, hereinafter, description of the bus 221 will be omitted. For example, in a case where the biometric data processing unit 201 and the learning unit 202 transfer data via the bus 221, description of the bus 221 is omitted and it is simply described that the biometric data processing unit 201 and the learning unit 202 transfer data.

The biometric data processing unit 201 performs various types of processing using the biometric data received from the weak device 12a.

The learning unit 202 performs learning processing of a classifier to be used for user authentication. For example, the learning unit 202 performs the learning processing of a classifier to be used for user authentication of the weak device 12a on the basis of the characteristic data or the like received from the weak device 12a.

The storage unit 203 stores various data required for processing of the server 14.

The input unit 204 includes an input device and is used for inputting various data, instructions, and the like to the server 14. The type of the input device included in the input unit 204 is not particularly limited, and a touch panel, a button, a switch, or the like is used as needed. The input unit 204 generates an input signal on the basis of data, an instruction, or the like input by the user, and supplies the input signal to each unit of the server 14.

The output control unit 205 controls outputs of various types of information by the output unit 206. For example, the output control unit 205 generates an output signal including at least one of visual information, auditory information, and tactile information. The output control unit 205 supplies the generated output signal to the output unit 206, and controls an output of one or more of the visual information, the auditory information, and the tactile information from the output unit 206.

The output unit 206 includes an output device and can output one or more of the visual information, the auditory information, and the tactile information. For example, the output unit 206 includes a display device, a speaker, a light emitting device, a vibration element, and the like.

The communication unit 207 communicates with the strong device 11a, the weak device 12a, and the information processing terminal 13a via the network 21 by a predetermined communication method. Any type of wireless communication or wired communication can be adopted for the communication unit 207.

<Processing of Information Processing System 1>

Next, processing of the information processing system 1 will be described with reference to FIGS. 6 to 18.

Figure 6:
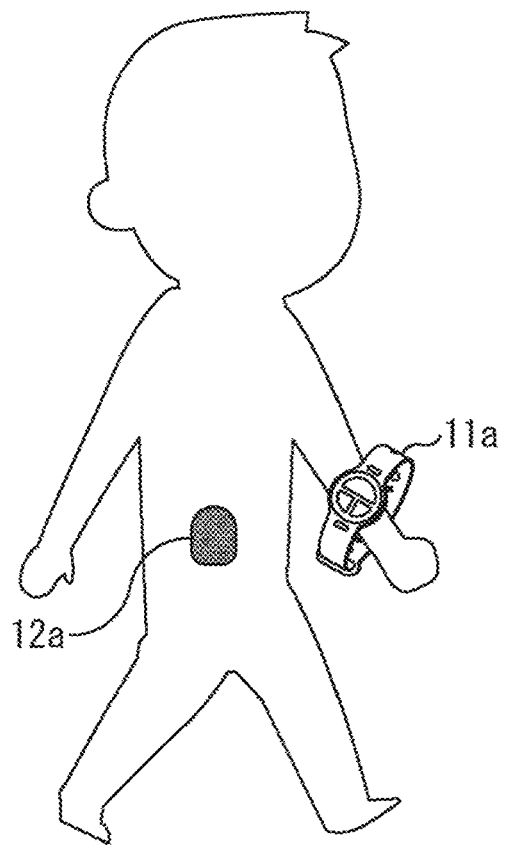
FIG. 6 is a diagram illustrating a mount example of the strong device and the weak device.

Note that, hereinafter, a case where the strong device 11a is a wristband-type wearable device and is mounted on the user's arm, and the weak device 12a is mounted on the user's abdomen will be described, as illustrated in FIG. 6.

<Processing of Strong Device 11a>

First, processing of the strong device 11a will be described with reference to the flowchart of FIG. 7.

This processing starts when the strong device 11a is powered on and ends when the strong device 11a is powered off, for example.

In step S1, the authentication state setting unit 55 resets the authentication state. Specifically, the authentication state setting unit 55 sets the authenticated user to unset and sets the authentication level to 1. The authentication state setting unit 55 updates the user information and the authentication level of the authentication information stored in the storage unit 56 to the set content.

In step S2, the communication unit 63 determines whether or not the strong device 11a has been connected to the information processing terminal 13a. In a case where it is determined that the strong device 11a has been connected to the information processing terminal 13a, that is, in a case where transition from a state where communication connection with the information processing terminal 13a is not established to a state where the communication connection is established has been made, the processing proceeds to step S3.

In step S3, the transmission control unit 54 transmits the authentication information to the information processing terminal 13a. Specifically, the transmission control unit 54 reads the authentication information stored in the storage unit 56, and adds, for example, identification information (for example, an ID or the like) of the strong device 11a to the authentication information. Then, the transmission control unit 54 transmits the authentication information to the information processing terminal 13a via the communication unit 63.

Thereby, even if the authentication state of the strong device 11a changes while the strong device 11a and the information processing terminal 13a are not connected, the latest authentication state is always notified to the information processing terminal 13a after connection.

Thereafter, the processing proceeds to step S4.

On the other hand, in step S2, in a case where it is not determined that the strong device 11a has been connected to the information processing terminal 13a, the processing of step S3 is skipped and the processing proceeds to step S4.

In step S4, the authentication unit 52 determines whether or not the user authentication is successful. Specifically, the fingerprint sensor 58 supplies the sensor data indicating the shape of the user's fingerprint to the authentication unit 52 in a case where the user performs a fingerprint authentication operation. The authentication unit 52 compares the shape of the fingerprint indicated in the acquired sensor data with the shape of the fingerprint indicated in the collation data stored in the storage unit 56. Then, in a case where authentication or identification of a specific user is successful, the authentication unit 52 determines that the user authentication is successful, and the processing proceeds to step S5.

In step S5, the mount detection unit 51 determines whether or not the strong device 11a is mounted on the user on the basis of the sensor data from the infrared sensor 57. In a case where it is determined that the strong device 11a is mounted on the user, the processing proceeds to step S6.

In step S6, the authentication state setting unit 55 updates the authentication state. Specifically, the authentication state setting unit 55 sets the user authenticated or identified by the user authentication as the authenticated user, and sets the authentication level to the authentication level set for the fingerprint authentication. The authentication state setting unit 55 updates the user information and the authentication level of the authentication information stored in the storage unit 56 to the set content.

In step S7, the communication unit 63 determines whether or not the strong device 11a is connected to the information processing terminal 13a. In a case where it is determined that the strong device 11a is connected to the information processing terminal 13a, that is, in a case where communication between the strong device 11a and the information processing terminal 13a is established, the processing proceeds to step S8.

In step S8, the authentication information is transmitted to the information processing terminal 13a similarly to the processing in step S3. Thereby, the authentication state after the user authentication is successful is notified to the information processing terminal 13a.

Thereafter, the processing proceeds to step S9.

On the other hand, in step S7, in a case where it is determined that the strong device 11a is not connected to the information processing terminal 13a, that is, in a case where the communication between the strong device 11a and the information processing terminal 13a is not established, the processing of step S8 is skipped and the processing proceeds to step S9.

Furthermore, in step S5, in a case where it is determined that the strong device 11a is not mounted on the user, the processing of steps S6 to S8 is skipped and the processing proceeds to step S9. That is, in the case where the strong device 11a is not mounted on the user even if the user authentication is successful, the authentication state is not updated and the user authentication is not validated.

Moreover, in step S4, in a case where it is determined that the user authentication has failed, or in a case where it is determined that the user authentication has not been performed, the processing of steps S5 to S8 is skipped and the processing proceeds to step S9.

In step S9, the transmission control unit 54 determines whether or not transmission of the characteristic information has been requested. In a case where the transmission control unit 54 receives a characteristic information transmission request signal for requesting transmission of the characteristic information from the information processing terminal 13a via the communication unit 63, the transmission control unit 54 determines that transmission of the characteristic information has been requested, and the processing proceeds to step S10.

In step S10, the strong device 11a starts transmission of the characteristic information to the information processing terminal 13a. For example, the characteristic detection unit 53 starts processing of detecting an interval between peaks of acceleration in a gravity direction of the strong device 11a mounted on the user as a walking interval that is a walking characteristic of the user on the basis of the sensor data from the acceleration sensor 59, and generating characteristic data indicating the detected walking interval.

Figure 8:
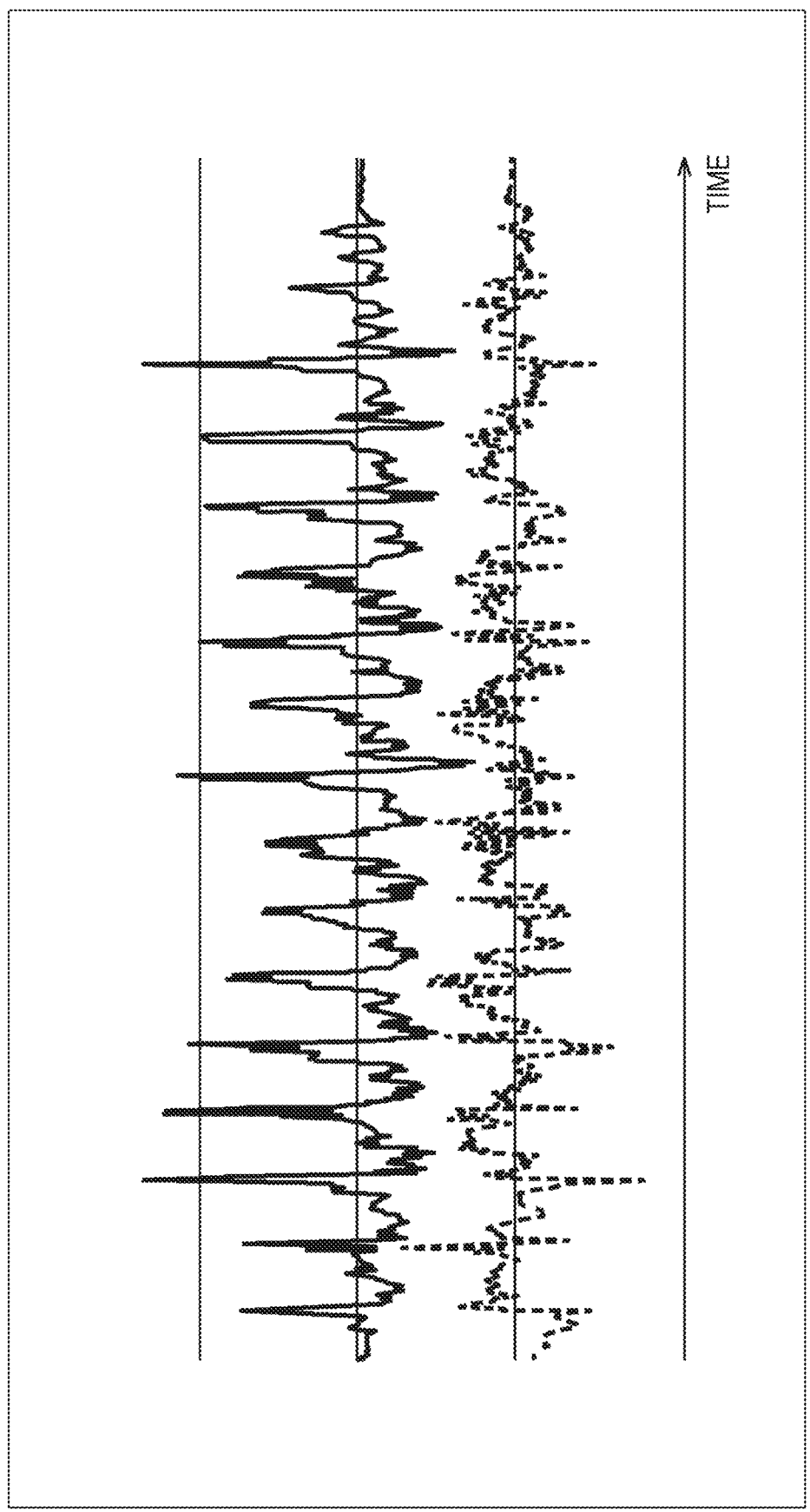
FIG. 8 is a graph illustrating an example of sensor data of an acceleration sensor.
Figure 9:
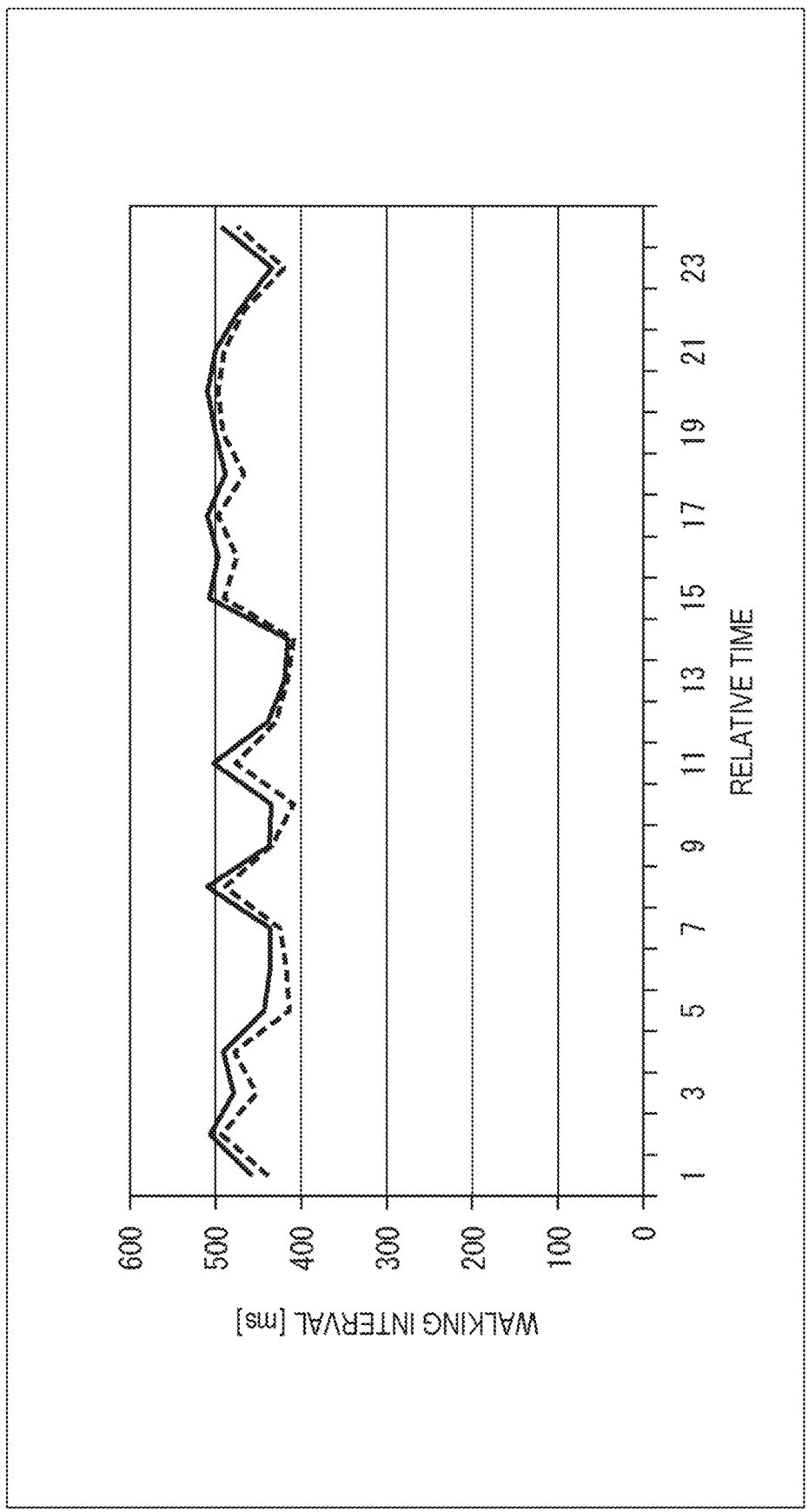
FIG. 9 is a graph illustrating an example of a waveform of a walking interval.

FIGS. 8 and 9 illustrate examples of the sensor data of the acceleration sensor and the detected walking intervals.

Specifically, FIG. 8 illustrates an example of waveforms of the sensor data output from the acceleration sensor 59 of the strong device 11a and the acceleration sensor 108 of the weak device 12a. The horizontal axis represents the time and the vertical axis represents acceleration in the gravity direction. Furthermore, the solid line represents the waveform of the sensor data of the acceleration sensor 59 of the strong device 11a, and the dotted line represents the waveform of the sensor data of the acceleration sensor 108 of the weak device 12a.

FIG. 9 illustrates an example of waveforms of the walking intervals of the user detected on the basis of the sensor data of FIG. 8. The horizontal axis represents a relative time, that is, the number of steps of the user, and the vertical axis represents the walking interval, that is, the time required to walk one step (the unit is ms). Furthermore, the solid line represents the walking interval detected on the basis of the sensor data of the acceleration sensor 59 of the strong device 11a, and the dotted line represents the walking interval detected on the basis of the sensor data of the acceleration sensor 108 of the weak device 12a.

The transmission control unit 54 starts processing of generating characteristic information including the characteristic data and the identification information of the strong device 11a and transmitting the characteristic information to the information processing terminal 13a via the communication unit 63.

A in FIG. 10 illustrates an example of the characteristic information transmitted from the strong device 11a.

The characteristic information includes a timestamp, a device ID, a characteristic type, and a characteristic amount.

The timestamp indicates the date and time when the characteristic data has been detected.

The device ID is an ID for identifying the strong device 11a.

The characteristic type indicates a type of the characteristic data. This example illustrates that the type of the characteristic data is the walking interval (a peak interval of the acceleration in the gravity direction).

The characteristic amount indicates a value of the characteristic data. This example illustrates the time of the walking interval as the value of the characteristic data.

Figure 11:
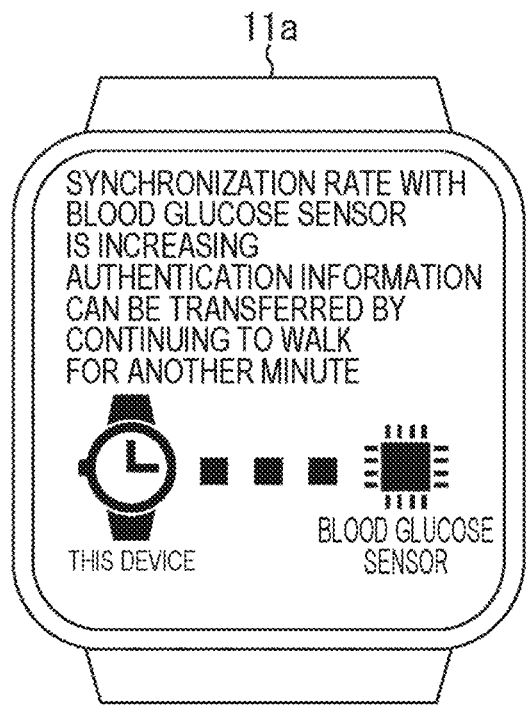
FIG. 11 is a diagram illustrating an example of a display screen.
Figure 12:
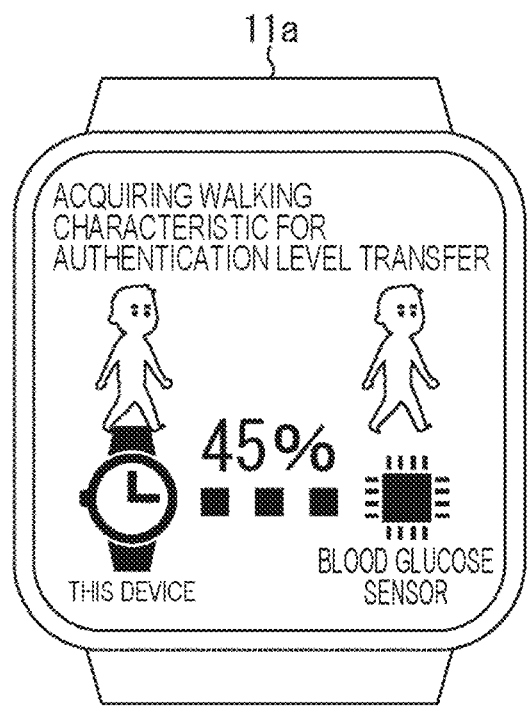
FIG. 12 is a diagram illustrating an example of the display screen.

Here, for example, as illustrated in FIGS. 11 and 12, the output unit 62 accurately detects the walking interval that is the characteristic data of the user under the control of the output control unit 61, and may output information prompting the user to walk so that the strong device 11a and the weak device 12a can be associated and the authentication information can be shared.

The example of a display screen of FIG. 11 illustrates that a synchronization rate (for example, a correlation coefficient of the characteristic data) between the device (strong device 11a) and the blood glucose sensor (weak device 12a) is increasing. The display screen illustrates that the authentication information of the device can be transferred to the blood glucose sensor by continuing to walk for another minute.

The example of the display screen of FIG. 12 illustrates that the device (strong device 11a) is acquiring a walking characteristic in order to transfer the authentication level to the blood glucose sensor (weak device 12a). Furthermore, the display screen illustrates that the walking characteristic has been acquired up to 45%.

This encourages the user to continue walking. Then, as the user continues walking, the reliability of the correlation coefficient of the characteristic data (walking interval) between the strong device 11a and the weak device 12a increases, and the strong device 11a and the weak device 12a are associated with each other and the authentication information can be reliably shared.

Thereafter, the processing proceeds to step S11.

On the other hand, in step S9, in a case where it is determined that transmission of the characteristic information has not been requested, the processing of step S10 is skipped and the processing proceeds to step S11.

In step S11, the transmission control unit 54 determines whether or not stop of the transmission of the characteristic information has been requested. In a case where it is determined that stop of the transmission of the characteristic information has not been requested, the processing proceeds to step S12.

In step S12, the communication unit 63 determines whether or not the connection with the information processing terminal 13a has been disconnected. In a case where it is determined that the connection with the information processing terminal 13a has been disconnected, that is, in a case where transition from the state where the communication with the information processing terminal 13a is established to the state where the communication connection is not established has been made, the processing proceeds to step S13.

Meanwhile, in step S11, in a case where the transmission control unit 54 receives a characteristic information transmission stop request signal for requesting stop of the transmission of the characteristic information from the information processing terminal 13a via the communication unit 63, the transmission control unit 54 determines that stop of the transmission of the characteristic information has been requested, the processing of step S12 is skipped, and the processing proceeds to step S13.

In step S13, the strong device 11a stops transmission of the characteristic information to the information processing terminal 13a. Specifically, in a case where the characteristic information is being transmitted to the information processing terminal 13a, the transmission control unit 54 stops the transmission of the characteristic information, and the characteristic detection unit 53 stops the detection of the walking characteristic of the user.

Thereafter, the processing proceeds to step S14.

On the other hand, in step S12, in a case where it is not determined that the connection with the information processing terminal 13a has been disconnected, the processing of step S13 is skipped and the processing proceeds to step S14.

In step S14, the mount detection unit 51 determines whether or not the strong device 11a has been removed from the user on the basis of the sensor data from the infrared sensor 57. In a case where it is determined that the strong device 11a has been removed from the user, that is, in a case where the strong device 11a has been transitioned from the state of being mounted on the user to an unmounted state, the processing proceeds to step S15.

In step S15, the authentication state is reset similarly to the processing of step S1. Thereby, in the case where the strong device 11a is removed from the user, the user authentication is invalidated and the user authentication is set to be unexecuted.

In step S16, the transmission of the characteristic information to the information processing terminal 13a is stopped similarly to the processing of step S13. That is, since the strong device 11a is removed from the user, and the correlation of the user's walking characteristics between the strong device 11a and the weak device 12a becomes unable to be detected, the transmission of the characteristic information is stopped.

In step S17, whether or not the strong device 11a is connected with the information processing terminal 13a is determined similarly to the processing of step S7. In a case where it is determined that the strong device 11a is connected with the information processing terminal 13a, the processing proceeds to step S18.

In step S18, the authentication information is transmitted to the information processing terminal 13a similarly to the processing in step S8. Thereby, it is notified to the information processing terminal 13a that the user authentication is invalidated due to the strong device 11a being removed from the user.

Thereafter, the processing proceeds to step S19.

On the other hand, in step S17, in a case where it is determined that the strong device 11a is not connected with the information processing terminal 13a, the processing of step S18 is skipped and the processing proceeds to step S19.

Furthermore, in step S14, in a case where it is not determined that the strong device 11a has been removed from the user, the processing of steps S15 to S18 is skipped and the processing proceeds to step S19.

In step S19, the output control unit 61 determines whether or not the authentication state of the weak device 12a has been changed. Specifically, in a case where the output control unit 61 receives an authentication state change notification signal for notifying the change in the authentication state of the weak device 12a from the information processing terminal 13a via the communication unit 63, the output control unit 61 determines that the authentication state of the weak device 12a has been changed, and the processing proceeds to step S20.

In step S20, the output unit 62 notifies the user of the change in the authentication state of the weak device 12a under the control of the output control unit 61. Note that details of the notification method will be described below.

After that, the processing returns to step S2, and the processing of step S2 and the subsequent steps is executed.

On the other hand, in step 319, in a case where it is determined that the authentication state of the weak device 12a has not been changed, the processing returns to step S2, and the processing of step S2 and the subsequent steps is executed.

<Processing of Weak Device 12a>

Next, processing of the weak device 12a will be described with reference to the flowchart of FIG. 13.

This processing starts when the weak device 12a is powered on and ends when the weak device 12a is powered off, for example.

In step S51, the authentication state setting unit 105 resets the authentication state. That is, the authentication state setting unit 105 sets the authenticated user to unset and sets the authentication level to 1. The authentication state setting unit 105 updates the user information and the authentication level of the authentication information stored in the storage unit 106 to the set content.

In step S52, the communication unit 113 determines whether or not the weak device 12a has been connected to the information processing terminal 13a. In a case where it is determined that the weak device 12a has been connected to the information processing terminal 13a, that is, in a case where transition from a state where communication connection with the information processing terminal 13a is not established to a state where the communication connection is established has been made, the processing proceeds to step S53.

In step S53, the weak device 12a transmits the authentication information and the mount state information to the information processing terminal 13a. Specifically, the transmission control unit 104 reads the authentication information stored in the storage unit 106, and adds, for example, identification information (for example, an ID or the like) of the weak device 12a to the authentication information. Furthermore, the mount detection unit 101 detects the mount state of the weak device 12a on the user on the basis of the sensor data from the infrared sensor 107, and generates mount state data indicating a detection result. The transmission control unit 104 generates mount state information including the mount state data and the identification information of the weak device 12a. Then, the transmission control unit 104 transmits the authentication information and the mount state information to the information processing terminal 13a via the communication unit 113.

Thereby, even if the authentication state and the mount state of the weak device 12a change while the weak device 12a and the information processing terminal 13a are not connected, the latest authentication state and mount state are always notified to the information processing terminal 13a after connection.

Thereafter, the processing proceeds to step S54.

On the other hand, in step S52, in a case where it is not determined that the weak device 12a has been connected to the information processing terminal 13a, the processing of step S53 is skipped and the processing proceeds to step S54.

In step S54, the mount detection unit 101 determines whether or not the weak device 12a has been mounted on the user on the basis of the sensor data from the infrared sensor 107. In a case where it is determined that the weak device 12a has been mounted on the user, the processing proceeds to step S55.

In step S55, the communication unit 113 determines whether or not the weak device 12a is connected with the information processing terminal 13a. In a case where it is determined that the weak device 12a is connected with the information processing terminal 13a, that is, in a case where communication between the weak device 12a and the information processing terminal 13a is established, the processing proceeds to step S56.

In step S56, the mount state information is transmitted to the information processing terminal 13a by similar processing to step S53. As a result, the weak device 12a having been mounted on the user is notified to the information processing terminal 13a.

Thereafter, the processing proceeds to step S57.

On the other hand, in step S55, in a case where it is determined that the weak device 12a is not connected with the information processing terminal 13a, that is, in a case where the communication between the weak device 12a and the information processing terminal 13a is not established, the processing of step S56 is skipped and the processing proceeds to step S57.

Furthermore, in step S54, in a case where it is not determined that the weak device 12a has been mounted on the user, the processing of steps S55 and 356 is skipped and the processing proceeds to step S57.

In step S57, the transmission control unit 104 determines whether or not transmission of the characteristic information has been requested. In a case where the transmission control unit 104 receives a characteristic information transmission request signal from the information processing terminal 13a via the communication unit 113, the transmission control unit 104 determines that transmission of the characteristic information has been requested, and the processing proceeds to step 358.

In step S58, the weak device 12a starts transmission of the characteristic information to the information processing terminal 13a. For example, the characteristic detection unit 102 starts processing of detecting an interval between peaks of acceleration in the gravity direction of the weak device 12a mounted on the user as a walking interval of the user on the basis of the sensor data from the acceleration sensor 108, similarly to the characteristic detection unit 53 of the strong device 11a, and generating characteristic data indicating the detected walking interval. The transmission control unit 104 starts processing of generating characteristic information including the characteristic data and the identification information of the weak device 12a and transmitting the characteristic information to the information processing terminal 13a via the communication unit 113.

B in FIG. 10 above illustrates an example of the characteristic information transmitted from the weak device 12a. The characteristic information of the weak device 12a has the same data configuration as the characteristic information of the strong device 11a.

Thereafter, the processing proceeds to step S59.

On the other hand, in step S57, in a case where it is determined that transmission of the characteristic information has not been requested, the processing of step S58 is skipped and the processing proceeds to step S59.

In step S59, the characteristic detection unit 102 determines whether or not stop of the transmission of the characteristic information has been requested. In a case where it is determined that stop of the transmission of the characteristic information has not been requested, the processing proceeds to step S60.

In step S60, the communication unit 113 determines whether or not the connection with the information processing terminal 13a has been disconnected. In a case where it is determined that the connection with the information processing terminal 13a has been disconnected, that is, in a case where transition from the state where the communication with the information processing terminal 13a is established to the state where the communication connection is not established has been made, the processing proceeds to step S61.

Meanwhile, in step S59, in a case where the transmission control unit 104 receives a characteristic information transmission stop request signal from the information processing terminal 13a via the communication unit 113, the transmission control unit 104 determines that stop of the transmission of the characteristic information has been requested, the processing of step S60 is skipped, and the processing proceeds to step S61.

In step S61, the weak device 12a stops transmission of the characteristic information to the information processing terminal 13a. Specifically, in a case where the characteristic information is being transmitted to the information processing terminal 13a, the transmission control unit 104 stops the transmission of the characteristic information, and the characteristic detection unit 102 stops the detection of the walking characteristic of the user.

Thereafter, the processing proceeds to step S62.

On the other hand, in step S60, in a case where it is not determined that the connection with the information processing terminal 13a has been disconnected, the processing of step S61 is skipped and the processing proceeds to step S62.

In step S62, the communication unit 113 determines whether or not the authentication information of the strong device 11a has been received from the information processing terminal 13a. In a case where it is determined that the authentication information of the strong device 11a has been received from the information processing terminal 13a, the processing proceeds to step S63.

In step S63, the authentication state setting unit 105 updates the authentication state on the basis of the authentication information of the strong device 11a received from the information processing terminal 13a. Specifically, the authentication state setting unit 105 sets the authenticated user and the authentication level to the authenticated user and the authentication level indicated in the authentication information of the strong device 11a. The authentication state setting unit 105 updates the user information and the authentication level of the authentication information stored in the storage unit 106 to the set content.

Thereby, the authentication information of the strong device 11a is shared with the weak device 12a that does not have the user authentication function. That is, the user authentication performed in the strong device 11a is also validated in the weak device 12a, and the authentication function at the same authentication level as the strong device 11a is implemented in the weak device 12a.

In step S64, the output unit 112 notifies the user of the change in the authentication state under the control of the output control unit 111.

Figure 14:
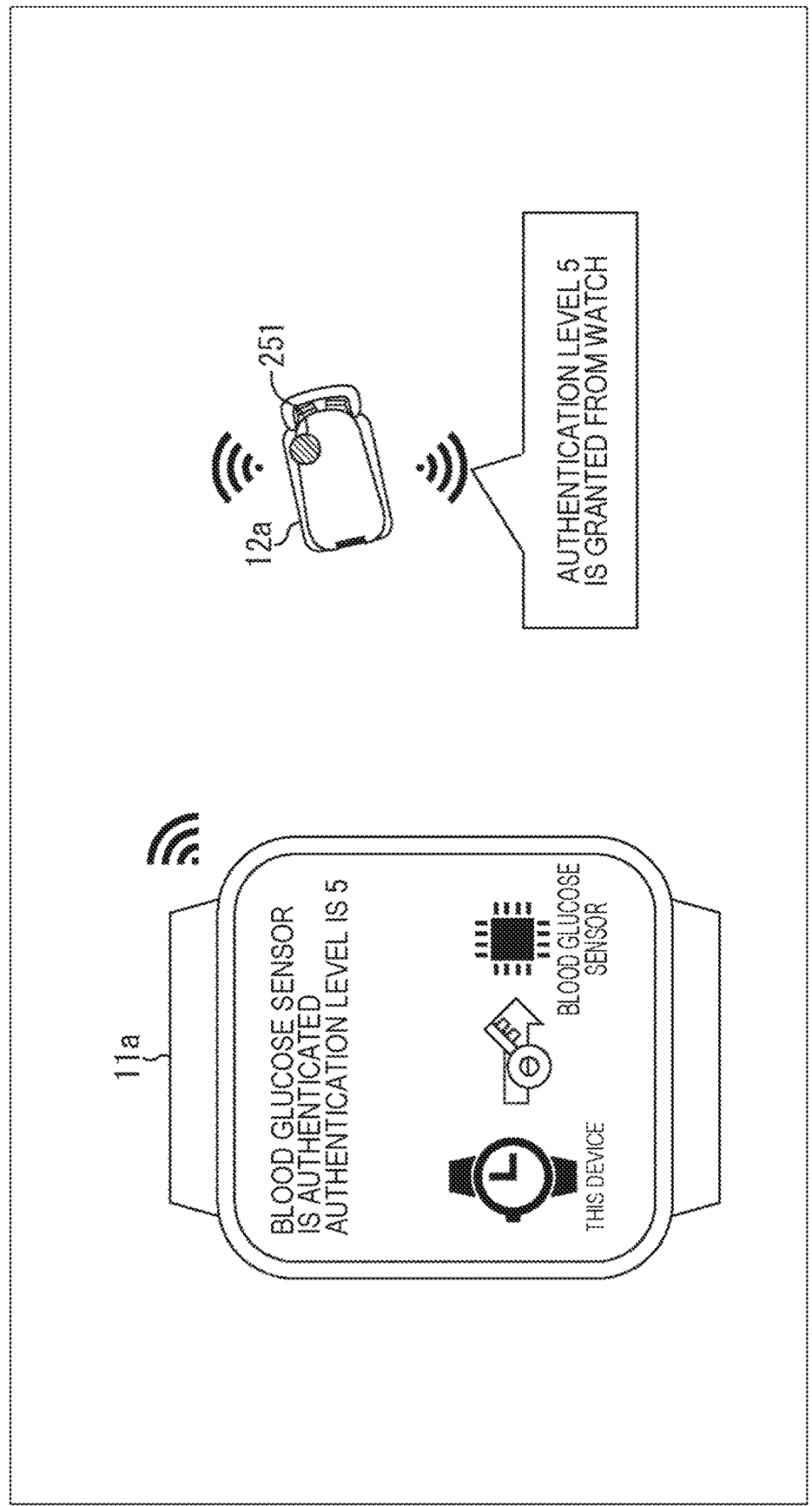
FIG. 14 is a diagram illustrating an example of a method of notifying a change in an authentication state of the weak device.

FIG. 14 illustrates an example of a method of notifying the change in the authentication state of the weak device 12a in the strong device 11a and the weak device 12a. Note that, in the strong device 11a, the processing of notifying the change in the authentication state of the weak device 12a is performed in step S20 of FIG. 7 as described above.

The left side of FIG. 14 illustrates an example of a screen displayed on the output unit 62 of the strong device 11a. The right side of FIG. 14 illustrates an example of audio and the like output from the output unit 112 of the weak device 12a.

This example illustrates that, in the strong device 11a, the authentication information of the device (strong device 11a) is transmitted to the blood glucose sensor (weak device 12a), so that the blood glucose sensor is authenticated, and the authentication level is set to 5. Furthermore, an LED 251 of the weak device 12a blinks in a predetermined pattern, and a voice message notifying that the authentication level 5 has been granted is output from a watch (strong device 11a). Moreover, the strong device 11a and the weak device 12a vibrate in synchronization.

Thereby, the authentication information of the strong device 11a is transmitted to the weak device 12a, so that the authentication level of the weak device 12a having been set to 5 is reliably notified to the user.

In step S65, the weak device 12a starts transmission of the biometric information. Specifically, the biometric data detection unit 103 starts processing of detecting the blood glucose level of the user on the basis of the sensor data from the blood glucose sensor 109, and generating the biometric data indicating the detected blood glucose level. Furthermore, the transmission control unit 104 starts processing of generating biometric information including the biometric data, the authentication information stored in the storage unit 106, and the identification information of the weak device 12a, and transmitting the biometric information to the server 14 via the communication unit 113 and the network 21.

Thereafter, the processing proceeds to step S66.

On the other hand, in step S62, in a case where it is determined that the authentication information of the strong device 11a has not been received from the information processing terminal 13a, the processing of steps S63 to S65 is skipped and the processing proceeds to step S66.

In step S66, the mount detection unit 101 determines whether or not the weak device 12a has been removed from the user on the basis of the sensor data from the infrared sensor 107. In a case where it is determined that the weak device 12a has been removed from the user, the processing proceeds to step 367.

In step S67, the authentication state is reset similarly to the processing of step S51. Thereby, in the case where the weak device 12a is removed from the user, the user authentication is invalidated and the user authentication is set to be unexecuted.

In step S68, the output unit 112 notifies the user of the change in the authentication state under the control of the output control unit 111.

In step 369, the weak device 12a stops transmission of the characteristic information and the biometric information.

Specifically, in a case where the characteristic information is being transmitted to the information processing terminal 13a, the transmission control unit 104 stops the transmission of the characteristic information, and the characteristic detection unit 102 stops the detection of the walking characteristic of the user. That is, since the weak device 12a is removed from the user, and the correlation of the user's walking characteristics between the strong device 11a and the weak device 12a becomes unable to be detected, the transmission of the characteristic information is stopped.

Furthermore, in a case where the biometric information is being transmitted to the server 14, the transmission control unit 104 stops the transmission of the biometric information and the biometric data detection unit 103 stops the detection of the blood glucose level of the user. That is, since the weak device 12a is removed from the user and the biometric data cannot be guaranteed to belong to the user, the transmission of biometric information is stopped.

In step S70, whether or not the weak device 12a is connected with the information processing terminal 13a is determined similarly to the processing of step S55. In a case where it is determined that the weak device 12a is connected with the information processing terminal 13a, the processing proceeds to step S71.

In step S71, the authentication information and the mount state information are transmitted to the information processing terminal 13a similarly to the processing of step S53. Thereby, removal of the weak device 12a from the user and reset of the authentication state are notified to the information processing terminal 13a.

After that, the processing returns to step S52, and the processing of step S52 and the subsequent steps is executed.

On the other hand, in step S70, in a case where it is determined that the weak device 12a is not connected with the information processing terminal 13a, the processing returns to step 352 and the processing of step S52 and the subsequent steps is executed.

Furthermore, in step S66, in a case where it is not determined that the weak device 12a has been removed from the user, the processing returns to step 352 and the processing of step S52 and the subsequent steps is executed.

<Processing of Information Processing Terminal 13a>

Next, processing executed by the information processing terminal 13a corresponding to the processing of the strong device 11a of FIG. 7 and the processing of the weak device 12a of FIG. 13 will be described with reference to the flowchart of FIG. 15.

This processing starts when the information processing terminal 13a is powered on and ends when the information processing terminal 13a is powered off, for example.

In step S101, the communication unit 157 determines whether or not the authentication information has been received. In a case where the communication unit 157 determines that the authentication information has been received from at least one of the strong device 11a or the weak device 12a, the processing proceeds to step 3102.

In step S102, the authentication sharing control unit 152 updates the authentication state table. The authentication state table includes, for example, information indicating the authentication states of the strong device 11a and the weak device 12b, and the mount states of the strong device 11a and the weak device 12a. The authentication states of the strong device 11a and the weak device 12a include, for example, the current authenticated users and the current authentication levels of the respective devices. The mount states of the strong device 11a and the weak device 12b include information indicating the presence or absence of mount of the strong device 11a and the weak device 12b on the user.

In a case of receiving the authentication information from the strong device 11a, the authentication sharing control unit 152 updates the authentication state and the mount state of the strong device 11a of the authentication state table stored in the storage unit 153 on the basis of the authentication information. Note that, as described above, in the case where the strong device 11a is removed from the user, the user authentication of the strong device 11a is invalidated. Therefore, in the case where the user authentication of the strong device 11a is valid, the strong device 11a is basically mounted on the user. Therefore, the mount state of the strong device 11a can be updated on the basis of the authentication information from the strong device 11a. Furthermore, the authentication sharing control unit 152 updates the authentication information of the strong device 11a stored in the storage unit 153 with the received authentication information.

Furthermore, in a case of receiving the authentication information from the weak device 12a, the authentication sharing control unit 152 updates the authentication state of the weak device 12a of the authentication state table stored in the storage unit 153 on the basis of the authentication information. Furthermore, the authentication sharing control unit 152 updates the authentication information of the weak device 12a stored in the storage unit 153 with the received authentication information.

In step S103, the authentication sharing control unit 152 determines whether or not the authentication state of the weak device 12a has been changed. In a case where it is determined that the authentication state of the weak device 12a has been changed, the processing proceeds to step S104.

Here, for example, a case where the weak device 12a is removed from the user and the user authentication is invalidated in the case where the user authentication of the weak device 12a is validated on the basis of the authentication information of the strong device 11a is assumed, for example.

In step S104, the authentication sharing control unit 152 notifies the strong device 11a of the change in the authentication state of the weak device 12a. Specifically, the authentication sharing control unit 152 generates an authentication state change notification signal indicating the change content of the authentication state of the weak device 12a, and transmits the authentication state change notification signal to the strong device 11a via the communication unit 157.

Thereafter, the processing proceeds to step S105.

On the other hand, in step S103, in a case where it is determined that the authentication state of the weak device 12a has not been changed, the processing of step S104 is skipped and the processing proceeds to step S105.

On the other hand, in step S101, in a case where it is determined that the authentication information has not been received, the processing of steps S102 to S104 is skipped and the processing proceeds to step S105.

In step S105, the communication unit 157 determines whether or not the mount state information has been received from the weak device 12a. In a case where it is determined that the mount state information has been received from the weak device 12a, the processing proceeds to step S106.

In step S106, the authentication sharing control unit 152 updates the authentication state table. Specifically, the authentication sharing control unit 152 updates the mount state of the weak device 12a in the authentication state table stored in the storage unit 153 on the basis of the mount state information received from the weak device 12a.

Thereafter, the processing proceeds to step S107.

Meanwhile, in step S105, in a case where it is determined that the mount state information has not been received from the weak device 12a, the processing of step S106 is skipped and the processing proceeds to step S107.

In step S107, the authentication sharing control unit 152 determines whether or not to start authentication information sharing determination processing on the basis of the authentication state table stored in the storage unit 153. Specifically, in a case where the authentication information sharing determination processing is not being executed, the authentication sharing control unit 152 determines to start the authentication information sharing determination processing, when the user authentication of the strong device 11a is valid, the user authentication of the weak device 12a is invalid, and the strong device 11a and the weak device 12a are mounted on the user, and the processing proceeds to step S108.

In step S108, the authentication sharing control unit 152 requests both the devices to transmit the characteristic information. Specifically, the authentication sharing control unit 152 generates a characteristic information transmission request signal and transmits the characteristic information transmission request signal to the strong device 11a and the weak device 12a via the communication unit 157. Thereby, the authentication information sharing determination processing is started.

Thereafter, the processing proceeds to step S109.

Meanwhile, in step S107, the authentication sharing control unit 152 determines not to start the authentication information sharing determination processing in a case where the authentication information sharing determination processing is already being executed, in a case where the user authentication of the strong device 11a is invalid, in a case where the user authentication of the weak device 12a is valid, or in a case where at least one of the strong device 11a or the weak device 12a is not mounted on the user, the processing of step S108 is skipped, and the processing proceeds to step S109.

In step S109, the communication unit 157 determines whether or not a characteristic information reception error has occurred. In a case where a state where the characteristic information cannot be received from at least one of the strong device 11a or the weak device 12a has occurred during execution of the authentication information sharing determination processing, the communication unit 157 determines that the characteristic information reception error has occurred, and the processing proceeds to step S110.

Here, for example, a case where at least one of the strong device 11a or the weak device 12a is removed from the user and the transmission of the characteristic information is stopped, or a case where at least one of the strong device 11a or the weak device 12a is not connected to the information processing terminal 13a is assumed, for example.

In step S110, the authentication sharing control unit 152 requests both the devices to stop the transmission of the characteristic information. Specifically, the authentication sharing control unit 152 generates a characteristic information transmission stop request signal and transmits the characteristic information transmission stop request signal to the strong device 11a and the weak device 12a via the communication unit 157. Thereby, the authentication information sharing determination processing is stopped.

Thereafter, the processing proceeds to step S111.

Meanwhile, in step S109, in a case where it is determined that the characteristic data reception error has not occurred, the processing of step S110 is skipped and the processing proceeds to step S111.

In step S111, the correlation detection unit 151 determines whether or not a correlation of the characteristic data is detectable. For example, in a case where the correlation detection unit 151 has received the characteristic data of a sufficient time or amount for calculating the correlation coefficient between the characteristic data of the strong device 11a and the characteristic data of the weak device 12a, the correlation detection unit 151 determines that the correlation of the characteristic data is detectable, and the processing proceeds to step S112.

In step S112, the correlation detection unit 151 determines whether or not the characteristic data correlate. Specifically, the correlation detection unit 151 calculates the correlation coefficient between the characteristic data of the strong device 11a and the characteristic data of the weak device 12a.

Here, the strong device 11a and the weak device 12a detect the walking interval as the characteristic data of the user. Therefore, in a case where both the devices are mounted on the same user, the correlation of the characteristic data becomes strong, whereas in a case where both the devices are mounted on different users or at least one of the devices is not mounted on the user, the correlation of the characteristic data becomes weak.

Therefore, the correlation detection unit 151 determines that the characteristic data correlate in a case where the calculated correlation coefficient is equal to or larger than a predetermined threshold value, and the processing proceeds to step S113. Here, a case where the characteristic data of the strong device 11a and the characteristic data of the weak device 12a are of the same person is assumed.

In step S113, the authentication sharing control unit 152 transmits the authentication information of the strong device 11a to the weak device 12a. Specifically, the authentication sharing control unit 152 determines that the strong device 11a and the weak device 12a are mounted on the same user because the strong device 11a and the weak device 12a are mounted on the user, and the characteristic data of the strong device 11a and the characteristic data of the weak device 12a correlate. Then, the authentication sharing control unit 152 reads the authentication information of the strong device 11a from the storage unit 153 and transmits the authentication information to the weak device 12a via the communication unit 157.

Note that, for example, the authentication sharing control unit 152 may extract only necessary information from the authentication information of the strong device 11a and transmit the extracted information to the weak device 12a.

In step S114, the change in the authentication state of the weak device 12a is notified to the strong device 11a, similarly to the processing of step S104. Thereby, the user authentication of the weak device 12a having been validated by the authentication information of the strong device 11a is notified to the strong device 11a.

In step S115, the authentication sharing control unit 152 updates the authentication state table. Specifically, the authentication sharing control unit 152 updates the authentication state of the weak device 12a in the authentication state table stored in the storage unit 153. Thereby, the authentication state (authentication level) of the weak device 12a is set to the authentication state (authentication level) similar to the strong device 11a.

Thereafter, the processing proceeds to step S116.

Meanwhile, in step S112, in a case where the correlation coefficient between the characteristic data of the strong device 11a and the characteristic data of the weak device 12a is less than a predetermined threshold value, the correlation detection unit 151 determines that the characteristic data do not correlate, the processing of steps S113 to S115 is skipped, and the processing proceeds to step S116. Here, for example, a case where the characteristic data of the strong device 11a and the characteristic data of the weak device 12a are not of the same person is assumed.

In step S116, both the devices are requested to stop the transmission of the characteristic information, similarly to the processing of step S110. Thereby, the authentication information sharing determination processing ends.

After that, the processing returns to step S101, and the processing in step S101 and the subsequent steps is executed.

Meanwhile, in step S111, in a case where the correlation detection unit 151 has not received the characteristic data of a sufficient time or amount for calculating the correlation coefficient between the characteristic data of the strong device 11a and the characteristic data of the weak device 12a yet, the correlation detection unit 151 determines that the correlation of the characteristic data cannot be detected yet, the processing returns to step S101, and the processing of step S101 and the subsequent steps is executed.

As described above, the authentication information having a high authentication level of the strong device 11a is shared with the weak device 12a not provided with the user authentication function, and the authentication function having a high authentication level can be implemented in the weak device 12a.

Figure 16:
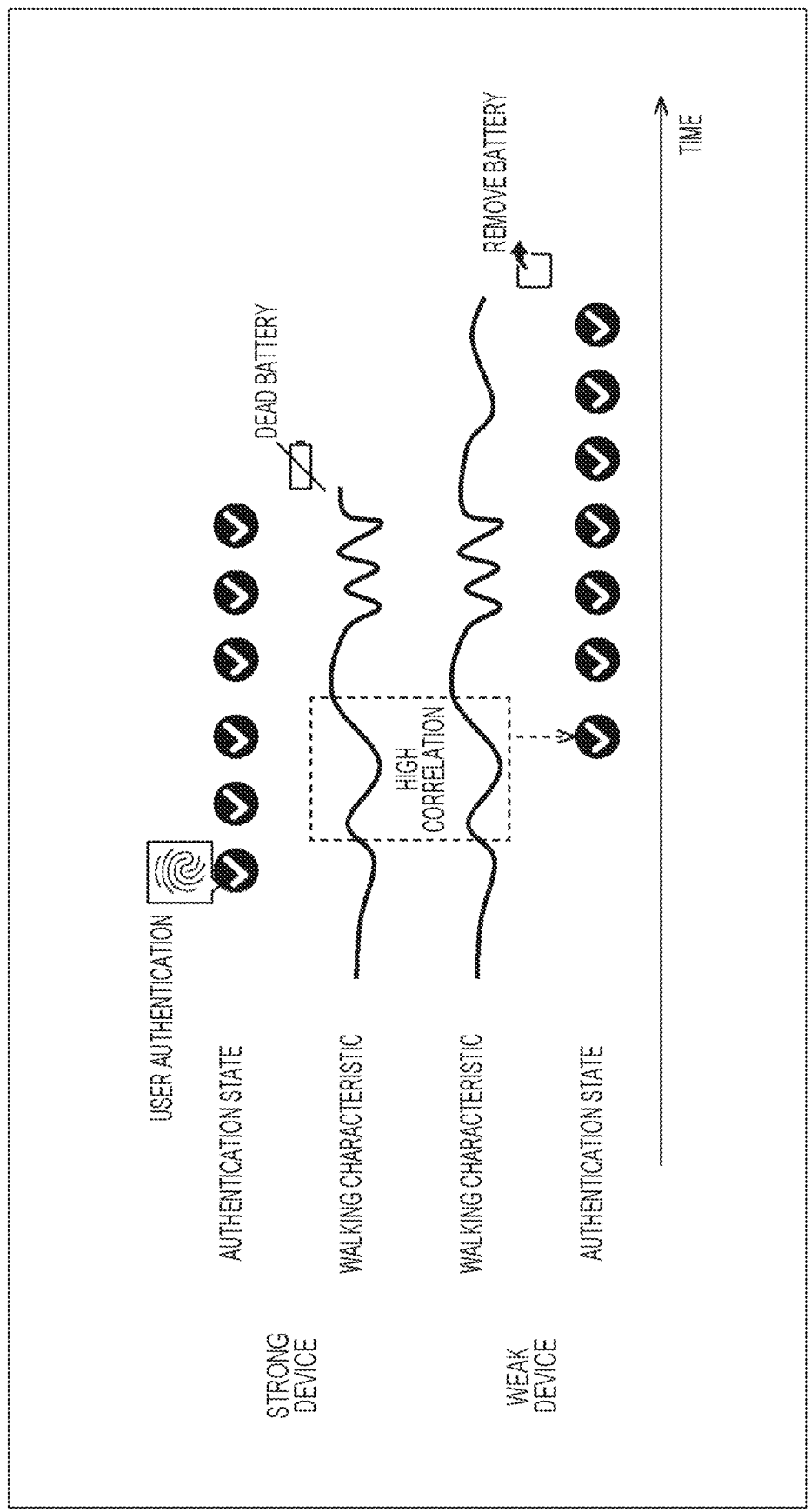
FIG. 16 is a diagram for describing a specific example of processing of sharing authentication information.

For example, as illustrated in FIG. 16, first, the user authentication is performed in the strong device 11a while being mounted on the user. Thereafter, the walking interval (the acceleration in the direction of gravity and the peaks) of the user is detected on the strong device 11a in a state of being mounted on the user, and the walking interval (the acceleration in the gravity direction and the peaks) of the user is detected in the weak device 12a in the state of being mounted on the user in parallel (at almost the same time). Then, in a case where the walking characteristics (walking intervals) of both the devices highly correlate, the authentication information of the strong device 11a is shared with the weak device 12a. Thereby, the weak device 12a being mounted on a specific user is guaranteed with high reliability.

Furthermore, the authentication information can be easily shared by the user simply wearing the strong device 11a and the weak device 12a.

Moreover, since the user who wears the strong device 11a and the weak device 12a being the same is guaranteed, spoofing and the like can be prevented and the authentication information can be safely shared.

Furthermore, even after the user authentication of the strong device 11a is invalidated due to, for example, dead battery or the like, the user authentication of the weak device 12a is valid. Then, the weak device 12a can use the authentication information of the strong device 11*a* as it is until the weak device 12*a* is removed from the user, for example.

Therefore, for example, even if the weak device 12*a* cannot be equipped with the user authentication function due to a reason such as the weak device 12*a* being mounted at a position where the user authentication is difficult, improvement of wearability, or cost reduction, the user authentication can be implemented in the weak device 12*a*. Then, for example, the weak device 12*a* guarantees that the detected biometric data belongs to a specific user with high reliability even though the weak device 12*a* does not have the user authentication function, and can provide the biometric data to the server 14.

Moreover, for example, in a case where the weak device 12*a* is shared by a plurality of users, for example, in a case where a rental business of the weak device 12*a* is performed, the presence of a user is assumed, who does not want to register the collation data for user authentication (for example, fingerprint data or the like), which is personal information, in the weak device 12*a*.

For example, the authentication information of the strong device 11*a* owned by the user is shared with the weak device 12*a*, whereby the user authentication function can be implemented in the weak device 12*a* without registering the collation data in the weak device 12*a*.

<Learning Processing>

Figure 17:
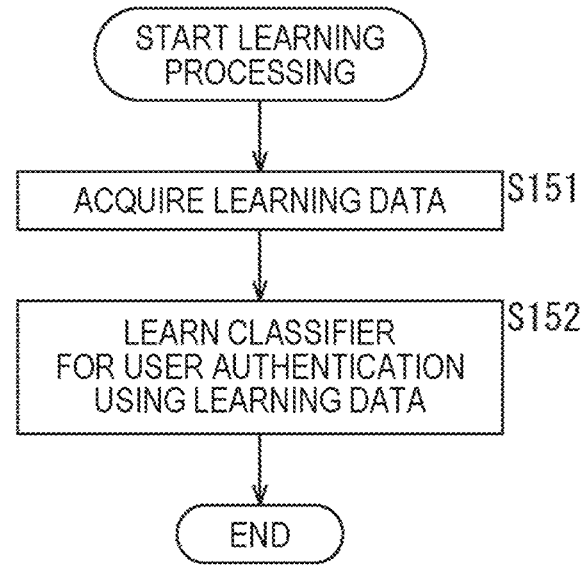
FIG. 17 is a flowchart for describing learning processing.

Next, learning processing executed by the server 14 will be described with reference to the flowchart in FIG. 17.

In this processing, learning processing for a classifier that performs the user authentication in the weak device 12*a* is performed using, as learning data, the sensor data, the characteristic data, or the biometric data detected by the weak device 12*a* while the user authentication of the weak device 12*a* is validated using the authentication information of the strong device 11*a*.

In step S151, the learning unit 202 acquires learning data.

For example, the weak device 12*a* generates the learning data including the sensor data detected by the acceleration sensor 108, the characteristic data detected by the characteristic detection unit 102 on the basis of the sensor data of the acceleration sensor 108, or the biometric data detected by the biometric data detection unit 103, and a label indicating the authenticated user, while the user authentication is validated on the basis of the authentication information of the strong device 11*a*.

Then, the weak device 12*a* transmits the learning data to the server 14 via the network 21. Note that the weak device 12*a* may sequentially transmit the learning data, or may store the learning data in the storage unit 106 and collectively transmit the learning data.

The learning unit 202 receives the learning data transmitted from the weak device 12*a* via the communication unit 207.

In step S152, the learning unit 202 learns the classifier for user authentication (hereinafter referred to as a user authentication engine) using the learning data.

Note that the learning method is not limited to a specific method, and for example, an appropriate method is used from various machine learning methods. For example, supervised learning or semi-supervised learning is used. Furthermore, for example, a neural network such as deep neural network (DNN) is used as a learning model. More specifically, for example, supervised learning using deep learning and an anomaly detection algorithm is used.

Furthermore, for example, the learning unit 202 may perform the learning processing using the learning data of a plurality of users supplied from the weak devices 12*a* of the plurality of users. This improves the accuracy of the user authentication engine.

Thereafter, the learning processing ends.

Then, by applying the generated user authentication engine to the weak device 12*a*, the weak device 12*a* alone can perform strong user authentication.

Note that the characteristic of the user used for user authentication in the user authentication engine is arbitrary. For example, as a gait characteristic, the acceleration of the weak device 12*a*, the norm in the gravity direction, or the like can be used. In addition, a behavior pattern of the user can be used. As the behavior pattern of the user, for example, use order or use history of an application program, a movement pattern, a typing speed of a keyboard, or the like can be used.

<Pairing Processing>

Next, pairing processing executed by the information processing system 1 will be described with reference to FIGS. 18 to 21.

In the above-described processing, for example, pairing setting between the strong device 11*a* and the information processing terminal 13 is performed in advance. Then, the strong device 11*a* and the information processing terminal 13, which has been paired, are directly connected by short-range wireless communication such as Bluetooth, and the above-described processing is performed. This also similarly applies to the weak device 12*a* and the information processing terminal 13.

Meanwhile, as will be described below, the strong device 11*a* and the weak device 12*a* may be connected to the information processing terminal 13 without performing the pairing setting in advance.

<Processing of Strong Device 11*a*>

Figure 18:
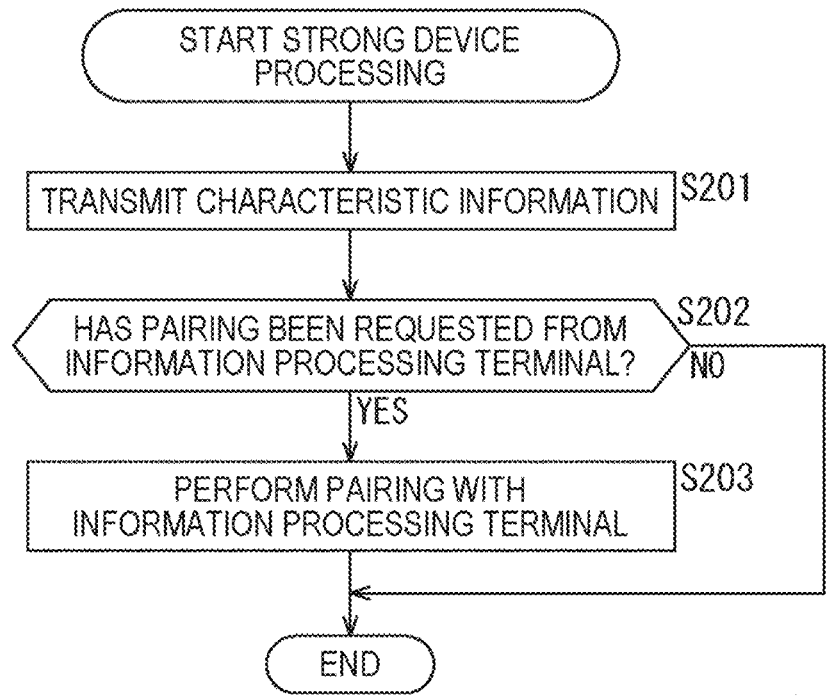
FIG. 18 is a flowchart for describing processing of the strong device of FIG. 2.

First, processing of the strong device 11*a* will be described with reference to the flowchart of FIG. 18.

In step S201, the strong device 11*a* transmits the characteristic information. Specifically, for example, the characteristic detection unit 53 detects the peak interval (walking interval) of the acceleration of the strong device 11*a* in the gravity direction on the basis of the sensor data from the acceleration sensor 59, and generates the characteristic data indicating the detection result.

The transmission control unit 54 generates the characteristic information including the characteristic data and the identification information of the strong device 11*a*, and the communication unit 63 broadcasts the characteristic information. Note that, for the transmission of the characteristic information, for example, a beacon function of Bluetooth low energy (BLE), Wi-Fi direct, radio frequency (RF) communication, or the like is used.

In step S202, the communication unit 63 determines whether or not pairing has been requested from the information processing terminal 13*a*. In a case where the communication unit 63 receives a pairing request signal for requesting pairing from the information processing terminal 13*a*, the communication unit 63 determines that pairing has been requested from the information processing terminal 13*a*, and the processing proceeds to step S203.

In step S203, the communication unit 63 performs pairing with the information processing terminal 13*a* according to a predetermined communication protocol.

Thereafter, the processing of the strong device 11*a* ends.

On the other hand, in step S202, in a case where it is determined that pairing has not been requested from the information processing terminal 13*a*, the processing of the strong device 11*a* ends without performing pairing with the information processing terminal 13*a*.

<Processing of Weak Device 12*a*>

Figure 19:
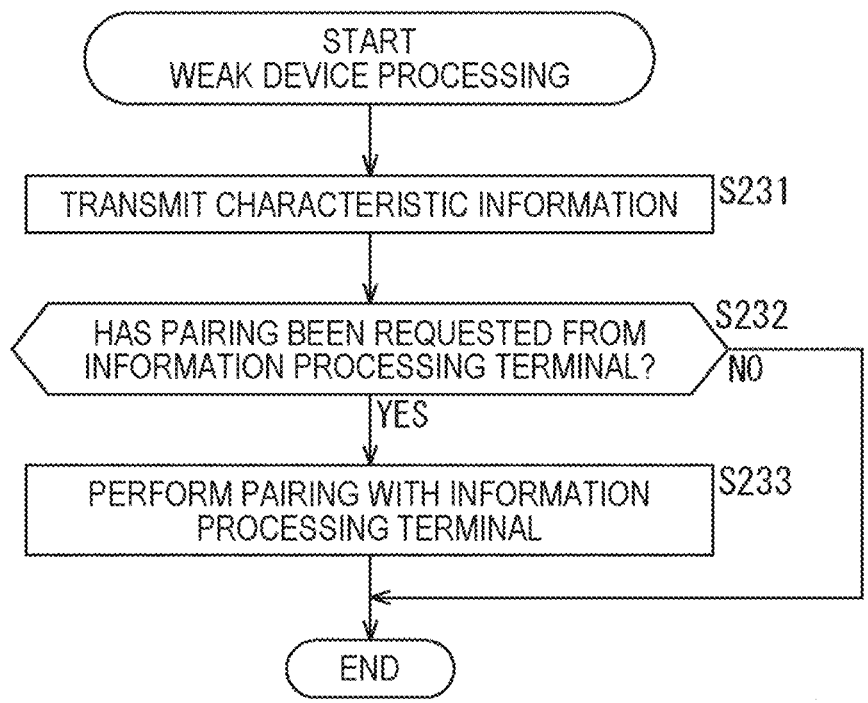
FIG. 19 is a flowchart for describing processing of the weak device of FIG. 3.

Next, processing of the weak device 12*a* will be described with reference to the flowchart of FIG. 19.

In step S231, the weak device 12*a* transmits the characteristic information. Specifically, for example, the characteristic detection unit 102 detects the peak interval (walking interval) of the acceleration of the weak device 12*a* in the gravity direction on the basis of the sensor data from the acceleration sensor 108, and generates the characteristic data indicating the detection result.

The transmission control unit 104 generates the characteristic information including the characteristic data and the identification information of the weak device 12*a*, and the communication unit 113 broadcasts the characteristic information. Note that, for the transmission of the characteristic information, for example, a beacon function of Bluetooth low energy (BLE), Wi-Fi direct, radio frequency (RF) communication, or the like is used, similarly to the strong device 11*a*.

In step S232, the communication unit 113 determines whether or not pairing has been requested from the information processing terminal 13*a*. In a case where the communication unit 113 receives a pairing request signal from the information processing terminal 13*a*, the communication unit 113 determines that pairing has been requested from the information processing terminal 13*a*, and the processing proceeds to step S233.

In step S233, the communication unit 113 performs pairing with the information processing terminal 13*a* according to a predetermined communication protocol.

Thereafter, the processing of the weak device 12*a* ends.

On the other hand, in step S232, in a case where it is determined that pairing has not been requested from the information processing terminal 13*a*, the processing of the weak device 12*a* ends without performing pairing with the information processing terminal 13*a*.

<Processing of Information Processing Terminal 13*a*>

Figure 20:
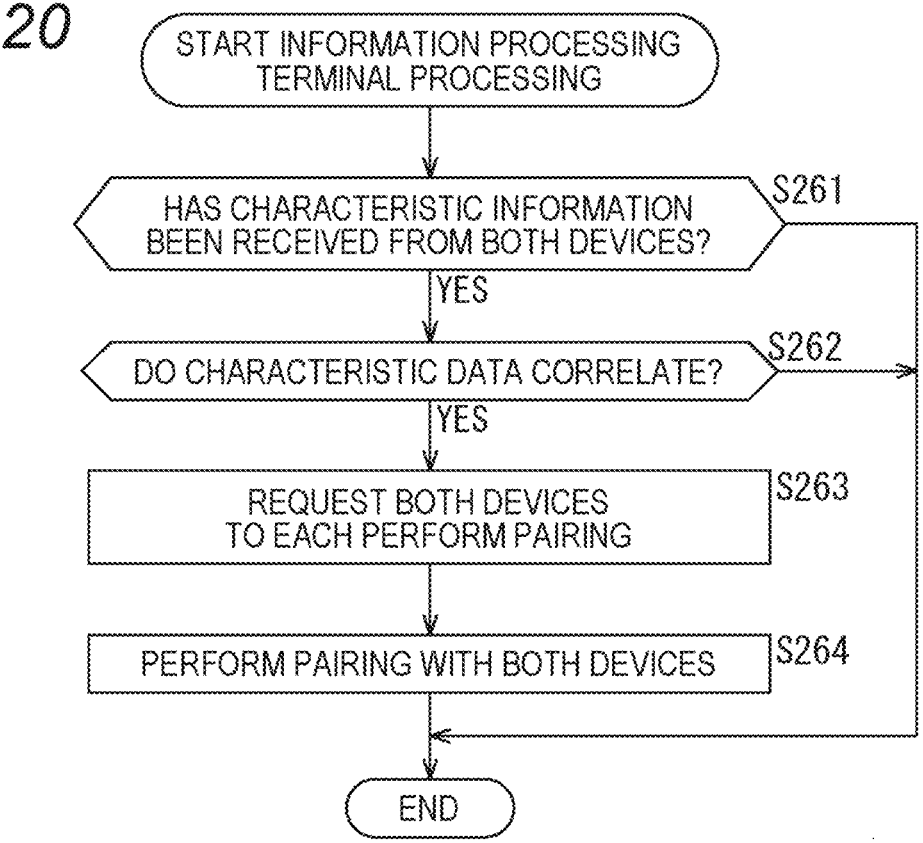
FIG. 20 is a flowchart for describing processing of the information processing terminal of FIG. 4.

Next, processing executed by the information processing terminal 13*a* corresponding to the processing of the strong device 11*a* of FIG. 18 and the processing of the weak device 12*a* of FIG. 19 will be described with reference to the flowchart of FIG. 20.

In step S261, the communication unit 157 determines whether or not the characteristic information has been received from both the devices. In a case where the communication unit 157 receives the characteristic information broadcasted from the strong device 11*a* and the characteristic information broadcasted from the weak device 12*a*, the communication unit 157 determines that the characteristic information has been received from both the devices, and the processing proceeds to step S262.

Figure 15:
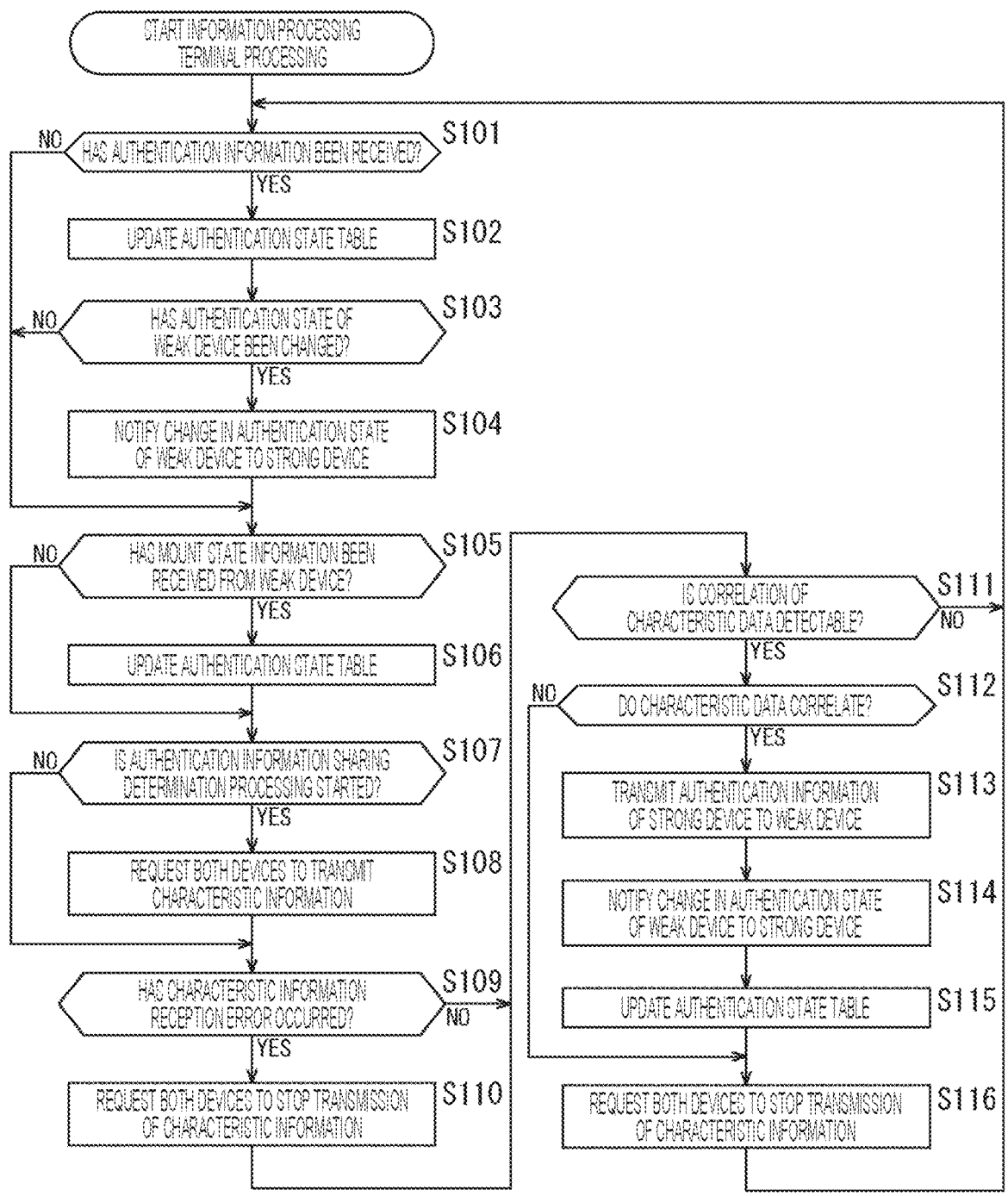
FIG. 15 is a flowchart for describing processing of the information processing terminal of FIG. 4.

In step S262, whether or not the characteristic data correlate is determined similarly to the processing of step S112 of FIG. 15. In a case where it is determined that the characteristic data correlate, the processing proceeds to step S263.

In step S263, the communication unit 157 requests pairing to each of the both devices. Specifically, the communication unit 157 generates the pairing request signal and transmits the pairing request signal to the strong device 11*a* and the weak device 12*a*.

In step S264, the communication unit 157 performs pairing with both the devices. Specifically, the communication unit 157 individually performs pairing with each of the strong device 11*a* and the weak device 12*a* according to a predetermined communication protocol.

Thereafter, the processing of the information processing terminal 13*a* ends.

Meanwhile, in a case where it is determined that the communication unit 157 has not received the characteristic information from at least one of the devices in step S261 or in a case where it is determined that the characteristic data do not correlate in step S262, the processing of the information processing terminal 13*a* ends without performing the pairing with the strong device 11*a* and the weak device 12*a*.

As described above, the strong device 11*a* and the information processing terminal 13*a*, and the weak device 12*a* and the information processing terminal 13*a* are paired and can perform communication without performing the pairing setting in advance.

Modification of First Embodiment

Hereinafter, modifications of the above-described first embodiment will be described.

For example, the strong device 11*a* and the weak device 12*a* may directly transmit and receive the characteristic information and the authentication information without going through the information processing terminal 13*a*. In this case, the processing of the correlation detection unit 151 and the authentication sharing control unit 152 of the information processing terminal 13*a* may be performed by either the strong device 11*a* or the weak device 12*a*. Alternatively, for example, the information processing terminal 13*a* may include the functions of the strong device 11*a* and operate as a strong device.

Furthermore, the information processing terminal 13*a* may receive the sensor data from the strong device 11*a* and detect the characteristic data on the basis of the received sensor data. Similarly, the information processing terminal 13*a* may receive the sensor data from the weak device 12*a* and detect the characteristic data on the basis of the received sensor data.

Moreover, for example, the server 14 may perform the processing of the information processing terminal 13*a*. For example, the strong device 11*a* and the weak device 12*a* may transmit the characteristic information and the authentication information to the server 14, and the server 14 may control the sharing of the authentication information between the strong device 11*a* and the weak device 12*a*.

Furthermore, for example, the weak device 12*a* may transmit the biometric information to the server 14 even in a case where the user authentication is invalid. Then, for example, the biometric data processing unit 201 of the server 14 may use the authentication level of the weak device 12*a* at the time of detecting the biometric data, in a case of performing various types of processing using the biometric data.

Moreover, for example, the weak device 12*a* may store the biometric information in the storage unit 106 or transmit the biometric information to the information processing terminal 13*a* without transmitting the biometric information to the server 14.

Furthermore, for example, the strong device 11*a* may also detect the biometric data and transmit the biometric information including the biometric data and the authentication information to the server 14.

Moreover, for example, the information processing terminal 13*a* may also be configured by a wearable device capable of biometric data and user authentication, and the authentication information may be shared among the strong device 11a, the weak device 12a, and the information processing terminal 13a.

2. Second Embodiment

Next, a second embodiment of the present technology will be described with reference to FIGS. 21 to 28.

In the second embodiment, a strong device 11b, a weak device 12b, and an information processing terminal 13b are used instead of the strong device 11a, the weak device 12a, and the information processing terminal 13a of the first embodiment. Then, user authentication is performed on both the strong device 11b and the weak device 12b, and authentication results of the user authentication of both the devices are compared, so that whether or not both the devices are mounted on the same user is detected.

<Configuration Example of Strong Device 11b>

Figure 21:
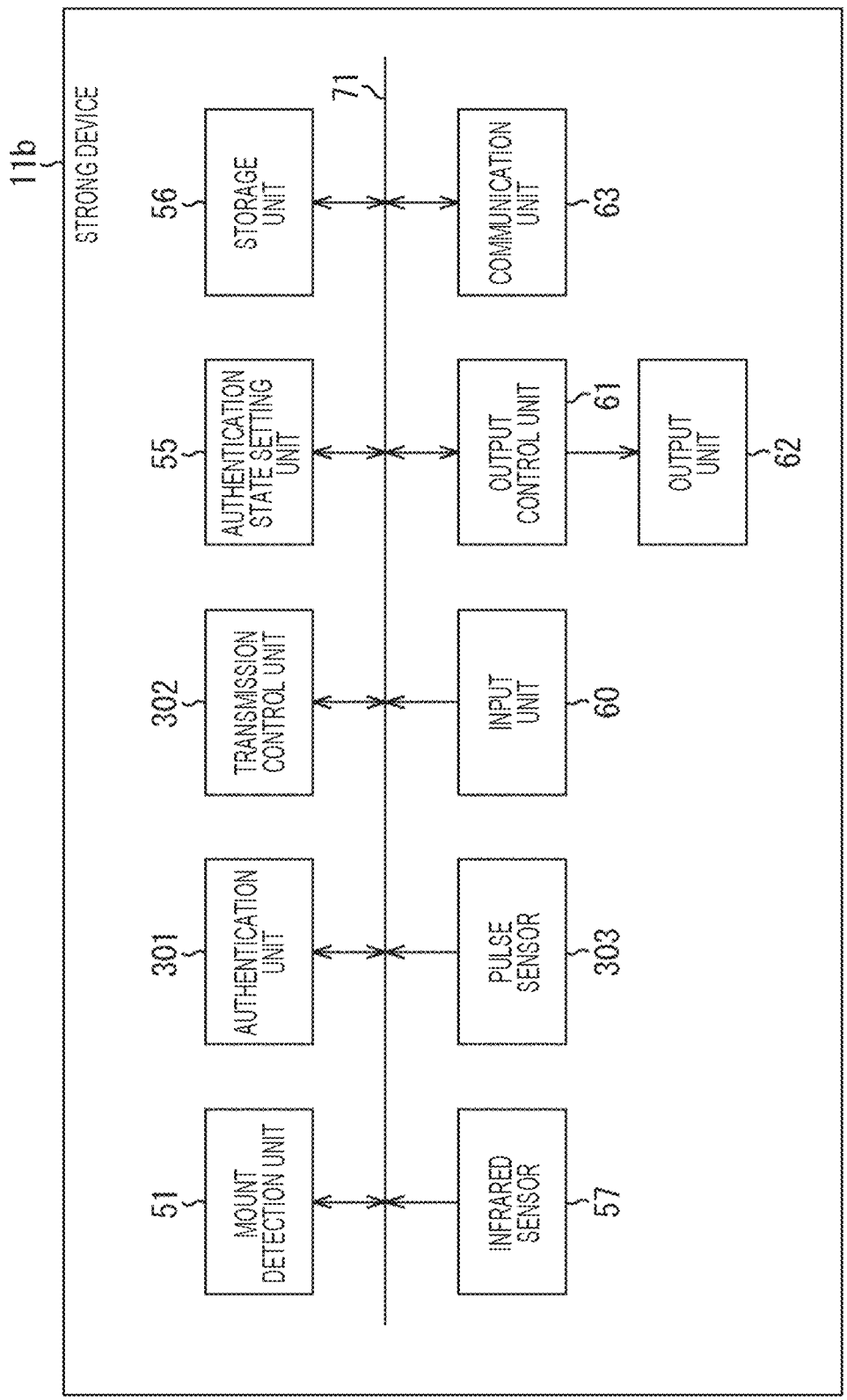
FIG. 21 is a block diagram illustrating a second embodiment of a strong device of FIG. 1.

FIG. 21 illustrates a configuration example of the strong device 11b. Note that a portion corresponding to the strong device 11a of FIG. 2 is denoted by the same reference numeral, and description thereof is appropriately omitted.

The strong device 11b includes a mount detection unit 51, an authentication state setting unit 55, a storage unit 56, an infrared sensor 57, an input unit 60, an output control unit 61, an output unit 62, a communication unit 63, a bus 71, an authentication unit 301, a transmission control unit 302, and a pulse sensor 303. The mount detection unit 51, the authentication state setting unit 55, the storage unit 56, the infrared sensor 57, the input unit 60, the output control unit 61, the communication unit 63, the authentication unit 301, the transmission control unit 302, and the pulse sensor 303 are connected to one another via the bus 71 and communicate with one another.

The authentication unit 301 performs pulse authentication as user authentication on the basis of sensor data from the pulse sensor 303 and collation data stored in the storage unit 56.

The transmission control unit 302 generates mount state information indicating a mount state of the strong device 11b. Furthermore, the transmission control unit 302 controls transmission of the authentication information and the mount state information to the information processing terminal 13.

The pulse sensor 303 detects a pulse of the user and supplies sensor data indicating a detection result to the authentication unit 301.

<Configuration Example of Weak Device 12b>

Figure 22:
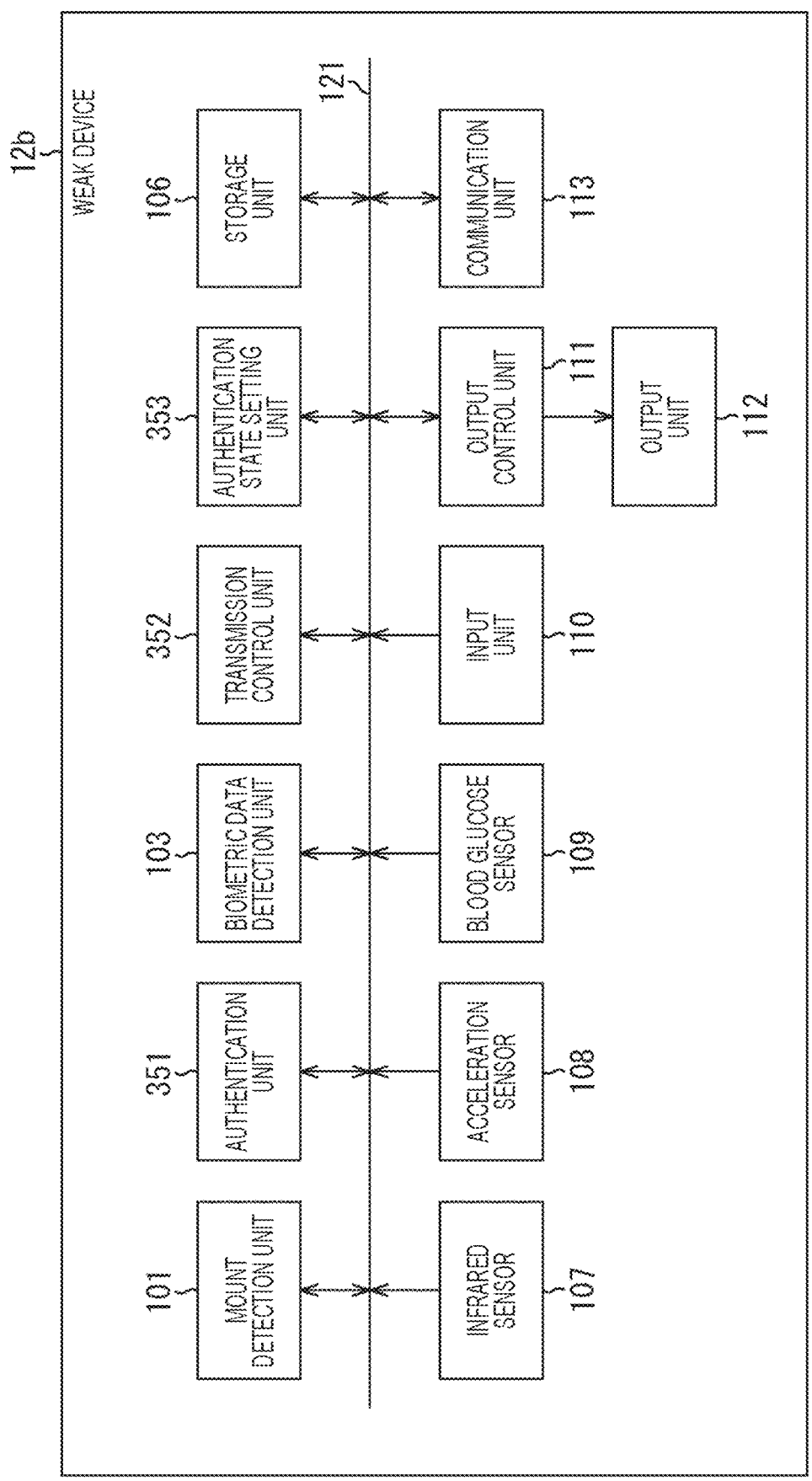
FIG. 22 is a block diagram illustrating the second embodiment of a weak device of FIG. 1.

FIG. 22 illustrates a configuration example of the weak device 12b. Note that a portion corresponding to the weak device 12a of FIG. 3 is denoted by the same reference numeral, and description thereof is appropriately omitted.

The weak device 12b includes a mount detection unit 101, a biometric data detection unit 103, a storage unit 106, an infrared sensor 107, an acceleration sensor 108, a blood glucose sensor 109, an input unit 110, an output control unit 111, an output unit 112, a communication unit 113, a bus 121, an authentication unit 351, a transmission control unit 352, and an authentication state setting unit 353. The mount detection unit 101, the biometric data detection unit 103, the storage unit 106, the infrared sensor 107, the acceleration sensor 108, the blood glucose sensor 109, the input unit 110, the output control unit 111, the communication unit 113, the authentication unit 351, the transmission control unit 352, and the authentication state setting unit 353 are connected to one another via the bus 121.

The authentication unit 351 performs gait authentication as user authentication on the basis of the sensor data from the acceleration sensor 108 and the collation data stored in the storage unit 106. Note that the authentication level of the gait authentication of the authentication unit 351 is lower than the authentication level of the pulse authentication of the authentication unit 301 of the strong device 11b.

The transmission control unit 352 generates mount state information indicating the mount state of the weak device 12b and biometric information including biometric data. The transmission control unit 104 controls transmission of the authentication information and the mount state information to the information processing terminal 13b and transmission of the biometric information to the server 14.

The authentication state setting unit 353 sets an authentication state of the weak device 12b on the basis of the mount state of the weak device 12b detected by the mount detection unit 101, a result of the user authentication by the authentication unit 351, and the authentication information of the strong device 11b transmitted from the information processing terminal 13b. The authentication state setting unit 353 generates or updates the authentication information indicating the authentication state of the weak device 12b, and causes the storage unit 106 to store the authentication information.

<Configuration Example of Information Processing Terminal 13b>

Figure 23:
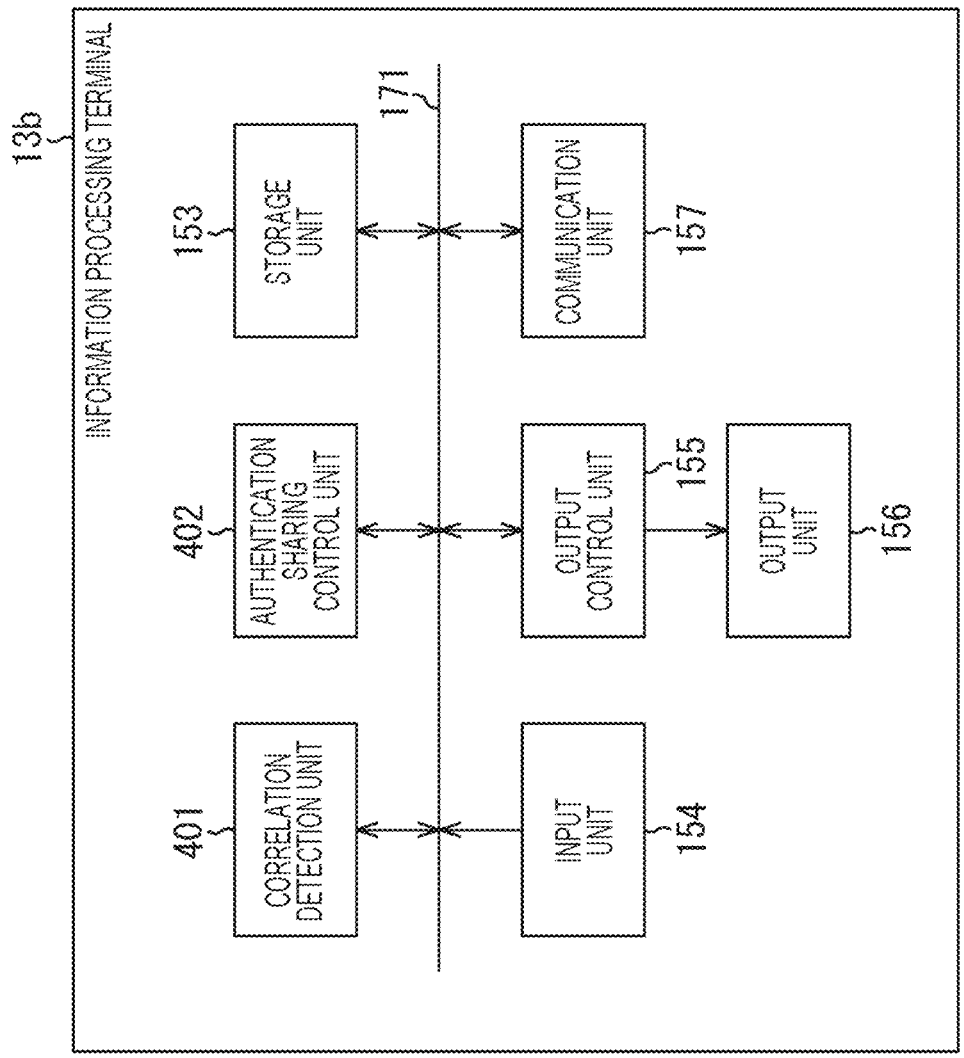
FIG. 23 is a block diagram illustrating the second embodiment of an information processing terminal of FIG. 1.

FIG. 23 illustrates a configuration example of the information processing terminal 13b. Note that a portion corresponding to the information processing terminal 13a of FIG. 4 is denoted by the same reference numeral, and description thereof is appropriately omitted.

The information processing terminal 13b includes a storage unit 153, an input unit 154, an output control unit 155, an output unit 156, a communication unit 157, a bus 171, a correlation detection unit 401, and an authentication sharing control unit 402. The storage unit 153, the input unit 154, the output control unit 155, the communication unit 157, the correlation detection unit 401, and the authentication sharing control unit 402 are connected to one another via the bus 171 and communicate with one another.

The correlation detection unit 401 detects a correlation between the user authentication result by the strong device 11b and the user authentication result by the weak device 12b.

The authentication sharing control unit 402 controls sharing of the authentication information between the strong device 11a and the weak device 12a. For example, the authentication sharing control unit 402 generates and updates an authentication state table for managing authentication states and the like of the strong device 11b and the weak device 12b on the basis of the authentication information and the mount state information from the strong device 11b and the authentication information and the mount state information from the weak device 12b. Furthermore, the authentication sharing control unit 402 requests the strong device 11b and the weak device 12b to transmit the authentication information, as needed. Moreover, the authentication sharing control unit 402 controls transmission of the authentication information of the strong device 11b to the weak device 12b on the basis of a detection result of the correlation detection unit 401.

<Processing of Information Processing System 1>

Next, processing of the information processing system 1 in the second embodiment will be described with reference to FIGS. 24 to 28.

<Processing of Strong Device 11b>

Figure 24:
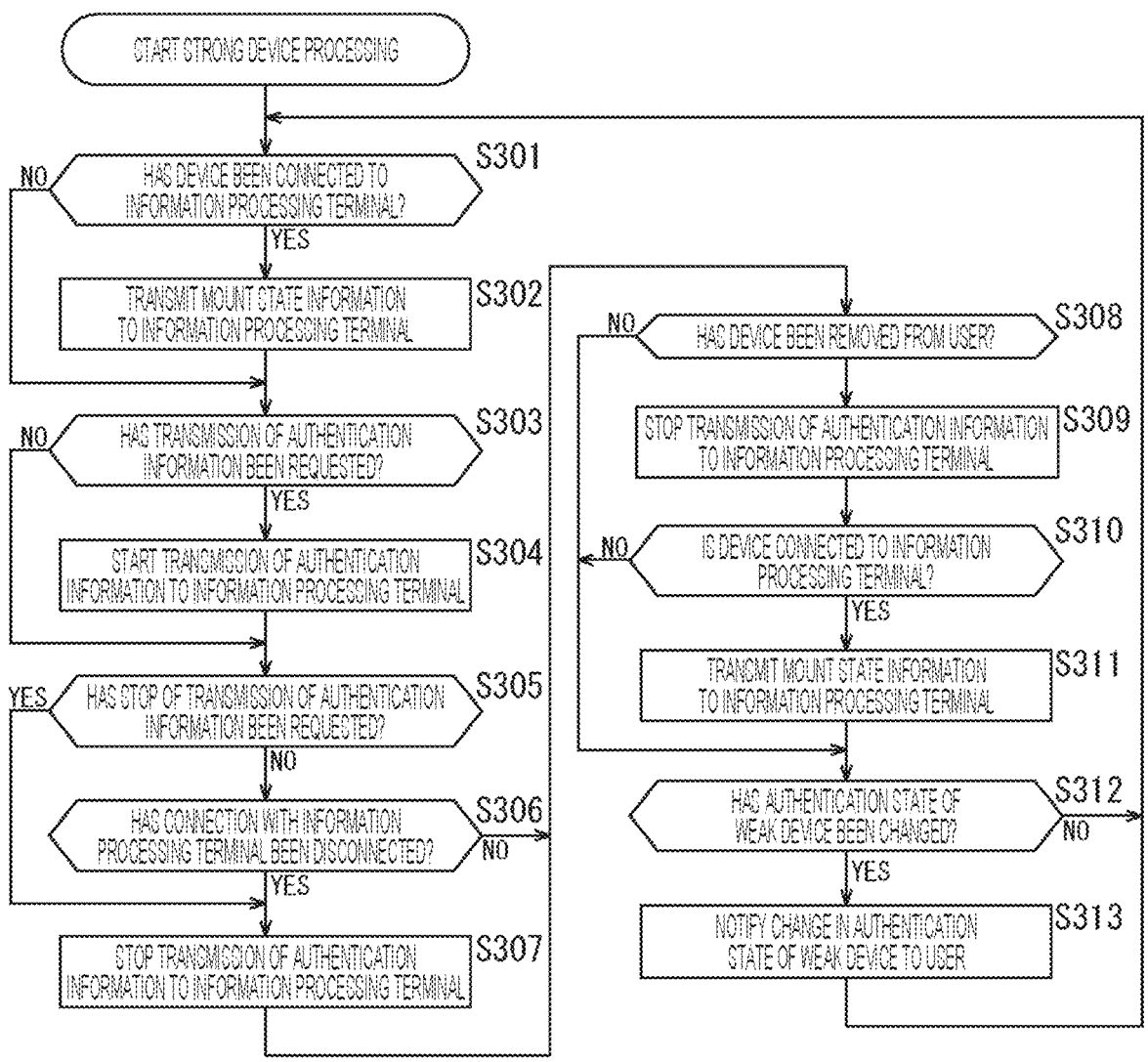
FIG. 24 is a flowchart for describing processing of the strong device of FIG. 21.

First, processing of the strong device 11b will be described with reference to the flowchart of FIG. 24.

This processing starts when the strong device 11b is powered on and ends when the strong device 11b is powered off, for example.

Figure 7:
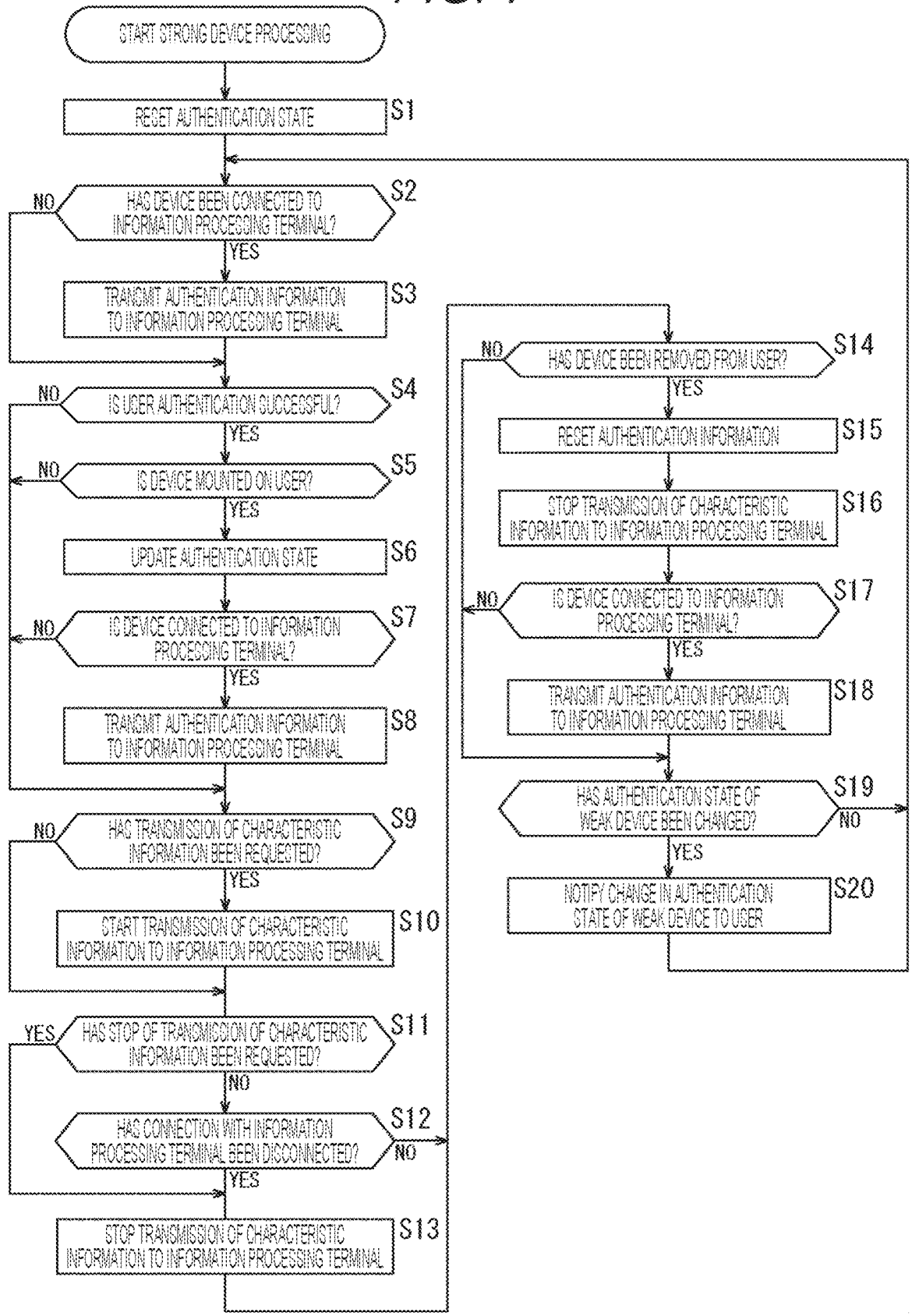
FIG. 7 is a flowchart for describing processing of the strong device of FIG. 2.

In step S301, whether or not the strong device 11b has been connected to the information processing terminal 13b is determined, as in the processing of step S2 of FIG. 7. In a case where it is determined that the strong device 11b has been connected with the information processing terminal 13b, the processing proceeds to step S302.

In step S302, the strong device 11b transmits the mount state information to the information processing terminal 13b. Specifically, the mount detection unit 51 detects the mount state of the strong device 11b on the basis of the sensor data from the infrared sensor 57, and generates mount state data indicating a detection result. The transmission control unit 302 generates mount state information including the mount state data and the identification information of the weak device 12a. Then, the transmission control unit 302 transmits the mount state information to the information processing terminal 13b via the communication unit 63.

Thereby, even if the mount state of the strong device 11b changes while the strong device 11b and the information processing terminal 13b are not connected, the latest mount state is always notified to the information processing terminal 13b after connection.

Thereafter, the processing proceeds to step S303.

On the other hand, in step S301, in a case where it is not determined that the strong device 11b has been connected to the information processing terminal 13b, the processing of step S302 is skipped and the processing proceeds to step S303.

In step S303, the transmission control unit 302 determines whether or not transmission of the authentication information has been requested. In a case where the transmission control unit 302 receives an authentication information transmission request signal for requesting transmission of the authentication information from the information processing terminal 13b via the communication unit 63, the transmission control unit 302 determines that transmission of the authentication information has been requested, and the processing proceeds to step S304.

In step S304, the strong device 11b starts transmission of the authentication information to the information processing terminal 13b. Specifically, the authentication unit 301 starts processing of performing the user authentication by detecting a pulse pattern (for example, a pulse interval) of the user on the basis of the sensor data from the pulse sensor 303, and comparing the detected pulse pattern with the collation data stored in the storage unit 56. Furthermore, the authentication state setting unit 55 starts processing of updating the authentication state of the strong device 11b and the authentication information stored in the storage unit 56 on the basis of a result of the user authentication by processing similar to step S6 of FIG. 7. Note that the authentication state setting unit 55 resets the authentication state and the authentication information in a case where the user authentication fails. Furthermore, the transmission control unit 302 starts processing of transmitting the authentication information stored in the storage unit 56 to the information processing terminal 13b via the communication unit 63.

Thereafter, the processing proceeds to step S305.

On the other hand, in step S303, in a case where it is determined that transmission of the authentication information has not been requested, the processing of step S304 is skipped and the processing proceeds to step S305.

In step S305, the transmission control unit 302 determines whether or not stop of the transmission of the authentication information has been requested. In a case where it is determined that stop of the transmission of the authentication information has not been requested, the processing proceeds to step S306.

In step S306, whether or not the connection with the information processing terminal 13b has been disconnected is determined similarly to the processing of step S12 of FIG. 7. In a case where it is determined that the connection with the information processing terminal 13b has been disconnected, the processing proceeds to step S307.

Meanwhile, in step S305, in a case where the transmission control unit 302 receives an authentication information transmission stop request signal for requesting stop of the transmission of the authentication information from the information processing terminal 13b via the communication unit 63, the transmission control unit 302 determines that stop of the transmission of the authentication information has been requested, the processing of step S306 is skipped, and the processing proceeds to step S307.

In step S307, the strong device 11b stops transmission of the authentication information to the information processing terminal 13b. Specifically, in a case where the authentication information is being transmitted to the information processing terminal 13b, the transmission control unit 302 stops the transmission of the authentication information and the authentication unit 301 stops the user authentication processing.

Thereafter, the processing proceeds to step S308.

On the other hand, in step S306, in a case where it is not determined that the connection with the information processing terminal 13b has been disconnected, the processing of step S307 is skipped and the processing proceeds to step S308.

In step S308, whether or not the strong device 11b has been removed from the user is determined similarly to the processing of step S14 of FIG. 7. In a case where it is determined that the strong device 11b has been removed from the user, the processing proceeds to step S309.

In step S309, the transmission of the authentication information to the information processing terminal 13b is stopped similarly to the processing of step S307.

In step S310, whether or not the strong device 11b is connected with the information processing terminal 13b is determined similarly to the processing of step S7 of FIG. 7. In a case where it is determined that the strong device 11b is connected with the information processing terminal 13b, the processing proceeds to step S311.

In step S311, the mount state information is transmitted to the information processing terminal 13b by similar processing to step S302. Thereby, the strong device 11a having been removed from the user is notified to the information processing terminal 13b.

Thereafter, the processing proceeds to step S312.

On the other hand, in step S310, in a case where it is determined that the strong device 11b is not connected with the information processing terminal 13b, the processing of step S311 is skipped and the processing proceeds to step S312.

Furthermore, in step S308, in a case where it is not determined that the strong device 11b has been removed from the user, the processing of steps S309 to S311 is skipped and the processing proceeds to step S312.

In step S312, it is determined whether or not the authentication state of the weak device 12b has been changed, similarly to the processing of step S19 of FIG. 7. In a case where it is determined that the authentication state of the weak device 12b has been changed, the processing proceeds to step S313.

In step S313, the change in the authentication state of the weak device 12b is notified to the user, similarly to the processing of step S20 of FIG. 7.

After that, the processing returns to step S301, and the processing in step S301 and the subsequent steps is executed.

On the other hand, in step S312, in a case where it is determined that the authentication state of the weak device 12b has not been changed, the processing returns to step S301 and the processing of step S301 and the subsequent steps is executed.

<Processing of Weak Device 12b>

Figure 25:
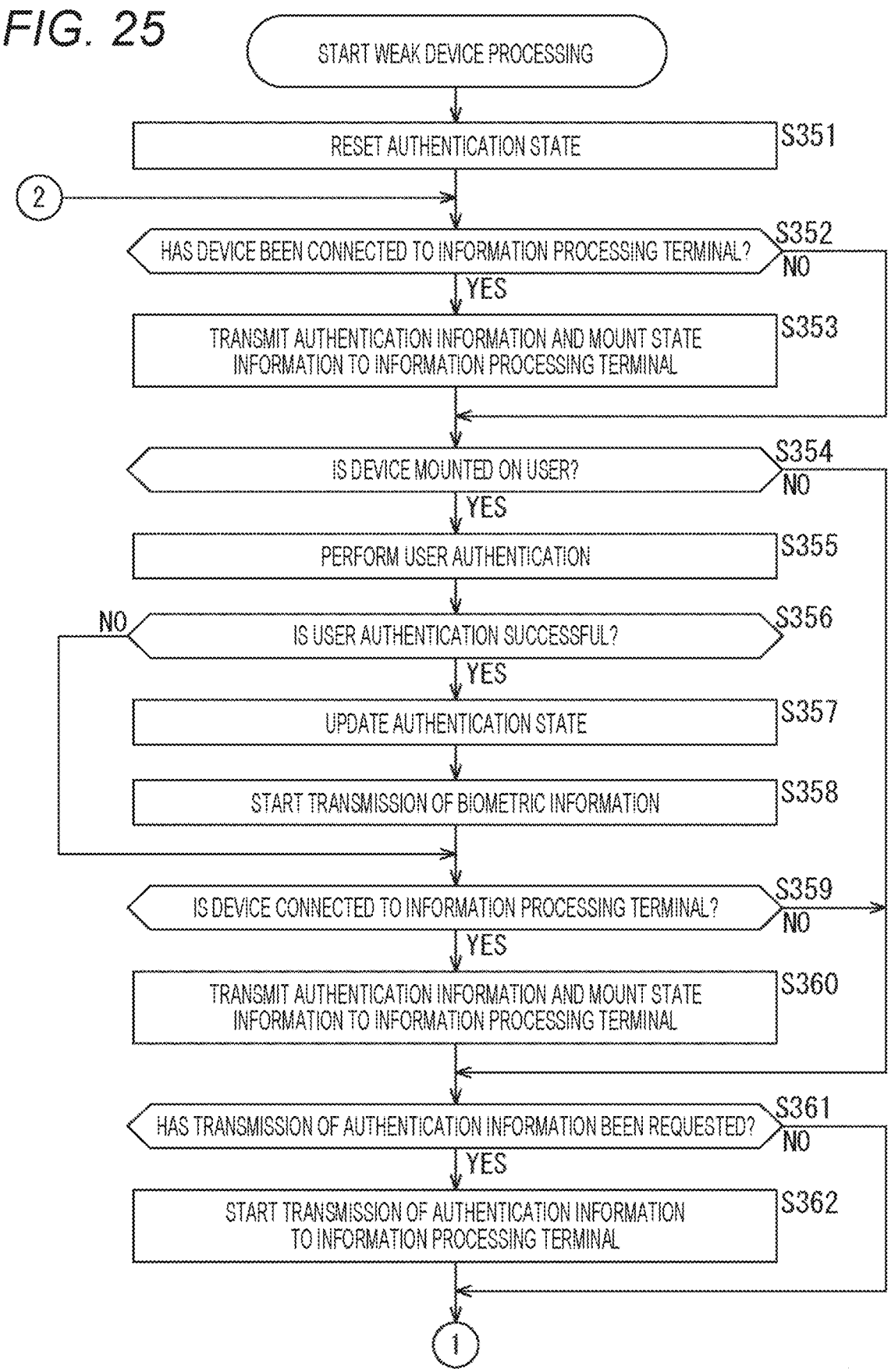
FIG. 25 is a flowchart for describing processing of the weak device of FIG. 22.
Figure 26:
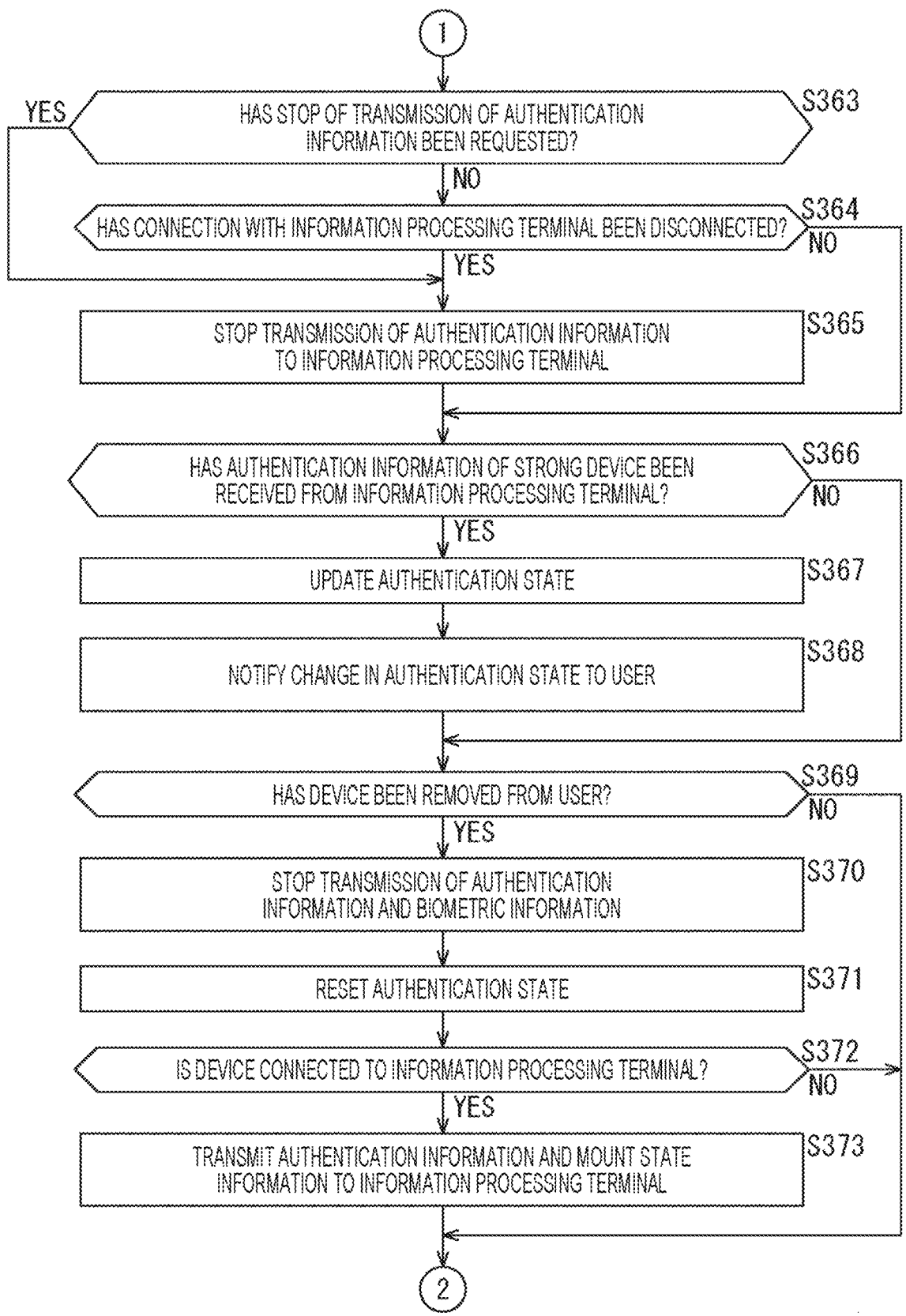
FIG. 26 is a flowchart for describing the processing of the weak device of FIG. 22.

Next, processing of the weak device 12b will be described with reference to the flowcharts of FIGS. 25 and 26.

This processing starts when the weak device 12b is powered on and ends when the weak device 12b is powered off, for example.

Figure 13:
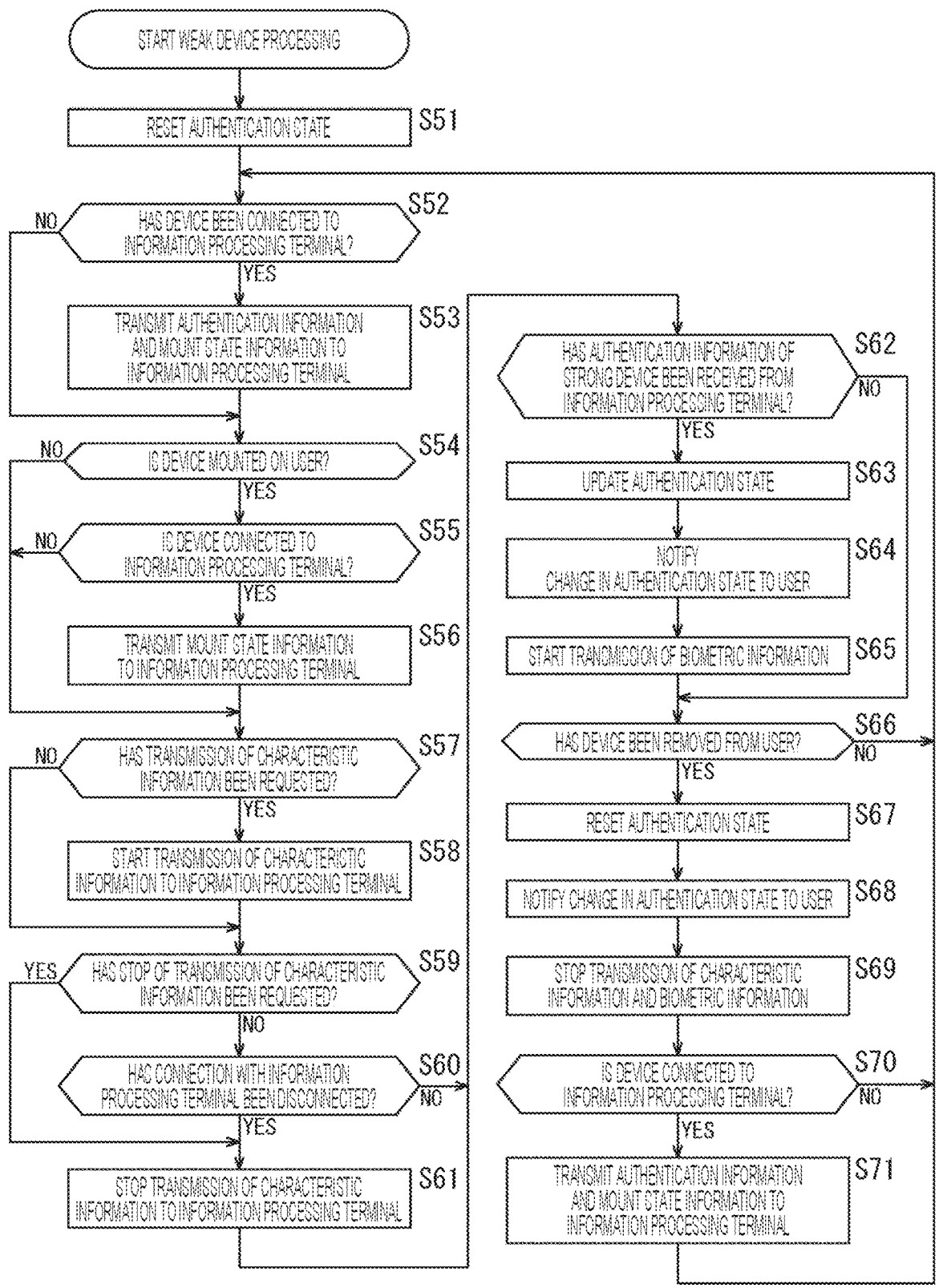
FIG. 13 is a flowchart for describing processing of the weak device of FIG. 3.

In step S351, the authentication state is reset similarly to the processing of step S51 of FIG. 13.

In step S352, whether or not the weak device 12b has been connected to the information processing terminal 13b is determined, as in the processing of step S52 of FIG. 13. In a case where it is determined that the weak device 12b has been connected to the information processing terminal 13b, the processing proceeds to step S353.

In step S353, the authentication information and the mount state information are transmitted to the information processing terminal 13b similarly to the processing of step S53 of FIG. 13.

Thereafter, the processing proceeds to step S354.

On the other hand, in step S352, in a case where it is not determined that the weak device 12b has been connected to the information processing terminal 13b, the processing of step S353 is skipped and the processing proceeds to step S354.

In step S354, whether or not the weak device 12b has been removed from the user is determined similarly to the processing of step S54 of FIG. 13. In a case where it is determined that the weak device 12b has been mounted on the user, the processing proceeds to step S355.

In step S355, the authentication unit 351 performs user authentication. Specifically, the authentication unit 351 detects a time-series pattern of a walking interval of the user on the basis of the sensor data from the acceleration sensor 108, and compares the detected time-series pattern of the walking interval with the collation data stored in the storage unit 106, thereby performing the user authentication.

In step S356, the authentication unit 351 determines whether or not the user authentication is successful. As a result of the processing of step S355, in a case where authentication or identification of a specific user is successful, the authentication unit 351 determines that the user authentication is successful, and the processing proceeds to step S357.

In step S357, the authentication state setting unit 353 updates the authentication state. Specifically, the authentication state setting unit 353 sets the user authenticated or identified by the user authentication as the authenticated user, and sets the authentication level to the authentication level set for the gait authentication. The authentication state setting unit 353 updates the user information and the authentication level of the authentication information stored in the storage unit 106 to the set content.

In step S358, transmission of the biometric information is started similarly to the processing of step S65 of FIG. 13.

On the other hand, in step S356, in a case where it is determined that the user authentication has failed, the processing of steps S357 and S358 is skipped and the processing proceeds to step S359.

In step S359, whether or not the weak device 12b is connected with the information processing terminal 13b is determined similarly to the processing of step S55 of FIG. 13. In a case where it is determined that the weak device 12b is connected with the information processing terminal 13b, the processing proceeds to step S360.

In step S360, the authentication information and the mount state information are transmitted to the information processing terminal 13b similarly to the processing of step S353.

Thereafter, the processing proceeds to step S361.

On the other hand, in step S359, in a case where it is determined that the weak device 12b is not connected with the information processing terminal 13b, the processing of step S360 is skipped and the processing proceeds to step S361.

Furthermore, in step S354, in a case where it is not determined that the weak device 12b has been mounted on the user, the processing of steps S355 and S360 is skipped and the processing proceeds to step S361.

In step S361, the transmission control unit 352 determines whether or not transmission of the authentication information has been requested. In a case where the transmission control unit 352 receives an authentication information transmission request signal from the information processing terminal 13b via the communication unit 113, the transmission control unit 352 determines that transmission of the authentication information has been requested, and the processing proceeds to step S362.

In step S362, the weak device 12b starts transmission of the authentication information to the information processing terminal 13b. Specifically, the authentication unit 351 starts the user authentication by similar processing to step S355. Furthermore, the authentication state setting unit 353 starts processing of updating the authentication state of the weak device 12b and the authentication information stored in the storage unit 106 on the basis of a result of the user authentication by processing similar to step S357. Note that the authentication state setting unit 353 resets the authentication state and the authentication information in a case where the user authentication has failed. Moreover, the transmission control unit 352 starts processing of transmitting the authentication information stored in the storage unit 106 to the information processing terminal 13b via the communication unit 113.

Thereafter, the processing proceeds to step S363.

On the other hand, in step S361, in a case where it is determined that transmission of the authentication information has not been requested, the processing of step S362 is skipped and the processing proceeds to step S363.

In step S363, the transmission control unit 352 determines whether or not stop of the transmission of the authentication information has been requested. In a case where it is determined that stop of the transmission of the authentication information has not been requested, the processing proceeds to step S364.

In step S364, whether or not the connection with the information processing terminal 13b has been disconnected is determined similarly to the processing of step S60 of FIG.

13. In a case where it is determined that the connection with the information processing terminal 13*b* has been disconnected, the processing proceeds to step S365.

Meanwhile, in step S363, in a case where the transmission control unit 352 receives an authentication information transmission stop request signal from the information processing terminal 13*b* via the communication unit 113, the transmission control unit 352 determines that stop of the transmission of the authentication information has been requested, the processing of step S364 is skipped, and the processing proceeds to step S365.

In step S365, the weak device 12*b* stops transmission of the authentication information to the information processing terminal 13*b*. Specifically, in a case where the authentication information is being transmitted to the information processing terminal 13*b*, the transmission control unit 352 stops the transmission of the authentication information and the authentication unit 351 stops the user authentication processing.

Thereafter, the processing proceeds to step S366.

On the other hand, in step S364, in a case where it is not determined that the connection with the information processing terminal 13*b* has been disconnected, the processing of step S365 is skipped and the processing proceeds to step S366.

In step S366, whether or not the authentication information of the strong device 11*b* has been received from the information processing terminal 13*b* is determined, as in the processing of step S62 of FIG. 13. In a case where it is determined that the authentication information of the strong device 11*b* has been received from the information processing terminal 13*b*, the processing proceeds to step S367.

In step S367, the authentication state is updated similarly to the processing of step S63 of FIG. 13.

In step S368, the change in the authentication state is notified to the user, similarly to the processing of step S64 of FIG. 13.

Thereafter, the processing proceeds to step S369.

On the other hand, in step S366, in a case where it is determined that the authentication information of the strong device 11*b* has not been received from the information processing terminal 13*b*, the processing of steps S367 and S368 is skipped and the processing proceeds to step S369.

In step S369, whether or not the weak device 12*b* has been removed from the user is determined similarly to the processing of step S66 of FIG. 13. In a case where it is determined that the weak device 12*b* has been removed from the user, the processing proceeds to step S370.

In step S370, the weak device 12*b* stops transmission of the authentication information and the biometric information. Specifically, in a case where the authentication information is being transmitted to the information processing terminal 13*a*, the transmission control unit 352 stops the transmission of the authentication information and the authentication unit 351 stops the user authentication processing.

Furthermore, in a case where the biometric information is being transmitted to the server 14, the transmission control unit 352 stops the transmission of the biometric information and the biometric data detection unit 103 stops the detection of the blood glucose level of the user.

In step S371, the authentication state is reset similarly to the processing of step S51 of FIG. 13.

In step S372, whether or not the weak device 12*b* is connected with the information processing terminal 13*b* is determined similarly to the processing of step S55 of FIG. 13. In a case where it is determined that the weak device 12*b* is connected with the information processing terminal 13*b*, the processing proceeds to step S373.

In step S373, the authentication information and the mount state information are transmitted to the information processing terminal 13*b* similarly to the processing of step S353.

After that, the processing returns to step S352, and the processing in step S352 and the subsequent steps is executed.

On the other hand, in step S372, in a case where it is determined that the weak device 12*b* is not connected with the information processing terminal 13*b*, the processing returns to step S352 and the processing of step S352 and the subsequent steps is executed.

Furthermore, in step S369, in a case where it is not determined that the weak device 12*b* has been removed from the user, the processing returns to step S352 and the processing of step S352 and the subsequent steps is executed.

<Processing of Information Processing Terminal 13*b*>

Figure 27:
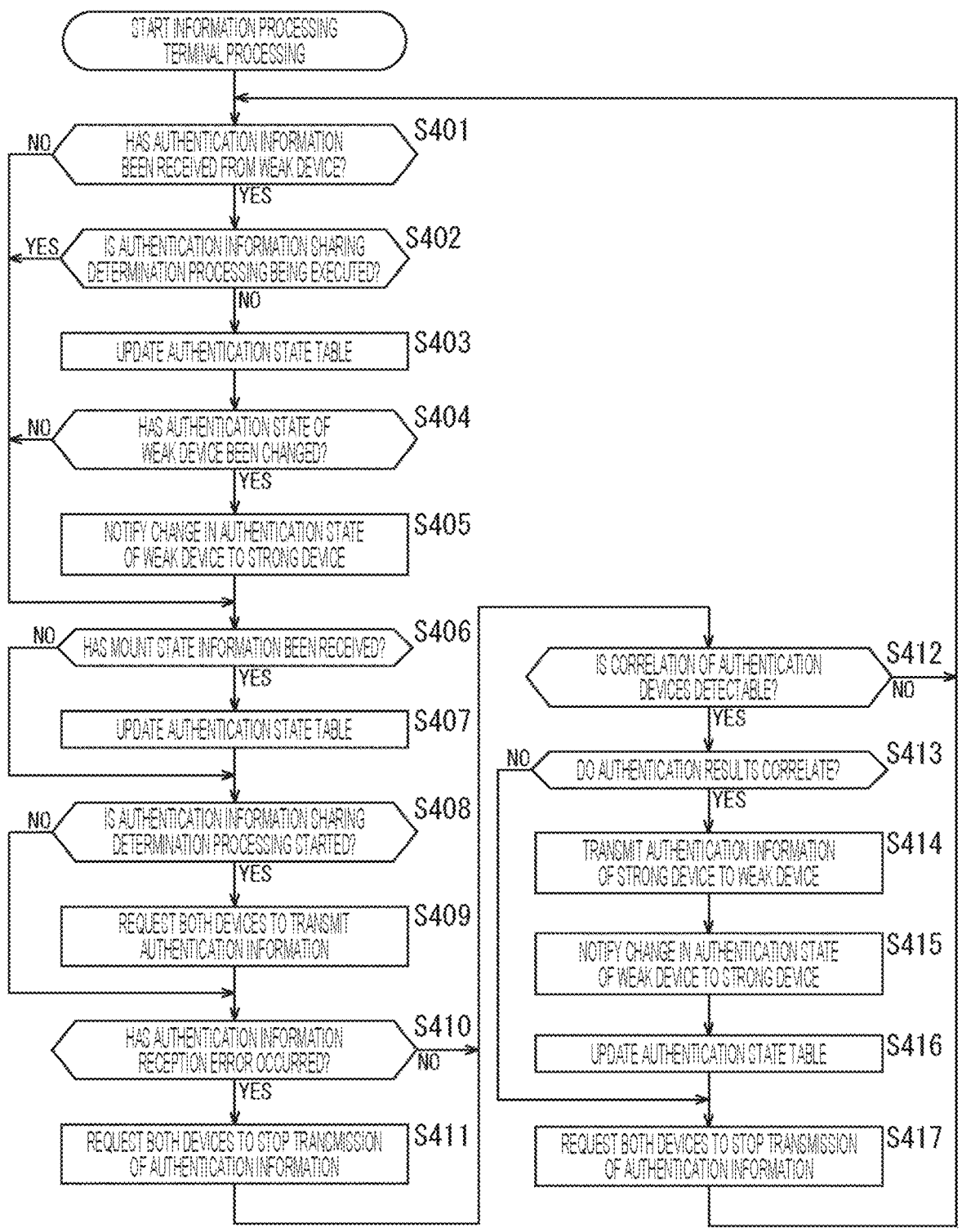
FIG. 27 is a flowchart for describing processing of the information processing terminal of FIG. 23.

Next, processing executed by the information processing terminal 13*b* corresponding to the processing of the strong device 11*b* of FIG. 24 and the processing of the weak device 12*b* of FIGS. 25 and 26 will be described with reference to the flowchart of FIG. 27.

This processing starts when the information processing terminal 13*b* is powered on and ends when the information processing terminal 13*b* is powered off, for example.

In step S401, the communication unit 157 determines whether or not the authentication information has been received from the weak device 12*b*. In a case where it is determined that the authentication information of the weak device 12*b* has been received, the processing proceeds to step S402.

In step S402, the authentication sharing control unit 402 determines whether or not authentication information sharing determination processing is being executed. In a case where it is determined that the authentication information sharing determination processing is not being executed, the processing proceeds to step S403.

In step S403, the authentication sharing control unit 402 updates the authentication state table. The authentication state table includes, for example, information indicating the authentication state of the weak device 12*b*, and the mount states of the strong device 11*b* and the weak device 12*b* on the user. The authentication sharing control unit 402 updates the authentication state of the weak device 12*a* in the authentication state table stored in the storage unit 153 on the basis of the authentication information of the weak device 12*a*.

In step S404, it is determined that whether or not the authentication state of the weak device 12*b* has been changed, similarly to the processing of step S103 of FIG. 15. In a case where it is determined that the authentication state of the weak device 12*b* has been changed, the processing proceeds to step S405.

In step S405, the change in the authentication state of the weak device 12*b* is notified to the strong device 11*b*, similarly to the processing of step S104 of FIG. 15.

Thereafter, the processing proceeds to step S406.

On the other hand, in step S404, in a case where it is determined that the authentication state of the weak device 12*b* has not been changed, the processing of step S405 is skipped and the processing proceeds to step S406.

Furthermore, in step S402, in a case where it is determined that the authentication information sharing determination processing is being executed, that is, in a case where the authentication information received from the weak device 12b is used for the authentication information sharing determination processing, processing of steps S403 to S405 is skipped and the processing proceeds to step S406.

Furthermore, in step S401, in a case where it is determined that the authentication information has not been received from the weak device 12b, the processing of steps S402 to S405 is skipped and the processing proceeds to step S406.

In step S406, the communication unit 157 determines whether or not the mount state information has been received. In a case where the communication unit 157 determines that the mount state information has been received from at least one of the strong device 11b or the weak device 12b, the processing proceeds to step S407.

In step S407, the authentication sharing control unit 402 updates the authentication state table. Specifically, in a case where the authentication sharing control unit 402 receives the mount state information from the strong device 11b, the authentication sharing control unit 402 updates the mount state of the strong device 11b of the authentication state table stored in the storage unit 153 on the basis of the mount state information. In a case where the authentication sharing control unit 402 receives the mount state information from the weak device 12b, the authentication sharing control unit 402 updates the mount state of the weak device 12b of the authentication state table stored in the storage unit 153 on the basis of the mount state information.

Thereafter, the processing proceeds to step S408.

Meanwhile, in step S406, in a case where it is determined that the mount state information has not been received, the processing of step S407 is skipped and the processing proceeds to step S408.

In step S408, the authentication sharing control unit 402 determines whether or not to start the authentication information sharing determination processing on the basis of the authentication state table stored in the storage unit 153. Specifically, in a case where the authentication information sharing determination processing is not being executed, the authentication sharing control unit 402 determines to start the authentication information sharing determination processing when both the strong device 11b and the weak device 12b are mounted on the user and the user authentication of the weak device 12b is invalid, and the processing proceeds to step S409.

In step S409, the authentication sharing control unit 402 requests both the devices to transmit the authentication information. Specifically, the authentication sharing control unit 402 generates an authentication information transmission request signal and transmits the authentication information transmission request signal to the strong device 11b and the weak device 12b via the communication unit 113. Thereby, the authentication information sharing determination processing is started.

Thereafter, the processing proceeds to step S410.

Meanwhile, in step S408, the authentication sharing control unit 402 determines not to start the authentication information sharing determination processing in a case where the authentication information sharing determination processing is already being executed, in a case where at least one of the strong device 11b or the weak device 12b is not mounted on the user, or in a case where the user authentication of the weak device 12b is valid, the processing of step S409 is skipped, and the processing proceeds to step S410.

In step S410, the communication unit 157 determines whether or not an authentication information reception error has occurred. In a case where a state where the authentication information cannot be received from at least one of the strong device 11b or the weak device 12b has occurred, the communication unit 157 determines that the authentication information reception error has occurred, and the processing proceeds to step S411.

Here, for example, a case where at least one of the strong device 11b or the weak device 12b is removed from the user and the transmission of the authentication information is stopped, or a case where at least one of the strong device 11b or the weak device 12b is not connected to the information processing terminal 13b is assumed, for example.

In step S411, the authentication sharing control unit 402 requests both the devices to stop transmission of the authentication information. Specifically, the authentication sharing control unit 402 generates an authentication information transmission stop request signal and transmits the authentication information transmission stop request signal to the strong device 11b and the weak device 12b via the communication unit 157.

Thereby, the authentication information sharing determination processing is stopped.

Thereafter, the processing proceeds to step S412.

Meanwhile, in step S410, in a case where it is determined that the authentication information reception error has not occurred, the processing of step S411 is skipped and the processing proceeds to step S412.

In step S412, the correlation detection unit 401 determines whether or not a correlation of the authentication results is detectable. For example, in a case where the correlation detection unit 401 has received the authentication information of a sufficient time or amount for calculating the correlation coefficient between the authentication result of the strong device 11b and the authentication information result of the weak device 12b, the correlation detection unit 401 determines that the correlation of the authentication results is detectable, and the processing proceeds to step S413.

In step S413, the correlation detection unit 401 determines whether or not the authentication results correlate. Specifically, the correlation detection unit 401 calculates the correlation coefficient between the user authentication result in the strong device 11b and the user authentication result in the weak device 12b. Then, in a case where the calculated correlation coefficient is equal to or larger than a predetermined threshold value, the correlation detection unit 401 determines that the authentication results correlate, that is, the authentication results are for the same person, and the processing proceeds to step S414.

Figure 28:
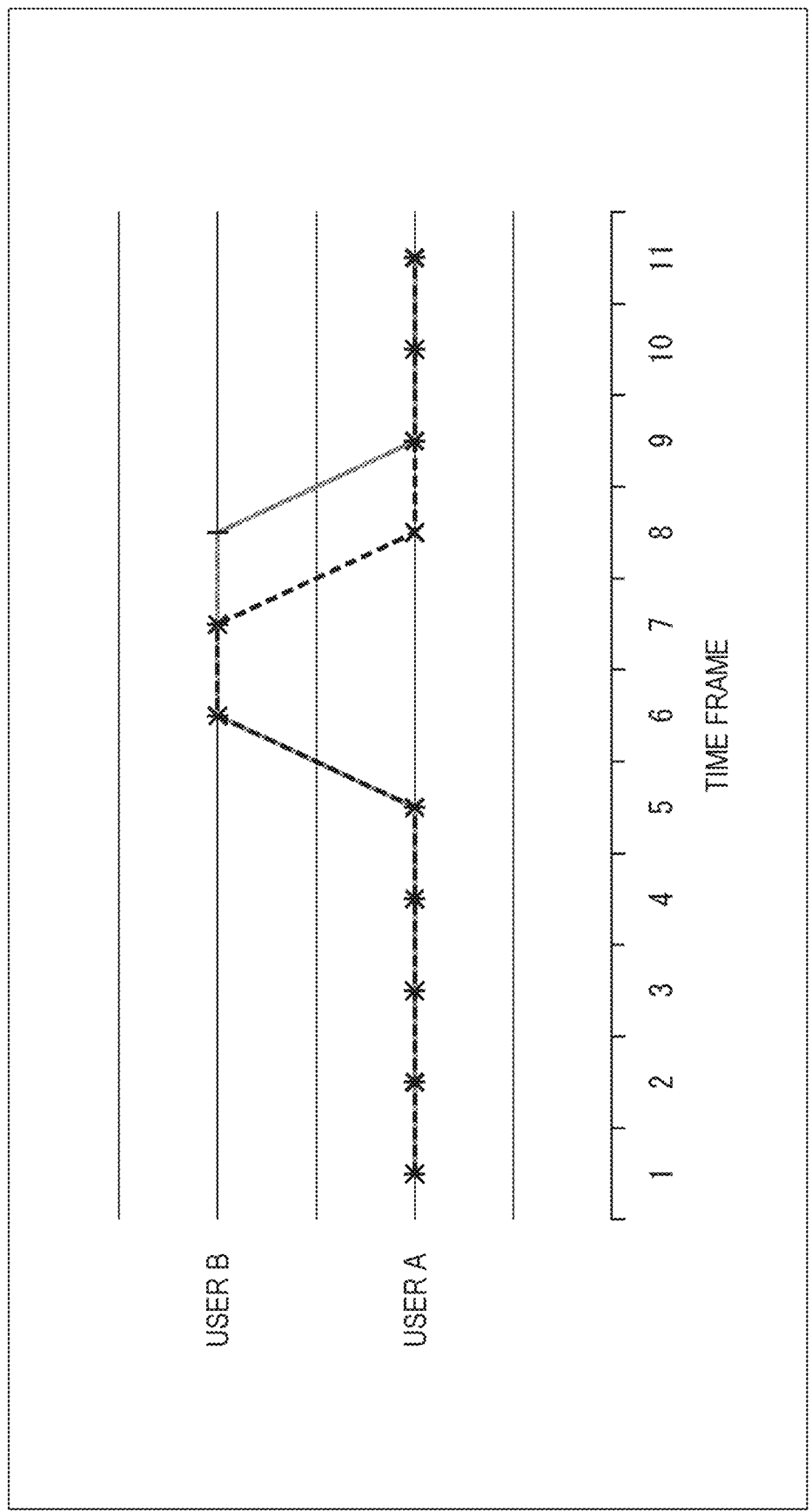
FIG. 28 is a graph illustrating an example of transition in authentication results.

FIG. 28 illustrates an example of the authentication result of the strong device 11b and the authentication result of the weak device 12b. The horizontal axis represents a time frame indicating a time interval for user authentication.

Note that, in this example, it is assumed that the strong device 11b and the weak device 12b are shared by a user A and a user B, and the strong device 11b and the weak device 12b identify a specific user from the user A and the user B.

Furthermore, it is assumed that the user A has calm personality, has a parasympathetic nerve-dominated life during the daytime, and has a standard walking interval. Meanwhile, it is assumed that the user B has an impatient personality, has a sympathetic-dominant life during the daytime, and has a short walking interval.

For example, in a case where the strong device 11b and the weak device 12b are mounted on the user A, it is assumed that false authentication of the user authentication occurs at similar timing even if the authentication methods of the two users are different.

For example, in this example, in the strong device 11b, the authenticated user is the user B between the time frame 6 and the time frame 8, and false authentication occurs. Furthermore, in the weak device 12b, the authenticated user is the user B between the time frame 6 to the time frame 7, and false authentication occurs. For example, in the time zone when the false authentication of the user authentication occurs, it is assumed that the user A, who is usually calm, becomes impatient due to factors such as being late and close to the characteristics of the user B.

In this way, in a case where the strong device 11b and the weak device 12b are mounted on the same user, the correlation of the authentication results of the user authentication becomes high. Meanwhile, in a case where the strong device 11b and the weak device 12b are not mounted on the same user, the correlation of the authentication results of the user authentication becomes low.

In step S414, the authentication information of the strong device 11a is transmitted to the weak device 12a, similarly to the processing of step S113 of FIG. 15.

In step S415, the change in the authentication state of the weak device 12b is notified to the strong device 11b, similarly to the processing of step S104 of FIG. 15.

In step S416, the authentication sharing control unit 402 updates the authentication state table.

Specifically, the authentication sharing control unit 402 updates the authentication state of the weak device 12b in the authentication state table stored in the storage unit 153. Thereby, the authentication state (authentication level) of the weak device 12b is set to the authentication state (authentication level) similar to the strong device 11b.

Thereafter, the processing proceeds to step S417.

Meanwhile, in step S413, in a case where the correlation coefficient between the user authentication result in the strong device 11a and the user authentication result in the weak device 12a is less than a predetermined threshold value, the correlation detection unit 151 determines that the authentication result do not correlate, and the processing of steps S414 to S416 is skipped and the processing proceeds to step S417.

In step S417, both the devices are requested to stop the transmission of the authentication information, similarly to the processing of step S411. Thereby, the authentication information sharing determination processing ends.

After that, the processing returns to step S401, and the processing in step S401 and the subsequent steps is executed.

Meanwhile, step S412, in a case where the correlation detection unit 401 has not received the authentication information of a sufficient time or amount for calculating the correlation coefficient between the authentication result of the strong device 11b and the authentication information result of the weak device 12b yet, the correlation detection unit 401 determines that the correlation of the authentication results cannot be detected yet, the processing returns to step S401, and the processing of step S401 and the subsequent steps is executed.

As described above, whether or not both the devices are mounted on the same user is detected on the basis of the user authentication results of the strong device 11b and the weak device 12b. Then, in a case where both the devices are mounted on the same user, the authentication information of the strong device 11b is shared with the weak device 12b, and the authentication level of the weak device 12b can be increased.

As a result, even if the strong device 11b and the weak device 12b cannot detect the same type of characteristic data, the authentication information can be shared.

Furthermore, the authentication information can be easily and safely shared between the strong device 11b and the weak device 12b, similarly to the first embodiment.

Modification of Second Embodiment

Hereinafter, modifications of the above-described second embodiment will be described.

For example, the strong device 11b and the weak device 12b may send and receive the authentication information without going through the information processing terminal 13b. In this case, the processing of the correlation detection unit 401 and the authentication sharing control unit 402 of the information processing terminal 13b may be performed by either the strong device 11b or the weak device 12b.

Furthermore, for example, the server 14 may perform the processing of the information processing terminal 13b. For example, the strong device 11b and the weak device 12b may transmit the authentication information to the server 14, and the server 14 may control sharing of the authentication information between the strong device 11b and the weak device 12b.

Moreover, for example, the weak device 12b may transmit the biometric information to the server 14 even in a case where the user authentication is invalid. Then, for example, the biometric data processing unit 201 of the server 14 may use the authentication level of the weak device 12b at the time of detecting the biometric data when performing various types of processing using the biometric data.

Furthermore, the weak device 12b may store the biometric information in the storage unit 106 or transmit the biometric information to the information processing terminal 13b without transmitting the biometric information to the server 14.

Moreover, the strong device 11b may also detect the biometric data and transmit the biometric information including the biometric data and the authentication information to the server 14.

Furthermore, the information processing terminal 13b may also be configured by a wearable device capable of biometric data and user authentication, and the authentication information may be shared among the strong device 11b, the weak device 12b, and the information processing terminal 13b.

Moreover, a combination of the user authentications to be used is not limited to the above-described example, and any combination can be used. For example, a combination of the user authentication based on driving characteristics and the user authentication based on operation of a portable information processing terminal such as a smartphone may be used. Thereby, for example, in a case where a user who is cautious on weekdays becomes active on holidays, false authentication of similar user authentication occurs, and the strong device 11b and the weak device 12b being mounted on the same user becomes able to be detected.

3. Third Embodiment

Next, a third embodiment of the present technology will be described with reference to FIGS. 29 to 42.

The third embodiment allows two wearable devices to share authentication information through another wearable device.

<Configuration Example of Information Processing System 501>

Figure 29:
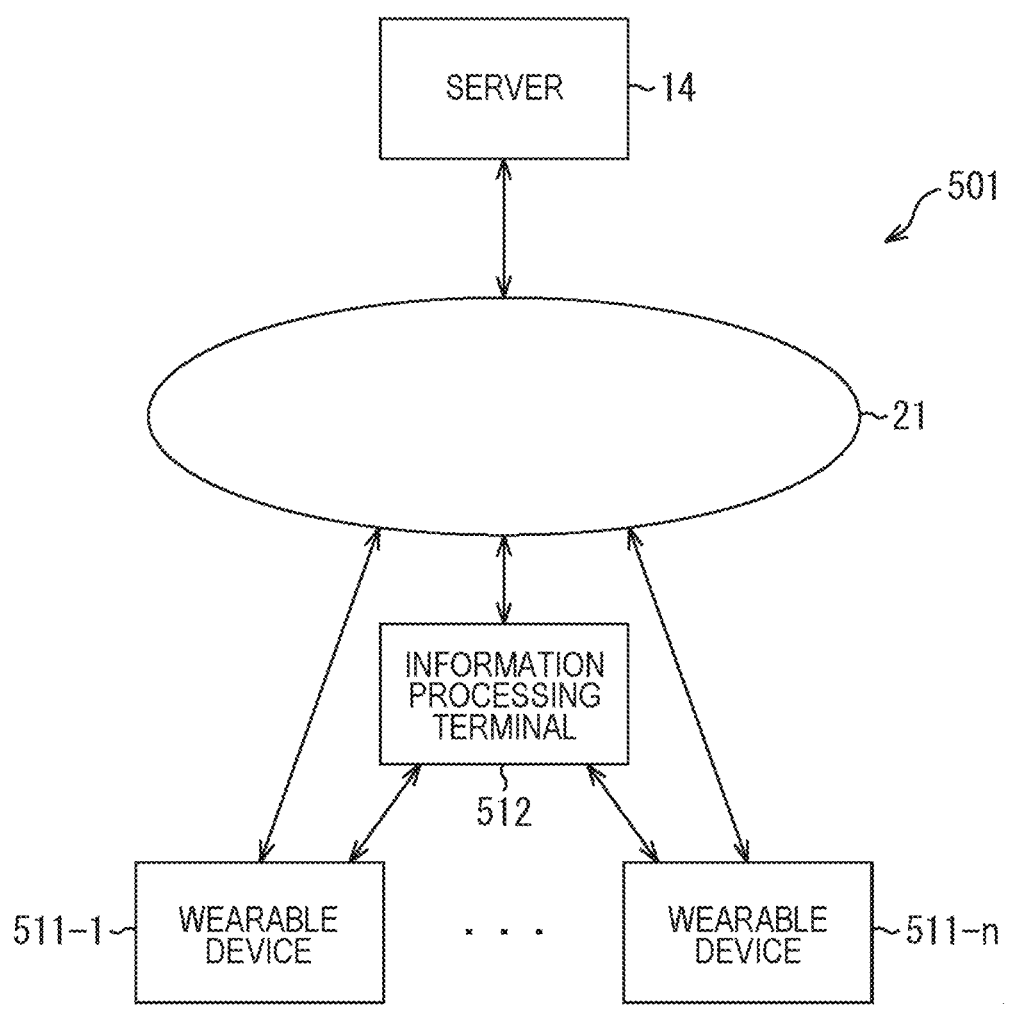
FIG. 29 is a block diagram illustrating a third embodiment of an information processing system to which the present technology is applied.

FIG. 29 is a block diagram illustrating a configuration example of an information processing system 501 to which the present technology is applied. Note that a portion corresponding to the information processing system 1 of FIG. 1 is denoted by the same reference numeral, and description thereof is appropriately omitted.

The information processing system 501 includes a server 14, a network 21, wearable devices 511-1 to 511-n, and an information processing terminal 512. The server 14, the wearable devices 511-1 to 511-n, and the information processing terminal 512 are connected to one another via the network 21 and communicate with one another. Furthermore, the wearable devices 511-1 to 511-n and the information processing terminal 512 can directly communicate with one another.

Note that, hereinafter, in a case where it is not necessary to individually distinguish the wearable devices 511-1 to 511-n, the wearable devices are simply referred to as wearable device(s) 511. Furthermore, hereinafter, in a case of distinguishing two wearable devices 511 by the authentication levels, one with a higher authentication level is referred to as a strong device, and one with a lower authentication level is referred to as a weak device.

Each wearable device 511 is configured by an information processing apparatus capable of being attached to the user, of any type such as eyeglass type, wristband type, bracelet type, necklace type, neckband type, earphone type, headset type, head mount type, and clothing type. Note that, hereinafter, a case in which each wearable device 511 is mainly mounted on a user will be described as an example.

Some wearable devices 511 have a user authentication function, and there are various authentication levels. Moreover, each wearable device 511 generates authentication information indicating an authentication state and transmits the authentication information to the information processing terminal 512.

Furthermore, each wearable device 511 detects a characteristic of the user, generates characteristic information including characteristic data indicating the detected characteristic, and transmits the characteristic information to the information processing terminal 512. Note that there are various types of characteristics of the user detected by each wearable device 511.

Moreover, some wearable devices 511 have a biometric data detection function, and there are various types of biometric data. The wearable device 511 having the biometric data detection function generates biometric information including the biometric data and the authentication information, and transmits the biometric information to the server 14 via the network 21.

Furthermore, each wearable device 511 generates sensor information, detection data information, authentication information, and mount state information, and transmits the generated information to the information processing terminal 512. The sensor information includes the types of sensors used for detecting the characteristic data and the biometric data among sensors included in each wearable device 511. The detection data information includes the types of characteristic data and biometric data that can be detected by each wearable device 511.

The information processing terminal 512 is configured by, for example, an information processing apparatus such as a smartphone, a personal computer, a tablet, or a mobile phone. The information processing terminal 512 controls sharing of the authentication information among the respective wearable devices 511 on the basis of the sensor information, the detection data information, the authentication information, and the mount state information received from the respective wearable devices 511.

<Configuration Example of Wearable Device 511>

Figure 30:
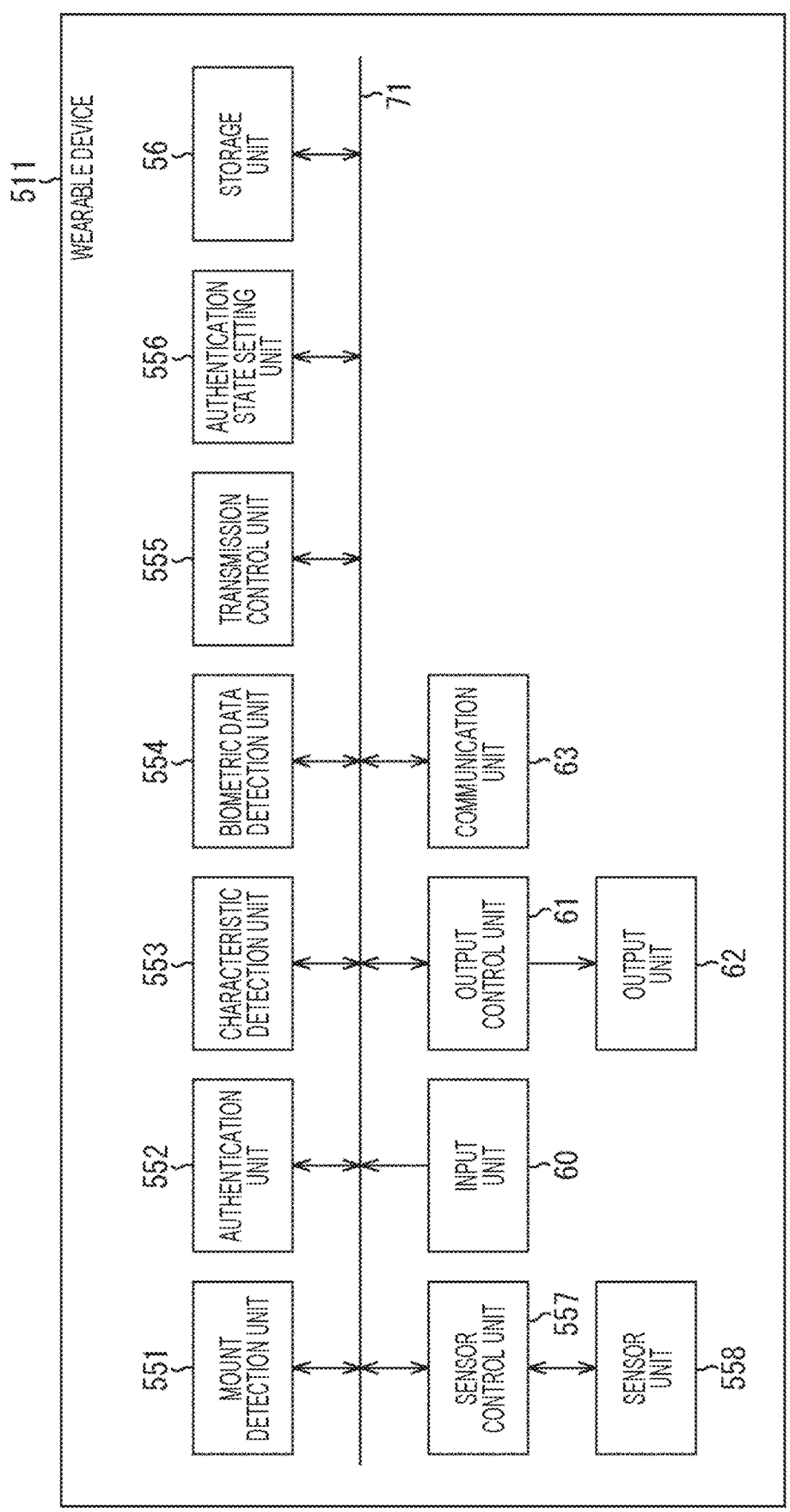
FIG. 30 is a block diagram illustrating a configuration example of a wearable device of FIG. 29.

FIG. 30 illustrates a configuration example of the wearable device 511 of FIG. 29. Note that a portion corresponding to the strong device 11a of FIG. 2 is denoted by the same reference numeral, and description thereof is appropriately omitted.

The wearable device 511 includes a storage unit 56, an input unit 60, an output control unit 61, an output unit 62, a communication unit 63, a bus 71, a mount detection unit 551, an authentication unit 552, a characteristic detection unit 553, a biometric data detection unit 554, a transmission control unit 555, an authentication state setting unit 556, a sensor control unit 557, and a sensor unit 558. The storage unit 56, the input unit 60, the output control unit 61, the communication unit 63, the mount detection unit 551, the authentication unit 552, the characteristic detection unit 553, the biometric data detection unit 554, the transmission control unit 555, the authentication state setting unit 556, and the sensor control unit 557 are connected to one another via the bus 71 and communicate with one another.

The mount detection unit 551 detects the mount state of the wearable device 511 on the user on the basis of the sensor data supplied from the sensor unit 558 via the sensor control unit 557.

Note that the detection method and the types of sensor data used by the mount detection unit 551 are arbitrary.

The authentication unit 552 performs user authentication on the basis of the sensor data supplied from the sensor unit 558 via the sensor control unit 557 and collation data stored in the storage unit 56.

Note that the authentication method and the types of sensor data used by the authentication unit 552 are arbitrary. Furthermore, not all the wearable devices 511 need to include the authentication unit 552, and there may be a wearable device 511 that does not include the authentication unit 552.

The characteristic detection unit 553 detects the characteristic of the user on the basis of the sensor data supplied from the sensor unit 558 via the sensor control unit 557 and generates the characteristic data indicating the detected characteristic.

Note that the type of characteristic data detected by the characteristic detection unit 553 is arbitrary, and a plurality of types of characteristic data may be detected. Furthermore, the detection method and the types of sensor data used by the characteristic detection unit 553 are arbitrary.

The biometric data detection unit 554 detects the biometric data of the user on the basis of the sensor data supplied from the sensor unit 558 via the sensor control unit 557.

Note that the type of biometric data detected by the biometric data detection unit 554 is arbitrary, and a plurality of types of biometric data may be detected. Furthermore, the detection method and the type of sensor data used by the biometric data detection unit 554 are arbitrary. Furthermore, not all the wearable devices 511 need to include the biometric data detection unit 554, and there may be a wearable device 511 that does not include the biometric data detection unit 554.

The transmission control unit 555 generates the mount state information indicating the mount state of the wearable device 511, the characteristic information including the characteristic data, and the biometric information including the biometric data. Furthermore, the transmission control unit 555 generates device information including the sensor information, the detection data information, the authentication information, and the mount state of the wearable device 511. The transmission control unit 555 controls transmission of the authentication information, the mount state information, the characteristic information, the device information, and the biometric information to the information processing terminal 512.

The authentication state setting unit 556 sets an authentication state of the wearable device 511 on the basis of at least one or more of the mount state of the wearable device 511 detected by the mount detection unit 551, a result of the user authentication by the authentication unit 52, and the authentication information of another wearable device 511 transmitted from the information processing terminal 13. The authentication state setting unit 556 generates or updates the authentication information indicating the authentication state of the wearable device 511, and causes the storage unit 56 to store the authentication information.

The sensor control unit 557 controls operation of each sensor included in the sensor unit 558, for example, power on/off, start, stop, and the like. Furthermore, the sensor control unit 557 supplies the sensor data from each sensor included in the sensor unit 558 to each unit of the wearable device 511.

The sensor unit 558 includes, for example, sensors necessary for the processing of the mount detection unit 51, the authentication unit 52, and the characteristic detection unit 53, and supplies the sensor data indicating a detection result of each sensor to the sensor control unit 557. The type and the number of sensors included in the sensor unit 558 are arbitrary.

<Configuration Example of Information Processing Terminal 512>

Figure 31:
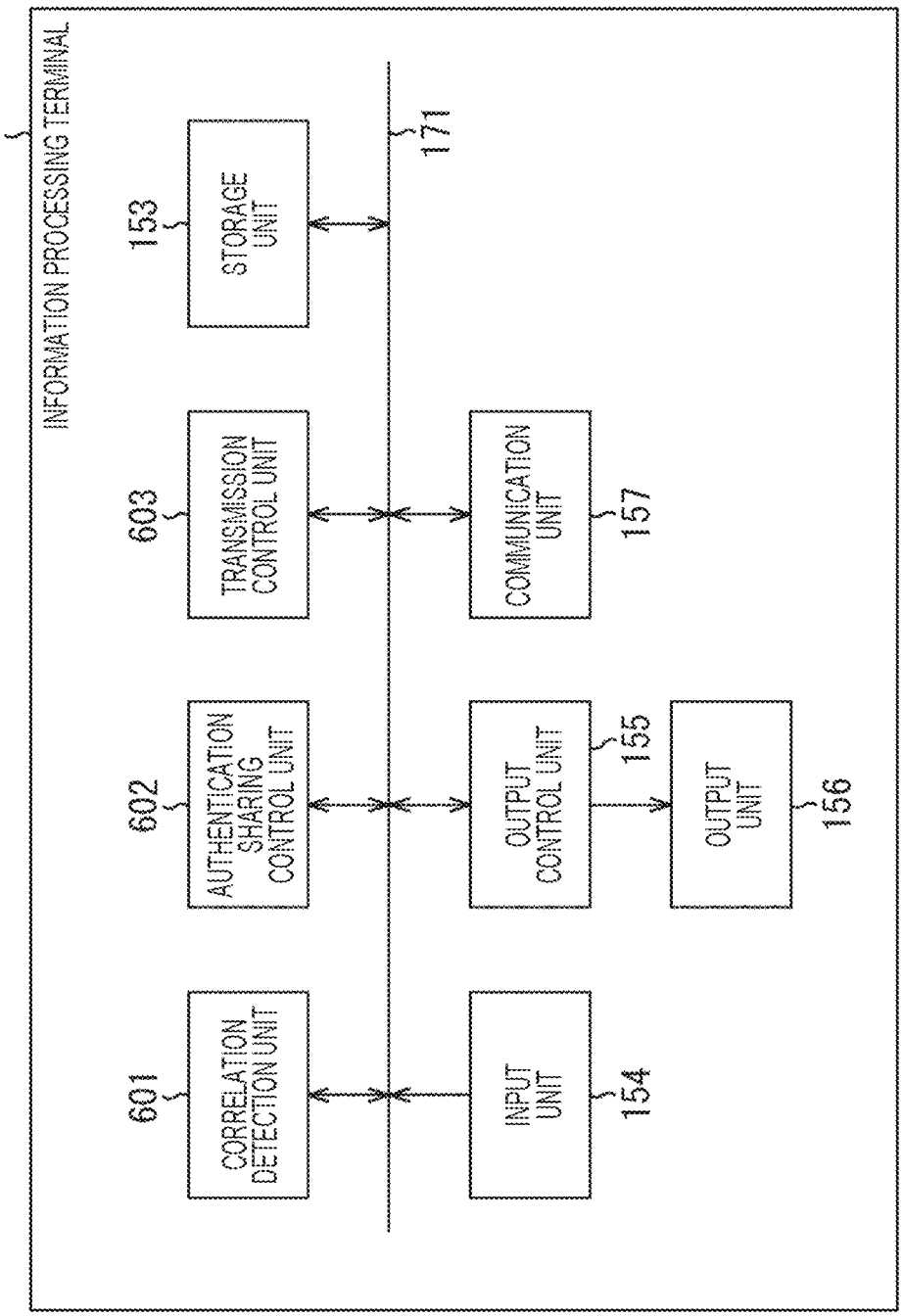
FIG. 31 is a block diagram illustrating a configuration example of an information processing terminal of FIG. 29.

FIG. 31 illustrates a configuration example of the information processing terminal 512 in FIG. 29. Note that a portion corresponding to the information processing terminal 13a of FIG. 4 is denoted by the same reference numeral, and description thereof is appropriately omitted.

The information processing terminal 512 includes a storage unit 153, an input unit 154, an output control unit 155, an output unit 156, a communication unit 157, a bus 171, a correlation detection unit 601, an authentication sharing control unit 602, and a transmission control unit 603. The storage unit 153, the input unit 154, the output control unit 155, the communication unit 157, the correlation detection unit 601, the authentication sharing control unit 602, and the transmission control unit 603 are connected to one another via the bus 171 and communicate with one another.

The correlation detection unit 601 detects a correlation between the characteristic data detected by each wearable devices 511.

The authentication sharing control unit 602 controls sharing of the authentication information between the respective wearable devices 511. For example, the authentication sharing control unit 602 generates and updates an authentication state table for managing the authentication state and the like of each wearable device 511 on the basis of the device information, the authentication information, and the mount state information from each wearable device 511. Furthermore, the authentication sharing control unit 602 requests each wearable device 511 to transmit the characteristic information as needed. Moreover, the authentication sharing control unit 602 controls transmission of the authentication information of another wearable device 511 to each wearable device 511 on the basis of a detection result of the correlation detection unit 601.

The transmission control unit 603 controls transmission of the biometric information of each wearable device 511 to the server 14. For example, the transmission control unit 603 requests each wearable device 511 to transmit the biometric information as needed. Furthermore, the transmission control unit 603 transmits the biometric information received from each wearable device 511 to the server 14 via the network 21.

<Processing of Information Processing System 501>

Next, processing of the information processing system 501 will be described with reference to FIGS. 32 to 44.

Figure 32:
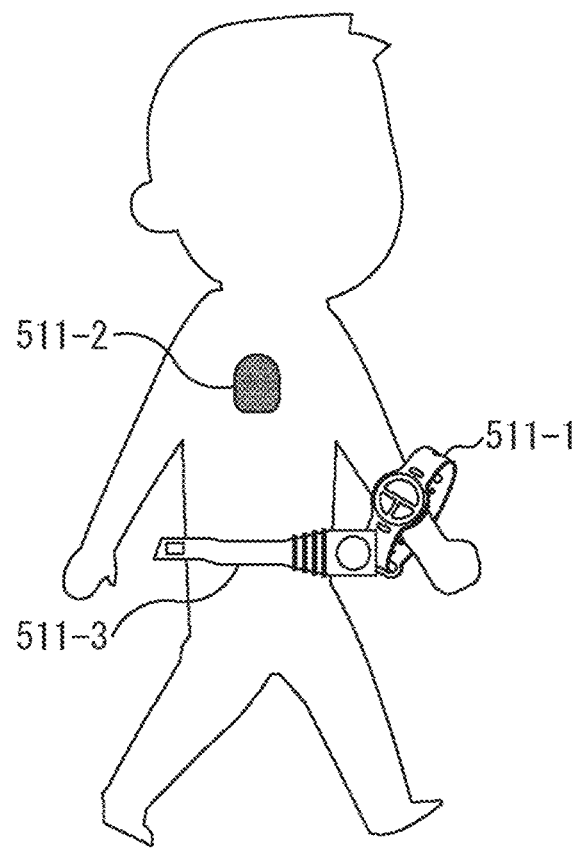
FIG. 32 is a diagram illustrating a mount example of the wearable device.

Note that, hereinafter, an example in which the user wears the three wearable devices 511 including the wearable devices 511-1 to 511-3, as illustrated in FIG. 32, will be described as appropriate.

The wearable device 511-1 is a wristband-type wearable sensor that is mounted on the user's wrist. The wearable device 511-1 includes a fingerprint sensor, an infrared sensor, and an acceleration sensor. The wearable device 511-1 can execute fingerprint authentication of the authentication level 5 using the fingerprint sensor. The wearable device 511-1 can detect the mount state by using the infrared sensor. The wearable device 511-1 can detect a walking interval of the user as characteristic data by using the acceleration sensor.

The wearable device 511-2 is attached to the user's torso or the like. The wearable device 511-2 includes an infrared sensor, an acceleration sensor, a pulse sensor, and a blood glucose sensor. The wearable device 511-2 can detect the mount state by using the infrared sensor. The wearable device 511-2 can detect the walking interval of the user by using the acceleration sensor and detect a pulse pattern by using the pulse sensor as the characteristic data. Moreover, the wearable device 511-2 can detect a blood glucose level of the user as biometric data by using the blood glucose sensor. Note that the wearable device 511-2 does not have the user authentication function.

The wearable device 511-3 is a belt-type wearable sensor and is mounted around the user's torso. The wearable device 511-3 includes an infrared sensor, a pulse sensor, and a respiration sensor. The wearable device 511-3 can detect the mount state by using the infrared sensor. The wearable device 511-3 can detect the pulse pattern as the characteristic data by using the pulse sensor. The wearable device 511-3 can detect a respiratory rhythm of the user as the biometric data using a respiration sensor. Note that, the wearable device 511-3 does not have the user authentication function.

<Processing of Wearable Device 511>

Figure 33:
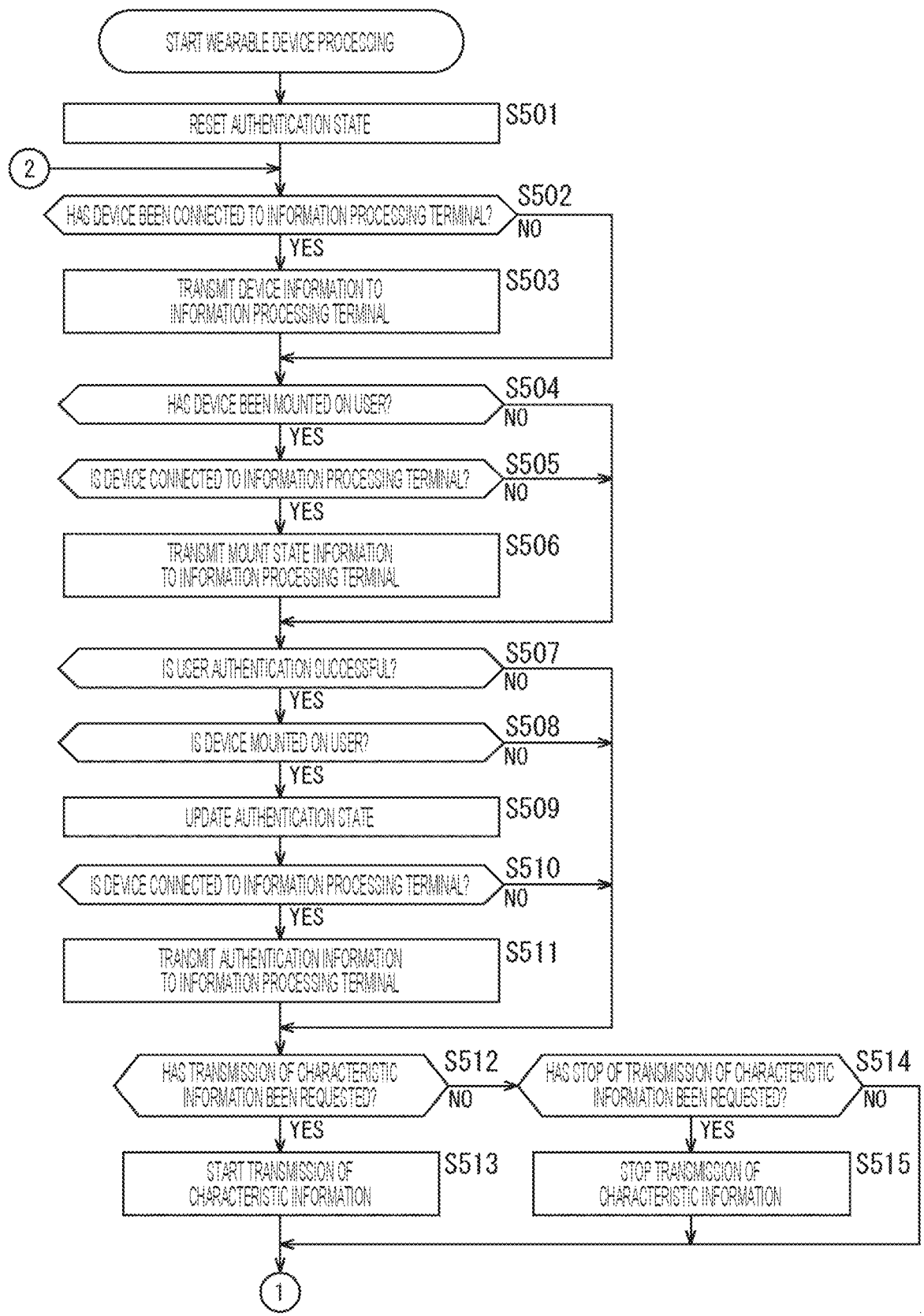
FIG. 33 is a flowchart for describing processing of the wearable device of FIG. 30.
Figure 34:
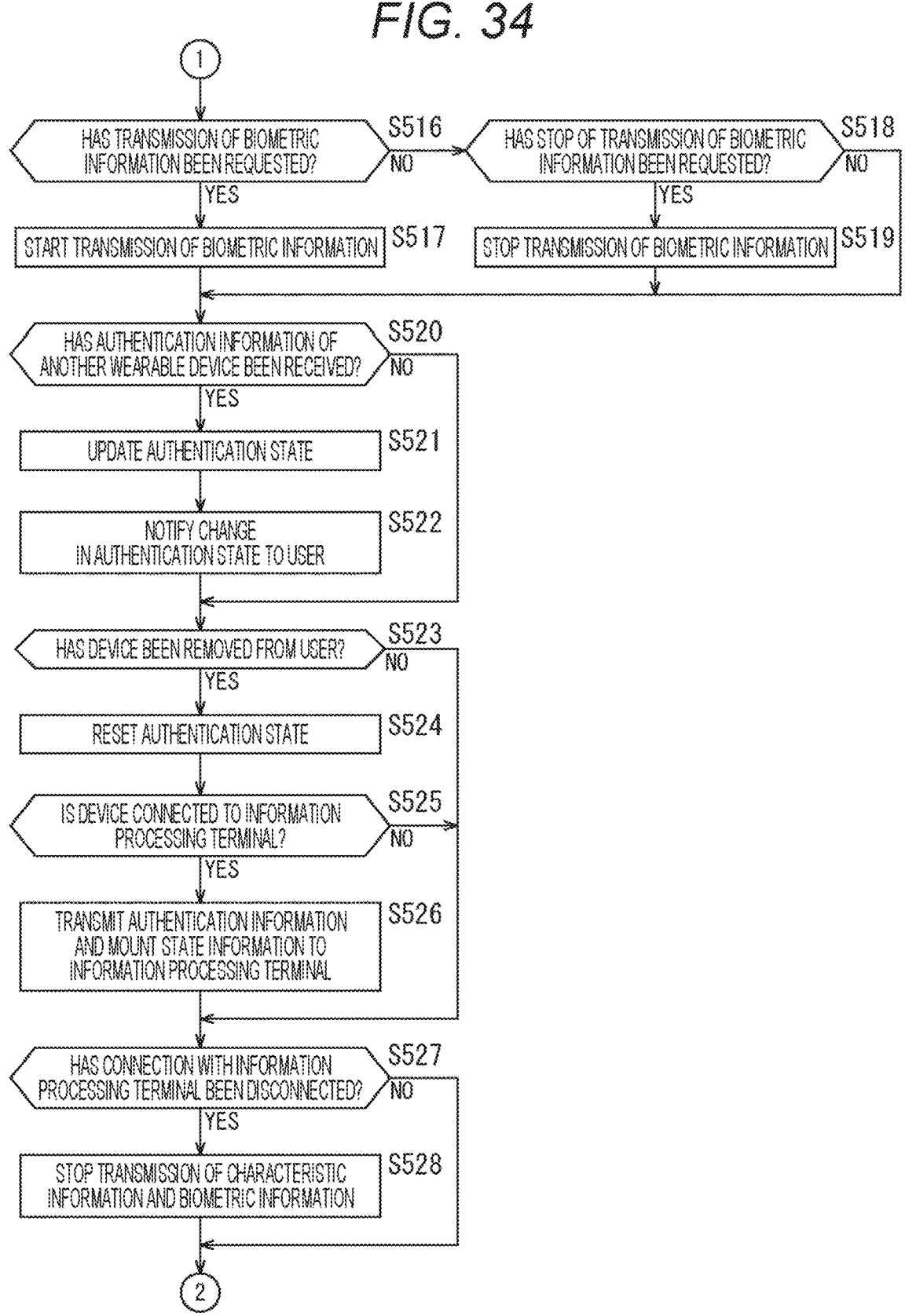
FIG. 34 is a flowchart for describing the processing of the wearable device of FIG. 30.

First, processing of the wearable device 511 will be described with reference to the flowcharts of FIGS. 33 and 34.

This processing starts when the wearable device 511 is powered on and ends when the wearable device 511 is powered off, for example.

In step S501, the authentication state setting unit 556 resets the authentication state by similar processing to step S1 of FIG. 7.

In step S502, the communication unit 63 determines whether or not the wearable device 511 has been connected to the information processing terminal 512, similarly to the processing of step S2 of FIG. 7. In a case where it is determined that the wearable device 511 has been connected to the information processing terminal 512, the processing proceeds to step S503.

In step S503, the wearable device 511 transmits the device information. Specifically, the mount detection unit 551 detects the mount state of the wearable device 511 on the user on the basis of the sensor data supplied from the sensor unit 558 via the sensor control unit 557.

The transmission control unit 555 reads the authentication information, the sensor information, and the detection data information from the storage unit 56, and generates the device information including the authentication information, the mount state of the wearable device 511, the sensor information, the detection data information, and identification information of the wearable device 511. The transmission control unit 555 transmits the device information to the information processing terminal 512 via the communication unit 63. Thereby, the latest authentication state, mount state, sensor type, and detection data type of the wearable device 511 are notified to the information processing terminal 512.

Thereafter, the processing proceeds to step S504.

On the other hand, in step S502, in a case where it is not determined that the wearable device 511 has been connected to the information processing terminal 512, the processing of step S503 is skipped and the processing proceeds to step S504.

In step S504, the mount detection unit 551 determines whether or not the wearable device 511 has been mounted on the user on the basis of the sensor data supplied from the sensor unit 558 via the sensor control unit 557. In a case where it is determined that the wearable device 511 has been mounted on the user, the processing proceeds to step S505.

In step S505, whether or not the wearable device 511 is connected with the information processing terminal 512 is determined, similarly to the processing of step S7 of FIG. 7. In a case where it is determined that the wearable device 511 is connected with the information processing terminal 512, the processing proceeds to step S506.

In step S506, the wearable device 511 transmits the mount state information to the information processing terminal 512. Specifically, the transmission control unit 555 generates the mount state information including the detection result of the mount state of the wearable device 511 and the identification information of the wearable device 511, and transmits the mount state information to the information processing terminal 512 via the communication unit 63. As a result, it is notified that the wearable device 511 has been mounted on the user to the information processing terminal 512.

Thereafter, the processing proceeds to step S507.

On the other hand, in step S505 in a case where it is determined that the wearable device 511 is not connected with the information processing terminal 512, the processing of step S506 is skipped and the processing proceeds to step S507.

Furthermore, in step S504, in a case where it is not determined that the wearable device 511 has been mounted on the user, the processing of steps S505 and S506 is skipped and the processing proceeds to step S507.

In step S507, the authentication unit 552 determines whether or not the user authentication is successful. Specifically, the authentication unit 552 performs the user authentication, for example, at predetermined timing or in a case where the user performs an operation for performing the user authentication. That is, the authentication unit 552 compares authentication data based on the sensor data supplied from the sensor unit 558 via the sensor control unit 557 with the collation data stored in the storage unit 56. Then, in a case where the authentication unit 552 can authenticate or identify a specific user, the authentication unit 552 determines that the user authentication is successful, and the processing proceeds to step S508.

In step S508, the mount detection unit 551 determines whether or not the wearable device 511 is mounted on the user on the basis of the sensor data supplied from the sensor unit 558 via the sensor control unit 557. In a case where it is determined that the wearable device 511 is mounted on the user, the processing proceeds to step S509.

In step S509, the authentication state setting unit 556 updates the authentication state by similar processing to step S6 of FIG. 7.

In step S510, whether or not the wearable device 511 is connected with the information processing terminal 512 is determined, similarly to the processing of step S7 of FIG. 7. In a case where it is determined that the wearable device 511 is connected with the information processing terminal 512, the processing proceeds to step S511.

In step S511, the transmission control unit 555 transmits the authentication information to the information processing terminal 512. Specifically, the transmission control unit 555 reads the authentication information from the storage unit 56, adds the identification information of the wearable device 511 to the authentication information, and transmits the authentication information to the information processing terminal 512 via the communication unit 63. Thereby, the authentication state after the user authentication is successful is notified to the information processing terminal 512.

Thereafter, the processing proceeds to step S512.

On the other hand, in step S510, in a case where it is determined that the wearable device 511 is not connected with the information processing terminal 512, the processing of step S511 is skipped and the processing proceeds to step S512.

Furthermore, in step S508, in a case where it is determined that the wearable device 511 is not mounted on the user, the processing of steps S509 to S511 is skipped and the processing proceeds to step S512.

Moreover, in step S507, in a case where it is determined that the user authentication has failed, or in a case where it is determined that the user authentication has not been performed, the processing of steps S508 to S511 is skipped and the processing proceeds to step S512.

In step S512, the transmission control unit 555 determines whether or not transmission of the characteristic information has been requested. In a case where the transmission control unit 555 receives a characteristic information transmission request signal from the information processing terminal 512 via the communication unit 63, the transmission control unit 555 determines that transmission of the characteristic information has been requested, and the processing proceeds to step S513.

In step S513, the wearable device 511 starts transmission of the characteristic information. Specifically, the characteristic detection unit 553 starts processing of detecting the characteristic of the user on the basis of the sensor data supplied from the sensor unit 558 via the sensor control unit 557 and generating the characteristic data indicating the detected characteristic of the user. The transmission control unit 555 starts processing of generating characteristic information including the characteristic data and the identification information of the wearable device 511 and transmitting the characteristic information to the information processing terminal 512 via the communication unit 63.

Thereafter, the processing proceeds to step S516.

On the other hand, in step S512, in a case where it is determined that transmission of the characteristic information has not been requested, the processing proceeds to step S514.

In step S514, the transmission control unit 555 determines whether or not stop of the transmission of the characteristic information has been requested. In a case where the transmission control unit 555 receives a characteristic information transmission stop request signal from the information processing terminal 512 via the communication unit 63, the transmission control unit 555 determines that stop of the transmission of the characteristic information has been requested, and the processing proceeds to step S515.

In step S515, the wearable device 511 stops transmission of the characteristic information. Specifically, in a case where the characteristic information is being transmitted, the transmission control unit 555 stops the transmission of the characteristic information, the characteristic detection unit 553 stops the detection of the characteristic of the user, and the sensor unit 558 stops the detection of the sensor data to be used for detecting the characteristic data under the control of the sensor control unit 557.

Thereafter, the processing proceeds to step S516.

On the other hand, in step S514, in a case where it is determined that stop of the transmission of the characteristic information has not been requested, the processing of step S515 is skipped and the processing proceeds to step S516.

In step S516, the transmission control unit 555 determines whether or not transmission of the biometric information has been requested. In a case where the transmission control unit 555 receives a biometric information transmission request signal for requesting transmission of the biometric information from the information processing terminal 512 via the communication unit 63, the transmission control unit 555 determines that transmission of the biometric information has been requested, and the processing proceeds to step S517.

In step S517, the wearable device 511 starts transmission of the biometric information. Specifically, the biometric data detection unit 554 starts processing of detecting the biometric data of the user on the basis of the sensor data supplied from the sensor unit 558 via the sensor control unit 557. The transmission control unit 555 starts processing of reading the authentication information from the storage unit 56, generating biometric information including the biometric data, the authentication information, and the identification information of the wearable device 511, and transmitting the biometric information to the information processing terminal 512 via the communication unit 63.

Thereafter, the processing proceeds to step S520

On the other hand, in step S516, in a case where it is determined that transmission of the biometric data has not been requested, the processing proceeds to step S518.

In step S518, the transmission control unit 555 determines whether or not stop of the transmission of the biometric information has been requested. In a case where the transmission control unit 555 receives a biometric information transmission stop request signal for requesting stop of the transmission of the biometric information from the information processing terminal 512 via the communication unit 63, the transmission control unit 555 determines that stop of the transmission of the biometric information has been requested, and the processing proceeds to step S519.

In step S519, the wearable device 511 stops transmission of the biometric information. Specifically, in a case where the biometric information is being transmitted, the transmission control unit 555 stops the transmission of the biometric information, the biometric data detection unit 554 stops the detection of the biometric data, and the sensor unit 558 stops the detection of the sensor data to be used for detecting the biometric data under the control of the sensor control unit 557.

Thereafter, the processing proceeds to step S520

On the other hand, in step S518, in a case where it is determined that stop of the transmission of the biometric information has not been requested, the processing of step S519 is skipped and the processing proceeds to step S520.

In step S520, the communication unit 63 determines whether or not the authentication information of another wearable device 511 has been received. In a case where the communication unit 63 determines that the authentication information of another wearable device 511 transmitted from the information processing terminal 512 has been received, the processing proceeds to step S521.

In step S521, the authentication state setting unit 556 updates the authentication state on the basis of the authentication information of another wearable device 511 received from the information processing terminal 512. Specifically, the authentication state setting unit 556 sets the authenticated user and the authentication level to the authenticated user and the authentication level indicated in the authentication information of another wearable device 511. The authentication state setting unit 556 updates the user information and the authentication level of the authentication information stored in the storage unit 56 to the set content.

In step S522, the change in the authentication state is notified to the user, similarly to the processing of step S64 of FIG. 13.

Thereafter, the processing proceeds to step 3523.

On the other hand, in step 3520, in a case where it is determined that the authentication information of another wearable device 511 has not been received, the processing of steps 3521 and 3522 is skipped and the processing proceeds to step S523.

In step S523, the mount detection unit 551 determines whether or not the wearable device 511 has been removed from the user on the basis of the sensor data supplied from the sensor unit 558 via the sensor control unit 557. In a case where it is determined that the wearable device 511 has been removed from the user, the processing proceeds to step S524.

In step S524, the authentication state is reset similarly to the processing of step S501.

In step S525, whether or not the wearable device 511 is connected with the information processing terminal 512 is determined similarly to the processing of step S7 of FIG. 7. In a case where it is determined that the wearable device 511 is connected with the information processing terminal 512, the processing proceeds to step S526.

In step S526, the wearable device 511 transmits the authentication information and the mount state information to the information processing terminal 512. That is, the authentication information is transmitted to the information processing terminal 512 by similar processing to step S511, and the mount state information is transmitted to the information processing terminal 512 by similar processing to step S506. Thereby, removal of the wearable device 511 from the user and reset of the authentication state are notified to the information processing terminal 512.

Thereafter, the processing proceeds to step S527.

On the other hand, in step S525, in a case where it is determined that the wearable device 511 is not connected with the information processing terminal 512, the processing of step S526 is skipped and the processing proceeds to step S527.

Furthermore, in step S523, in a case where it is not determined that the wearable device 511 has been removed from the user, the processing of steps S524 to S526 is skipped and the processing proceeds to step S527.

In step S527, whether or not the connection with the information processing terminal 512 has been disconnected is determined similarly to the processing of step S12 of FIG. 7. In a case where it is determined that the connection with the information processing terminal 512 has been disconnected, the processing proceeds to step S528.

In step S528, the wearable device 511 stops transmission of the characteristic information and the biometric information. Specifically, in a case where the characteristic data is being transmitted, the transmission of the characteristic data is stopped similarly to the processing of step S514. Furthermore, in a case where the biometric data is being transmitted, the transmission of the biometric data is stopped similarly to the processing of step S519.

Thereafter, the processing returns to step S502, and the processing in step S502 and the subsequent steps is executed.

On the other hand, in step S527, in a case where it is not determined that the connection with the information processing terminal 512 has been disconnected, the processing returns to step S502 and the processing of step S502 and the subsequent steps is executed.

<Processing of Information Processing Terminal 512>

Figure 35:
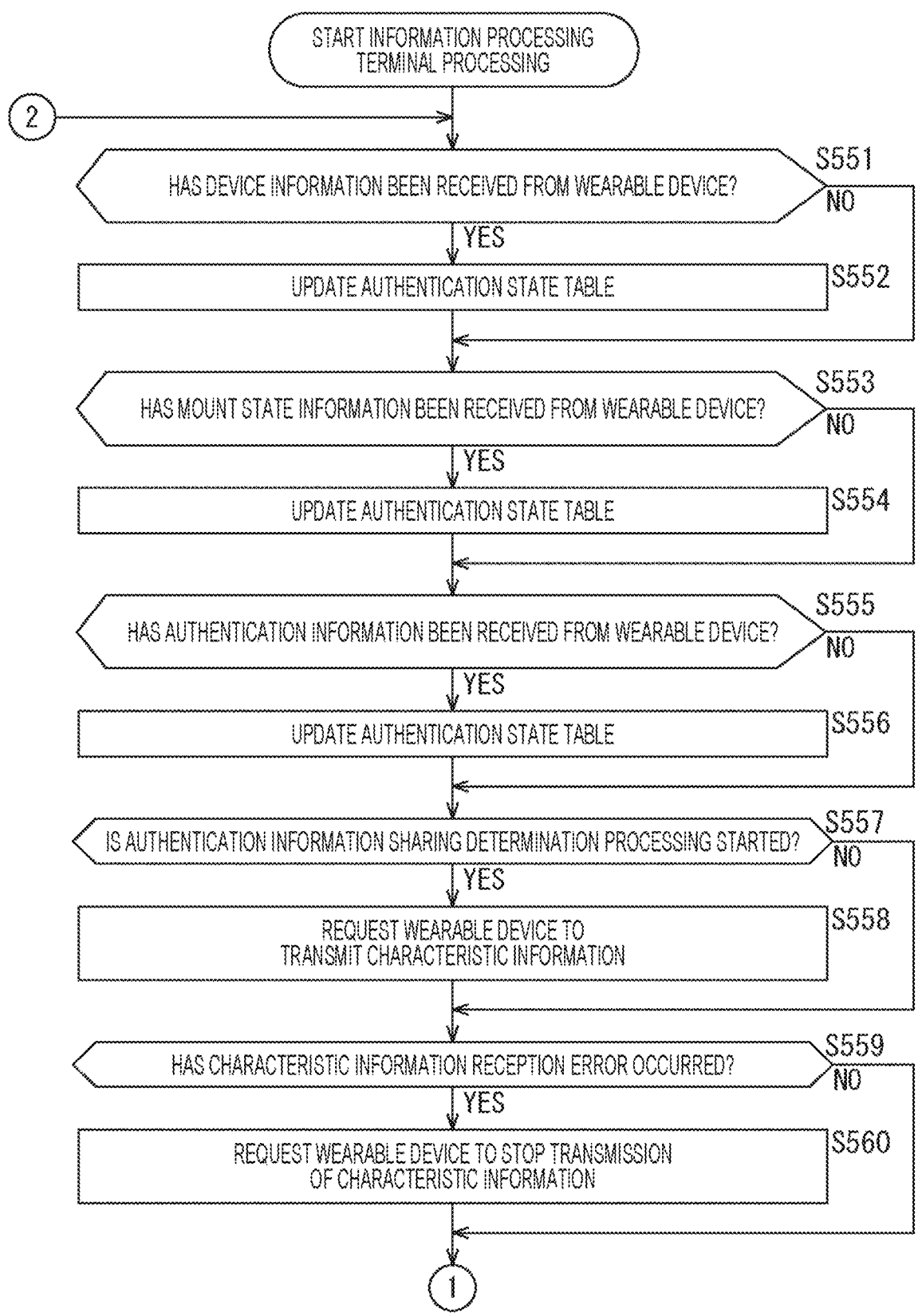
FIG. 35 is a flowchart for describing processing of the information processing terminal of FIG. 31.
Figure 36:
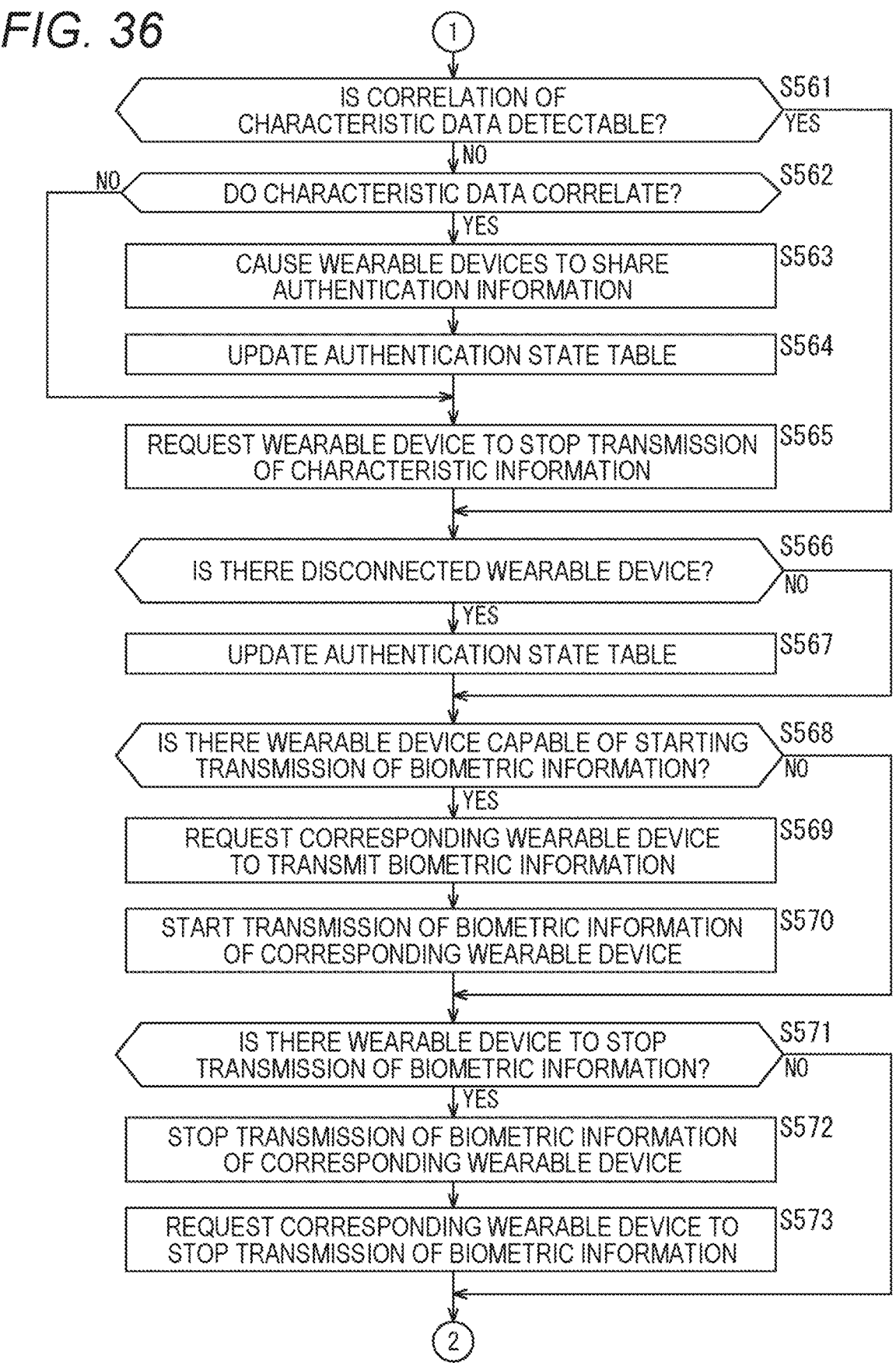
FIG. 36 is a flowchart for describing the processing of the information processing terminal of FIG. 31.

Next, processing executed by the information processing terminal 512 corresponding to the processing of the wearable device 511 of FIGS. 33 and 34 will be described with reference to the flowcharts of FIGS. 35 and 36.

This processing starts when the information processing terminal 512 is powered on and ends when the information processing terminal 512 is powered off, for example.

In step S551, the communication unit 157 determines whether or not the device information has been received from the wearable device 511. In a case where the communication unit 157 determines that the device information has been received from any wearable device 511, the processing proceeds to step S552.

In step S552, the authentication sharing control unit 602 updates the authentication state table.

FIG. 37 illustrates an example of the authentication state table corresponding to the wearable devices 511-1 to 511-3 of FIG. 32.

The authentication state table includes a device ID, the authentication level, the mount state, the sensor type, and the detection data type.

The device ID is an ID for identifying the wearable device 511 connected to the information processing terminal 512. In this example, the device ID of the wearable device 511-1 is set to 1, the device ID of the wearable device 511-2 is set to 2, and the device ID of the wearable device 511-3 is set to 3.

The authentication level indicates the current authentication level of each wearable device 511. In this example, the authentication level of the wearable device 511-1 is set to 5, and the authentication levels of the wearable devices 511-2 and 511-3 are set to 1.

The mount state indicates the presence or absence of mount of each wearable device 511 on the user. This example illustrates that all the wearable devices 511-1 to 511-3 are mounted on the user.

The sensor type indicates types of sensors included in each wearable device 511 for detecting the characteristic data and the biometric data. This example illustrates that the wearable device 511-1 includes an acceleration sensor, the wearable device 511-2 includes an acceleration sensor, a pulse sensor, and a blood glucose sensor, and the wearable device 511-3 includes a pulse sensor and a respiration sensor.

The detection data type indicates types of characteristic data and biometric data that can be detected by each wearable device 511. In this example, the wearable device 511-1 can detect a walking interval, the wearable device 511-2 can detect a walking interval, a pulse pattern, and a blood glucose level, and the wearable device 511-3 can detect a pulse pattern and a respiratory rhythm.

Then, the authentication sharing control unit 602 adds data regarding the wearable device 511, which is a transmission source of the device information, to the authentication state table. Furthermore, the authentication sharing control unit 602 causes the storage unit 153 to store the authentication information included in the device information as the authentication information of the wearable device 511 of the transmission source of the device information.

Thereafter, the processing proceeds to step S553.

Meanwhile, in step S551, in a case where it is determined that the device information has not been received from the wearable device 511, the processing of step S552 is skipped and the processing proceeds to step S553.

In step S553, the communication unit 157 determines whether or not the mount state information has been received from the wearable device 511. In a case where the communication unit 157 determines that the mount state information has been received from any wearable device 511, the processing proceeds to step S554.

In step S554, the authentication sharing control unit 602 updates the authentication state table. Specifically, the authentication sharing control unit 602 updates the mount state of the wearable device 511 that is the transmission source of the mount state information in the authentication state table on the basis of the received mount state information.

Thereafter, the processing proceeds to step S555.

Meanwhile, in step S553, in a case where it is determined that the mount state information has not been received from the wearable device 511, the processing of step S554 is skipped and the processing proceeds to step S555.

In step S555, the communication unit 157 determines whether or not the authentication information has been received from the wearable device 511. In a case where the communication unit 157 determines that the authentication information has been received from any wearable device 511, the processing proceeds to step S556.

In step S556, the authentication sharing control unit 602 updates the authentication state table. Specifically, the authentication sharing control unit 602 the authentication sharing control unit 602 updates the authentication level of the wearable device 511 that is the transmission source of the authentication information in the authentication state table on the basis of the received authentication information. Furthermore, the authentication sharing control unit 602 updates the authentication information of the wearable device 511 that is the transmission source of the authentication information stored in the storage unit 153 with the received authentication information.

Thereafter, the processing proceeds to step S557.

On the other hand, in step S555, in a case where it is determined that the authentication information of the wearable device 511 has not been received, the processing of step S556 is skipped and the processing proceeds to step S557.

In step S557, the authentication sharing control unit 602 determines whether or not to start the authentication information sharing determination processing. The authentication sharing control unit 602 extracts a combination of wearable devices 511 capable of sharing the authentication information on the basis of the authentication state table in a case where the authentication information sharing determination processing is not being executed.

For example, the authentication sharing control unit 602 extracts a combination of wearable devices 511 mounted on the user, capable of detecting characteristic data of similar types, and having different authentication levels as the combination capable of sharing the authentication information.

For example, in the example of the authentication state table of FIG. 37, the wearable device 511-1 and the wearable device 511-2 are both mounted on the user, capable of detecting the walking interval, and have different authentication levels, and thus are extracted as the combination capable of sharing the authentication information.

Meanwhile, the wearable device 511-1 and the wearable device 511-3 are both mounted on the user and have different authentication levels, but not capable of detecting the characteristic data of similar types, and thus are not extracted as the combination capable of sharing the authentication information. Furthermore, the wearable device 511-2 and the wearable device 511-3 are both mounted on the user and capable of detecting the pulse pattern, but have the same authentication level, and thus are not extracted as the combination capable of sharing the authentication information.

Then, in a case of extracting a combination of one or more wearable devices 511, the authentication sharing control unit 602 determines to start authentication information sharing determination processing, and the processing proceeds to step S558.

In step S558, the authentication sharing control unit 602 requests the wearable device 511 to transmit the characteristic information. Specifically, the authentication sharing control unit 602 selects one of the combinations of the wearable devices 511 extracted in the processing of step S557. Then, the authentication sharing control unit 602 generates a characteristic information transmission request signal and transmits the characteristic information transmission request signal to the selected wearable device 511 via the communication unit 157. Thereby, the authentication information sharing determination processing is started.

Thereafter, the processing proceeds to step S559.

Meanwhile, in step S557, in a case where the authentication information sharing determination processing is being executed or in a case where the combination of wearable devices 511 capable of sharing the authentication information cannot be extracted, the authentication sharing control unit 602 determines not to start the authentication information sharing determination processing, the processing of step S558 is skipped, and the processing proceeds to step S559.

In step S559, the communication unit 157 determines whether or not a characteristic information reception error has occurred. In a case where a state where the characteristic information cannot be received from at least one of the wearable devices 511 performing the authentication information sharing determination processing has occurred, the communication unit 157 determines that the characteristic information reception error has occurred and the processing proceeds to step S560.

In step S560, the authentication sharing control unit 602 requests the wearable device 511 to stop the transmission of the characteristic information. The authentication sharing control unit 602 generates a characteristic information transmission stop request signal and transmits the characteristic information transmission stop request signal to the wearable device 511 performing the authentication information sharing determination processing, via the communication unit 157. Thereby, the authentication information sharing determination processing is stopped.

Thereafter, the processing proceeds to step S561.

Meanwhile, in step S559, in a case where it is determined that the characteristic information reception error has not occurred, the processing of step S560 is skipped and the processing proceeds to step S561.

In step S561, the correlation detection unit 601 determines whether or not a correlation of the characteristic data can be detected, similarly to the processing of step S111 of FIG. 15. In a case where it is determined that a correlation of the characteristic data is detectable, the processing proceeds to step S562.

In step S562, the correlation detection unit 601 determines whether or not the characteristic data correlate. Specifically, the correlation detection unit 601 calculates a correlation coefficient between the characteristic data of the wearable devices 511 for which the authentication information sharing determination processing is being executed. The correlation detection unit 151 determines that the characteristic data correlate in a case where the calculated correlation coefficient is equal to or larger than a predetermined threshold value, and the processing proceeds to step S563.

In step S563, the authentication sharing control unit 602 shares the authentication information between the wearable devices. Specifically, the authentication sharing control unit 602 determines that both the devices are mounted on the user because both the wearable devices 511 for which the authentication information sharing determination processing is being executed are mounted on the user, and the characteristic data of both the devices correlate. Then, the authentication sharing control unit 602 transmits the authentication information of the strong device having a high authentication level to the weak device having a low authentication level via the communication unit 157 among the wearable devices 511 for which the authentication information sharing determination processing is being executed.

Furthermore, the authentication sharing control unit 602 generates authentication state change information indicating change content of the authentication state of the weak device, and transmits the authentication state change information to the strong device via the communication unit 157.

Moreover, the authentication sharing control unit 602 updates the authentication information of the weak device stored in the storage unit 153 with the authentication information of the strong device transmitted to the weak device.

In step S564, the authentication sharing control unit 602 updates the authentication state table. That is, the authentication sharing control unit 602 updates the authentication level of the weak device to a level similar to the authentication level of the strong device in the authentication state table.

Thereafter, the processing proceeds to step S565.

Meanwhile, in step S562, in a case where the calculated correlation coefficient is less than a predetermined threshold value, the correlation detection unit 151 determines that the characteristic data do not correlate, the processing of steps S563 to S564 is skipped, and the processing proceeds to step S565.

In step S565, the authentication sharing control unit 602 requests the wearable device 511 to stop the transmission of the characteristic information. Specifically, the authentication sharing control unit 152 generates a characteristic information transmission stop request signal and transmits the characteristic information transmission stop request signal to the strong device and the weak device via the communication unit 157. Thereby, the authentication information sharing determination processing ends. Here, for example, a case where the characteristic data of the strong device and the characteristic data of the weak device are not of the same person is assumed.

Thereafter, the processing proceeds to step S566.

On the other hand, in step S561, in a case where it is determined that the correlation of the characteristic data is not detectable, the processing of steps S562 to S565 is skipped and the processing proceeds to step S566.

In step S566, the communication unit 157 determines whether or not there is a disconnected wearable device 511. In a case where it is determined that there is a disconnected wearable device 511, the processing proceeds to step S567.

In step S567, the authentication sharing control unit 602 updates the authentication state table. That is, the authentication sharing control unit 602 deletes the data of the disconnected wearable device 511 from the authentication state table. Furthermore, the authentication sharing control unit 602 deletes the authentication information of the disconnected wearable device 511 from the storage unit 153.

Thereafter, the processing proceeds to step S568.

On the other hand, in step S566, in a case where it is determined that there is no disconnected wearable device 511, the processing of step S567 is skipped and the processing proceeds to step S568.

In step S568, the transmission control unit 603 determines whether or not there is a wearable device 511 capable of starting transmission of the biometric information. Specifically, the transmission control unit 603 searches the wearable devices 511 registered in the authentication state table for a wearable device 511 mounted on the user and capable of detecting the biometric data but not transmitting the biometric information. Note that, at this time, a wearable device 511 having invalid user authentication (the authentication level of 1) may be or may not be included. Then, in a case where a corresponding wearable device 511 has been detected, the transmission control unit 603 determines that there is a wearable device 511 capable of starting transmission of the biometric information, and the processing proceeds to step S569.

In step S569, the transmission control unit 603 requests the corresponding wearable device 511 to transmit the biometric information. Specifically, the transmission control unit 603 generates a biometric information transmission request signal and transmits the biometric information transmission request signal to the wearable device 511 detected in the processing of step S568 via the communication unit 157.

In step S570, the transmission control unit 603 starts transmission of the biometric information of the corresponding wearable device 511. Specifically, the transmission control unit 603 starts reception of the biometric information from the wearable device 511 requested to transmit the biometric information in the processing of step S569, via the communication unit 157. Furthermore, the transmission control unit 603 starts transmission of the received biometric information to the server 14 via the communication unit 157 and the network 21.

Thereafter, the processing proceeds to step S571.

On the other hand, in step S568, in a case where it is determined that there is no wearable device 511 capable of starting transmission of the biometric information, the processing of steps S569 and S570 is skipped and the processing proceeds to step S571.

In step S571, the transmission control unit 603 determines whether or not there is a wearable device 511 to stop transmission of the biometric information. Specifically, the transmission control unit 603 searches the wearable devices 511 currently transmitting the biometric information for the wearable device 511 not mounted on the user on the basis of the authentication state table. Note that, in a case where transmission of the biometric information of the wearable device 511 with invalid user authentication is not performed, the wearable device 511 with invalid user authentication is also searched from the wearable devices 511 currently transmitting the biometric information. Then, in a case where a corresponding wearable device 511 has been detected, the transmission control unit 603 determines that there is a wearable device 511 to stop transmission of the biometric information, and the processing proceeds to step S572.

In step S572, the transmission control unit 603 stops transmission of the biometric information of the corresponding wearable device 511. Specifically, the transmission control unit 603 stops transmission of the biometric information from the wearable device 511 detected in the processing of step S571.

In step S573, the transmission control unit 603 requests the corresponding wearable device 511 to stop transmission of the biometric information. Specifically, the transmission control unit 603 generates a biometric information transmission stop request signal and transmits the biometric information transmission stop request signal to the wearable device 511 detected in the processing of step S571 via the communication unit 157.

Thereafter, the processing returns to step S551, and the processing of step S551 and the subsequent steps is executed.

On the other hand, in step S571, in a case where it is determined that there is no wearable device 511 to stop transmission of the biometric information, the processing returns to step S551 and the processing of step S551 and the subsequent steps is executed.

As described above, the authentication information can be shared among the wearable devices 511. Furthermore, in a case where the authentication information of one wearable device 511 (hereinafter referred to as device A) is shared with another wearable device 511 (hereinafter referred to as device B), the device B can share the authentication information of the device A with another wearable device 511 (hereinafter referred to as device C) independently of the device A. That is, the device A and the device C can share the authentication information via the device B.

Figure 38:
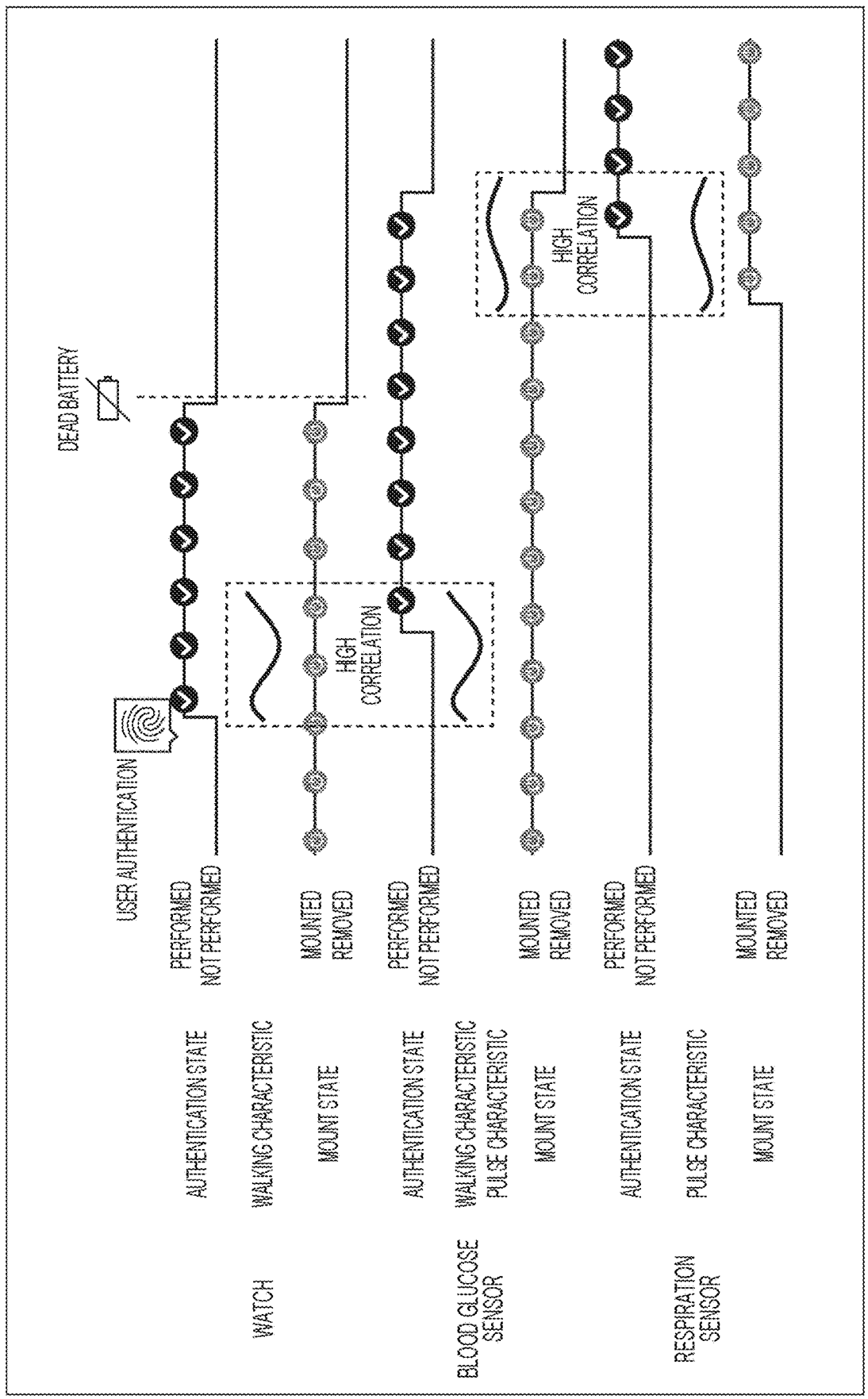
FIG. 38 is a diagram for describing a specific example of processing of sharing authentication information.

For example, FIG. 38 illustrates an example of a flow of processing of sharing the authentication information among the wearable device 511-1 (watch), the wearable device 511-2 (blood glucose sensor), and the wearable device 511-3 (respiration sensor) by the above-described processing. The horizontal axis represents the time, and transitions of the authentication states, the characteristic data, and the mount states of the wearable devices 511-1 to 511-3 are each illustrated.

First, the wearable device 511-1 and the wearable device 511-2 are mounted on the user, and the wearable device 511-1 is not mounted on the user.

Then, after the user authentication is performed on the wearable device 511-1 and the user authentication is successful, the correlation between the walking characteristic (walking interval) detected by the wearable device 511-1 and the walking characteristic (walking interval) detected by the wearable device 511-2 is detected. Then, in a case where the correlation between the devices is high, the authentication information of the wearable device 511-1 is shared with the wearable device 511-2, and the user authentication of the wearable device 511-2 becomes valid.

Thereafter, even after the battery of the wearable device 511-1 runs out and the user authentication of the wearable device 511-1 becomes invalid, the authentication state of the wearable device 511-2 is maintained as it is.

Next, after the wearable device 511-3 is mounted on the user, the correlation between the pulse characteristic (pulse pattern) detected by the wearable device 511-2 and the pulse characteristic (pulse pattern) detected by the wearable device 511-3 is detected. Then, in a case where the correlation between the devices is high, the authentication information of the wearable device 511-2 is shared with the wearable device 511-3. That is, the authentication information of the wearable device 511-1 is shared with the wearable device 511-3 via the wearable device 511-2, and the user authentication of the wearable device 511-3 becomes valid.

Thereafter, even after the wearable device 511-2 is removed from the user and the user authentication of the wearable device 511-2 becomes invalid, the authentication state of the wearable device 511-3 is maintained as it is.

Thereby, sharing of the authentication information having a high authentication level can be implemented without increasing the number of sensors mounted on each wearable device 511. For example, the authentication information of the wearable device 511-1 can be shared with the wearable device 511-3 without providing a sensor in the wearable device 511-3, the sensor detecting similar characteristic data to the wearable device 511-1.

Furthermore, the authentication information can be easily and safely shared among the wearable devices 511, similarly to the other embodiments.

Here, an example of a display screen displayed on the output unit 156 under the control of the output control unit 155 of the information processing terminal 512 during the above-described processing will be described with reference to FIGS. 39 to 42.

Figures 39, 40:
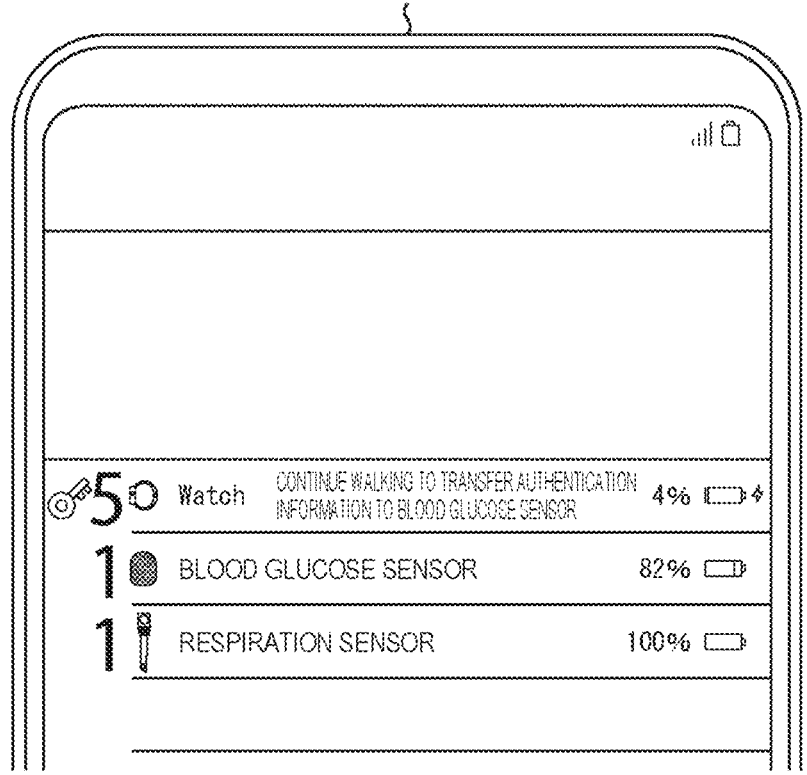
FIG. 39 is a diagram illustrating an example of a display screen.
FIG. 40 is a diagram illustrating an example of the display screen.

FIG. 39 illustrates an example of a display screen during the sharing determination processing between the wearable device 511-1 (watch) and the wearable device 511-2 (blood glucose sensor).

In this example, the states of wearable devices 511-1 to 511-3 are each displayed on separate rows.

At the left end of each row, a key-shaped icon indicating whether the user authentication is valid or not is displayed. The key-shaped icon is displayed on the row of the wearable device 511-1, indicating that the user authentication is valid. Meanwhile, the key-shaped icon is not displayed on the rows of the wearable device 511-2 and the wearable device 511-3, indicating that the user authentication is invalid.

On the right of the icon, the authentication level of each wearable device 511 is displayed as a numerical value.

On the right of the authentication level, an icon for identifying each wearable device 511 is displayed.

On the right of the icon, the type of each wearable device 511 is displayed by text.

On the right of the type, a message to the user is displayed as needed. For example, the row of the wearable device 511-1 displays a message prompting the user to continue walking and transfer the authentication information to the blood glucose sensor (wearable device 511-2).

At the right end of each row, the remaining battery level of each wearable device 511 is displayed as a numerical value and an icon.

Note that the remaining battery level of each wearable device 511 is notified from each wearable device 511 to the information processing terminal 512 periodically or at predetermined timing, for example.

In the example of FIG. 40, the authentication state of each wearable device 511 and a sharing state of the authentication information are displayed in a table format. The device of the transmission source (from) of the authentication information is displayed on the vertical side of the table, and the device of the transmission destination (to) of the authentication information is displayed on the top of the table.

This example illustrates that the authentication level of the wearable device 511-1 (watch) alone is 5, and the authentication levels of the wearable device 511-2 (blood glucose sensor) and the wearable device 511-3 (respiration sensor) are each 1. Furthermore, the key-shaped icon represents that the authentication information of the wearable device 511-1 is shared with the wearable device 511-2 and the wearable device 511-3.

Figure 41:
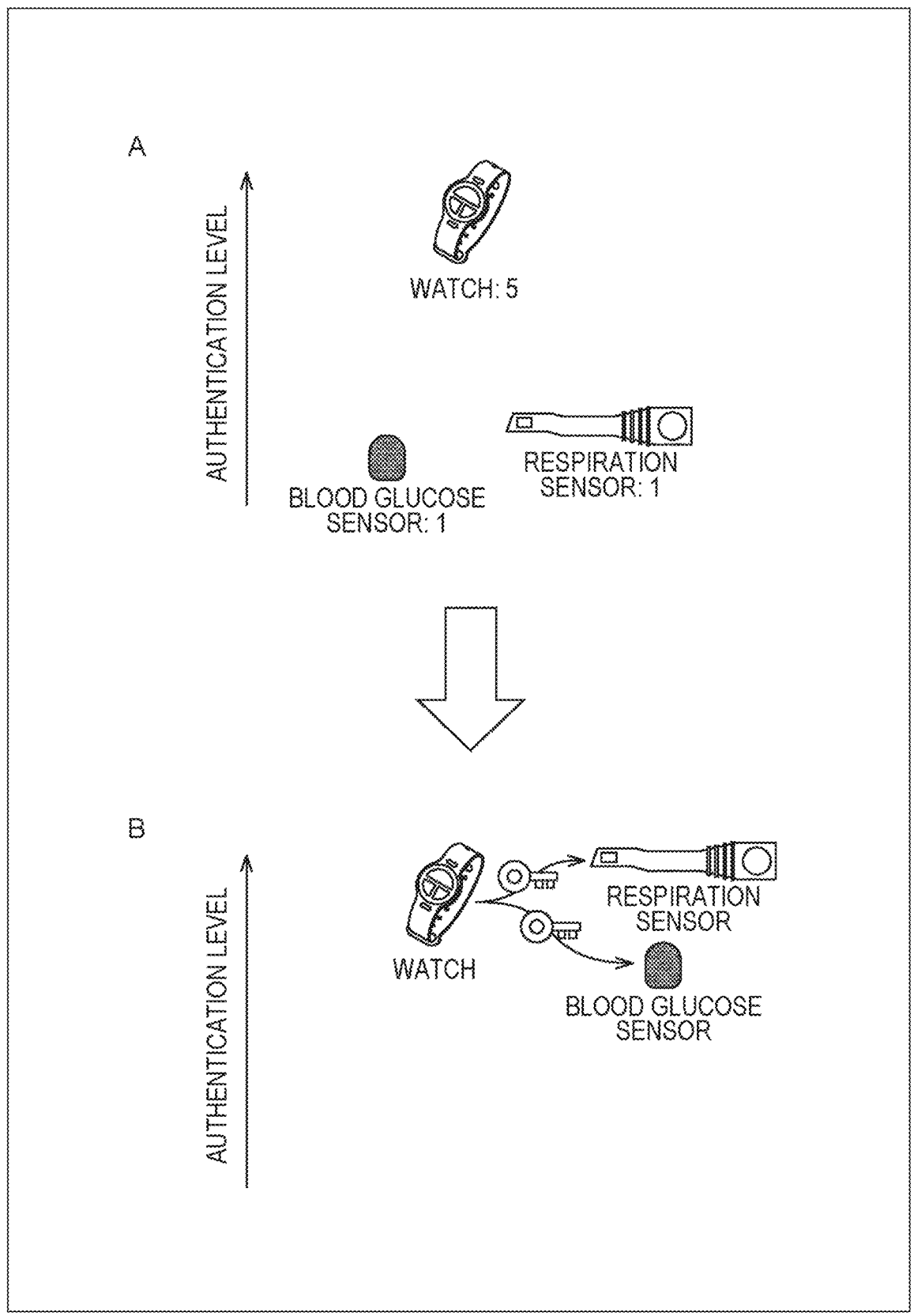
FIG. 41 is a diagram illustrating an example of the display screen.

A in FIG. 41 illustrates an example of the display screen before sharing the authentication information. In this example, the authentication level of each wearable device 511 is illustrated by a numerical value and a graph. Specifically, the icons representing the respective wearable devices 511 are displayed side by side according to the authentication levels. Furthermore, the type and the authentication level of each wearable device 511 are displayed below each icon.

B in FIG. 41 illustrates an example of the display screen after the authentication information of the wearable device 511-1 (watch) is shared with the wearable device 511-2 (blood glucose sensor) and the wearable device 511-3 (respiration sensor). The arrows and the key-shaped icons from the wearable device 511-1 indicate that the authentication information of the wearable device 511-1 is shared with the wearable device 511-2 and the wearable device 511-3.

Note that, for example, the user may be able to cancel the shared state of the authentication information by tapping the key-shaped icon. For example, when the key-shaped icon between the wearable device 511-1 and the wearable device 511-2 is tapped, the information processing terminal 512 may perform processing of canceling the sharing of the authentication information between the two devices. This makes the user authentication of the wearable device 511-2 invalid and the authentication level is set to 1.

Furthermore, for example, the authentication level of each wearable device 511 may be able to be lowered by dragging the icon of each wearable device 511 downward. For example, when the icon of the wearable device 511-2 is dragged downward, the information processing terminal 512 may perform processing of changing the authentication level of the wearable device 511-2 to a level according to the position of the icon.

Figure 42:
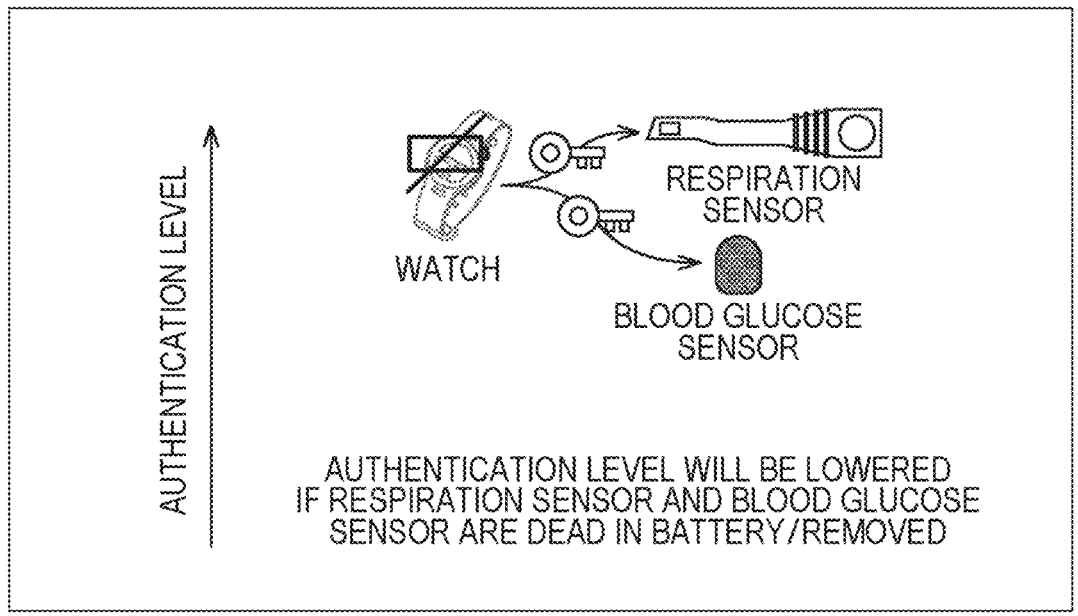
FIG. 42 is a diagram illustrating an example of the display screen.

FIG. 42 illustrates an example of the display screen when the battery of the wearable device 511-1 runs out in a case where the authentication information of the wearable device 511-1 (watch) is shared with the wearable device 511-2 (blood glucose sensor) and the wearable device 511-3 (respiration sensor).

Specifically, an icon representing dead battery is superimposed on the icon of the wearable device 511-1. Furthermore, a message warning that the authentication levels of the blood glucose sensor and respiration sensor will be low when the blood glucose sensor (wearable device 511-2) and the respiration sensor (wearable device 511-3) run out of battery or are removed from the user (because the authentication information of the wearable device 511-1 cannot be shared due to the dead battery) is displayed.

Note that, for example, in a case where the authentication information is not shared by the wearable device 511-1 and the wearable device 511-2 and the remaining battery level of the wearable device 511-1 becomes less than a predetermined threshold value, the authentication information of the wearable device 511-1 may be notified to the user to be shared with the wearable device 511-2.

Modification of Third Embodiment

Hereinafter, modifications of the above-described third embodiment will be described.

For example, each wearable device 511 may directly transmit and receive the characteristic information and the authentication information without going through the information processing terminal 512. In this case, the processing of the correlation detection unit 601 and the authentication sharing control unit 602 of the information processing terminal 512 may be performed by any wearable device 511. Thereby, for example, after the wearable device 511-1 directly transmits the authentication information to the wearable device 511-2, the wearable device 511-2 can directly transmit the authentication information of the wearable device 511-2 to the wearable device 511-3.

Furthermore, the information processing terminal 512 may receive the sensor data from each wearable device 511 and detect the characteristic data on the basis of the received sensor data.

Moreover, for example, the server 14 may perform the processing of the information processing terminal 512. For example, each wearable device 511 may transmit the characteristic information and the authentication information to the server 14, and the server 14 may control sharing of the authentication information among the respective wearable devices 511.

Furthermore, each wearable device 511 may directly transmit the biometric information to the server 14 or store the biometric information in the storage unit 56.

Furthermore, for example, the information processing terminal 512 may also be configured by a wearable device capable of biometric data and user authentication, and the authentication information may be able to be shared among each of the wearable devices 511 and the information processing terminal 512.

4. Fourth Embodiment

Next, a fourth embodiment of the present technology will be described with reference to FIGS. 43 to 49.

In the fourth embodiment, whether or not devices are mounted on the same user is detected using human body communication.

Here, the human body communication is, for example, communication in which a human body as a dielectric is used as a communication medium, and information is transmitted by causing a weak current to flow through the human body and modulating the current.

<Configuration Example of Information Processing System 701>

Figure 43:
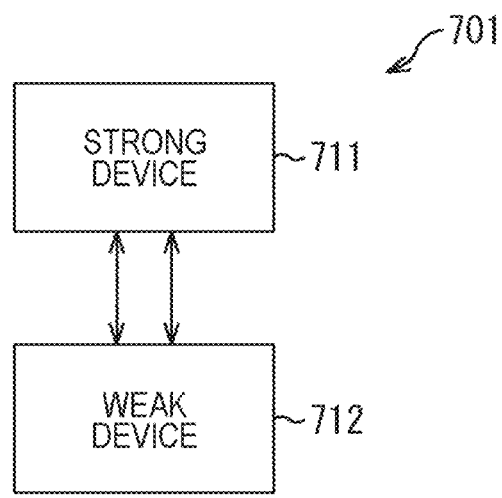
FIG. 43 is a block diagram illustrating a fourth embodiment of an information processing system to which the present technology is applied.

FIG. 43 illustrates a configuration example of an information processing system 701 to which the present technology is applied.

The information processing system 701 includes a strong device 711 and a weak device 712. The strong device 711 and the weak device 712 are capable of any type of wireless communication and human body communication.

The strong device 711 and the weak device 712 are configured by information processing apparatuses capable of being attached to the user, of any type such as eyeglass type, wristband type, bracelet type, necklace type, neckband type, earphone type, headset type, head mount type, and clothing type, for example. Note that, hereinafter, a case where the strong device 711 and the weak device 712 are mainly mounted on the user will be described as an example.

The strong device 711 can perform user authentication in a case of being attached to the user. Furthermore, an authentication level of the strong device 711 is higher than that of the weak device 12.

Meanwhile, the weak device 712 has a lower authentication level than the strong device 711. That is, the weak device 712 has a user authentication function having a lower authentication level than the strong device 711 or does not have a user authentication function.

Then, in a case where the strong device 711 generates authentication information and detects that the strong device 711 is mounted on the same user as the weak device 712 by human body communication, the strong device 711 transmits the authentication information to the weak device 712.

Furthermore, the strong device 711 and the weak device 712 detect biometric data of a user, and generate biometric information including the biometric data and authentication information. The strong device 711 and the weak device 712 store biometric information or transmit the biometric information to a server (not illustrated) or the like.

<Configuration Example of Strong Device 711>

Figure 44:
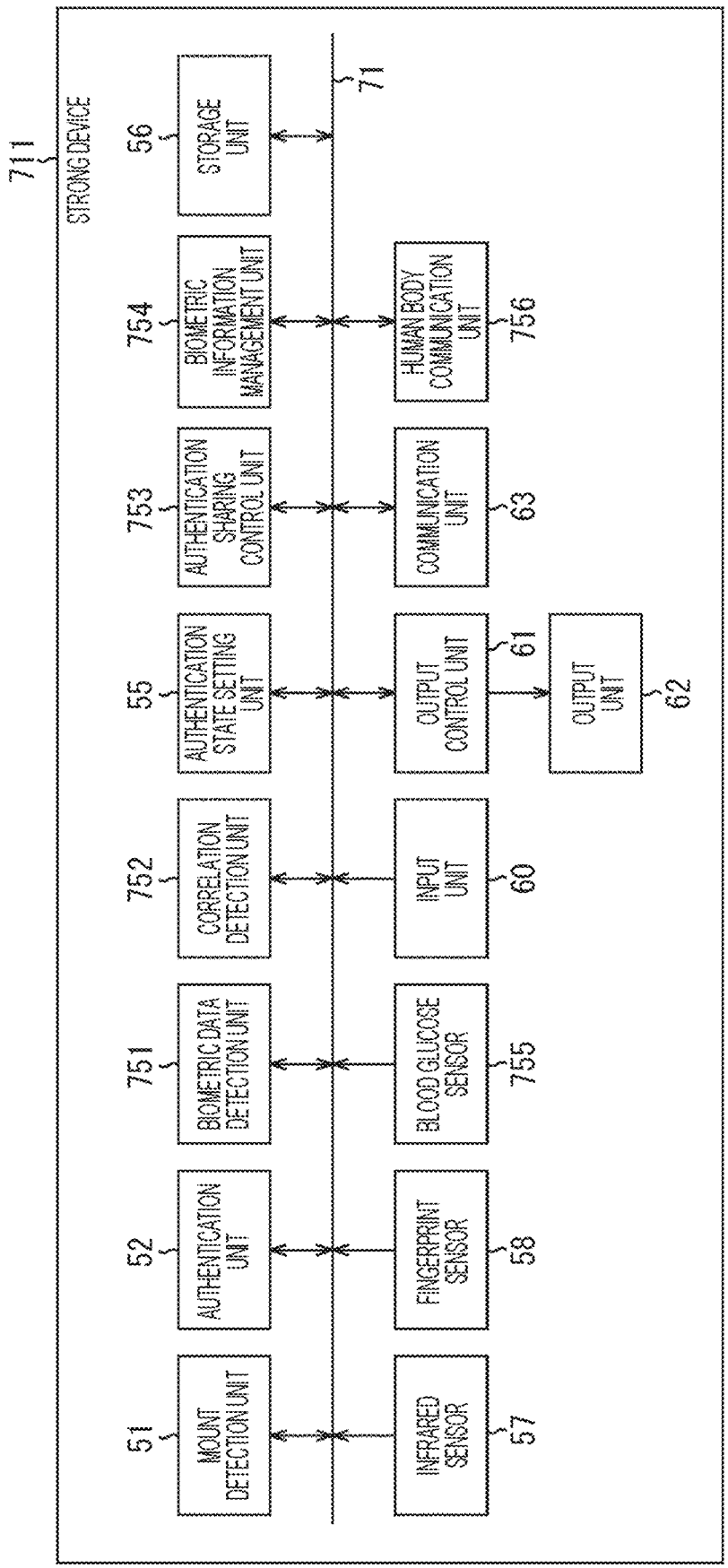
FIG. 44 is a block diagram illustrating a configuration example of a strong device of FIG. 43.

FIG. 44 illustrates a configuration example of the strong device 711 of FIG. 43. Note that a portion corresponding to the strong device 11*a* of FIG. 2 is denoted by the same reference numeral, and description thereof is appropriately omitted.

The strong device 711 includes a mount detection unit 51, an authentication unit 52, an authentication state setting unit 55, a storage unit 56, an infrared sensor 57, a fingerprint sensor 58, an input unit 60, an output control unit 61, an output unit 62, a communication unit 63, a bus 71, a biometric data detection unit 751, a correlation detection unit 752, an authentication sharing control unit 753, a biometric information management unit 754, a blood glucose sensor 755, and a human body communication unit 756. The mount detection unit 51, authentication unit 52, the authentication state setting unit 55, the storage unit 56, the infrared sensor 57, the fingerprint sensor 58, the input unit 60, the output control unit 61, the communication unit 63, the biometric data detection unit 751, the correlation detection unit 752, the authentication sharing control unit 753, the biometric information management unit 754, the blood glucose sensor 755, and the human body communication unit 756 are connected to one another via the bus 71 and communicate with one another.

The biometric data detection unit 751 detects a blood glucose level of the user on the basis of sensor data from the blood glucose sensor 755, and generates biometric data indicating a detection result.

The correlation detection unit 752 detects a correlation between a transmission signal and a reception signal of the human body communication unit 756.

The authentication sharing control unit 753 controls sharing of the authentication information between the strong device 711 and the weak device 712. For example, the authentication sharing control unit 753 controls transmission of the authentication information of the strong device 711 to the weak device 712 on the basis of a detection result of the correlation detection unit 752.

The biometric information management unit 754 generates biometric information including the biometric data, the authentication information, and identification information of the strong device 711. The biometric information management unit 754 stores the biometric information in the storage unit 56 or transmits the biometric information to a server (not illustrated) or the like via the communication unit 63, as needed.

The blood glucose sensor 755 detects the blood glucose level of the user and supplies the sensor data indicating the detected blood glucose level to the biometric data detection unit 751.

The human body communication unit 756 includes, for example, an electrode that can come into contact with the user's skin, and performs human body communication with the weak device 712 by causing a weak current to flow into the user's body via the electrode.

<Configuration Example of Weak Device 712>

Figure 45:
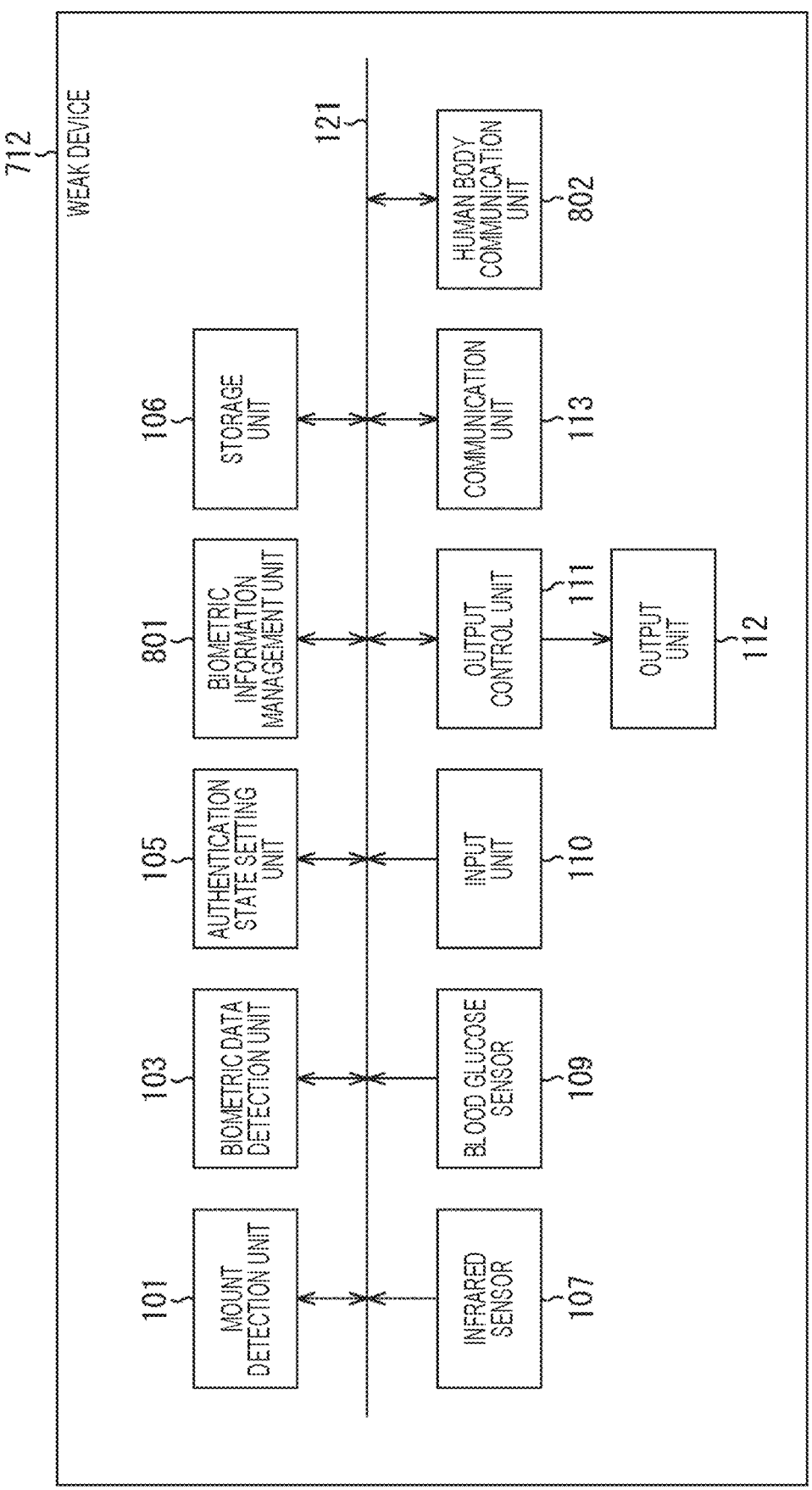
FIG. 45 is a block diagram illustrating a configuration example of a weak device of FIG. 43.

FIG. 45 illustrates a configuration example of the weak device 712 of FIG. 43. Note that a portion corresponding to the weak device 12a of FIG. 3 is denoted by the same reference numeral, and description thereof is appropriately omitted.

The weak device 712 includes a mount detection unit 101, a biometric data detection unit 103, an authentication state setting unit 105, a storage unit 106, an infrared sensor 107, a blood glucose sensor 109, an input unit 110, an output control unit 111, an output unit 112, a communication unit 113, a bus 121, a biometric information management unit 801, and a human body communication unit 802. The mount detection unit 101, the biometric data detection unit 103, the authentication state setting unit 105, the storage unit 106, the infrared sensor 107, the blood glucose sensor 109, the input unit 110, the output control unit 111, the communication unit 113, the biometric information management unit 801, and the human body communication unit 802 are connected to one another via the bus 121 and communicate with one another.

The biometric information management unit 801 generates biometric information including the biometric data, the authentication information, and identification information of the weak device 712. The biometric information management unit 801 stores the biometric information in the storage unit 106 or transmits the biometric information to a server (not illustrated) or the like via the communication unit 113, as needed.

The human body communication unit 802 includes, for example, an electrode that can come into contact with the user's skin, and performs human body communication with the strong device 711 by causing a weak current to flow into the user's body via the electrode.

<Processing of Information Processing System 701>

Next, processing of the information processing system 701 will be described with reference to FIGS. 46 to 49.

<Processing of Weak Device 712>

First, processing of the weak device 712 will be described with reference to the flowchart of FIG. 46.

Figure 47:
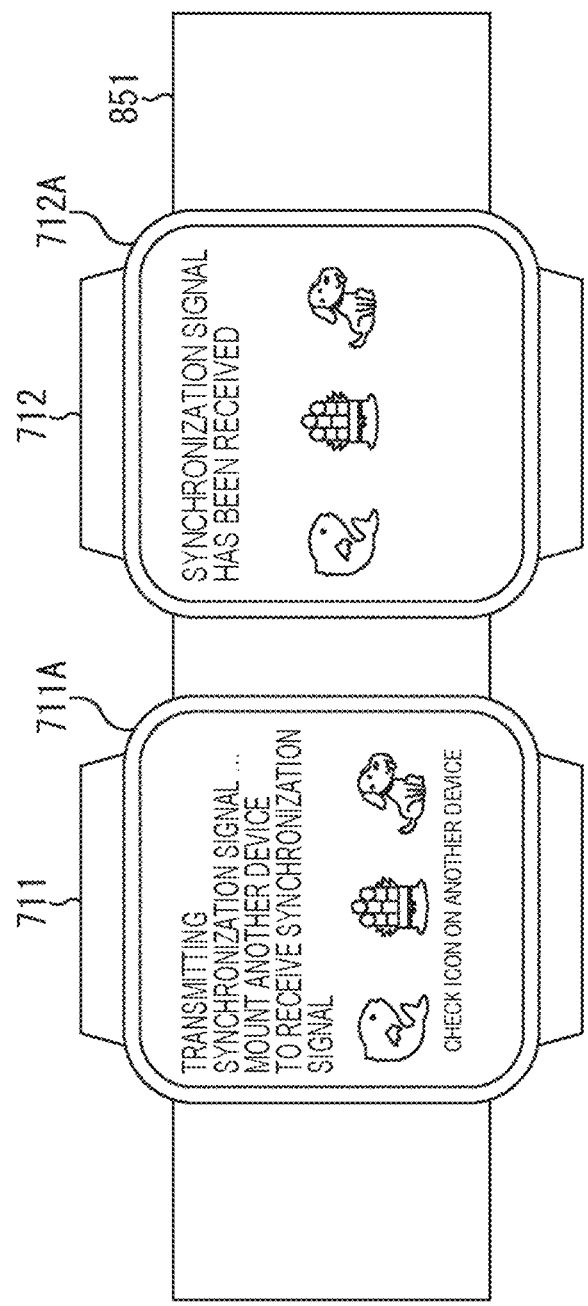
FIG. 47 is a diagram illustrating a mount example of the strong device and the weak device.

This processing is started when an operation for executing sharing of the authentication information is performed for the input unit 110 of the weak device 712 in a state where the wristband-type strong device 711 and the wristband-type weak device 712 are mounted on an arm 851 of the user, as illustrated in FIG. 47, for example.

Note that, for example, the electrode of the human body communication unit 756 is provided on a portion of a back surface of a case 711A of the strong device 711, the portion being in contact with the skin of the arm 851. Similarly, the electrode of the human body communication unit 802 is provided on a portion of a back surface of a case 712A of the weak device 712, the portion being in contact with the skin of the arm 851.

In step S601, the mount detection unit 101 determines whether or not the weak device 712 is mounted on the user on the basis of the sensor data supplied from the infrared sensor 107. In a case where it is determined that the weak device 712 is mounted on the user, the processing proceeds to step S602.

In step S602, the communication unit 113 transmits a session start signal.

In response, as will be described below, in a case where the strong device 711 receives the session start signal from the weak device 712, the strong device 711 transmits a random pattern signal indicating a random pattern by human body communication.

In step S603, the human body communication unit 802 determines whether or not a random pattern signal has been received. In a case where it is determined that the random pattern signal has been received, the processing proceeds to step S604.

In step S604, the human body communication unit 802 transmits a random pattern signal having the same pattern as the received signal. Specifically, the human body communication unit 802 transmits a random pattern signal having the same pattern as the random pattern signal received from the strong device 711 to the strong device 711 by human body communication.

In response, as will be described below, the strong device 711 transmits the authentication information when the transmitted pattern and the received pattern match.

In step S605, the communication unit 113 determines whether or not the authentication information has been received. In a case where it is determined that the authentication information has been received, the processing proceeds to step S606.

In step S606, the authentication state is updated similarly to the processing of step S63 of FIG. 13.

In step S607, the change in the authentication state is notified to the user, similarly to the processing of step S64 of FIG. 13.

In step S608, the weak device 712 starts generation of the biometric information. Specifically, the biometric data detection unit 103 starts processing of detecting the blood glucose level of the user on the basis of the sensor data from the blood glucose sensor 109, and generating the biometric data indicating a detection result. The biometric information management unit 801 starts processing of generating the biometric information including the biometric data, the authentication information, and the identification information of the weak device 712. Furthermore, the biometric information management unit 801 starts processing of storing the biometric information in the storage unit 106 or transmitting the biometric information to a server (not illustrated) or the like via the communication unit 113.

Thereafter, the processing of the weak device 712 ends.

Meanwhile, in a case where it is determined that the weak device 712 is not mounted on the user in step S601, in a case where it is determined that the random pattern signal is not received in step S603, or in a case where it is determined that the authentication information is not received in step S605, update of the authentication state and generation of the biometric information are not performed and the processing ends.

<Processing of Strong Device 711>

Next, processing executed by the strong device 711 corresponding to the processing of the weak device 712 of FIG. 46 will be described with reference to the flowchart of FIG. 48.

This processing is started when, for example, the communication unit 63 receives the session start signal transmitted from the weak device 712.

In step S651, whether or not the strong device 711 is mounted on the user is determined, similarly to the processing of step S5 of FIG. 7. In a case where it is determined that the strong device 711 is mounted on the user, the processing proceeds to step S652.

In step S652, the authentication sharing control unit 753 determines whether or not the user authentication is valid. In a case where it is determined that the user authentication is valid, that is, in a case where the user authentication is successful with the strong device 711 mounted on the user and an authenticated user and the authentication level are set, the processing proceeds to step S653.

In step S653, the authentication sharing control unit 753 generates and stores a random pattern. For example, the authentication sharing control unit 753 generates the random pattern by measuring white noise for a predetermined number of samples at predetermined time intervals, and setting a sample value to 1 in a case where the white noise is equal to or higher than a predetermined threshold value, or setting the sample value to 0 in a case where white noise is less than the predetermined threshold value. The authentication sharing control unit 753 causes the storage unit 56 to store data indicating the generated random pattern.

In step S654, the human body communication unit 756 transmits the random pattern signal. Specifically, the human body communication unit 756 sends a digital signal indicating the random pattern stored in the storage unit 56 to the skin of the arm 851 by a small amount of electric current.

In step S655, the human body communication unit 756 receives the random pattern signal. Specifically, the human body communication unit 756 receives the random pattern signal transmitted from the weak device 712 that has received the random pattern signal.

Figure 49:
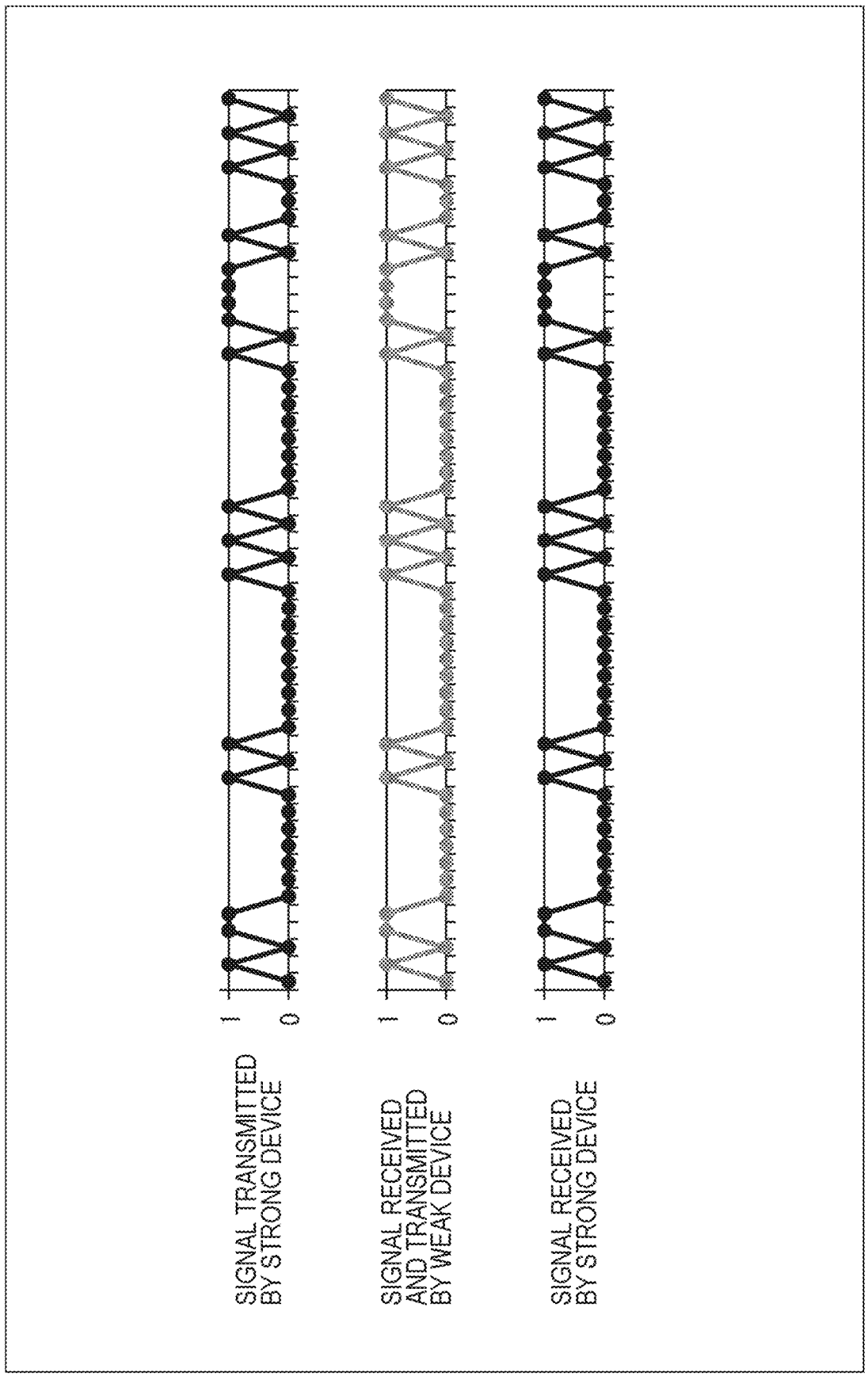
FIG. 49 is a graph illustrating an example of a human body communication signal.

FIG. 49 illustrates an example of the random pattern signals transmitted and received between the strong device 711 and the weak device 712. The horizontal axis in the figure represents the time.

The upper graph in FIG. 49 illustrates a waveform of the random pattern signal transmitted by the strong device 711. As described above, the random pattern signal is a digital signal having a value of 0 or 1.

The central graph in FIG. 49 illustrates a waveform of the random pattern signal transmitted by the weak device 712. The waveform of the random pattern signal is the same as the waveform of the random pattern signal transmitted from the strong device 711.

The lower graph in FIG. 49 illustrates a waveform of the random pattern signal received by the strong device 711. The waveform of the random pattern signal is the same as the waveform of the random pattern signal transmitted from the weak device 712, and as a result, is the same as the waveform of the random pattern signal transmitted by the strong device 711.

Furthermore, FIG. 47 above illustrates an example of the display screens of the strong device 711 and the weak device 712 during transmission/reception of the random pattern signals.

In this example, a message indicating that a synchronization signal (random pattern signal) is being transmitted is displayed on the strong device 711. Furthermore, a message prompting the user to wear another device (weak device 712) and receive the synchronization signal is displayed.

Moreover, an icon representing the pattern of the random pattern signal is displayed. For example, in the strong device 711 and the weak device 712, an icon having a different design is prepared in advance for each numerical value of a predetermined digit. Then, the strong device 711 converts the value of the random pattern signal into an icon string and displays the converted icon string. Then, a message prompting the user to check the icon on another device (weak device 712) is displayed.

Meanwhile, the weak device 712 displays a message indicating that the synchronization signal (random pattern signal) has been received. Furthermore, an icon string similar to that of the strong device 711 is displayed on the basis of the value of the received random pattern signal.

For example, the user can easily confirm whether or not the authentication information sharing processing between the strong device 711 and the weak device 712 is smoothly proceeding by comparing the icon string displayed on the strong device 711 with the icon string displayed on the weak device 712.

Note that the value of the random pattern signal may be converted into, for example, a character string, a symbol, a numerical value, a combination thereof, or the like, and displayed, instead of the icon string. Furthermore, an actual numerical value of the random pattern signal may be displayed.

In step S656, the correlation detection unit 752 determines whether or not the transmitted pattern and the received pattern are similar. Specifically, the correlation detection unit 752 compares the pattern of the random pattern signal received from the weak device 712 with the random pattern stored in the storage unit 56. In a case where the degree of coincidence between the two patterns is equal to or larger than a predetermined threshold value, the correlation detection unit 752 determines that the transmitted pattern and the received pattern are similar, and the processing proceeds to step S657.

In step S657, the authentication sharing control unit 753 transmits the authentication information. Specifically, the authentication sharing control unit 753 reads the authentication information from the storage unit 56 and transmits the authentication information to the weak device 712 via the communication unit 63.

In step S658, a change in the authentication state of the weak device 712 is notified to the user, similarly to the processing of step S20 of FIG. 7.

Thereafter, the processing of the strong device 711 ends.

Meanwhile, in a case where it is determined that the strong device 711 is not mounted on the user in step S651, in a case where it is determined that the user authentication is invalid in step S652, or in a case where it is determined that the transmitted pattern and the received pattern are not similar in step S655, the processing ends without transmitting the authentication information to the weak device 712.

By using the human body communication as described above, the strong device 711 and the weak device 712 being mounted on the same user is detected without using the characteristic data of the user, and the authentication information can be shared. Therefore, the authentication information can be quickly shared. Furthermore, it is not necessary for the user to take actions such as walking for a predetermined time in order to detect the correlation of the characteristic data. That is, the authentication information can be easily and safely shared between the strong device 711 and the weak device 712.

Here, use examples of the information processing system 701 will be described.

For example, the strong device 711 is mounted when the user is awake and the weak device 712 is mounted when the user sleeps. Furthermore, the weak device 712 is connected to a charger and charged when not in use.

For example, the user removes the weak device 712 from the charger and wears the weak device 712 on the arm wearing the strong device 711 before sleep. Then, by performing predetermined processing for the weak device 712, the above-described processing is performed and the authentication information of the strong device 711 is shared with the weak device 712. Note that, for example, when the weak device 712 is removed from the charger, a communication session by the human body communication may be automatically started, and after the weak device 712 is mounted on the user, the above-described processing may be performed without performing the user operation.

The user then, for example, removes the strong device 711 from his arm, connects the strong device 711 to the charger, and begins charging the strong device 711. Furthermore, the weak device 712 detects the biometric data of the user during sleep and stores the biometric data together with the authentication information having a high authentication level acquired from the strong device 711.

Thereby, the biometric data of the user can be detected and accumulated throughout the day under the user authentication with a high authentication level, using the strong device 711 and the weak device 712.

Note that the scene in which the strong device 711 and the weak device 712 are properly used is not limited to the above-described sleep time and can be arbitrarily set. For example, the weak device 712 may be made completely waterproof, and the weak device 712 may be mounted instead of the strong device 711 when taking a bath.

Furthermore, the strong device 711 and the weak device 712 may be mounted on a place other than the above-described one arm. For example, the strong device 711 and the weak device 712 may be mounted on one leg, separately mounted on the left and right arms, separately mounted on the left and right legs, or separately mounted on the arm and the leg.

Modification of Fourth Embodiment

Hereinafter, modifications of the above-described fourth embodiment will be described.

For example, the communication session may be started from the strong device 711.

Furthermore, for example, the weak device 712 may detect the correlation of the patterns of the transmission/reception signals of the human body communication.

5. Fifth Embodiment

Next, a fifth embodiment of the present technology will be described with reference to FIGS. 50 to 57.

Strong devices provided with a strong user authentication function are usually expensive. Therefore, it is not very economical for individuals to respectively have strong devices in a company, a family, or the like, and it is assumed that a strong device is shared by a plurality of users.

Furthermore, a strong user authentication function requires a large amount of calculation, and may require a high-performance processor or may increase power consumption. Therefore, it may be difficult to implement a strong device with a small wearable device.

In response, the fifth embodiment enables a strong device to be shared by a plurality of users.

<Configuration Example of Information Processing System 901>

Figure 50:
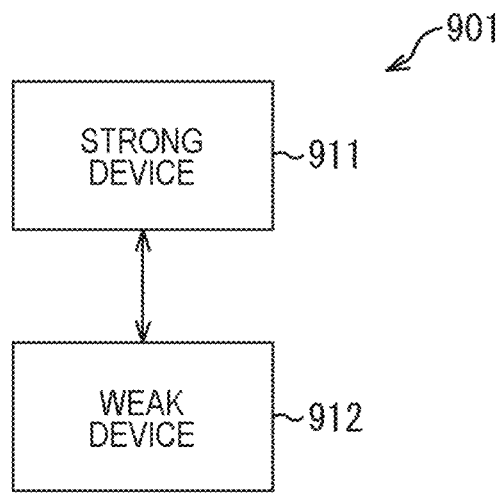
FIG. 50 is a block diagram illustrating a fifth embodiment of an information processing system to which the present technology is applied.

FIG. 50 is a block diagram illustrating a configuration example of an information processing system 901 to which the present technology is applied.

The information processing system 901 includes a strong device 911 and a weak device 912. The strong device 911 and the weak device 912 are capable of any method of wireless communication.

The strong device 911 is configured by, for example, a stationary personal computer or the like. The weak device 912 is configured by an information processing apparatus capable of being attached to the user, of any type such as eyeglass type, wristband type, bracelet type, necklace type, neckband type, earphone type, headset type, head mount type, and clothing type, for example. Note that, hereinafter, a case in which the weak device 912 is mainly mounted on a user will be described as an example.

The strong device 911 can perform user authentication in a state of being in contact with the user. Furthermore, an authentication level of the strong device 911 is higher than that of the weak device 912.

Meanwhile, the weak device 912 has a lower authentication level than the strong device 911. That is, the weak device 912 has a user authentication function having a lower authentication level than the strong device 911 or does not have a user authentication function.

Furthermore, the strong device 911 and the weak device 912 each detect similar types of characteristics of the user. The characteristics of the user detected by the strong device 11 and the weak device 12 are not particularly limited as long as both the devices being mounted on the same user can be detected from the characteristics. The weak device 912 generates characteristic information including characteristic data indicating the detected characteristic and transmits the characteristic information to the strong device 911.

Then, in a case where the strong device 911 detects that the strong device 911 is mounted on the same user as the weak device 912 on the basis of the characteristic data detected by the strong device 911 and the characteristic data detected by the weak device 912, the strong device 911 transmits the authentication information to the weak device 912.

The weak device 912 sets an authentication state on the basis of the authentication information of the strong device 911 and its own user authentication result (in a case of having a user authentication function). Then, the weak device 912 enables or disables the functions according to the authentication level, and executes processing of the enabled function.

<Configuration Example of Strong Device 911>

Figure 51:
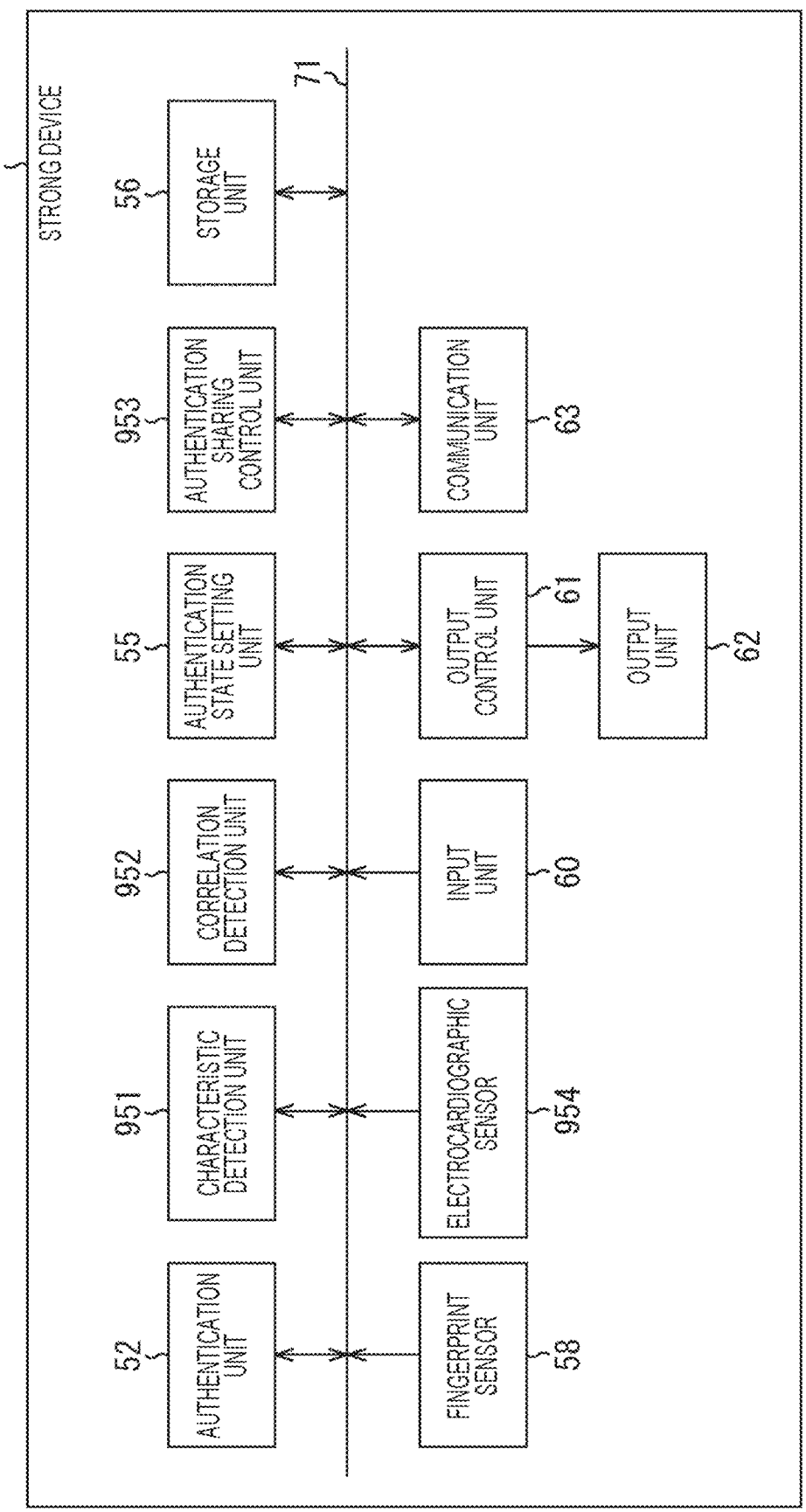
FIG. 51 is a block diagram illustrating a configuration example of a strong device of FIG. 50.

FIG. 51 illustrates a configuration example of the strong device 911 of FIG. 50. Note that a portion corresponding to the strong device 11a of FIG. 2 is denoted by the same reference numeral, and description thereof is appropriately omitted.

The strong device 911 includes an authentication unit 52, an authentication state setting unit 55, a storage unit 56, a fingerprint sensor 58, an input unit 60, an output control unit 61, an output unit 62, a communication unit 63, a bus 71, a characteristic detection unit 951, a correlation detection unit 952, an authentication sharing control unit 953, and an electrocardiographic sensor 954. The authentication unit 52, the authentication state setting unit 55, the storage unit 56, the fingerprint sensor 58, the input unit 60, the output control unit 61, the communication unit 63, the characteristic detection unit 951, the correlation detection unit 952, the authentication sharing control unit 953, and the electrocardiographic sensor 954 are connected to one another via the bus 71 and communicate with one another.

The characteristic detection unit 951 detects a heartbeat pattern of the user (for example, a heartbeat interval) on the basis of sensor data from the electrocardiographic sensor 954, and generates characteristic data indicating the detected heartbeat pattern.

The correlation detection unit 952 detects a correlation between the characteristic data detected by the characteristic detection unit 951 and the characteristic data received from the weak device 912.

The authentication sharing control unit 953 controls sharing of the authentication information between the strong device 911 and the weak device 912. For example, the authentication sharing control unit 953 controls transmission of the authentication information of the strong device 911 to the weak device 912 on the basis of a detection result of the correlation detection unit 952.

The electrocardiographic sensor 954 detects the user's heartbeat and supplies the sensor data indicating the detected heartbeat to the characteristic detection unit 951.

<Configuration Example of Weak Device 912>

Figure 52:
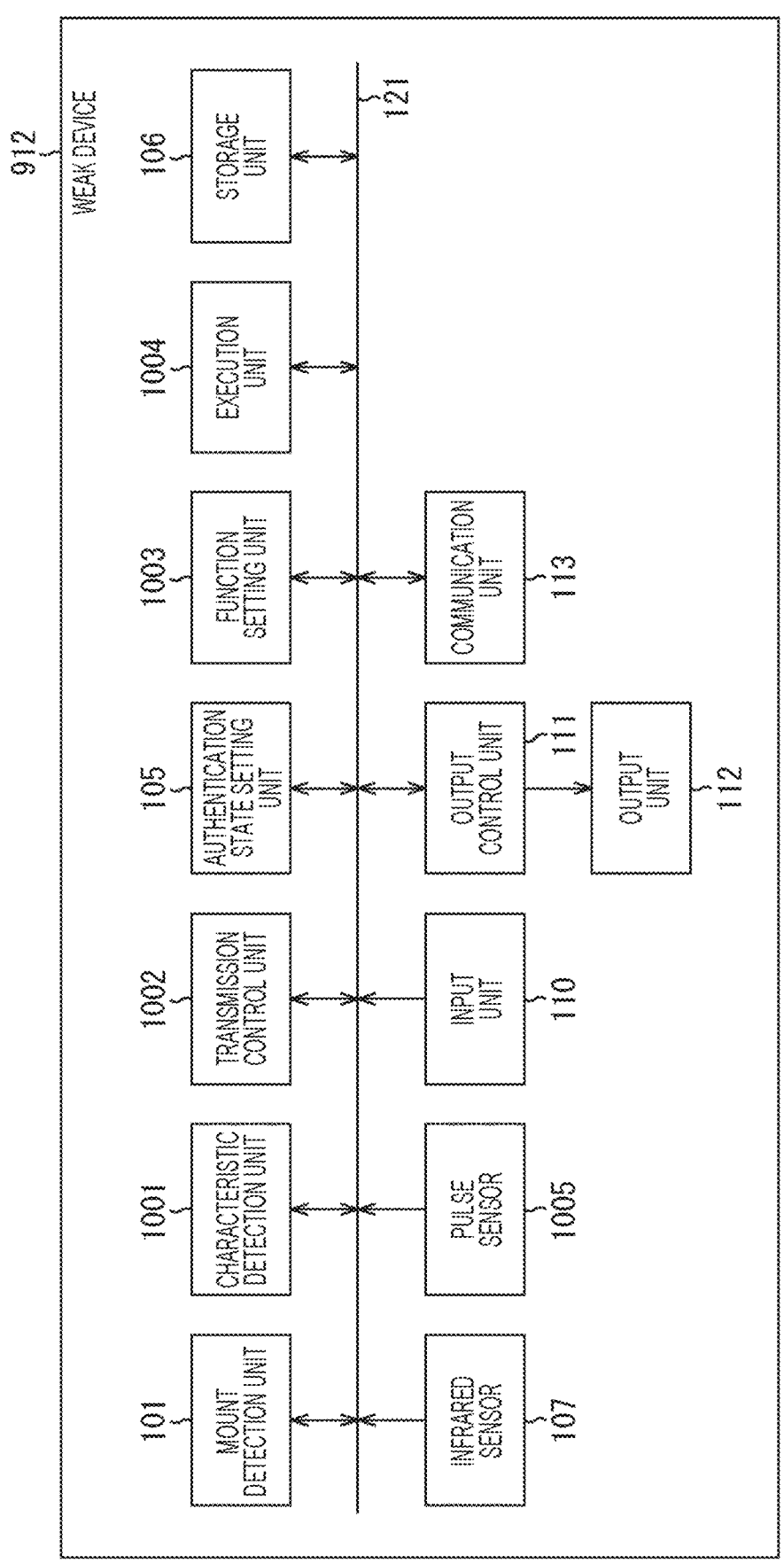
FIG. 52 is a block diagram illustrating a configuration example of a weak device of FIG. 50.

FIG. 52 illustrates a configuration example of the weak device 912 of FIG. 50. Note that a portion corresponding to the weak device 12a of FIG. 3 is denoted by the same reference numeral, and description thereof is appropriately omitted.

The weak device 912 includes a mount detection unit 101, an authentication state setting unit 105, a storage unit 106, an infrared sensor 107, an input unit 110, an output control unit 111, an output unit 112, a communication unit 113, a bus 121, a characteristic detection unit 1001, a transmission control unit 1002, a function setting unit 1003, an execution unit 1004, and a pulse sensor 1005. The mount detection unit 101, the authentication state setting unit 105, the storage unit 106, the infrared sensor 107, the input unit 110, the output control unit 111, the communication unit 113, the characteristic detection unit 1001, the transmission control unit 1002, the function setting unit 1003, the execution unit 1004, and the pulse sensor 1005 are connected to one another via the bus 121 and communicate with one another.

The characteristic detection unit 1001 detects a pulse pattern of the user (for example, a pulse interval) on the basis of sensor data from the pulse sensor 1005, and generates characteristic data indicating the detected pulse pattern.

The transmission control unit 1002 generates characteristic information including the characteristic data. The transmission control unit 1002 controls transmission of the characteristic information to the strong device 911.

The function setting unit 1003 sets enabled functions according to the authentication state of the weak device 912.

The execution unit 1004 executes processing of the function enabled by the function setting unit 1003.

The pulse sensor 1005 detects the user's pulse and supplies the sensor data indicating the detection result to the characteristic detection unit 1001.

<Configuration Example of Authentication Module 1051>

Figure 53:
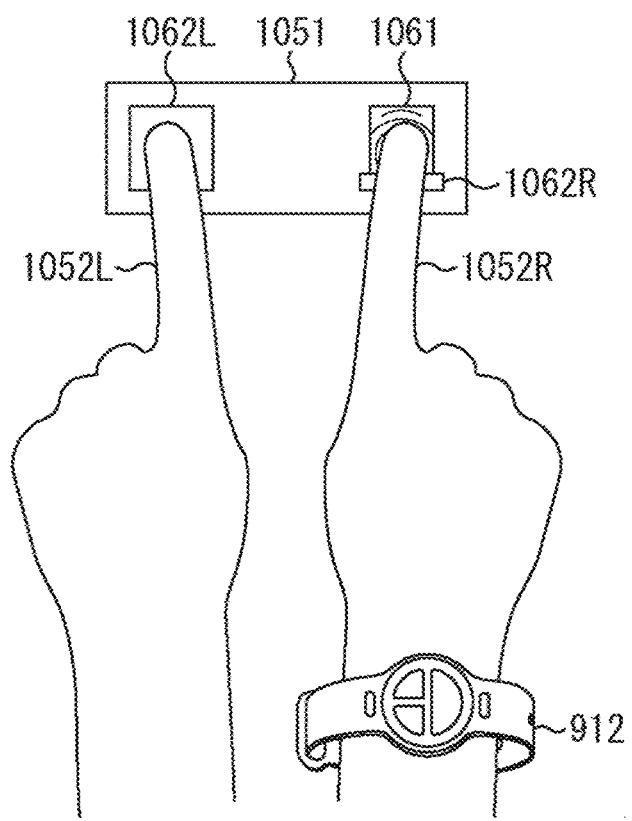
FIG. 53 is a diagram illustrating a configuration example of an authentication module for the strong device of FIG. 50.

FIG. 53 illustrates a configuration example of the authentication module 1051 included in the strong device 911.

The authentication module 1051 includes a fingerprint reading module 1061, and electrodes 1062L and 1062R. The fingerprint reading module 1061 and the electrode 1062R are arranged to be adjacent to each other in the vertical direction in the drawing. The fingerprint reading module 1061, and the electrodes 1062R and 1062L are arranged with a predetermined interval in the horizontal direction in the drawing.

The fingerprint reading module 1061 is provided in the fingerprint sensor 58, and includes a lens, an image sensor, and the like for capturing a user's fingerprint. For example, as in this example, when the user holds an index finger 1052R of the right hand over the fingerprint reading module 1061, the fingertip of the index finger 1052R is captured and the shape of the fingerprint of the index finger 1052R is detected.

The electrodes 1062L and 1062R are electrodes provided in the electrocardiographic sensor 954 and for detecting the user's heartbeat. For example, as in this example, when the user touches the electrode 1062L with an index finger 1052L of the left hand and the electrode 1062R with the index finger 1052R of the right hand, the electrocardiographic sensor 954 detects the user's heartbeat by causing a current to flow into the user's body via the electrodes 1062L and 1062R.

Here, since the fingerprint reading module 1061 and the electrode 1062R are adjacent to each other, the user can hold the index finger 1052R over the fingerprint reading module 1061 and touch the electrode 1062R at the same time. Therefore, the fingerprint sensor 58 and the electrocardiographic sensor 954 can perform the detection processing in parallel.

<Processing of Information Processing System 901>

Next, processing of the information processing system 901 will be described with reference to FIGS. 54 to 57.

<Processing of Strong Device 911>

First, processing of the strong device 911 will be described with reference to the flowchart of FIG. 54.

This processing is started when, for example, the user brings the finger of the left hand into contact with the electrode 1062L, holds the finger of the right hand wearing the weak device 912 over the fingerprint reading module 1061, and brings the finger of the left hand into contact with the electrode 1062R, as illustrated in FIG. 53, after performing a predetermined operation for sharing the authentication information via the input unit 60.

In step S701, the authentication sharing control unit 953 requests the weak device 912 to transmit the characteristic information. Specifically, the authentication sharing control unit 953 generates a characteristic information transmission request signal and transmits the characteristic information transmission request signal to the weak device 912 via the communication unit 63.

Meanwhile, as will be described below, the weak device 912 transmits the characteristic information to the strong device 911 in a case where the weak device 912 is mounted on the user.

In step S702, the strong device 911 performs user authentication and characteristic data detection.

Specifically, the fingerprint sensor 58 detects a shape of a fingerprint of the user and supplies sensor data indicating a detected result to the authentication unit 52. The authentication unit 52 compares the shape of the fingerprint indicated in the acquired sensor data with the shape of the fingerprint indicated in the collation data stored in the storage unit 56.

The electrocardiographic sensor 954 detects the user's heartbeat and supplies the sensor data indicating the detection result to the characteristic detection unit 951. The characteristic detection unit 951 detects the user's heartbeat pattern on the basis of the sensor data, generates the characteristic data indicating the detection result, and supplies the characteristic data to the correlation detection unit 952. In this way, the user authentication and the detection of the user's heartbeat pattern are performed in parallel (almost simultaneously).

In step S703, the authentication unit 52 determines whether or not the user authentication is successful. As a result of the user authentication, in a case where authentication or identification of a specific user is successful, the authentication unit 52 determines that the user authentication is successful, and the processing proceeds to step S704.

In step S704, the authentication state is updated similarly to the processing of step S6 of FIG. 7.

In step S705, the communication unit 63 determines whether or not the characteristic information has been received from the weak device 912. In a case where it is determined that the characteristic information has been received from the weak device 912, the processing proceeds to step S706.

In step S706, the correlation detection unit 952 determines whether or not the characteristic data correlate. Specifically, the correlation detection unit 952 calculates a correlation coefficient between the heartbeat pattern indicated in the characteristic data from the characteristic detection unit 951 and the pulse pattern indicated in the characteristic data included in the characteristic information from the weak device 912. In a case where the calculated correlation coefficient is equal to or larger than a predetermined threshold value, the correlation detection unit 952 determines that the characteristic data correlate, that is, the characteristic data are of the same person, and the processing proceeds to step S706.

Figure 55:
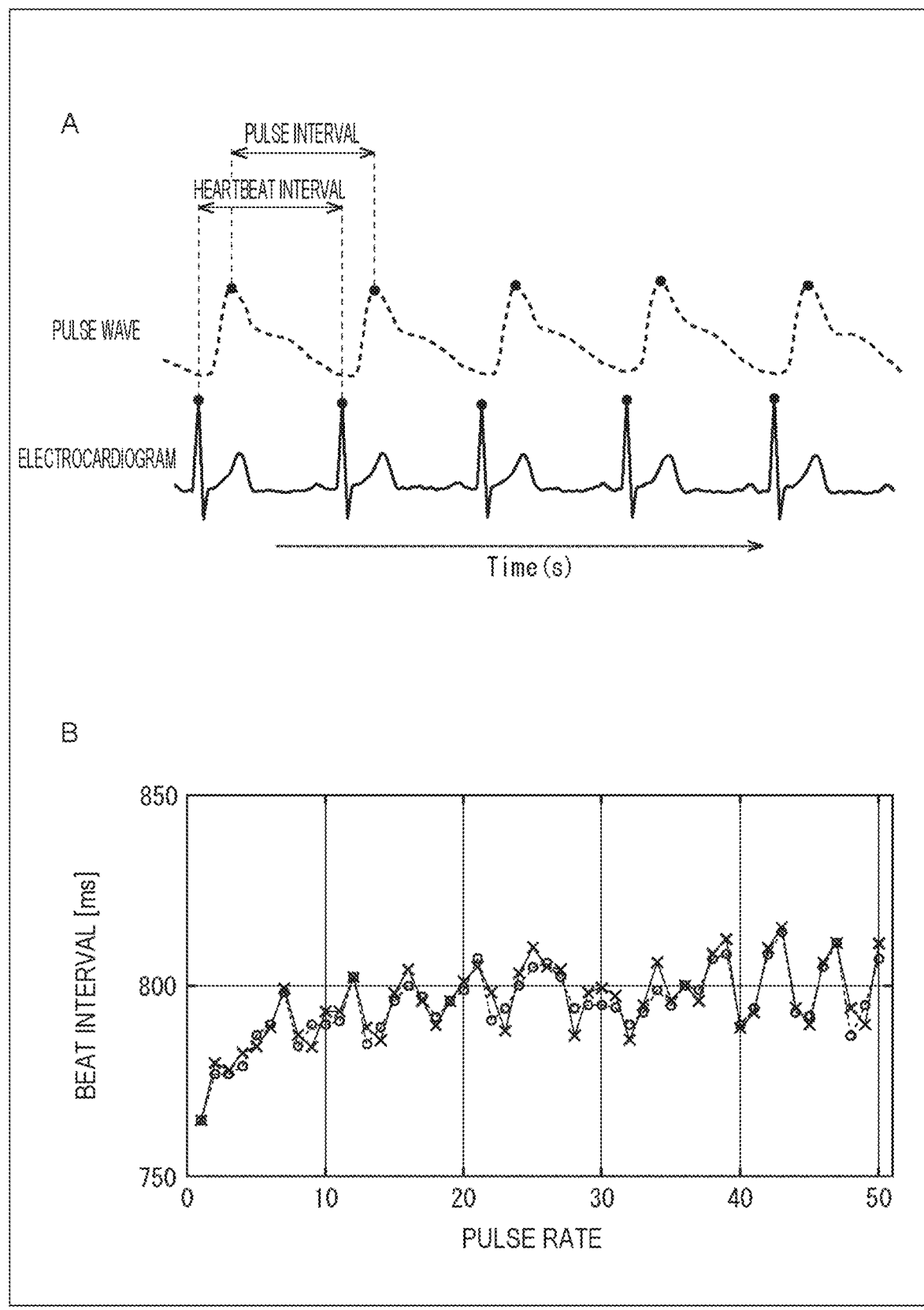
FIG. 55 is a graph illustrating an example of a heartbeat pattern and a pulse pattern.

Note that, strictly speaking, the heartbeat and the pulse are different types of characteristics of the user but they closely correlate with each other. For example, A in FIG. 55 illustrates an example of an electrocardiographic waveform detected by the strong device 911 and a pulse waveform detected by the weak device 912. The horizontal axis represents the time (in seconds), the solid line represents the electrocardiographic waveform, and the dotted line represents the pulse waveform. Furthermore, B in FIG. 55 illustrates an example of a waveform of the heartbeat interval detected by the strong device 911 and a waveform of the pulse interval detected by the weak device 912. The horizontal axis represents the number of beats, the vertical axis represents the beat interval (in milliseconds), the solid line represents the waveform of the heartbeat interval, and the dotted line represents the waveform of the pulse interval. In this way, the waveform of the heartbeat interval and the waveform of the pulse interval are very close to each other.

Therefore, in a case where the weak device 912 is mounted on the user who has been authenticated by the strong device 911, the correlation between the heartbeat pattern detected by the strong device 911 and the pulse pattern detected by the weak device 912 becomes strong. Meanwhile, in a case where the weak device 912 is mounted on a user different from the user authenticated by the strong device 911, or in a case where the weak device 912 is not mounted on the user, the correlation between the heartbeat pattern detected by the strong device 911 and the pulse pattern detected by the weak device 912 becomes weak.

In step S707, the authentication sharing control unit 953 transmits the authentication information. Specifically, the authentication sharing control unit 953 reads the authentication information from the storage unit 56, adds the identification information of the strong device 911, and transmits the authentication information to the weak device 912 via the communication unit 63.

Thereafter, the processing of the strong device 911 ends.

Meanwhile, in step S706, in a case where the calculated correlation coefficient is less than the predetermined threshold value, the correlation detection unit 952 determines that the characteristic data do not correlate, the processing of step S707 is skipped, and the processing ends without transmitting the authentication information to the weak device 912.

Furthermore, in step S705, in a case where it is determined that the characteristic information is not received from the weak device 912, the processing of steps S706 and S707 is skipped, and the processing ends without transmitting the authentication information to the weak device 912.

Moreover, in step S703, in a case where it is determined that the user authentication has failed, the processing of steps 3704 to S707 is skipped, and the processing ends without transmitting the authentication information to the weak device 912.

<Processing of Weak Device 912>

Next, processing executed by the weak device 912 corresponding to the processing of the strong device 911 of FIG. 54 will be described with reference to the flowchart of FIG. 56.

This processing is started when, for example, the communication unit 113 receives the characteristic information transmission request signal transmitted from the strong device 911.

Figure 46:
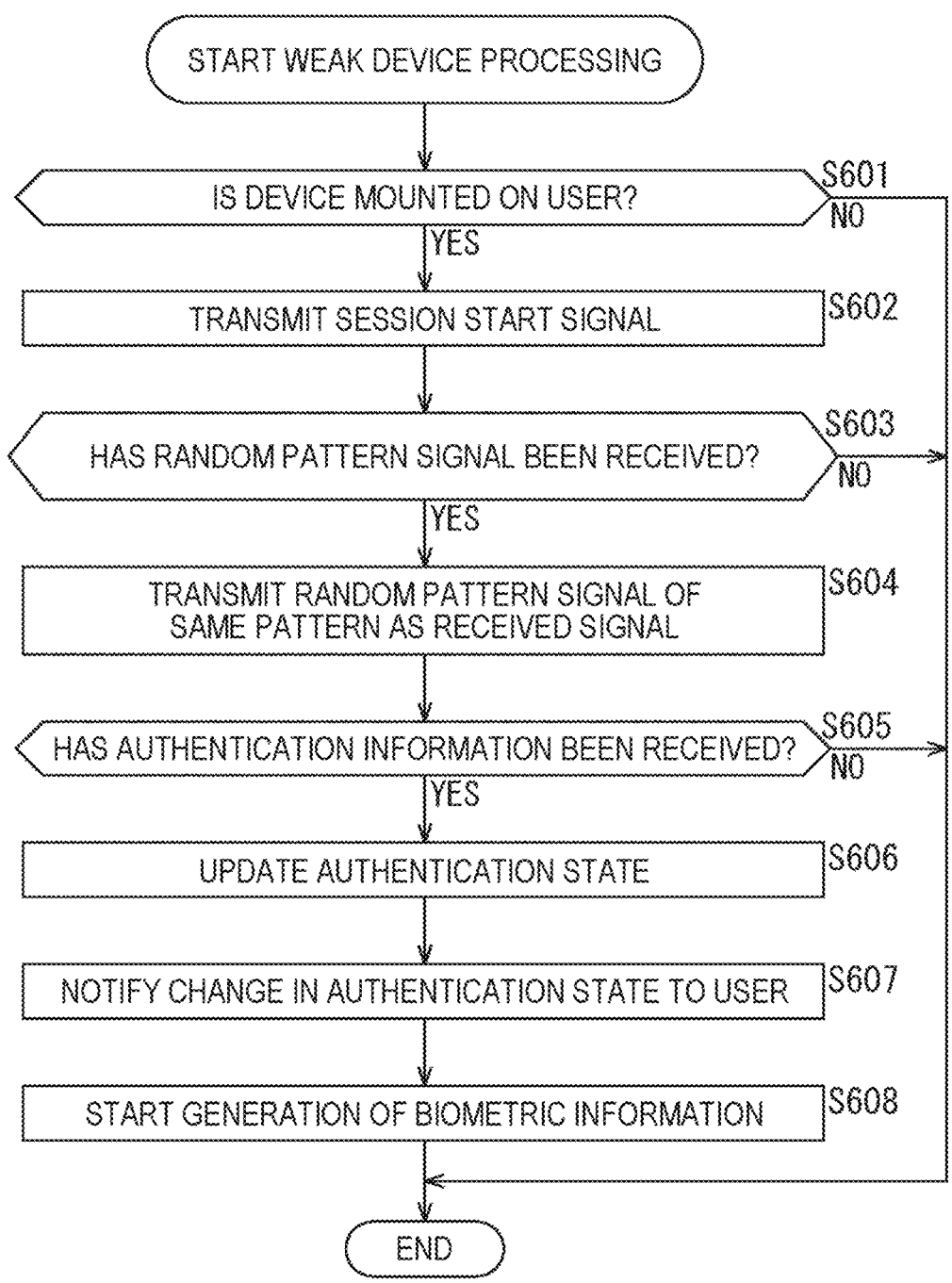
FIG. 46 is a flowchart for describing processing of the weak device of FIG. 45.

In step S751, whether or not the weak device 912 is mounted on the user is determined, similarly to the processing of step S601 of FIG. 46. In a case where it is determined that the weak device 912 is mounted on the user, the processing proceeds to step S752.

In step S752, the weak device 912 transmits the characteristic information to the strong device 911. Specifically, the characteristic detection unit 1001 detects the pulse pattern of the user on the basis of the sensor data from the pulse sensor 1005, and generates the characteristic data indicating the detected pulse pattern. The transmission control unit 1002 generates the characteristic information including the characteristic data and the identification information of the weak device 12a, and transmits the characteristic information to the strong device 911 via the communication unit 113.

In step S753, the communication unit 113 determines whether or not the authentication information has been received. In a case where the communication unit 113 determines that the authentication information has been received from the strong device 911, the processing proceeds to step S754.

In step S754, the authentication state is updated similarly to the processing of step S63 of FIG. 13.

In step S755, the function setting unit 1003 sets an enabled function on the basis of the authentication state. For example, the function setting unit 1003 enables the function according to the authentication level set on the basis of the authentication information of the strong device 911.

FIG. 57 illustrates an example of the functions to be enabled. In this example, the function to be enabled is different for each weak device 912 owned by each member of the family including father, mother, daughter, and son. That is, the function to be enabled is different for each user.

For example, in the weak device 912 of the father, a car key function is enabled. In the weak device 912 of the mother, the car key function and an ATM withdrawal function are enabled. In the weak device 912 of the daughter, the functions of location information transmission and payment up to 1000 yen per month are enabled. In the weak device 912 of the son, functions of swimming key and location information transmission are enabled.

Thereafter, the processing of the weak device 912 ends.

On the other hand, in step S753, in a case where it is determined that the authentication information has not been received, the processing of steps S754 and S755 is skipped and the processing ends without updating the authentication state and enabling the functions.

Furthermore, in step S751, in a case where it is determined that the weak device 712 is not mounted on the user, the processing of steps S752 to 3755 is skipped, and the processing ends without updating the authentication state and enabling the functions.

The user can cause the authentication information of the strong device 911 to be shared with the weak device 912 by simply holding the finger over the fingerprint reading module 1061 and touching the electrodes 1062L and 1062R with the fingers of the right and left hands, respectively, in a state of mounting the weak device 912 on the arm, as described above. That is, the authentication information can be easily and safely shared between the strong device 911 and the weak device 912. Furthermore, the functions of the weak device 912 can be easily and safely enabled.

Furthermore, in the strong device 911, the user authentication and the characteristic data detection are executed in parallel while the user is in contact with the strong device 911. Therefore, the user targeted for user authentication and the user targeted for characteristic data detection being the same can be reliably guaranteed.

Modification of Fifth Embodiment

Hereinafter, modifications of the above-described fifth embodiment will be described.

For example, the weak device 912 may transmit the sensor data to the strong device 911, and the strong device 911 may detect the characteristic data of the weak device 912.

Furthermore, for example, the weak device 912 may detect the correlation of the characteristic data.

Moreover, the fifth embodiment can be applied to a case where a key of a locker and a valuables box of various facilities, events, or the like is implemented by the weak device 912 and shared by a plurality of users, for example.

Furthermore, the strong device 911 can collect the characteristic information and the authentication information of each user. Therefore, for example, the strong device 911 can perform the above-described learning processing of FIG. 17.

6. Sixth Embodiment

Next, a sixth embodiment of the present technology will be described with reference to FIGS. 58 to 63.

The present embodiment enables a strong device provided with a strong user authentication function to be shared by a plurality of users, as in the fifth embodiment.

Note that, in the sixth embodiment, whether or not a strong device and a weak device are mounted on or in contact with the same user is detected using human body communication.

<Configuration Example of Information Processing System 1101>

Figure 58:
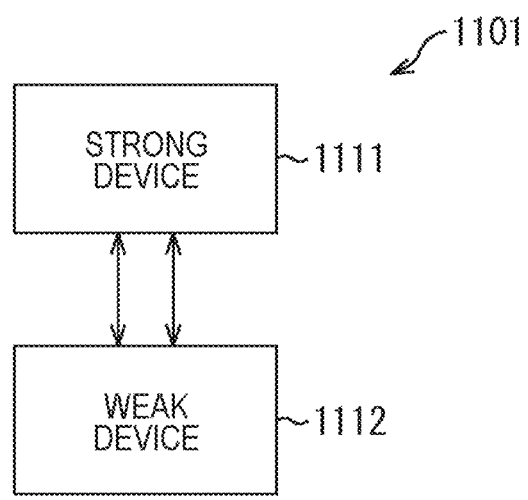
FIG. 58 is a block diagram illustrating a sixth embodiment of an information processing system to which the present technology is applied.

FIG. 58 is a block diagram illustrating a configuration example of an information processing system 1101 to which the present technology is applied.

The information processing system 1101 includes a strong device 1111 and a strong device 1111. The strong device 1111 and the weak device 1112 are capable of any type of wireless communication and human body communication.

The strong device 1111 is configured by, for example, a stationary personal computer or the like. The weak device 1112 is configured by an information processing apparatus capable of being attached to the user, of any type such as eyeglass type, wristband type, bracelet type, necklace type, neckband type, earphone type, headset type, head mount type, and clothing type, for example. Note that, hereinafter, a case in which the weak device 1112 is mainly mounted on a user will be described as an example.

The strong device 1111 can perform user authentication in a state of being in contact with the user. Furthermore, an authentication level of the strong device 1111 is higher than that of the weak device 1112.

Meanwhile, the weak device 1112 has a lower authentication level than the strong device 1111. That is, the weak device 1112 has a user authentication function having a lower authentication level than the strong device 1111 or does not have a user authentication function.

Then, in a case where the strong device 1111 generates authentication information and detects that the strong device 1111 is mounted on the same user as the weak device 1112 by human body communication, the strong device 1111 transmits the authentication information to the weak device 1112.

The weak device 1112 sets an authentication state on the basis of the authentication information of the strong device 1111 and its own user authentication result (in a case of having a user authentication function). Then, the weak device 1112 enables or disables the functions according to the authentication level, and executes processing of the enabled function.

<Configuration Example of Strong Device 1111>

Figure 59:
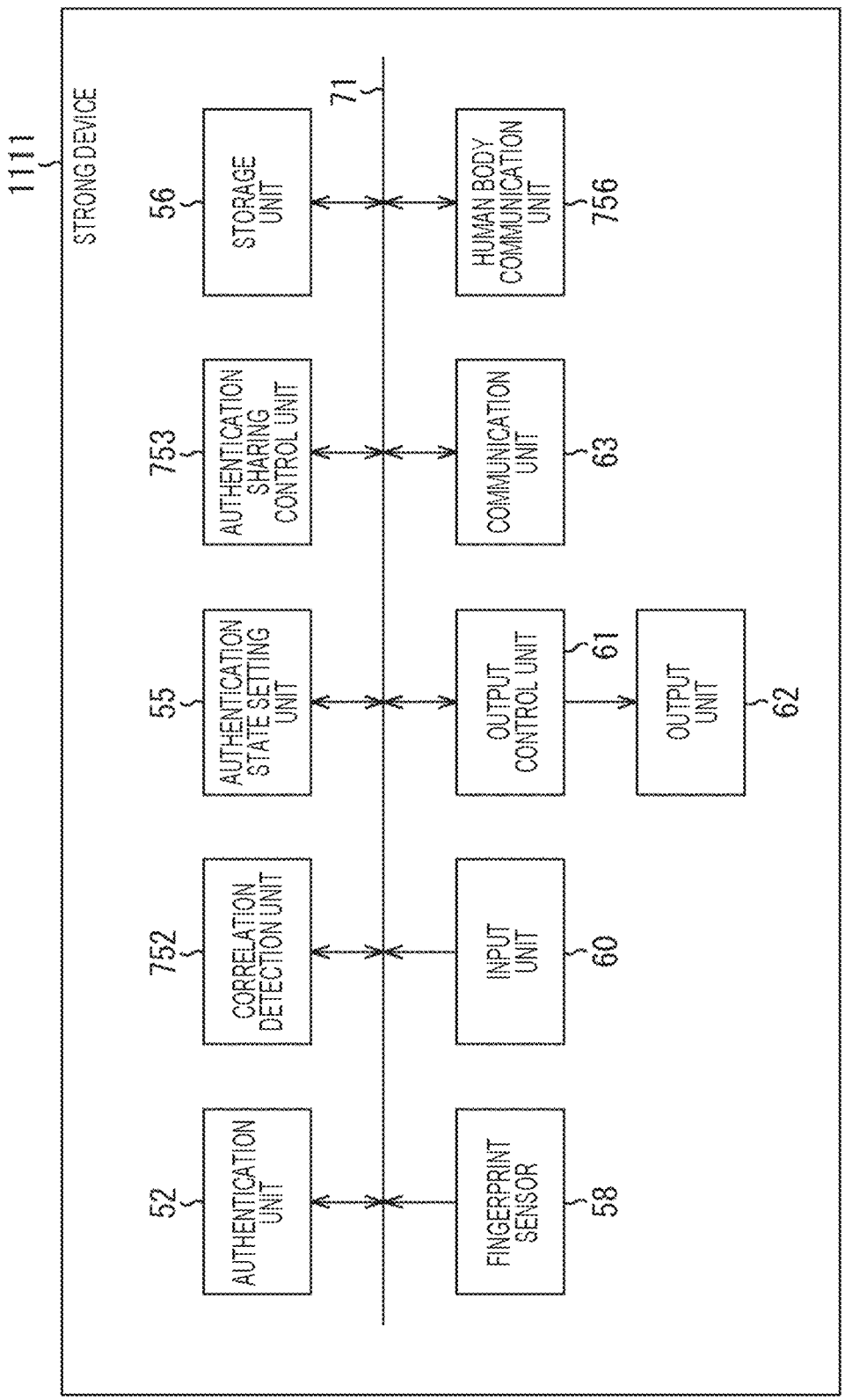
FIG. 59 is a block diagram illustrating a configuration example of a strong device of FIG. 58.

FIG. 59 illustrates a configuration example of the strong device 1111 of FIG. 58. Note that a portion corresponding to the strong device 711 of FIG. 44 is denoted by the same reference numeral, and description thereof is appropriately omitted.

The strong device 1111 has a configuration in which the mount detection unit 51, the infrared sensor 57, the biometric data detection unit 751, the biometric information management unit 754, and the blood glucose sensor 755 are deleted from the strong device 711 of FIG. 44.

<Configuration Example of Weak Device 1112>

Figure 60:
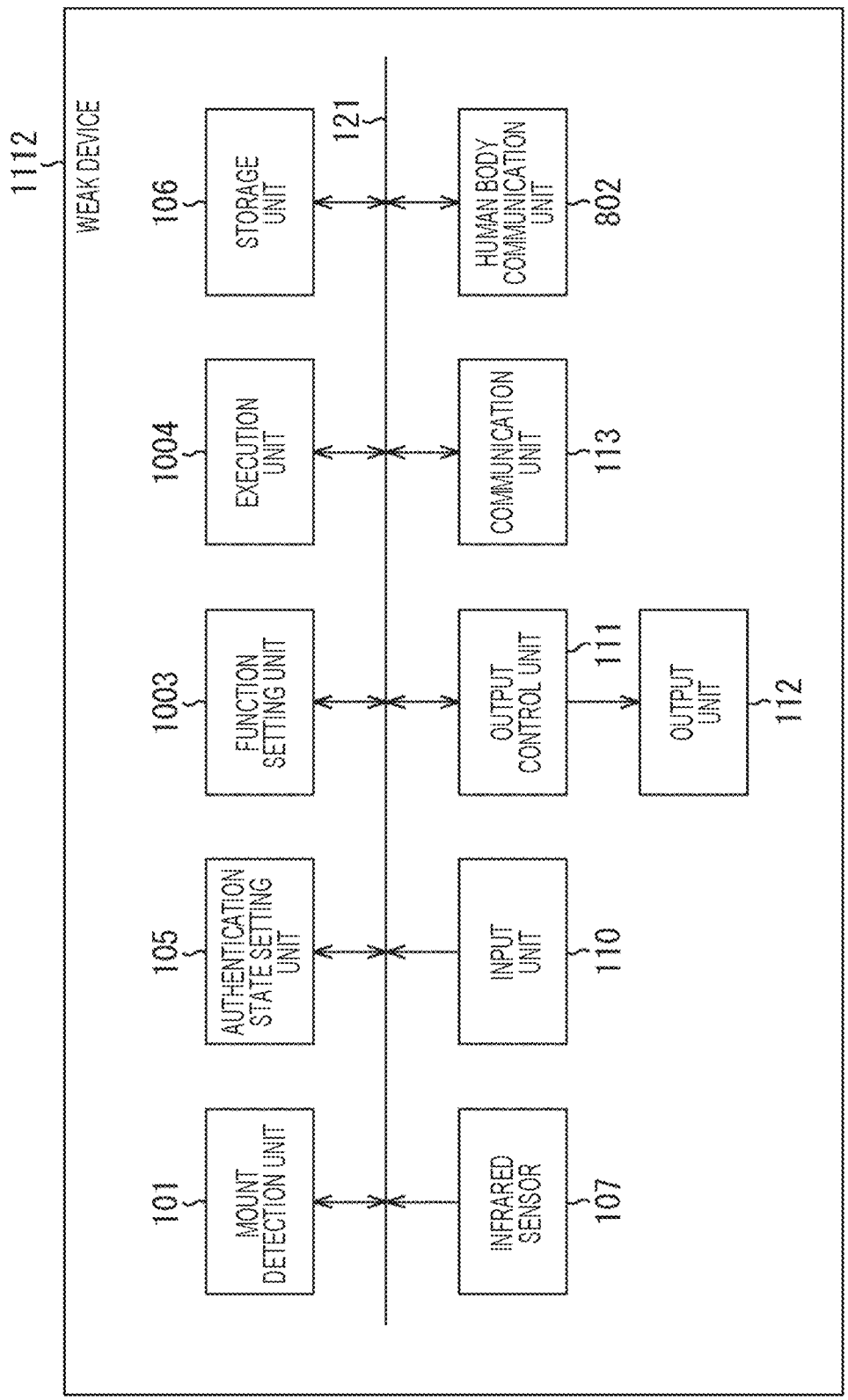
FIG. 60 is a block diagram illustrating a configuration example of a weak device of FIG. 58.

FIG. 60 illustrates a configuration example of the weak device 1112 of FIG. 58. Note that portions corresponding to the weak device 712 of FIG. 45 and the weak device 912 of FIG. 52 are denoted by the same reference numerals, and description thereof is appropriately omitted.

The weak device 1112 has a configuration in which the biometric data detection unit 103, the blood glucose sensor 109, and the biometric information management unit 801 are deleted from the weak device 712 of FIG. 45, and the function setting unit 1003 and the execution unit 1004 of the weak device 912 of FIG. 52 are added.

<Configuration Example of Authentication Module 1151>

Figure 61:
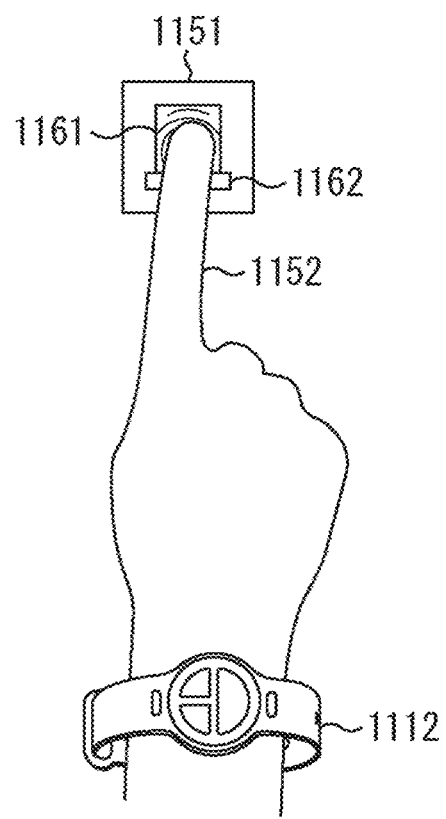
FIG. 61 is a diagram illustrating a configuration example of an authentication module for the strong device of FIG. 59.

FIG. 61 illustrates a configuration example of the authentication module 1151 included in the strong device 1111.

The authentication module 1151 includes a fingerprint reading module 1161 and an electrode 1162. The fingerprint reading module 1161 and the electrode 1162 are arranged to be adjacent to each other in the vertical direction in the drawing.

The fingerprint reading module 1161 is provided in the fingerprint sensor 58 and includes a lens, an image sensor, and the like for capturing a user's fingerprint. For example, as in this example, when the user holds an index finger 11152 of the right hand over the fingerprint reading module 1161, the fingertip of the index finger 1152 is captured and the shape of the fingerprint of the index finger 1152 is detected.

The electrode 1162 is an electrode provided in the human body communication unit 756 and for performing human body communication. For example, as in this example, when the user touches the electrode 1162 with the index finger 1152, the human body communication unit 756 performs the human body communication unit by causing a weak current to flow between the electrode 1162 and an electrode on a back surface of a case of the weak device 1112 via the user's body.

<Processing of Strong Device 1111>

Figure 62:
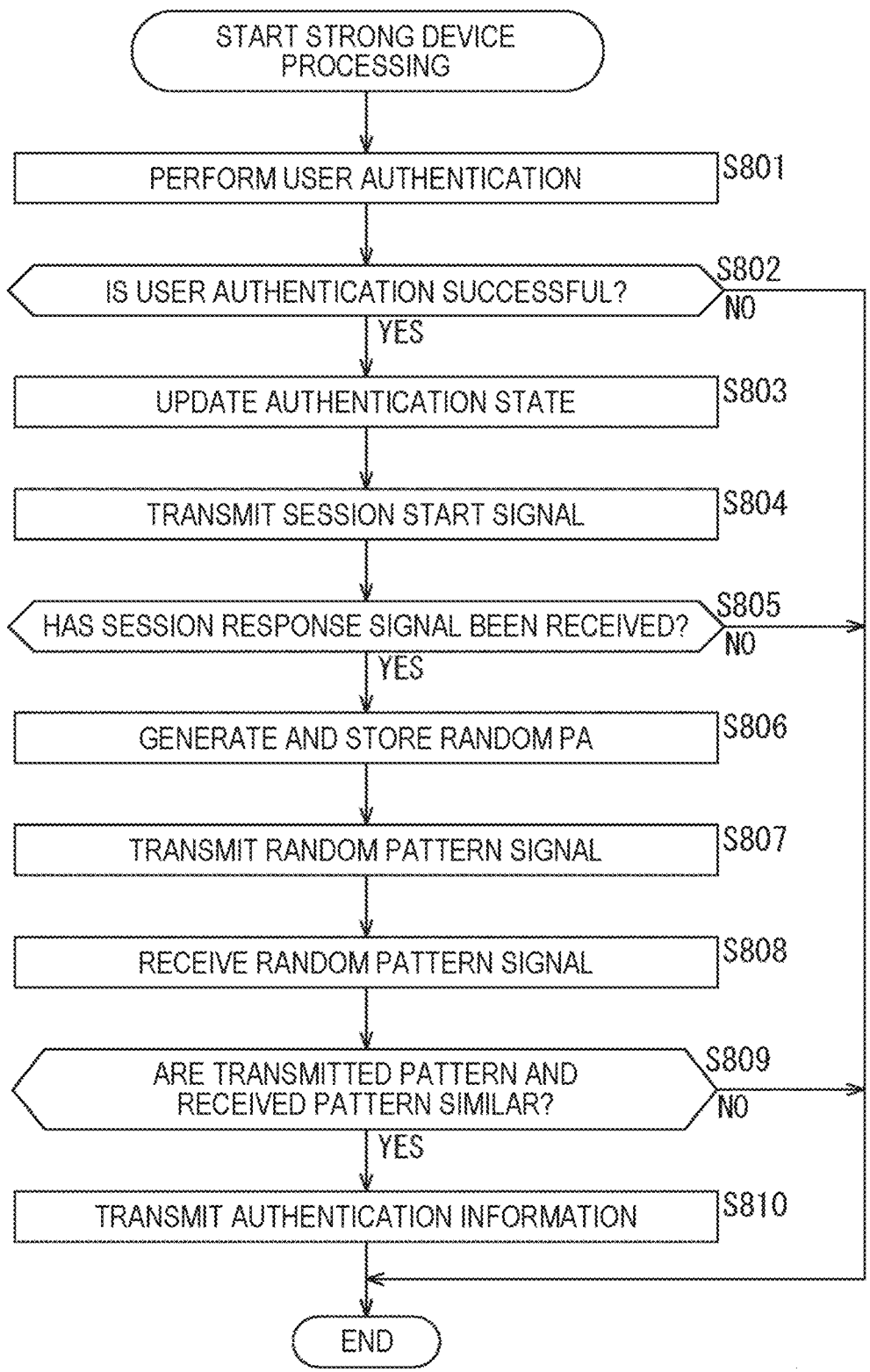
FIG. 62 is a flowchart for describing processing of the strong device of FIG. 59.

Next, processing executed by the strong device 1111 will be described with reference to the flowchart in FIG. 62.

This processing is started when, for example, the user holds the finger over the fingerprint reading module 1161 and brings the finger into contact with the electrode 1162, as illustrated in FIG. 61, after performing a predetermined operation for sharing the authentication information via the input unit 60.

In step S801, the strong device 1111 performs user authentication. Specifically, the fingerprint sensor 58 detects a shape of a fingerprint of the user and supplies sensor data indicating a detected result to the authentication unit 52. The authentication unit 52 compares the shape of the fingerprint indicated in the acquired sensor data with the shape of the fingerprint indicated in the collation data stored in the storage unit 56.

Figure 54:
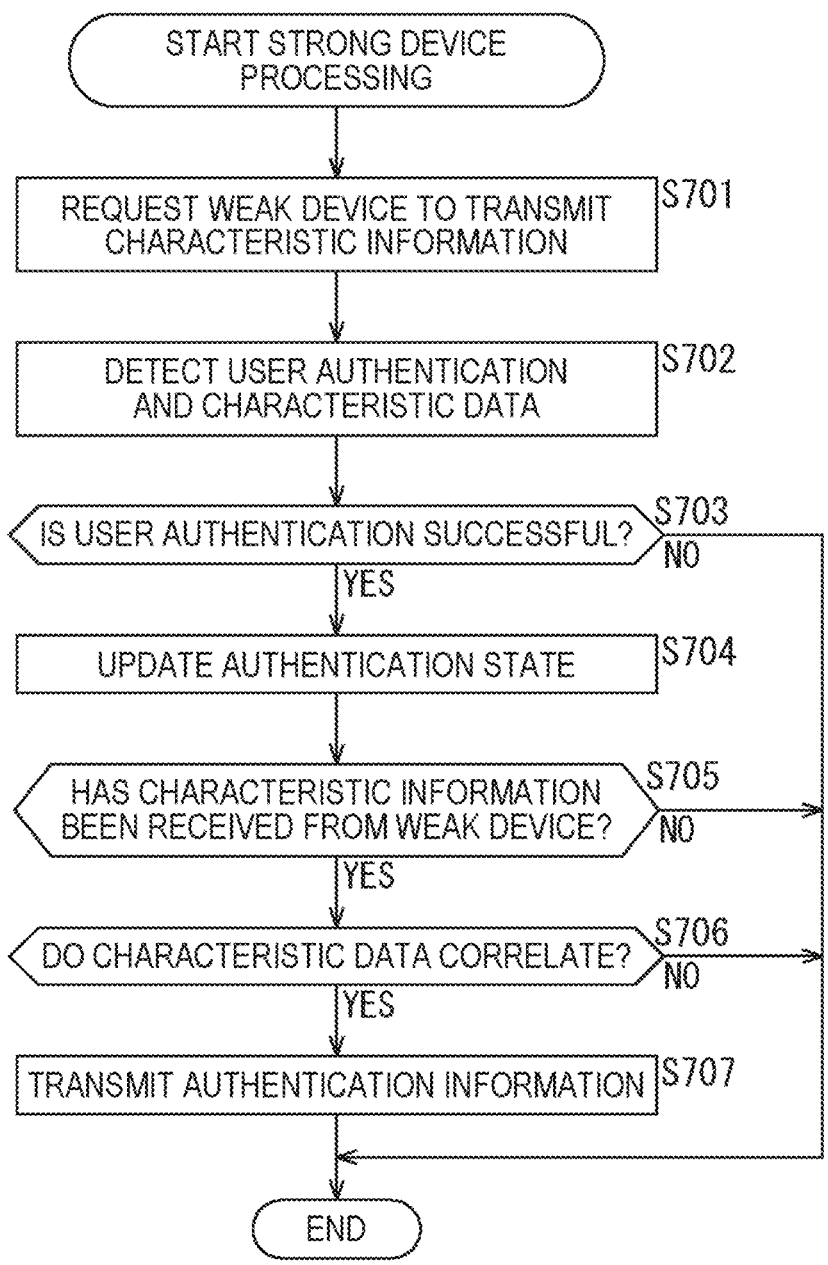
FIG. 54 is a flowchart for describing processing of the strong device of FIG. 51.

In step S802, whether or not the user authentication is successful is determined similarly to the processing of step S703 of FIG. 54. In a case where it is determined that the user authentication is successful, the processing proceeds to step S803.

In step S803, the authentication state is updated similarly to the processing of step S6 of FIG. 7.

In step S804, the communication unit 63 transmits a session start signal.

In response, as will be described below, in a case where the weak device 1112 receives the session start signal from the strong device 1111, the weak device 1112 transmits a session response signal.

In step S805, the communication unit 63 determines whether or not the session response signal has been received. In a case where it is determined that the session response signal has been received, the processing proceeds to step S806.

Figure 48:
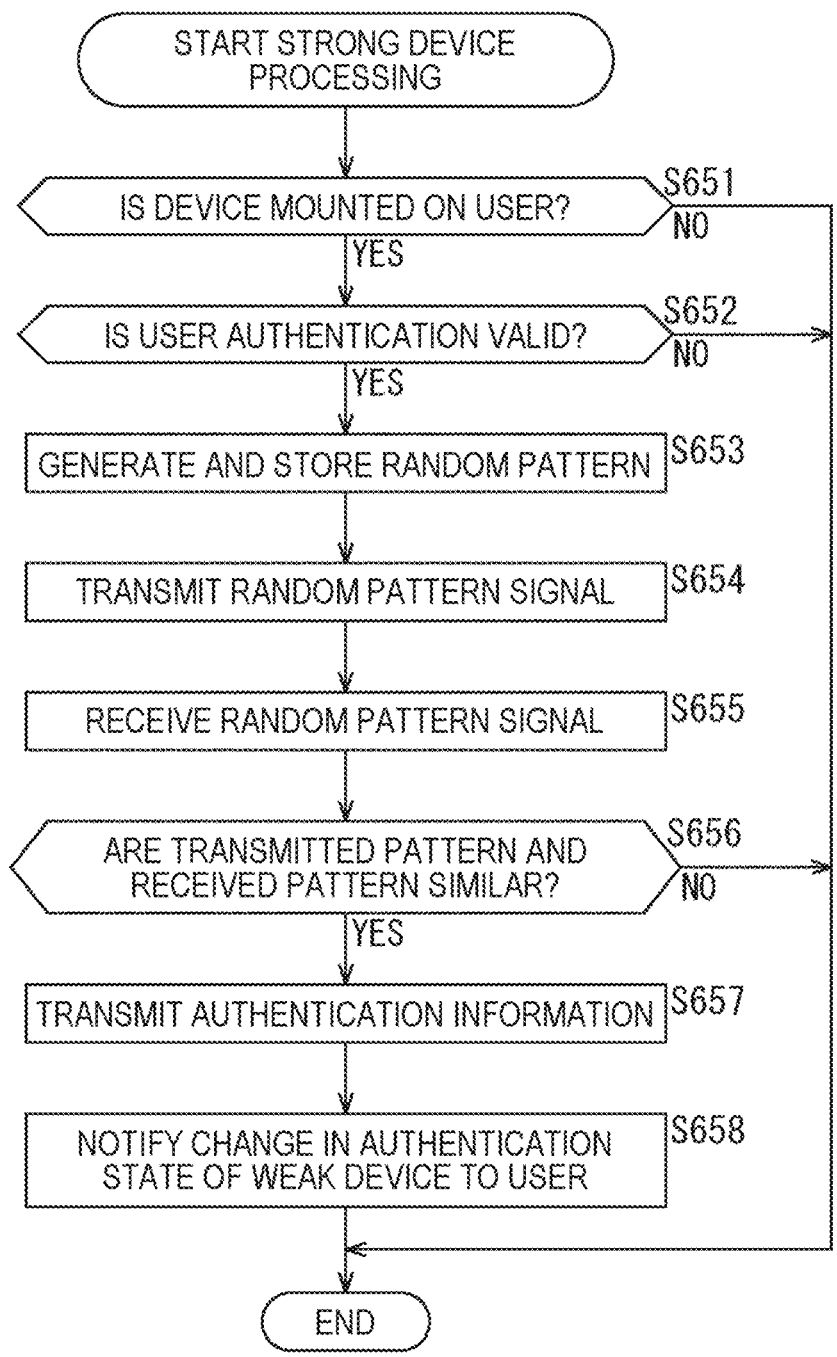
FIG. 48 is a flowchart for describing processing of the strong device of FIG. 44.

In step S806, a random pattern is generated and stored similarly to the processing of step S653 of FIG. 48.

In step S807, a random pattern signal is transmitted similarly to the processing of step S654 of FIG. 48.

In step S808, the random pattern signal is received similarly to the processing of step S655 of FIG. 48.

In step S809, whether or not the transmitted pattern and the received pattern are similar is determined similarly to the processing of step S656 of FIG. 48. In a case where it is determined that the transmitted pattern and the received pattern are similar, the processing proceeds to step S810.

In step S810, the authentication information is transmitted similarly to the processing of step S657 of FIG. 48.

Then, the processing ends.

Meanwhile, in a case where it is determined that the user authentication has failed in step S802, in a case where it is determined that the session response signal has not been received in step S805, or in a case where it is determined that the transmitted pattern and the received pattern are not similar in step S809, the processing ends without transmitting the authentication information to the weak device 1112.

<Processing of Weak Device 1112>

Figure 63:
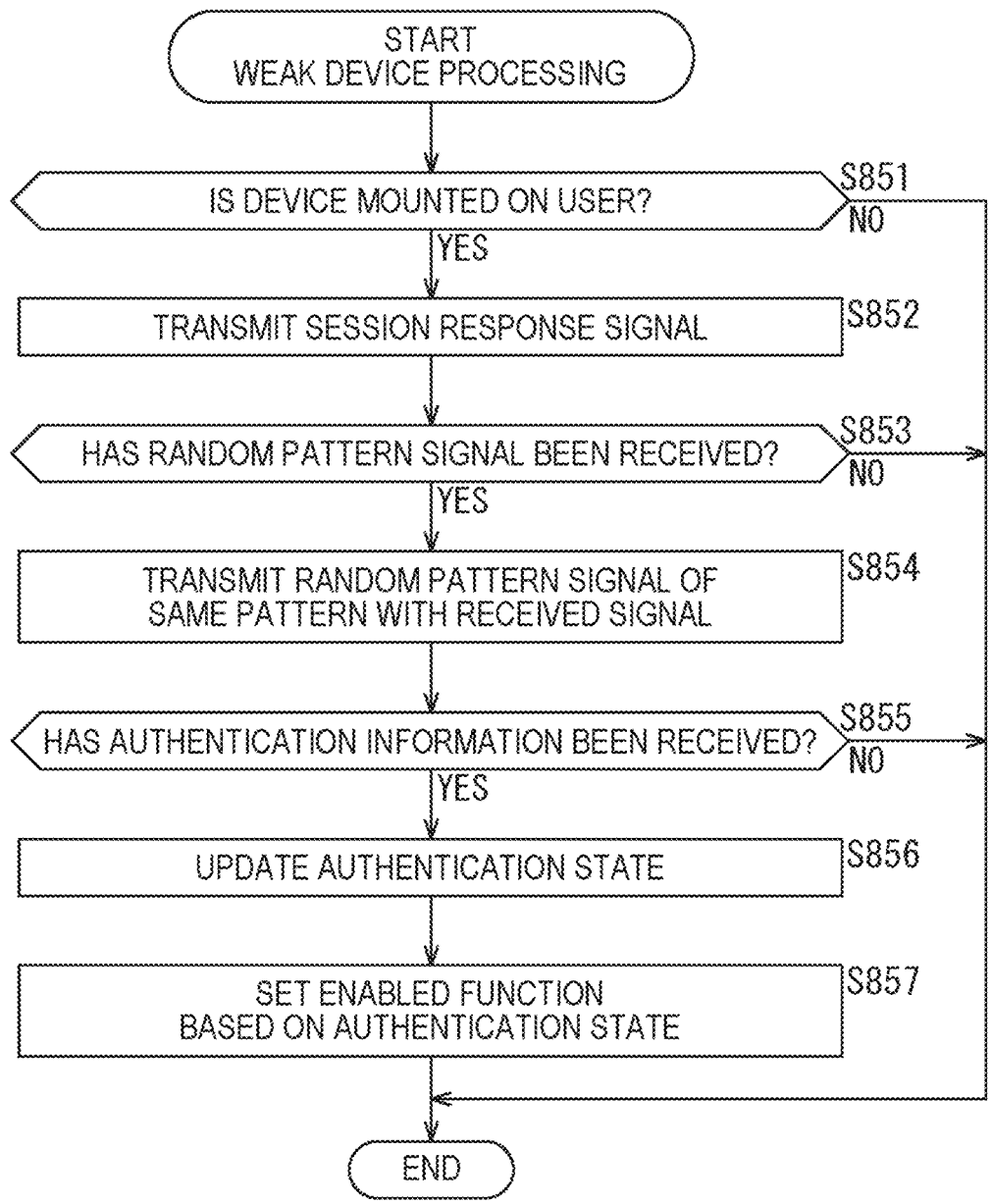
FIG. 63 is a flowchart for describing processing of the weak device of FIG. 60.

Next, processing executed by the weak device 1112 corresponding to the processing of the strong device 1111 of FIG. 62 will be described with reference to the flowchart of FIG. 63.

This processing is started when, for example, the communication unit 113 receives the session start signal transmitted from the strong device 1111.

In step S851, whether or not the weak device 1112 is mounted on the user is determined, similarly to the processing of step S601 of FIG. 46. In a case where it is determined that the weak device 1112 is mounted on the user, the processing proceeds to step S852.

In step S852, the communication unit 113 transmits the session response signal corresponding to the session signal.

In step S853, whether or not the random pattern signal has been received is determined similarly to the processing of step S603 of FIG. 46. In a case where it is determined that the random pattern signal has been received, the processing proceeds to step S854.

In step S854, a random pattern signal having the same pattern as the received signal is transmitted similarly to the processing of step S604 of FIG. 46.

In step S855, whether or not the authentication information has been received is determined similarly to the processing of step S605 of FIG. 46. In a case where it is determined that the authentication information has been received, the processing proceeds to step S856.

In step S856, the authentication state is updated similarly to the processing of step S606 of FIG. 46.

Figure 56:
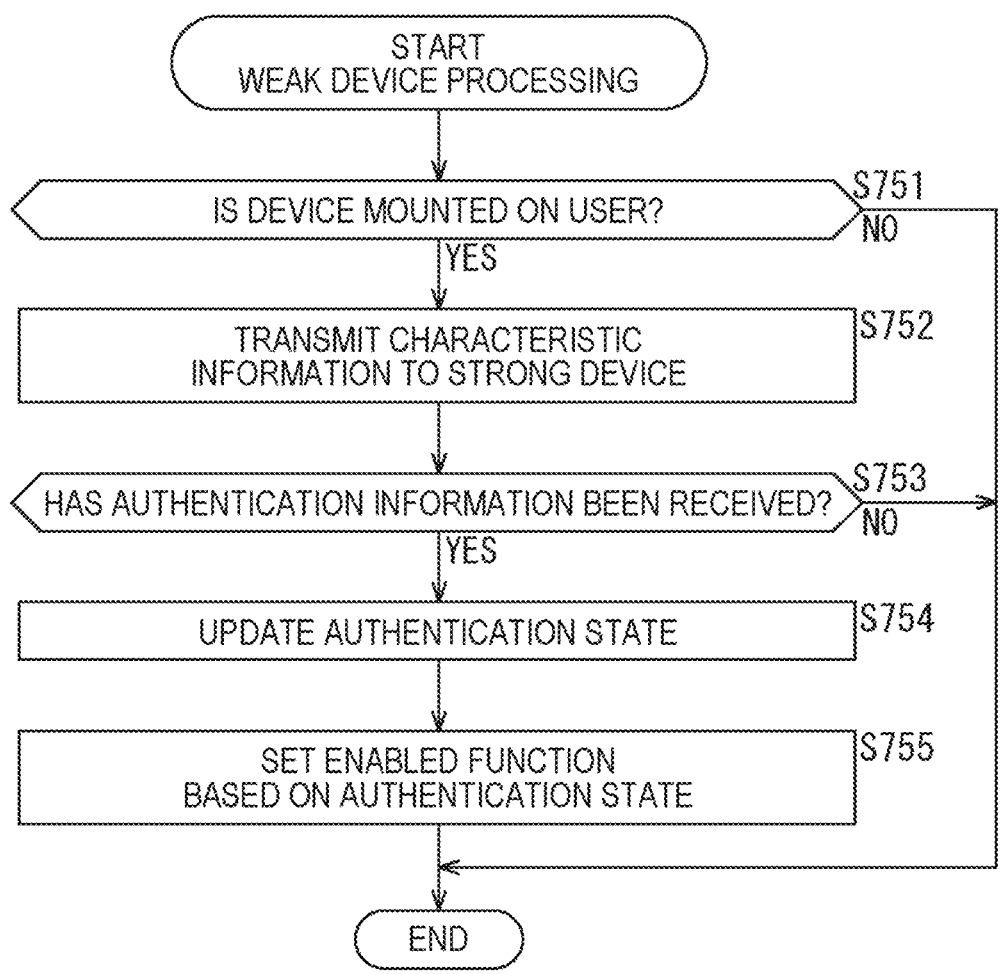
FIG. 56 is a flowchart for describing processing of the weak device of FIG. 52.

In step S857, the enabled function is set on the basis of the authentication state, similarly to the processing of step S755 of FIG. 56.

Thereafter, the processing of the weak device 1112 ends.

Meanwhile, in a case where it is determined that the weak device 1112 is not mounted on the user in step S851, in a case where it is determined that the random pattern signal is not received in step S853, or in a case where it is determined that the authentication information is not received in step S855, the processing ends without changing the authentication state and setting enabled functions.

The user can cause the authentication information of the strong device 1111 to be shared with the weak device 1112 by simply holding the finger over the fingerprint reading module 1161 and touching the electrode 1162 with the same finger in the state of mounting the weak device 1112 on the arm, as described above. That is, the authentication information can be easily and safely shared between the strong device 1111 and the weak device 1112. Furthermore, the functions of the weak device 1112 can be easily and safely enabled.

Furthermore, in the strong device 1111, the user authentication and the characteristic data detection are executed in parallel while the user is in contact with the strong device 1111. Therefore, the user targeted for user authentication and the user targeted for characteristic data detection being the same can be reliably guaranteed.

Here, use examples of the information processing system 1101 will be described.

For example, the information processing system 1101 can be applied to a company management system.

For example, in a case where a company employee forgets its employee ID card or a wearable device functioning the employee ID card, the employee rents the weak device 1112 at a reception desk at a company entrance. Then, the employee wears the weak device 1112 on its arm, holds a finger of the hand wearing the weak device 1112 over the fingerprint reading module 1161, and touches the electrode 1162 with the same finger. Thereby, the authentication information of the strong device 1111 generated on the basis of the fingerprint authentication is transmitted to the weak device 1112. For example, the authentication information includes an employee ID of the identified employee, so that the employee ID is registered in the weak device 1112. Then, the employee can enter a gate, use a cafeteria, and the like, by using the weak device 1112, similarly to a case where the employee holds the employee ID card or the like.

Furthermore, for example, a guest who visits the company rents a weak device at the reception. Then, the guest wears the weak device 1112 on its arm and inputs a predetermined password using a keyboard provided in the input unit 60 of the strong device 1111. For example, an electrode is provided in an Enter key of the keyboard, and when the guest presses the Enter key, the human body communication is performed. Thereby, the authentication information of the strong device 1111 generated on the basis of the password authentication is transmitted to the weak device 1112. For example, the authentication information includes a guest ID, so that the guest ID is registered in the weak device 1112. Then, the guest can enter a guest area, use the employee cafeteria, and the like by using the weak device 1112.

Modification of Sixth Embodiment

Hereinafter, modifications of the above-described sixth embodiment will be described.

For example, the weak device 1112 may detect the correlation of the transmission/reception signals of the human body communication.

Furthermore, the sixth embodiment can be applied to a case where a key of a locker and a valuables box of various facilities, events, or the like is implemented by the weak device 1112 and shared by a plurality of users, for example.

7. Modification

Hereinafter, modifications of the above-described embodiments of the present technology will be described.
<Modification of Characteristics to be Detected>
The characteristic used for detecting whether or not each device is attached to the same user is not limited to the above-described examples, and another characteristic may be used or a plurality of characteristics may be used in combination.

For example, an amount of activity of the user can be used.

Figure 64:
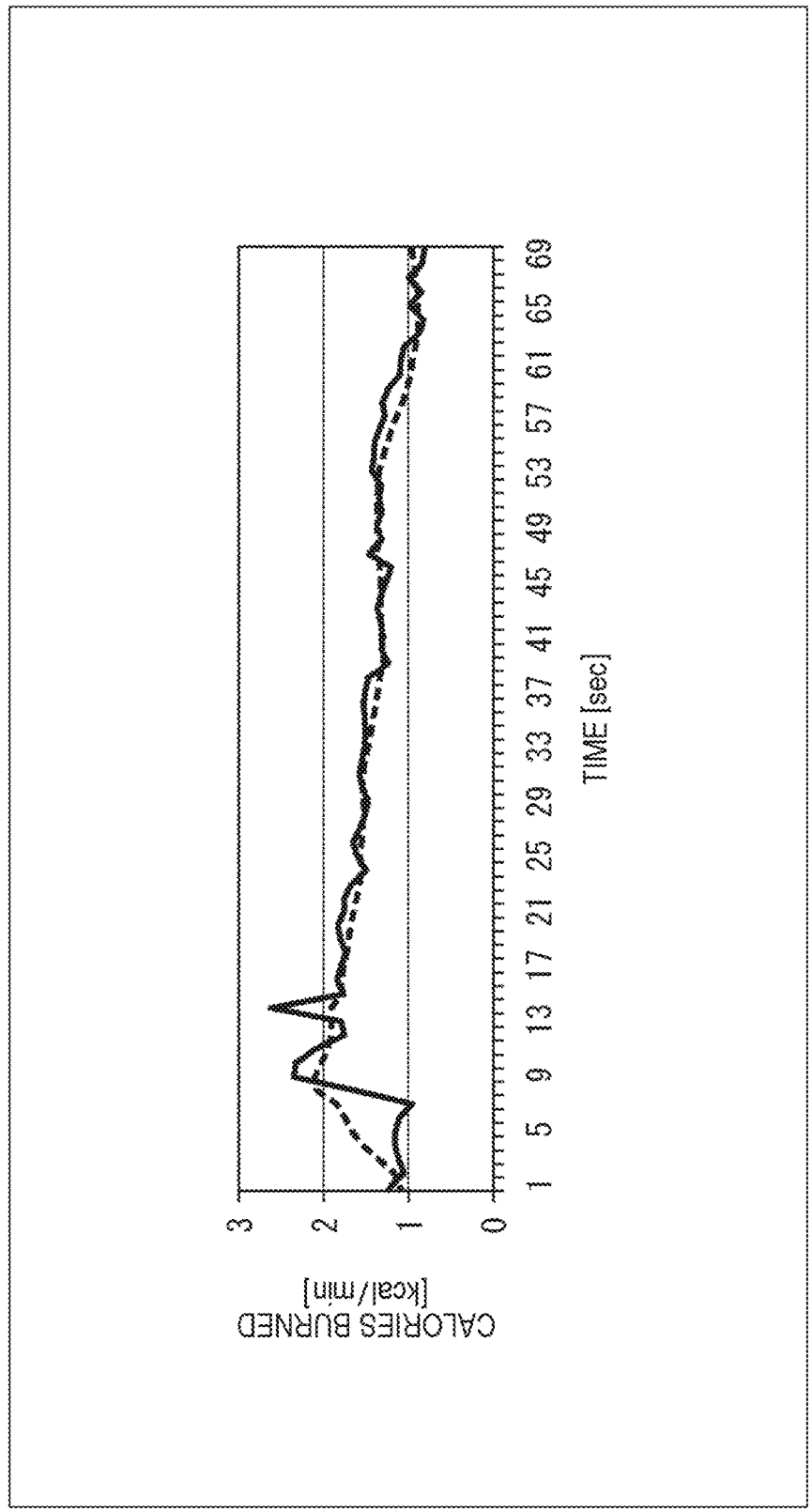
FIG. 64 is a graph illustrating an example of transition of an amount of activity.

FIG. 64 illustrates an example of time-series transition of the amount of activity (calories burned) estimated on the basis of data detected by the strong device with a high authentication level and the weak device with a low authentication level. The horizontal axis represents the time (in seconds), and the vertical axis represents the calories burned (kcal/min). The solid line represents the amount of activity estimated in the strong device, and the dotted line represents the amount of activity estimated in the weak device.

The amount of activity of the user can be estimated on the basis of, for example, the acceleration and the heart rate. Therefore, for example, an acceleration sensor and a heart rate sensor may be provided in the strong device and the weak device, and the amount of activity of the user is estimated on the basis of the acceleration and the heart rate detected by each of the devices. Note that the amount of activity can also be estimated using the pulse rate instead of the heart rate, using a pulse sensor instead of the heart rate sensor.

Furthermore, a maximal oxygen uptake of the user can also be used, for example.

Figure 65:
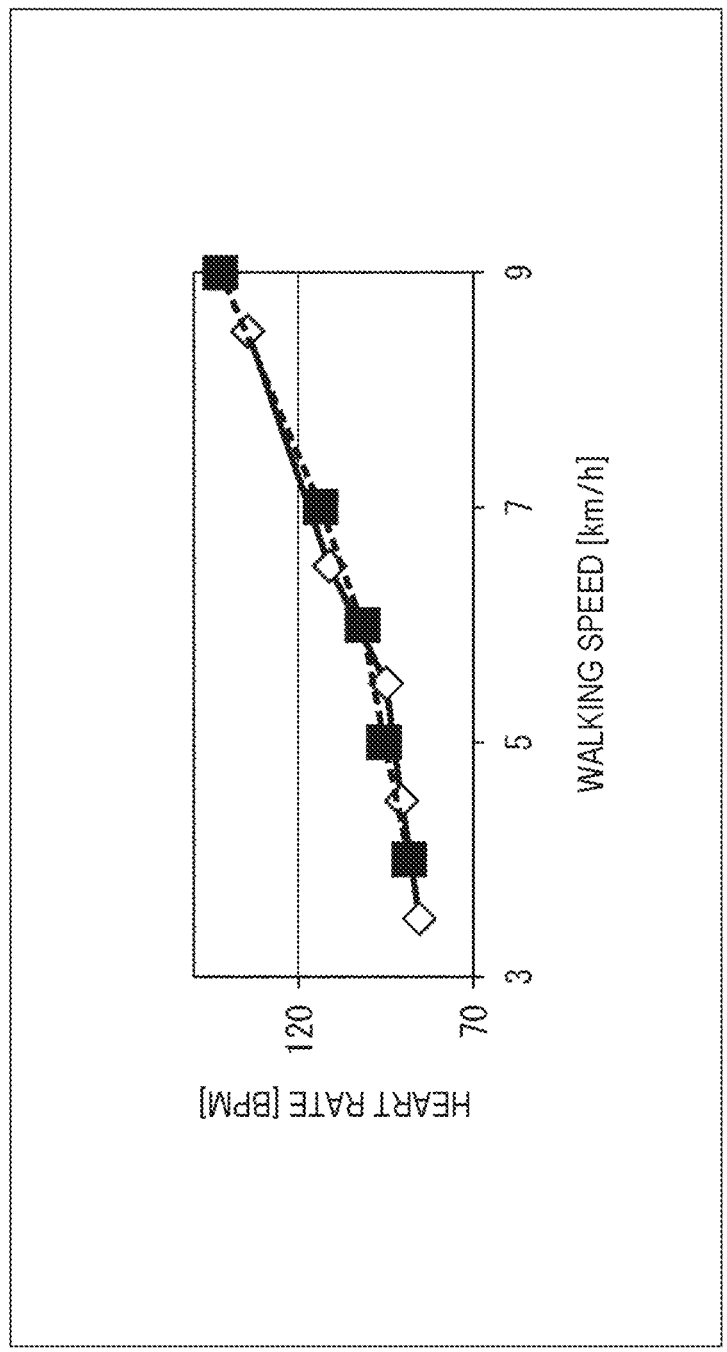
FIG. 65 is a graph illustrating an example of a relationship between a walking speed and a heart rate.

FIG. 65 illustrates an example of measurement results of the user's walking speed and heart rate. The horizontal axis represents the walking speed (km/h), and the vertical axis represents the heart rate (BPM). The solid line represents the measurement result in the strong device, and the dotted line represents the measurement result in the weak device.

The maximum oxygen uptake can be estimated on the basis of, for example, a coefficient of a linear approximation that represents the relationship between the walking speed and the heart rate. Therefore, an acceleration sensor or a speed sensor and a heart rate sensor are provided in each device, the walking speed and the heart rate of the user are measured, and the maximum oxygen uptake may be estimated on the basis of measurement results. Note that the maximum oxygen uptake can also be estimated using the pulse rate instead of the heart rate, using a pulse sensor instead of the heart rate sensor.

Moreover, for example, a sleep characteristic of the user can be used.

Figure 66:
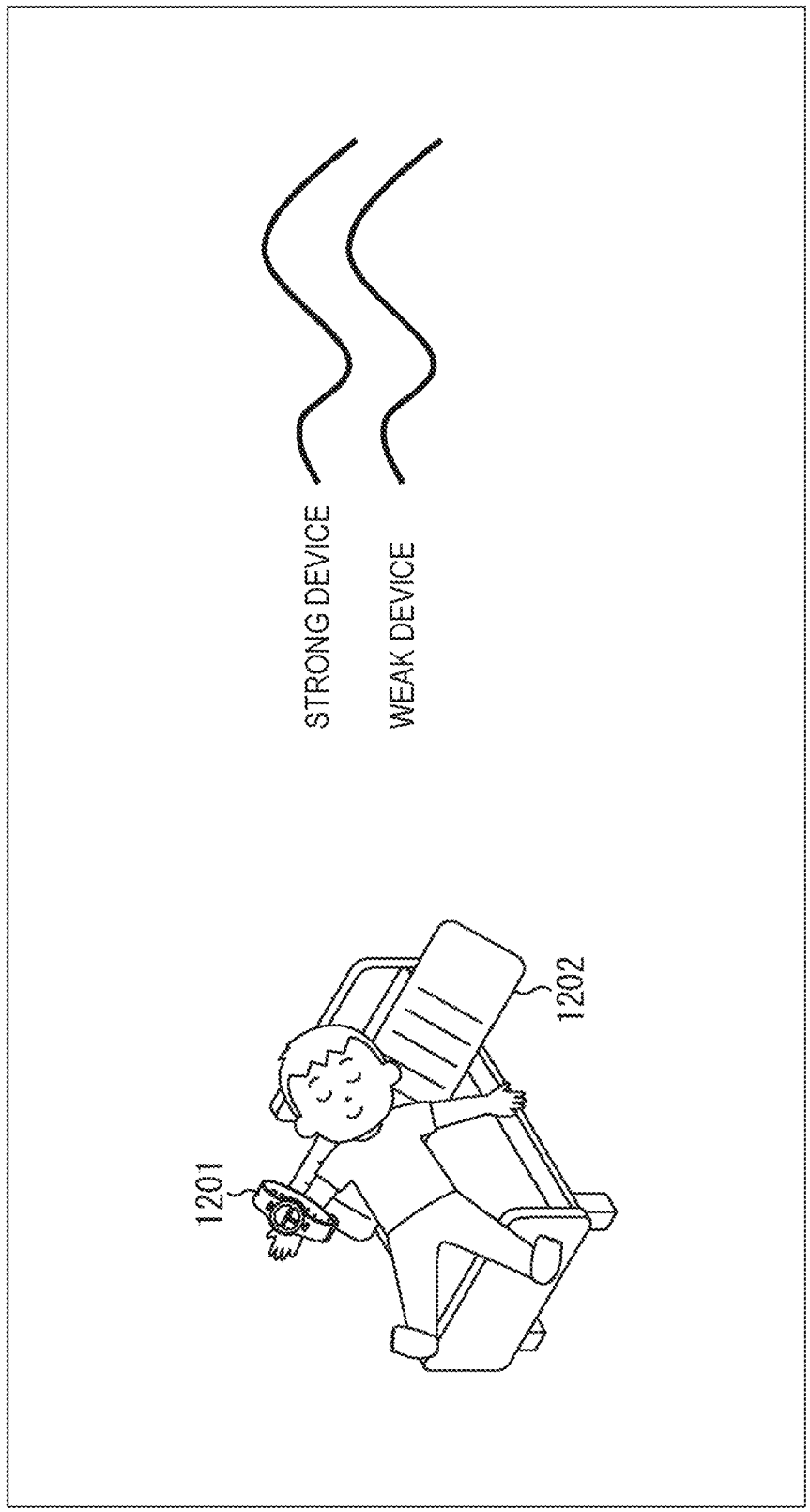
FIG. 66 is a diagram illustrating an example of the strong device and the weak device.

For example, as illustrated in FIG. 66, the user wears a wristband-type strong device 1201 during sleep and uses a cushion-type weak device 1202 as a pillow. For example, the strong device 1201 includes an acceleration sensor and detects a user's turnover on the basis of the sensor data of the acceleration sensor. Furthermore, for example, the weak device 1202 includes a motion sensor and detects the user's turning over on the basis of the sensor data of the motion sensor. Then, the time-series transition of the user's turning over is used as a characteristic of the user.

Furthermore, for example, the strong device 1201 and the weak device 1202 may be provided with a sleep meter, and rhythm, depth, and the like of sleep measured by the sleep meter may be used as a characteristic of the user. Note that the left side of FIG. 66 is a graph illustrating an example of the user's sleep rhythm.

Moreover, a characteristic different from the user's characteristic can be used.

For example, a signal or geomagnetic intensity received by each device can be used as a characteristic.

Figure 67:
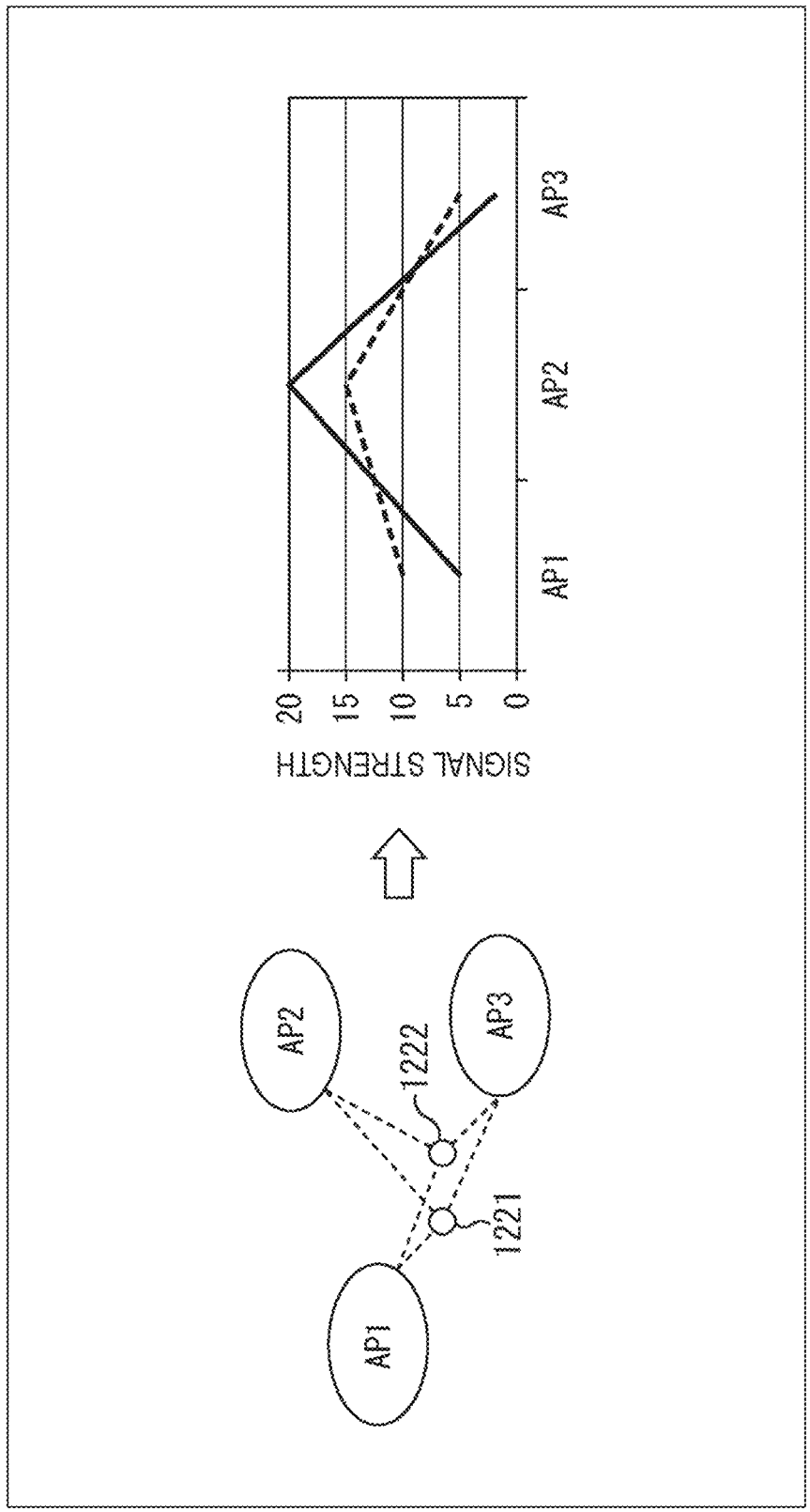
FIG. 67 is a diagram illustrating an example of strength of reception signals from each of access points of the strong device and the weak device.

FIG. 67 illustrates an example of using strength of a signal from each access point as a characteristic.

As illustrated on the left side of FIG. 67, both a strong device 1221 and a weak device 1222 receive signals from access points AP1 to AP3.

The right side of FIG. 67 illustrates distribution of the intensity of the signals received from the access points AP1 to AP3 by the strong device 1221 and the weak device 1222. The horizontal axis represents the access point and the vertical axis represents the signal strength. Furthermore, the solid line represents the distribution of the intensity of the reception signal of the strong device 1221, and the dotted line represents the distribution of the intensity of the reception signal of the weak device 1222.

Here, in a case where the strong device 1221 and the strong device 1221 are mounted on the same user, a strong correlation appears in the distribution of the intensity of the signals received from the access points AP1 to AP3 by each of the devices. Therefore, the strength of the reception signal from each access point can be used as the characteristic data.

<How to Guarantee User Targeted for User Authentication and User Targeted for Characteristic Data Detection are Same Person>

In the above-described series of processing, if the user targeted for user authentication and the user targeted for characteristic data detection being the same person can be guaranteed, that is, it the user who has performed the user authentication wearing the device for which the user authentication has been performed is guaranteed, the authentication information can be more safely shared. For example, a situation in which a user different from a user who wears a device performs the user authentication on the device and the authentication information of the different user is shared can be prevented.

Figure 68:
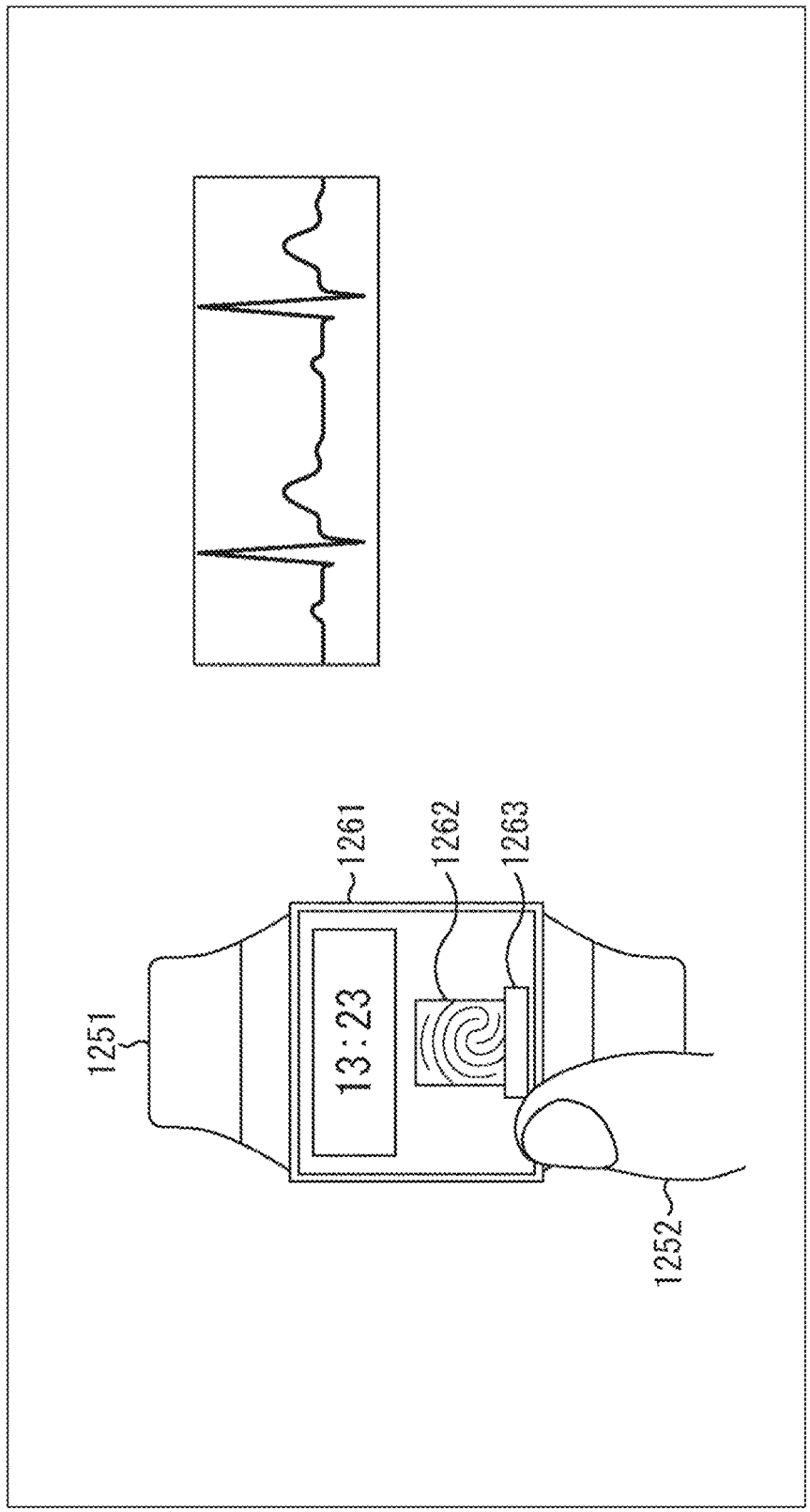
FIG. 68 is a diagram illustrating an example of a wearable device.

For example, by using a wristband-type wearable device 1251 illustrated in FIG. 68, the user targeted for user authentication and the user targeted for characteristic data detection being the same person can be guaranteed.

A fingerprint reading module 1262 and an electrode 1263 are provided on a surface of a case 1261 of the wearable device 1251. The fingerprint reading module 1262 and the electrode 1263 are adjacent to each other in the vertical direction in the drawing. Furthermore, an electrode (not illustrated) is also provided on a back surface of the case 1261, and in a case where the user wears the wearable device 1251, the electrode on the back surface of the case 1261 comes into contact with the skin of the user's wrist.

For example, in a case where the user holds a finger 1252 over the fingerprint reading module 1262 while the user wears the wearable device 1251, the finger 1252 comes into contact with the electrode 1263.

Thereby, the fingerprint authentication is performed on the basis of an image of the fingerprint read by the fingerprint reading module 1262. Furthermore, an action potential or an action current of the user's heart is measured on the basis of a potential difference between the electrode 1263 and the electrode on the back surface of the case 1261. The graph on the right side of FIG. 68 is an example of an electrocardiogram illustrating transition of the action potential or the action current of the user's heart.

Meanwhile, for example, even if a user different from the user wearing the wearable device 1251 holds a finger on the fingerprint reading module 1262 and the finger touches the electrode 1263, the potential difference between the electrode 1263 and the electrode on the back surface of the case 1261 becomes very large. Therefore, it is difficult to measure the action potential or the action current of the user's heart.

Therefore, by using the wearable device 1251, the user who has performed the fingerprint authentication and the user who has measured the action potential or the action current of the heart being the same person can be guaranteed.

Furthermore, for example, a wristband-type wearable device may be provided with a vein authentication module and a pulse sensor. This enables, for example, the user to simultaneously perform vein authentication and pulse rate measurement while wearing a wearable sensor on its arm. Then, by performing the vein authentication and the measurement of the pulse rate at the same time, the user targeted for the vein authentication and the user target for the pulse rate detection being the same can be guaranteed.

Moreover, for example, in a case of using face authentication, the user who is performing the face authentication wearing the wearable device may be recognized by image recognition. For example, a camera that captures an image for face recognition may capture an image including the user's face to a portion on which the wearable device is mounted in an angle of view, and recognize the wearable device in the captured image. Thereby, the user targeted for face authentication wearing the wearable device is guaranteed.

Furthermore, for example, when the wearable device is mounted on the user, the user's blood may be collected, and the collected blood may be used for DNA authentication. This guarantees that the user targeted for user authentication wears the wearable device.

Moreover, for example, a chip that enables short-range wireless communication such as near field communication (NFC) and radio frequency identifier (RFID) and stores data for user authentication may be embedded near a position where the user's wearable device is mounted. Then, when the wearable device is mounted on the user, the user authentication may be performed by reading the authentication data from the chip. This guarantees that the user targeted for user authentication wears the wearable device.

<Modification of Authentication Method and Authentication Level>

The above-described user authentication method is an example and the authentication method is not particularly limited in the present technology as long as the authentication level differs among devices.

For example, face authentication, iris authentication, authentication using an electrocardiogram, password authentication, PIN authentication, and the like can be used in addition to the above-mentioned examples.

Furthermore, for example, one device may have a user authentication function having a plurality of different authentication levels, set an authentication level on the basis of the type of successful user authentication, and share authentication information including the set authentication level with another device.

Moreover, for example, an authentication level may be set on the basis of the number of types of successful user authentication, and authentication information including the set authentication level may be shared with another device. That is, the authentication level may be increased as a larger number of types of user authentication is successful.

Furthermore, for example, in a case where the weak device sets the authentication level on the basis of the authentication information received from the strong device, the authentication level may be lowered with the passage of time. In this case, for example, in a case where the authentication level of the weak device becomes equal to or lower than a predetermined threshold value, the user may be prompted to share the authentication information of the strong device with the weak device. Furthermore, whether the strong device and the weak device being attached to the same user may be periodically detected, and the authentication level of the weak device may be maintained.

Moreover, for example, in a case where the weak device receives the authentication information of the strong device, the authentication level lower than that of the strong device may be set. Furthermore, in a case where strong device information is further transmitted from the weak device to another device, the authentication level of the another device may be set to a level lower than that of the weak device. Thereby, the authentication level is lowered each time the authentication information is transferred.

<Modification Regarding Characteristic Data Correlation Detection Processing>

The threshold value used for detecting the correlation of the characteristic data and the period used for calculating the correlation coefficient between the characteristic data may be changed on the basis of, for example, the type, function, and the like of the device.

Furthermore, the threshold value used for detecting the correlation of the characteristic data may be set by the learning processing or may be set on the basis of a result of an experiment by a plurality of users.

<Modification Regarding Authentication Information Sharing Method>

In a case of sharing the authentication information between devices, only part of the authentication information may be shared instead of all the authentication information. For example, only the authentication level may be shared. Information indicating the type of successful user authentication may be shared and each device may set the authentication level on the basis of the type of the user authentication.

Furthermore, in the case of sharing the authentication information among devices via the information processing terminal, as in the first to third embodiments, the information processing terminal may manage a sharing relationship of the authentication information among the respective devices, using a table or the like, without transmitting the authentication information to the devices, for example.

<Modification Regarding Biometric Information>

For example, the content of the authentication information included in the biometric information may be changed. For example, the reliability of the authenticated user (for example, the probability that the authenticated user is Mr. A is 99.9%, or the like) may be included in the authentication information.

Furthermore, an electronic signature may be added to the biometric information.

Other Modifications

In the above description, an example of sharing the authentication information between devices mounted on or in contact with the same user has been described. However, for example, it is possible to share the authentication information with a device carried by the same user.

For example, it is possible to detect whether or not another device is carried by the same user on the basis of the distance from the wearable device mounted on the user. For example, in a case where the wearable device is mounted on the user, and in a case where the distance to the wearable device is less than a predetermined threshold value, it can be determined that the device is carried by the same user, and in a case where the distance to the wearable is equal to or larger than the predetermined threshold value, it can be determined that the device is not carried by the same user.

Figure 69:
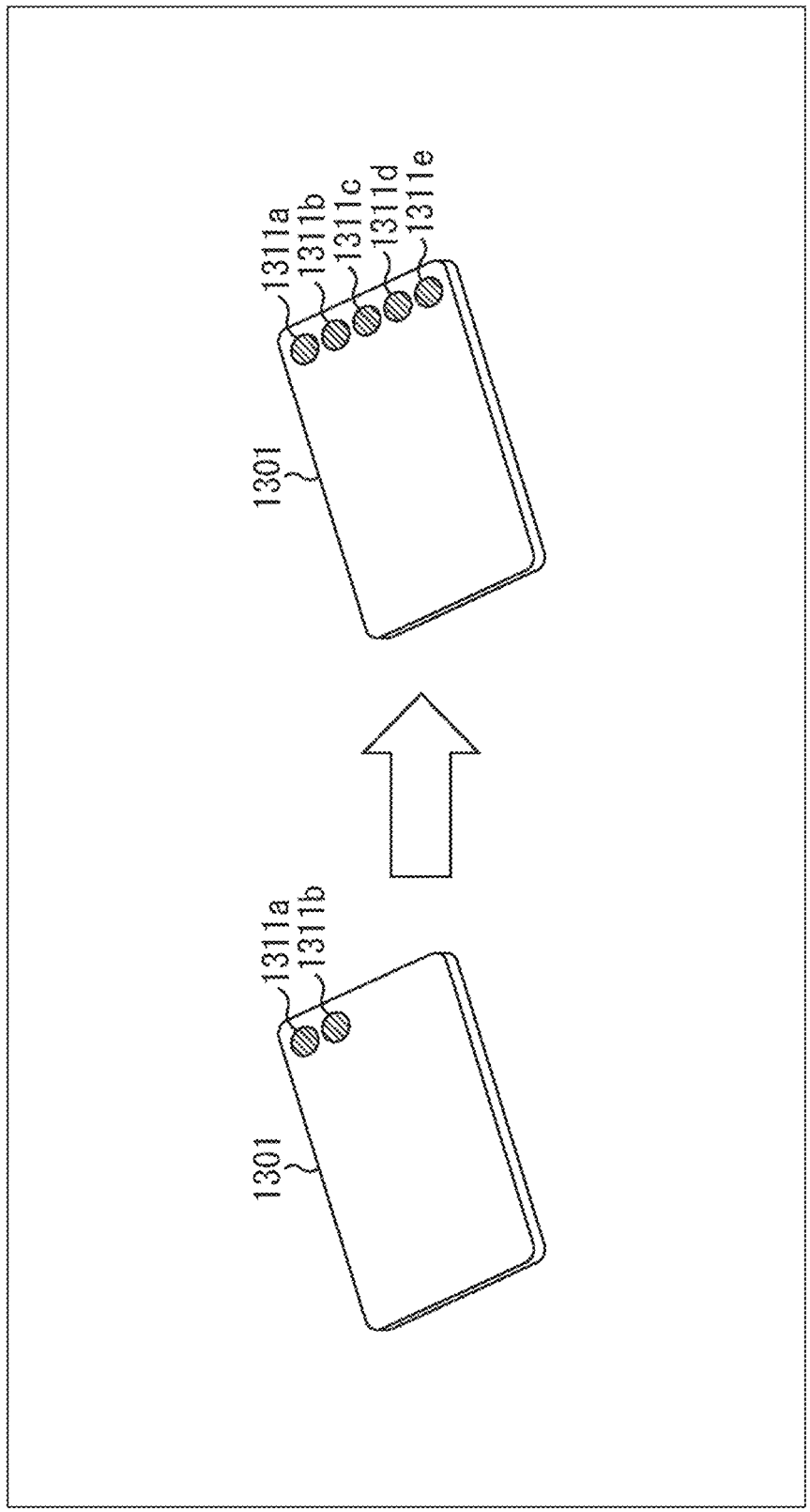
FIG. 69 is a diagram illustrating an example of an authentication level display method.

Thereby, for example, the authentication information can be shared between a card-type device 1301 illustrated in FIG. 69 and another wearable device or the like.

Furthermore, in the device 1301, the authentication level may be displayed and the enabled function may be switched according to the authentication level.

For example, the left side of FIG. 69 illustrates a case where the authentication level of the device 1301 is 2, and the right side illustrates a case where the authentication level of the device 1301 is 5. In the case where the authentication level is 2, LEDs 1311a and 1311b of the device 1301 are lit. In the case where the authentication level is 5, LEDs 1311a to 1311e of the device 1301 are lit. As a result, the user can easily grasp the authentication level of the device 1301.

FIG. 70 illustrates a relationship between the authentication levels of the device 1301 and available characteristics.

In a case where the authentication level is 1, only a prepaid payment function is available. Note that the authentication level 1 is a case where the user authentication has not been performed or a case where the user authentication with EER of 5% or more is successful.

In a case where the authentication level is 2, a function of a membership card of a sports gym will be further available. Note that the authentication level 2 is a case where the user authentication with EER of less than 5% is successful.

In a case where the authentication level is 3, a postpaid payment function will be further available. Note that the authentication level 3 is a case where the user authentication with EER of less than 0.1% is successful.

In a case where the authentication level is 4, a car key function will be further available. Note that the authentication level 4 is a case where the user authentication with EER of less than 0.05% is successful.

In a case where the authentication level is 5, a house key function will be further available. Note that the authentication level 5 is a case where the user authentication with EER of less than 0.01% is successful.

Furthermore, for example, the authentication level of each device may be set offline.

For example, the information processing terminal 13 of FIG. 1 stores the authentication state, the mount state, and the characteristic data of the strong device 11, and the mount state and the characteristic data of the weak device 12. Then, the information processing terminal 13 may calculate a period in which the user authentication of the strong device 11 is valid and the strong device 11 and the weak device 12 are attached to the same user, on the basis of the correlation coefficient of the authentication state of the strong device 11, the mount states of the strong device 11 and the weak device 12, and the characteristic data of the strong device 11 and the weak device 12. Then, the information processing terminal 13 may set the authentication level of the weak device 12 on the basis of the authentication level of the strong device 11, assuming that the authentication information is shared between the strong device 11 and the weak device 12 during the calculated period.

Note that this processing can be executed by the strong device 11 or the weak device 12, or may be executed by two or more of the strong device 11, the weak device 12, and the information processing terminal 13 in a coordinated manner.

8. Others

<Configuration Example of Computer>

The series of processing described above can be executed by hardware or software. In the case of executing the series of processing by software, a program that configures the software is installed in a computer. Here, examples of the computer include a computer incorporated in dedicated hardware, and a general-purpose personal computer or the like capable of executing various functions by installing various programs, for example.

Figure 71:
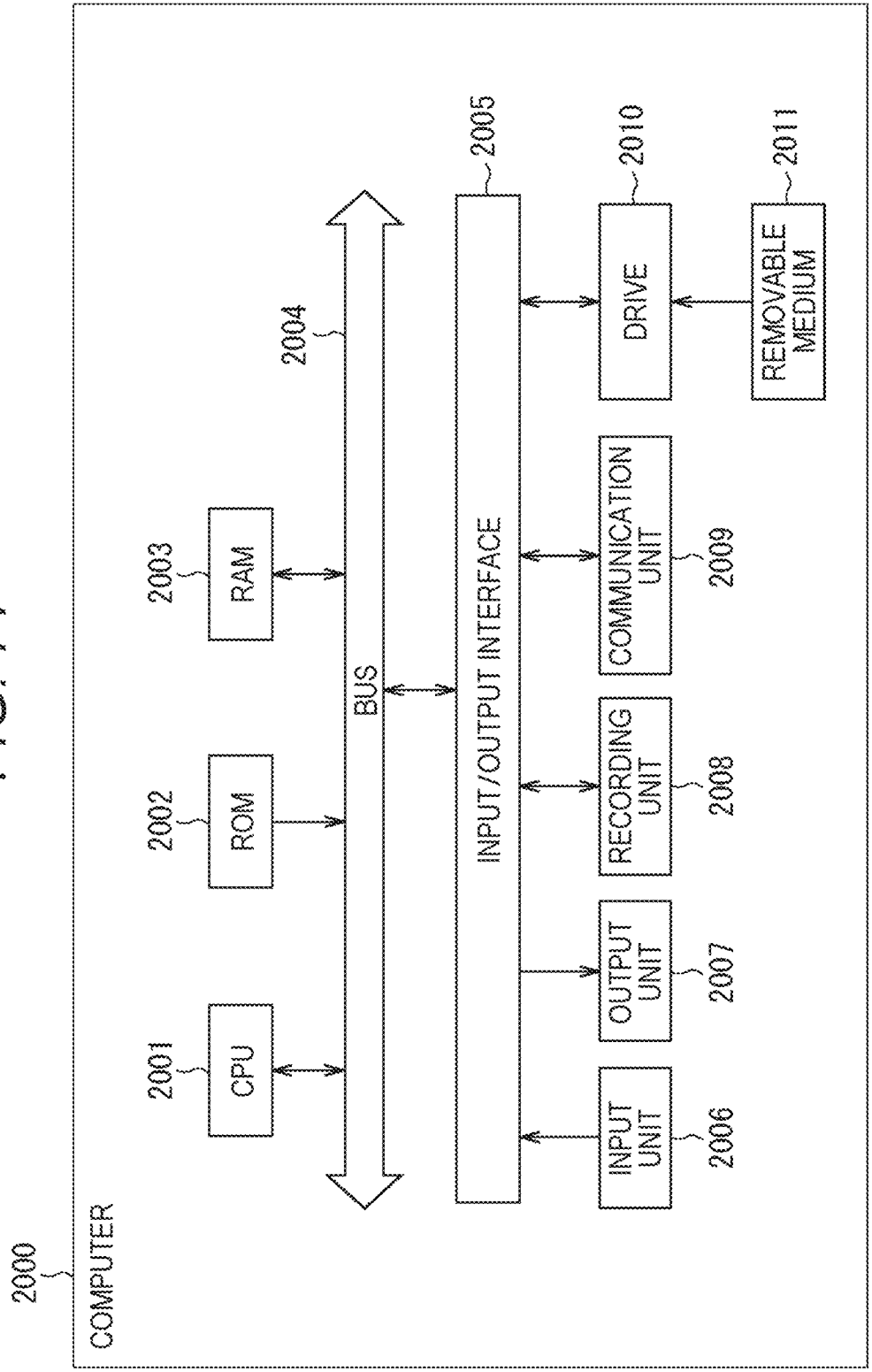
FIG. 71 is a diagram illustrating a configuration example of a computer.

FIG. 71 is a block diagram illustrating a configuration example of hardware of a computer that executes the above-described series of processing by a program.

In a computer 2000, a central processing unit (CPU) 2001, a read only memory (ROM) 2002, and a random access memory (RAM) 2003 are mutually connected by a bus 2004 and mutually perform communication.

Moreover, an input/output interface 2005 is connected to the bus 2004. An input unit 2006, an output unit 2007, a recording unit 2008, a communication unit 2009, and a drive 2010 are connected to the input/output interface 2005.

The input unit 2006 includes an input switch, a button, a microphone, an image sensor, and the like. The output unit 2007 includes a display, a speaker, and the like. The recording unit 2008 includes a hard disk, a nonvolatile memory, and the like. The communication unit 2009 includes a network interface and the like. The drive 2010 drives a removable medium 2011 such as a magnetic disk, an optical disk, a magneto-optical disk, or a semiconductor memory.

In the computer configured as described above, the CPU 2001 loads a program recorded in the recording unit 2008 into the RAM 2003, for example, and executes the program via the input/output interface 2005 and the bus 2004, thereby performing the above-described series of processing.

The program to be executed by the computer (CPU 2001) can be recorded on the removable medium 2011 as a package medium and the like, for example, and can be provided. Furthermore, the program can be provided via a wired or wireless transmission medium such as a local area network, the Internet, or digital satellite broadcast.

In the computer, the removable medium 2011 is attached to the drive 2010, so that the program can be installed in the recording unit 2008 via the input/output interface 2005. Furthermore, the program can be received by the communication unit 2009 via a wired or wireless transmission medium and installed in the recording unit 2008. Other than the above method, the program can be installed in the ROM 2002 or the recording unit 2008 in advance.

Note that the program executed by the computer may be a program processed in chronological order according to the order described in the present specification or may be a program executed in parallel or at necessary timing such as when a call is made.

Furthermore, in the present specification, the term "system" means a group of a plurality of configuration elements (devices, modules (parts), and the like), and whether or not all the configuration elements are in the same casing is irrelevant. Therefore, a plurality of devices housed in separate casings and connected via a network, and one device that houses a plurality of modules in one casing are both systems.

Further, embodiments of the present technology are not limited to the above-described embodiments, and various modifications can be made without departing from the gist of the present technology.

For example, in the present technology, a configuration of cloud computing in which one function is shared and processed in cooperation by a plurality of devices via a network can be adopted.

Furthermore, each step described in the above-described flowcharts can be executed by one device or can be shared and executed by a plurality of devices.

Moreover, in a case where a plurality of pieces of processing is included in one step, the plurality of pieces of processing included in the one step can be executed by one device or can be shared and executed by a plurality of devices.

<Combination Example of Configuration>

The present technology may have the following configurations.

(1)

An information processing apparatus including:
　an authentication sharing control unit configured to control sharing of authentication information of a user among a plurality of information processing apparatuses attached to the same user and having different authentication levels.

(2)

The information processing apparatus according to (1) above, in which
　the plurality of information processing apparatuses includes a first information processing apparatus and a second information processing apparatus, and
　the authentication sharing control unit controls sharing of the authentication information between the first information processing apparatus and the second information processing apparatus.

(3)

The information processing apparatus according to (2) above, further including:
　a correlation detection unit configured to detect a correlation between first characteristic data based on first data detected in the first information processing apparatus, and second characteristic data based on second data detected in the second information processing apparatus, in which
　the authentication sharing control unit controls sharing of the authentication information between the first information processing apparatus and the second information processing apparatus on the basis of the correlation between the first characteristic data and the second characteristic data.

(4)

The information processing apparatus according to (3) above, in which
　the first characteristic data is based on the first data detected in a state where the first information processing apparatus is attached to the user, and the second characteristic data is based on the second data detected in a state where the second information processing apparatus is attached to the user.

<4-1>

The information processing apparatus according to (4) above, in which
　the first characteristic data is based on the first data detected in a state where the first information processing apparatus is kept attached to the user after user authentication is performed in the first information processing apparatus in a state where the first information processing apparatus is being attached to the user, and
　the authentication sharing control unit controls transmission of the authentication information based on the user authentication to the second information processing apparatus.

(5)

The information processing apparatus according to (3) or (4) above, in which
　the first characteristic data is based on the first data detected in parallel to the second data.

(6)

The information processing apparatus according to any one of (3) to (5) above, in which
　the first characteristic data and the second characteristic data indicate characteristics of the user.

(7)

The information processing apparatus according to any one of (3) to (6) above, further including:

an output control unit configured to control an output of information prompting a predetermined behavior during detection of the first characteristic data and the second characteristic data.

(8)

The information processing apparatus according to any one of (2) to (7) above, in which
the authentication sharing control unit controls transmission of the authentication information of the first information processing apparatus to the second information processing apparatus in a case where the authentication level of the first information processing apparatus is higher than the authentication level of the second information processing apparatus.

(9)

The information processing apparatus according to (8) above, in which
the authentication information includes the authentication level of the first information processing apparatus.

(10)

The information processing apparatus according to any one of (2) to (9) above, in which
the authentication sharing control unit selects a combination of the first information processing apparatus and the second information processing apparatus from among three or more of the information processing apparatuses on the basis of a type of characteristic data detectable by each of the information processing apparatuses and presence or absence of attachment to the user of each of the information processing apparatuses.

<10-1>

The information processing apparatus according to (2) above, further including:
a correlation detection unit configured to detect a correlation between an authentication result of first user authentication in the first information processing apparatus and an authentication result of second user authentication in the second information processing apparatus, in which
the authentication sharing control unit controls sharing of the authentication information between the first information processing apparatus and the second information processing apparatus on the basis of the correlation between the authentication result of the first user authentication and the authentication result of the second user authentication.

(11)

The information processing apparatus according to (1) above, in which
the plurality of information processing apparatuses includes a first information processing apparatus, and
the authentication sharing control unit controls sharing of the authentication information with the first information processing apparatus.

(12)

The information processing apparatus according to (11) above, further including:
an attachment detection unit configured to detect presence or absence of attachment to the user;
a characteristic detection unit configured to detect first characteristic data based on first data detected in a state of being attached to the user; and
a correlation detection unit configured to detect a correlation between the first characteristic data and second characteristic data based on second data detected in a state of being attached to the user in the first information processing apparatus, in which
the authentication sharing control unit controls sharing of the authentication information with the first information processing apparatus on the basis of the correlation between the first characteristic data and the second characteristic data.

(13)

The information processing apparatus according to (12) above, further including:
an authentication unit configured to perform user authentication with the authentication level higher than the first information processing apparatus, in which
the authentication sharing control unit controls transmission of the authentication information based on the user authentication to the first information processing apparatus.

<13-1>

The information processing apparatus according to (13) above, in which
the first characteristic data is based on the first data detected in a state of being kept attached to the user after the user authentication is performed in a state of being attached to the user.

(14)

The information processing apparatus according to (13) above, further including:
an authentication state setting unit configured to invalidate the user authentication in a case where the information processing apparatus is removed from the user.

<14-1>

The information processing apparatus according to (13) or (14) above, in which
the first characteristic data is based on the first data detected in parallel with the user authentication performed in a state of being attached to the user.

<14-2>

The information processing apparatus according to any one of (12) to (14) above, in which
the first characteristic data is based on the first data detected in parallel to the second data.

<14-3>

The information processing apparatus according to any one of (12) to (14) above, in which
the first characteristic data and the second characteristic data indicate characteristics of the user.

(15)

The information processing apparatus according to any one of (12) to (14) above, further including:
an output control unit configured to control an output of information prompting a predetermined behavior during detection of the first characteristic data.

(16)

The information processing apparatus according to any one of (12) to (15) above, further including:
an attachment detection unit configured to detect presence or absence of attachment to the user.

<16-1>

The information processing apparatus according to (11) above, further including:
a human body communication unit configured to perform human body communication with the first information processing apparatus; and
a correlation detection unit configured to detect a correlation of patterns of signals transmitted to and received from the first information processing apparatus by the human body communication, in which
the authentication sharing control unit controls sharing of the authentication information with the first information processing apparatus on the basis of the correlation of the patterns of the signals.

(17)
The information processing apparatus according to any one of (11) to (16) above, in which
the authentication information is authentication information received from the second information processing apparatus.

(18)
The information processing apparatus according to any one of (1) to (17) above, further including:
an output control unit configured to control an output of information indicating a sharing status of the authentication information among the plurality of information processing apparatuses.

(19)
An information processing method including:
controlling sharing of authentication information of a user among a plurality of information processing apparatuses attached to the same user and having different authentication levels.

(20)
A program for causing a computer to execute processing of:
controlling sharing of authentication information of a user among a plurality of information processing apparatuses attached to the same user and having different authentication levels.

Note that the effects described in the present specification are merely examples and are not limited, and other effects may be exhibited.

REFERENCE SIGNS LIST

1 Information processing system
11, 11a, 11b Strong device
12, 12a, 12b Weak device
13, 13a, 13b Information processing terminal
14 Server
51 Mount detection unit
52 Authentication unit
53 Characteristic detection unit
54 Transmission control unit
55 Authentication state setting unit
61 Output control unit
101 Mount detection unit
102 Characteristic detection unit
103 Biometric data detection unit
104 Transmission control unit
105 Authentication state setting unit
111 Output control unit
151 Correlation detection unit
152 Authentication sharing control unit
155 Output control unit
201 Biometric data processing unit
202 Learning unit
301 Authentication unit
302 Transmission control unit
351 Authentication unit
352 Transmission control unit
353 Authentication state setting unit
401 Correlation detection unit
402 Authentication sharing control unit
501 Information processing system
511-1 to 511-n Wearable device
512 Information processing terminal
551 Mount detection unit
552 Authentication unit
553 Characteristic detection unit
554 Biometric data detection unit
555 Transmission control unit
556 Authentication state setting unit
557 Sensor control unit
558 Sensor unit
601 Correlation detection unit
602 Authentication sharing control unit
603 Transmission control unit
701 Information processing system
711 Strong device
712 Weak device
751 Biometric data detection unit
752 Correlation detection unit
753 Authentication sharing control unit
754 Biometric information management unit
756 Human body communication unit
801 Biometric information management unit
802 Human body communication unit
901 Information processing system
911 Strong device
912 Weak device
951 Characteristic detection unit
952 Correlation detection unit
953 Authentication sharing control unit
1001 Characteristic detection unit
1002 Transmission control unit
1003 Function control unit
1004 Execution unit
1101 Information processing system
1111 Strong device
1112 Weak device
1201 Strong device
1202 Weak device
1211 Strong device
1202 Weak device
1251 Wearable device
1301 Device

The invention claimed is:
1. An information processing system comprising:
an authentication sharing control unit configured to control sharing of authentication information of a user among a plurality of information processing apparatuses attached to the user, the information processing apparatuses having different authentication levels; and
an output control unit configured to control output of information prompting a predetermined behavior related to the sharing of the authentication information,
wherein the authentication sharing control unit controls the sharing of the authentication information of the user based on an authentication level of each information processing apparatus and detected behavior of the user including the prompted predetermined behavior detected by each information processing apparatus,
wherein the predetermined behavior controls the sharing of the authentication information of the user by causing the authentication information of an information processing apparatus having a strong authentication level among the plurality of information processing apparatuses to be shared with an information processing apparatus having a weak authentication level among the plurality of information processing apparatuses, and
wherein the authentication sharing control unit and the output control unit are each implemented via at least one processor.

2. The information processing system according to claim 1, wherein
the plurality of information processing apparatuses includes a first information processing apparatus and a second information processing apparatus, and
the authentication sharing control unit controls sharing of the authentication information between the first information processing apparatus and the second information processing apparatus.

3. The information processing system according to claim 2, further comprising:
a correlation detection unit configured to detect a correlation between first characteristic data based on first data detected in the first information processing apparatus, and second characteristic data based on second data detected in the second information processing apparatus,
wherein the authentication sharing control unit controls sharing of the authentication information between the first information processing apparatus and the second information processing apparatus on a basis of the correlation between the first characteristic data and the second characteristic data, and
wherein the correlation detection unit is implemented via at least one processor.

4. The information processing system according to claim 3, wherein
the first characteristic data is based on the first data detected in a state where the first information processing apparatus is attached to the user, and
the second characteristic data is based on the second data detected in a state where the second information processing apparatus is attached to the user.

5. The information processing system according to claim 3,
wherein the first characteristic data is based on the first data detected in parallel to the second data.

6. The information processing system according to claim 3,
wherein the first characteristic data and the second characteristic data indicate characteristics of the user.

7. The information processing system according to claim 3,
wherein the output control unit controls the output of the information prompting the predetermined behavior during detection of the first characteristic data and the second characteristic data.

8. The information processing system according to claim 2,
wherein the authentication sharing control unit controls transmission of the authentication information of the first information processing apparatus to the second information processing apparatus in a case where the authentication level of the first information processing apparatus is higher than the authentication level of the second information processing apparatus.

9. The information processing system according to claim 2,
wherein the authentication sharing control unit selects a combination of the first information processing apparatus and the second information processing apparatus from among three or more of the information processing apparatuses on a basis of a type of characteristic data detectable by each of the information processing apparatuses and presence or absence of attachment to the user of each of the information processing apparatuses.

10. The information processing system according to claim 1, wherein
the plurality of information processing apparatuses includes a first information processing apparatus, and
the authentication sharing control unit controls sharing of the authentication information with the first information processing apparatus.

11. The information processing system according to claim 10, further comprising:
a characteristic detection unit configured to detect first characteristic data based on first data detected in a state of being attached to the user; and
a correlation detection unit configured to detect a correlation between the first characteristic data and second characteristic data based on second data detected in a state of being attached to the user in the first information processing apparatus,
wherein the authentication sharing control unit controls sharing of the authentication information with the first information processing apparatus on a basis of the correlation between the first characteristic data and the second characteristic data, and
wherein the characteristic detection unit and the correlation detection unit are each implemented via at least one processor.

12. The information processing system according to claim 11, further comprising:
an authentication unit configured to perform user authentication with the authentication level higher than the first information processing apparatus,
wherein the authentication sharing control unit controls transmission of the authentication information based on the user authentication to the first information processing apparatus, and
wherein the authentication unit is implemented via at least one processor.

13. The information processing system according to claim 12, further comprising:
an authentication state setting unit configured to invalidate the user authentication in a case where the information processing apparatus is removed from the user,
wherein the authentication state setting unit is implemented via at least one processor.

14. The information processing system according to claim 11,
wherein the output control unit controls the output of the information prompting the predetermined behavior during detection of the first characteristic data.

15. The information processing system according to claim 11, further comprising:
an attachment detection unit configured to detect presence or absence of attachment to the user,
wherein the attachment detection unit is implemented via at least one processor.

16. The information processing system according to claim 10,
wherein the authentication information is authentication information received from the second information processing apparatus.

17. The information processing system according to claim 1, further comprising:
an output control unit configured to control an output of information indicating a sharing status of the authentication information among the plurality of information processing apparatuses,
wherein the output control unit is implemented via at least one processor.

18. An information processing method comprising:

controlling sharing of authentication information of a user among a plurality of information processing apparatuses attached to the same user, the information processing apparatuses having different authentication levels; and outputting information prompting a predetermined behavior of the user related to the sharing of the authentication information, wherein the sharing of the authentication information of the user is controlled based on an authentication level of each information processing apparatus and detected behavior of the user including the prompted predetermined behavior detected by each information processing apparatus, and wherein the predetermined behavior controls the sharing of the authentication information of the user by causing the authentication information of an information processing apparatus having a strong authentication level among the plurality of information processing apparatuses to be shared with an information processing apparatus having a weak authentication level among the plurality of information processing apparatuses.

19. A non-transitory computer-readable storage medium having embodied thereon a program, which when executed by a computer causes the computer to execute a method, the method comprising:

controlling sharing of authentication information of a user among a plurality of information processing apparatuses attached to the same user, the information processing apparatuses having different authentication levels; and outputting information prompting a predetermined behavior of the user related to the sharing of the authentication information, wherein the sharing of the authentication information of the user is controlled based on an authentication level of each information processing apparatus and detected behavior of the user including the prompted predetermined behavior detected by each information processing apparatus, and wherein the predetermined behavior controls the sharing of the authentication information of the user by causing the authentication information of an information processing apparatus having a strong authentication level among the plurality of information processing apparatuses to be shared with an information processing apparatus having a weak authentication level among the plurality of information processing apparatuses.

* * * * *